US012777392B2

(12) United States Patent
Zhou et al.

(10) Patent No.: US 12,777,392 B2
(45) Date of Patent: Oct. 27, 2026

(54) EARLY TIME ALIGNMENT ACQUISITION FOR FAST CELL SWITCHING

(71) Applicant: Comcast Cable Communications, LLC, Philadelphia, PA (US)

(72) Inventors: Hua Zhou, Vienna, VA (US); Hyoungsuk Jeon, Centreville, VA (US); Esmael Hejazi Dinan, McLean, VA (US); Ali Cagatay Cirik, Chantilly, VA (US); Gautham Prasad, Herndon, VA (US); Taehun Kim, Fairfax, VA (US); Jian Xu, McLean, VA (US); Fasil Abdul Latheef, Dresden (DE); Hsin-Hsi Tsai, Taichung City (TW)

(73) Assignee: Comcast Cable Communications, LLC, Philadelphia, PA (US)

( * ) Notice: Subject to any disclaimer, the term of this patent is extended or adjusted under 35 U.S.C. 154(b) by 282 days.

(21) Appl. No.: 18/491,102

(22) Filed: Oct. 20, 2023

(65) Prior Publication Data

US 2024/0187954 A1 Jun. 6, 2024

Related U.S. Application Data

(60) Provisional application No. 63/418,403, filed on Oct. 21, 2022.

(51) Int. Cl.

| | |
|---|---|
| ***H04W 36/32*** | (2009.01) |
| ***H04W 36/00*** | (2009.01) |
| ***H04W 72/232*** | (2023.01) |

(52) U.S. Cl.

CPC ....... *H04W 36/32* (2013.01); *H04W 36/0061* (2013.01); *H04W 36/0072* (2013.01); *H04W 72/232* (2023.01)

(58) Field of Classification Search

None

See application file for complete search history.

(56) References Cited

U.S. PATENT DOCUMENTS

| | | | | |
|---|---|---|---|---|
| 8,396,032 B2 * | 3/2013 | Kato | ................. | H04W 56/0045 370/329 |
| 8,725,143 B2 * | 5/2014 | Park | ................ | H04W 36/00835 455/434 |

(Continued)

FOREIGN PATENT DOCUMENTS

| | | |
|---|---|---|
| JP | 2014522136 A | 8/2014 |
| WO | 2021263076 A1 | 12/2021 |

(Continued)

OTHER PUBLICATIONS

3GPP TS 38.133 V17.4.0 (Dec. 2021), 3rd Generation Partnership Project; Technical Specification Group Radio Access Network; NR; Requirements for support of radio resource management (Release 17).

(Continued)

*Primary Examiner* — Faiyazkhan Ghafoerkhan

(74) *Attorney, Agent, or Firm* — Banner & Witcoff, Ltd.

(57) ABSTRACT

A wireless device may communicate via one or more cells. A cell switching command may be used to indicate cell switching for the wireless device. Before the cell switching command is sent/received, an early time alignment acquisition may be performed. A deactivated initial uplink bandwidth part may be used to transmit the preamble. A cell switching command may be used to activate the (deactivated) initial uplink bandwidth part of the candidate cell. After being activated, the initial uplink bandwidth part may be used for uplink signal transmission via the cell.

20 Claims, 55 Drawing Sheets

(56) References Cited

U.S. PATENT DOCUMENTS

| | | | | |
|---|---|---|---|---|
| 8,804,630 | B2 * | 8/2014 | Ito | H04W 56/0045 370/329 |
| 9,549,351 | B2 * | 1/2017 | Wanstedt | H04W 72/044 |
| 2009/0270094 | A1 * | 10/2009 | Ito | H04W 56/0045 455/434 |
| 2010/0188982 | A1 * | 7/2010 | Kato | H04W 56/0045 370/242 |
| 2020/0260500 | A1 * | 8/2020 | Agiwal | H04W 28/0278 |
| 2023/0199571 | A1 * | 6/2023 | Babaei | H04W 36/0016 370/331 |
| 2023/0362986 | A1 * | 11/2023 | Leng | H04W 74/0838 |
| 2024/0015602 | A1 * | 1/2024 | Babaei | H04W 36/0016 |
| 2024/0187954 | A1 * | 6/2024 | Zhou | H04W 36/0077 |
| 2025/0071680 | A1 * | 2/2025 | Zhou | H04W 72/232 |
| 2025/0220530 | A1 * | 7/2025 | Xu | H04W 36/0069 |
| 2025/0247750 | A1 * | 7/2025 | Xu | H04W 36/324 |
| 2025/0374132 | A1 * | 12/2025 | Teyeb | H04W 12/041 |

FOREIGN PATENT DOCUMENTS

| | | | |
|---|---|---|---|
| WO | 2022/130207 | A1 | 6/2022 |
| WO | 2022208990 | A1 | 10/2022 |

OTHER PUBLICATIONS

3GPP TS 38.211 V17.1.0 (Mar. 2022), 3rd Generation Partnership Project; Technical Specification Group Radio Access Network; NR; Physical channels and modulation (Release 17).
3GPP TS 38.212 V17.1.0 (Mar. 2022), 3rd Generation Partnership Project; Technical Specification Group Radio Access Network; NR; Multiplexing and channel coding (Release 17).
3GPP TS 38.213 V17.1.0 (Mar. 2022), 3rd Generation Partnership Project; Technical Specification Group Radio Access Network; NR; Physical layer procedures for control (Release 17).
3GPP TS 38.214 V17.1.0 (Mar. 2022) 3rd Generation Partnership Project; Technical Specification Group Radio Access Network; NR; Physical layer procedures for data (Release 17).
3GPP TS 38.215 V17.1.0 (Mar. 2022), 3rd Generation Partnership Project; Technical Specification Group Radio Access Network; NR; Physical layer measurements (Release 17).
3GPP TS 38.300 V16.7.0 (Sep. 2021), Technical Specification, 3rd Generation Partnership Project; Technical Specification Group Radio Access Network; NR; NR and NG-RAN Overall Description; Stage 2 (Release 16).
3GPP TS 38.321 V17.0.0 (Mar. 2022), 3rd Generation Partnership Project; Technical Specification Group Radio Access Network;NR;Medium Access Control (MAC) protocol specification (Release 17).
3GPP TS 38.331 V16.7.0 (Dec. 2021) 3rd Generation Partnership Project; Technical Specification Group Radio Access Network; NR; Radio Resource Control (RRC) protocol specification (Release 16).
R2-2207381 3GPP TSG-RAN WG2 Meeting #119e, E-Meeting, Aug. 17-Aug. 26, 2022, Source: Intel Corporation, Title: Discussion on candidate solutions of L1 L2 mobility.
R2-2207857 3GPP TSG-RAN WG2 Meeting #119 electronic, Online, Aug. 17-29, 2022, Source: Sharp, Title: Initial discussion of L1/L2 mobility.
R2-2208559 3GPP TSG-RAN WG2 Meeting #119e, Electronic Meeting, Aug. 17-29, 2022, Source: ZTE Corporation, Sanechips, Title: Initial Considerations on L1/L2 Signaling Based Mobility.
R2-2208679 3GPP TSG-RAN WG2 #119e, Electronic meeting, Aug. 17, 2022-Aug. 29, 2022, Source: Ericsson, Title: R17 NR NTN UE Capability issues.
R2-2210172 3GPP TSG RAN WG1 Meeting #110bis-e, Online, Oct. 10-19, 2022, Source: ZTE Corporation, Sanechips, Title: Discussion on dynamic switch for L1/L2 mobility.
R2-2210332 3GPP TSG RAN WG2 Meeting #110-bis-e, Electronic meeting, Oct. 10-19, 2022, Source: Ericsson, Title: L1 measurements and beam indication for L1/L2 based inter-cell mobility.
R2-2210333 3GPP TSG RAN WG2 Meeting #110-bis-e, Electronic meeting, Oct. 10-19, 2022, Source: Ericsson, Title: RRC aspects of L1/L2 based inter-cell mobility.
R1-2209204 3GPP TSG RAN WG1 #110bis-e, e-Meeting, Oct. 19-19, 2022, Source: InterDigital, Inc., Title: Timing advance management to reduce latency.
3GPP TS 38.321, V.17.2.0 (Sep. 2022), 3rd Generation Partnership Proejct; Technical Specification Group Radio Access Network; NR; Medium Access Control (MAC) protocol specification (Release 17).
R4-1809660 3GPP TSG-RAN WG4 Meeting #88, Gothenburg, Sweden, Aug. 20-24, 2018, Source: China Telecom, Title: Further discussion on BS test applicability for different SCSes and CHBWs.
R2-2208509 3GPP TSG-RAN WG1 Meeting #110bis-e, e-Meeting, Oct. 10-19, 2022, Source: ZTE, Title: L1 enhancements for inter-cell beam management.
R2-2208510 3GPP TSG-RAN WG1 Meeting #110bis-e, eMeeting, Oct. 10-19, 2022, Source: ZTE, Title: Enhancements on TA management to reduce latency.
May 12, 2026—Japanese Office Action—JP App. 2025-522933.

* cited by examiner

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
| --- | --- |
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 2_7 | Notifying Paging early indication and TRS availability indication for one or more UEs |
| 3_0 | Scheduling of NR sidelink in one cell |
| 3_1 | Scheduling of LTE sidelink in one cell |
| 4_0 | Scheduling of PDSCH with CRC scrambled by MCCH-RNTI/G-RNTI for broadcast |
| 4_1 | Scheduling of PDSCH with CRC scrambled by G-RNTI/G-CS-RNTI for multicast |
| 4_2 | Scheduling of PDSCH with CRC scrambled by G-RNTI/G-CS-RNTI for multicast |

FIG. 23

```
MIB ::=                     SEQUENCE {
   systemFrameNumber                BIT STRING (SIZE (6)),
   subCarrierSpacingCommon          ENUMERATED {scs15or60, scs30or120},
   ssb-SubcarrierOffset             INTEGER (0..15),
   dmrs-TypeA-Position              ENUMERATED {pos2, pos3},
   pdcch-ConfigSIB1                 PDCCH-ConfigSIB1,
   cellBarred                       ENUMERATED {barred, notBarred},
   intraFreqReselection             ENUMERATED {allowed, notAllowed},
   spare                            BIT STRING (SIZE (1))}

PDCCH-ConfigSIB1 ::=        SEQUENCE {
   controlResourceSetZero           ControlResourceSetZero,
   searchSpaceZero                  SearchSpaceZero}
```

FIG. 24A

| Index | SS/PBCH block and CORESET multiplexing pattern | Number of RBs per coreset | Number of Symbols per coreset | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| ... | ... | ... | ... | ... |

FIG. 24B

| Index | *O* | Number of search space sets per slot | *M* | First symbol index |
|---|---|---|---|---|
| 0 | 0 | 1 | 1 | 0 |
| 1 | 0 | 2 | 1/2 | {0, if *i* is even}, {*N*, if is odd} |
| 2 | 2 | 1 | 1 | 0 |
| 3 | 2 | 2 | 1/2 | {0, if *i* is even}, {*N*, if *i* is odd} |
| 4 | 5 | 1 | 1 | 0 |
| 5 | 5 | 2 | 1/2 | {0, if *i* is even}, *N*, if *i* is odd |
| 6 | 7 | 1 | 1 | 0 |
| 7 | 7 | 2 | 1/2 | {0, if *i* is even}, {*N*, if *i* is odd} |
| ... | ... | ... | ... | ... |

FIG. 24C

```
SIB1 ::=      SEQUENCE {
   cellSelectionInfo              SEQUENCE {
      q-RxLevMin                     Q-RxLevMin,
      q-RxLevMinOffset               INTEGER (1..8) ...}
   cellAccessRelatedInfo           CellAccessRelatedInfo,
   connEstFailureControl           ConnEstFailureControl
   si-SchedulingInfo              SI-SchedulingInfo
   servingCellConfigCommon           ServingCellConfigCommonSIB
   ims-EmergencySupport             ENUMERATED {true}
   eCallOverIMS-Support             ENUMERATED {true}
   ue-TimersAndConstants             UE-TimersAndConstants
   uac-BarringInfo                SEQUENCE { ...}
   useFullResumeID                ENUMERATED {true}
   lateNonCriticalExtension         OCTET STRING
   nonCriticalExtension            SIB1-v16xy-IEs  }

ServingCellConfigCommonSIB ::=     SEQUENCE {
   downlinkConfigCommon             DownlinkConfigCommonSIB,
   uplinkConfigCommon              UplinkConfigCommonSIB
   supplementaryUplink             UplinkConfigCommonSIB
   n-TimingAdvanceOffset            ENUMERATED { n0, n25600, n39936 }
   ssb-PositionsInBurst            SEQUENCE {
      inOneGroup                   BIT STRING (SIZE (8)),
      groupPresence                 BIT STRING (SIZE (8)) },
   ssb-PeriodicityServingCell       ENUMERATED {ms5, ms10, ms20, ms40, ms80, ms160},
   tdd-UL-DL-ConfigurationCommon      TDD-UL-DL-ConfigCommon
   ss-PBCH-BlockPower               INTEGER (-60..50),
   ...,}

DownlinkConfigCommonSIB ::=    SEQUENCE {
   frequencyInfoDL              FrequencyInfoDL-SIB,
   initialDownlinkBWP            BWP-DownlinkCommon,
   bcch-Config                  BCCH-Config,
   pcch-Config                  PCCH-Config,  ...}

PCCH-Config ::=          SEQUENCE {
   defaultPagingCycle              PagingCycle,
   nAndPagingFrameOffset              CHOICE {
      oneT                        NULL,
      halfT                      INTEGER (0..1), ...},
   ns                      ENUMERATED {four, two, one},
   firstPDCCH-MonitoringOccasionOfPO   CHOICE {
      sCS15KHZoneT      SEQUENCE (SIZE (1..maxPO-perPF)) OF INTEGER (0..139),...}
   ...,
   [[   nrofPDCCH-MonitoringOccasionPerSSB-InPO-r16  INTEGER (2..4)  ]]
}
```

FIG. 25

```
BWP-DownlinkCommon ::=          SEQUENCE {
   genericParameters              BWP,
   pdcch-ConfigCommon              SetupRelease { PDCCH-ConfigCommon }
   pdsch-ConfigCommon              SetupRelease { PDSCH-ConfigCommon }
   ...}

PDCCH-ConfigCommon ::=          SEQUENCE {
   controlResourceSetZero          ControlResourceSetZero
   commonControlResourceSet          ControlResourceSet
   searchSpaceZero                SearchSpaceZero
   commonSearchSpaceList           SEQUENCE (SIZE(1..4)) OF SearchSpace
   searchSpaceSIB1                SearchSpaceId
   searchSpaceOtherSystemInformation  SearchSpaceId
   pagingSearchSpace               SearchSpaceId
   ra-SearchSpace                 SearchSpaceId
    [[
   firstPDCCH-MonitoringOccasionOfPO  CHOICE {
      sCS15KHZoneT   SEQUENCE (SIZE (1..maxPO-perPF)) OF INTEGER (0..139),
      ...
   }OPTIONAL   -- Cond OtherBWP
    ]]
   ...,}

PDCCH-ServingCellConfig ::=       SEQUENCE {
   slotFormatIndicator            SetupRelease { SlotFormatIndicator }...,
   [[
   availabilityIndicator-r16        SetupRelease {AvailabilityIndicator-r16}
   searchSpaceSwitchTimer-r16         INTEGER (1..80)
   ]]
}

SearchSpaceSwitchConfig-r16 ::=   SEQUENCE {
   cellGroupsForSwitchList-r16       SEQUENCE(SIZE (1..4)) OF CellGroupForSwitch-r16
   searchSpaceSwitchDelay-r16         INTEGER (10..52)
}
CellGroupForSwitch-r16 ::= SEQUENCE(SIZE (1..16)) OF ServCellIndex


ControlResourceSet ::=          SEQUENCE {
   controlResourceSetId            ControlResourceSetId,
   frequencyDomainResources           BIT STRING (SIZE (45)),
   duration                    INTEGER (1..maxCoReSetDuration),
   cce-REG-MappingType               CHOICE {
      interleaved                SEQUENCE {
         reg-BundleSize               ENUMERATED {n2, n3, n6},
         interleaverSize             ENUMERATED {n2, n3, n6},
         shiftIndex               INTEGER(0..maxNrofPhysicalResourceBlocks-1)},
      nonInterleaved              NULL},
   precoderGranularity            ENUMERATED {sameAsREG-bundle, allContiguousRBs},
   pdcch-DMRS-ScramblingID              INTEGER (0..65535)
   ...,  }
```

FIG. 26

```
SearchSpace ::=                    SEQUENCE {
   searchSpaceId                      SearchSpaceId,
   controlResourceSetId                  ControlResourceSetId
   monitoringSlotPeriodicityAndOffset      CHOICE {
      sl1                          NULL,
      sl2                          INTEGER (0..1),...}
   duration                        INTEGER (2..2559)
   monitoringSymbolsWithinSlot           BIT STRING (SIZE (14))
   nrofCandidates                   SEQUENCE {
      aggregationLevel1                  ENUMERATED {n0, n1, n2, ... n8},
      aggregationLevel2                  ENUMERATED {n0, n1, n2, ... n8},
      ...}
   searchSpaceType                    CHOICE {
      common                        SEQUENCE {
         dci-Format0-0-AndFormat1-0          SEQUENCE {...}
         dci-Format2-0                  SEQUENCE {
            nrofCandidates-SFI                SEQUENCE {
               aggregationLevel1                 ENUMERATED {n1, n2}
               aggregationLevel2                 ENUMERATED {n1, n2}...},
            ...}
         dci-Format2-1                  SEQUENCE {...}
...
      },
      ue-Specific                     SEQUENCE {
         dci-Formats       ENUMERATED {formats0-0-And-1-0, formats0-1-And-1-1},
         ...,}
   }
}

SearchSpaceExt-r16 ::=             SEQUENCE {
   controlResourceSetId-r16             ControlResourceSetId-r16
   searchSpaceType-r16                SEQUENCE {
      common-r16                    SEQUENCE {
         dci-Format2-4-r16                SEQUENCE {
            nrofCandidates-CI-r16              SEQUENCE {
               aggregationLevel1-r16             ENUMERATED {n1, n2}...},...}
         dci-Format2-5-r16                SEQUENCE {
            nrofCandidates-IAB-r16              SEQUENCE {
               aggregationLevel1-r16             ENUMERATED {n1, n2}...},...}
         dci-Format2-6-r16                SEQUENCE {...}
         ...}
   }
   searchSpaceGroupIdList-r16       SEQUENCE (SIZE (1.. 2)) OF INTEGER (0..1)
   freqMonitorLocations-r16               BIT STRING (SIZE (5))
}

SearchSpaceSwitchTrigger-r16 ::=   SEQUENCE {
   servingCellId-r16             ServCellIndex,
   positionInDCI-r16
INTEGER(0..maxSFI-DCI-PayloadSize-1)
}
```

FIG. 27

| SCS | OFDM starting Symbols of the candidate SSBs | fc<=3GHz, Lmax=4 | 3GHz<fc<=6GHz, Lmax=8 | fc>6GHz, Lmax=64 |
|---|---|---|---|---|
| CaseA: 15 KHz | {2,8}+14n | n=0,1 | n=0,1,2,3 | Not Applicable (NA) |
| CaseB: 30 KHz | {4,8,16,20}+28n | n=0 | n=0,1 | NA |
| CaseC: 30 KHz | {2,8}+14n | n=0,1 | n=0,1,2,3 | NA |
| CaseD: 120 KHz | {4,8,16,20}+28n | NA | NA | n=0,1,2,3,5,6,7,8,10,11,12,13,15,16,17,18 |
| CaseE: 240 KHz | {8,12,16,20,32,36,40,44} + 56n | NA | NA | n=0,1,2,3,5,6,7,8 |

FIG. 34

Intra-Cell Multiple TRPs

Inter-Cell Multiple TRPs

```
RRCReconfiguration-IEs ::=          SEQUENCE {
   radioBearerConfig                RadioBearerConfig
   secondaryCellGroup               OCTET STRING (CONTAINING CellGroupConfig)
   measConfig                       MeasConfig
   nonCriticalExtension             RRCReconfiguration-v1530-IEs
}
RRCReconfiguration-v1530-IEs ::=    SEQUENCE {
   masterCellGroup          OCTET STRING (CONTAINING CellGroupConfig)
   fullConfig               ENUMERATED {true}        OPTIONAL, -- Cond FullConfig
   ...}
CellGroupConfig ::=                 SEQUENCE {
   cellGroupId                      CellGroupId,
   rlc-BearerToAddModList       SEQUENCE (SIZE(1..maxLC-ID)) OF RLC-BearerConfig
   mac-CellGroupConfig          MAC-CellGroupConfig
   physicalCellGroupConfig      PhysicalCellGroupConfig
   spCellConfig                 SpCellConfig
   sCellToAddModList            SEQUENCE (SIZE (1..maxNrofSCells)) OF SCellConfig
...,}

SpCellConfig ::=                SEQUENCE {
   servCellIndex                ServCellIndex
   reconfigurationWithSync          ReconfigurationWithSync
   spCellConfigDedicated            ServingCellConfig
   ...,}
ServingCellConfig ::=           SEQUENCE {
   initialDownlinkBWP              BWP-DownlinkDedicated
   downlinkBWP-ToAddModList  SEQUENCE (SIZE (1..maxNrofBWPs)) OF BWP-Downlink
   firstActiveDownlinkBWP-Id         BWP-Id
   defaultDownlinkBWP-Id             BWP-Id
   uplinkConfig                 UplinkConfig
  ...}

UplinkConfig ::=              SEQUENCE {
   initialUplinkBWP             BWP-UplinkDedicated
   uplinkBWP-ToAddModList    SEQUENCE (SIZE (1..maxNrofBWPs)) OF BWP-Uplink
   firstActiveUplinkBWP-Id          BWP-Id
   carrierSwitching             SetupRelease { SRS-CarrierSwitching }
   ...,}

ReconfigurationWithSync ::=      SEQUENCE {
   spCellConfigCommon              ServingCellConfigCommon
   newUE-Identity               RNTI-Value,
   t304                      ENUMERATED {ms50, ms100, ms150, ...},
   rach-ConfigDedicated            CHOICE {
      uplink                    RACH-ConfigDedicated,
      supplementaryUplink           RACH-ConfigDedicated
   }...,}
```

FIG. 39

```
RACH-ConfigDedicated ::=      SEQUENCE {
   cfra                     CFRA
   ra-Prioritization           RA-Prioritization
...}

CFRA ::=                SEQUENCE {
   occasions                 SEQUENCE {
      rach-ConfigGeneric       RACH-ConfigGeneric,
      ssb-perRACH-Occasion  ENUMERATED {oneEighth, oneFourth, oneHalf, one, two, ...}
      }
   resources                CHOICE {
      ssb                   SEQUENCE {
         ssb-ResourceList   SEQUENCE (SIZE(1..maxRA-SSB-Resources)) OF CFRA-SSB-
Resource,
         ra-ssb-OccasionMaskIndex      INTEGER (0..15)
      },
      csirs                 SEQUENCE {
         csirs-ResourceList            SEQUENCE (SIZE(1..maxRA-CSIRS-Resources)) OF
CFRA-CSIRS-Resource,
         rsrp-ThresholdCSI-RS          RSRP-Range
      }
   },
   ...,}

CFRA-SSB-Resource ::=        SEQUENCE {
   ssb                      SSB-Index,
   ra-PreambleIndex            INTEGER (0..63),
   ...,}

CFRA-CSIRS-Resource ::=       SEQUENCE {
   csi-RS                     CSI-RS-Index,
   ra-OccasionList             SEQUENCE (SIZE(1..maxRA-OccasionsPerCSIRS)) OF
INTEGER (0..maxRA-Occasions-1),
   ra-PreambleIndex            INTEGER (0..63),
   ...}


RACH-ConfigGeneric ::=          SEQUENCE {
   prach-ConfigurationIndex         INTEGER (0..255),
   msg1-FDM                     ENUMERATED {one, two, four, eight},
   msg1-FrequencyStart            INTEGER (0..maxNrofPhysicalResourceBlocks-1),
   zeroCorrelationZoneConfig        INTEGER(0..15),
   preambleReceivedTargetPower       INTEGER (-202..-60),
   preambleTransMax               ENUMERATED {n3, n4, n5, n6, n7, n8, n10, ...},
   powerRampingStep               ENUMERATED {dB0, dB2, dB4, dB6},
   ra-ResponseWindow              ENUMERATED {sl1, sl2, sl4, sl8, sl10, sl20, sl40, sl80},
   ...,}
```

FIG. 40

CHO: Conditional Handover

```
RRCReconfiguration-v1610-IEs ::=       SEQUENCE {
   otherConfig-v1610                   OtherConfig-v1610
   bap-Config-r16                      SetupRelease { BAP-Config-r16 }
   iab-IP-AddressConfigurationList-r16    IAB-IP-AddressConfigurationList-r16
   conditionalReconfiguration-r16      ConditionalReconfiguration-r16
   daps-SourceRelease-r16              ENUMERATED{true}
   t316-r16                            SetupRelease {T316-r16}
   ...
   targetCellSMTC-SCG-r16              SSB-MTC
   }

ConditionalReconfiguration-r16 ::=   SEQUENCE {
   attemptCondReconfig-r16           ENUMERATED {true}
condReconfigToRemoveList-r16         CondReconfigToRemoveList-r16
condReconfigToAddModList-r16         CondReconfigToAddModList-r16
 ...
}

CondReconfigToAddModList-r16 ::= SEQUENCE (SIZE (1.. maxNrofCondCells-r16)) OF
CondReconfigToAddMod-r16

CondReconfigToAddMod-r16 ::=    SEQUENCE {
   condReconfigId-r16           CondReconfigId-r16,
   condExecutionCond-r16        SEQUENCE (SIZE (1..2)) OF MeasId
   condRRCReconfig-r16          OCTET STRING (CONTAINING RRCReconfiguration)
   ...,
}

CondReconfigId-r16 ::=          INTEGER (1.. maxNrofCondCells-r16)
```

*condExecutionCond*

The execution condition that needs to be fulfilled in order to trigger the execution of a conditional reconfiguration for CHO, CPA, intra-SN CPC without MN involvement or MN initiated inter-SN CPC. When configuring 2 triggering events (Meas Ids) for a candidate cell, network ensures that both refer to the same *measObject*. For CHO, if network configures *condEventD1* or *condEventT1* for a candidate cell network configures a second triggering event *condEventA3, condEventA4* or *condEventA5* for the same candidate cell. Network does not configure both *condEventD1* and *condEventT1* for the same candidate cell.

CondEvent A3: Conditional reconfiguration candidate becomes amount of offset better than PCell/PSCell;

CondEvent A4: Conditional reconfiguration candidate becomes better than absolute threshold;

CondEvent A5: PCell/PSCell becomes worse than absolute threshold1 AND Conditional reconfiguration candidate becomes better than another absolute threshold2;

FIG. 42

ICBM: Inter-Cell Beam Management

```
RRCReconfiguration-IEs ::=          SEQUENCE {
   radioBearerConfig                RadioBearerConfig
   masterCellGroup                  OCTET STRING (CONTAINING CellGroupConfig)
   measConfig                       MeasConfig
...}

RRCReconfiguration-vXXXX-IEs ::=          SEQUENCE {
   candidates-L1L2-Config          Candidates-L1L2-Config
...}

Candidates-L1L2-Config ::=   SEQUENCE {
   candidates-L1L2-ToRemoveList        Candidates-L1L2-ToRemoveList;
   candidates-L1L2-ToAddModList        Candidates-L1L2-ToAddModList;
...}

Candidates-L1L2-ToAddModList ::= SEQUENCE (SIZE (1.. maxNrofL1L2Candidates)) OF
Candidates-L1L2-ToAddMod
```

FIG. 49A

```
candidates-L1L2-ToAddMod ::=     SEQUENCE {
   candidates-L1L2-Id              Candidates-L1L2Id,
   candidates-L1L2-CellsConfig     OCTET STRING (CONTAINING RRCReconfiguration)
}
```

FIG. 49B

```
candidates-L1L2-ToAddMod ::=     SEQUENCE {
   candidates-L1L2-Id              Candidates-L1L2Id,
   candidates-L1L2-CellsConfig       OCTET STRING (CONTAINING CellGroupConfig)
}
```

FIG. 49C

```
candidates-L1L2-ToAddMod ::=     SEQUENCE {
   candidates-L1L2-Id              Candidates-L1L2Id,
   candidates-L1L2-CellsConfig       OCTET STRING (CONTAINING SpCellConfig)
}
```

FIG. 49D

EARLY TIME ALIGNMENT ACQUISITION FOR FAST CELL SWITCHING

CROSS-REFERENCE TO RELATED APPLICATIONS

This application claims the benefit of U.S. Provisional Application No. 63/418,403 filed on Oct. 21, 2022. The above referenced application is hereby incorporated by reference in its entirety.

BACKGROUND

A wireless device communicates via one or more cells. The wireless device switches from a source cell to a target cell as primary cell (PCell) if the wireless relocates from the source cell to the target cell.

SUMMARY

The following summary presents a simplified summary of certain features. The summary is not an extensive overview and is not intended to identify key or critical elements.

A wireless device may communicate via one or more cells. A cell switching command may be used to indicate cell switching for the wireless device. Before the cell switching command is sent/received, an early time alignment acquisition may be performed. For example, a preamble may be sent to a target cell to acquire an early time alignment prior to cell switching. Uplink bandwidth parts of the target cell may not be activated before reception of the cell switching command such that it may be unclear which uplink bandwidth part should be used by the wireless device for the preamble transmission. For transmission of the preamble, one or more radio resource control messages comprising configuration parameters (e.g., for a layer 1 and/or layer 2 triggered mobility (LTM) procedure) may be received by the wireless device via a source cell. A deactivated initial uplink bandwidth part may be used to transmit the preamble. A cell switching command may be used to activate the (deactivated) initial uplink bandwidth part of the candidate cell. After being activated, the initial uplink bandwidth part may be used for uplink signal transmission via the cell. The wireless device may transmit the preamble via a frequency resource, of the target cell, according to a frequency reference point indicated by a message.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 19 shows example logical channel identifier (LCID) values.

FIG. 20 shows example LCID values.

FIG. 23 shows examples of various downlink control information (DCI) formats.

FIG. 24A shows an example master information block (MIB) message.

FIG. 24B shows an example configuration of a CORESET.

FIG. 24C shows an example of configuration of a search space.

FIG. 25 shows an example of a system information block (SIB).

FIG. 26 shows example RRC configuration parameters.

FIG. 27 shows an example configuration of a search space.

FIG. 34 shows an example of synchronization signal block (SSB) configurations.

FIG. 39 shows an example of a radio resource control (RRC) message for layer 3 based handover.

FIG. 40 shows an example of an RRC message for layer 3 based handover.

FIG. 42 shows an example of an RRC message for layer based conditional handover procedure.

FIG. 49A, FIG. 49B, FIG. 49C, and FIG. 49D show examples of target PCell configurations for PCell switching.

DETAILED DESCRIPTION

Figure 1A:
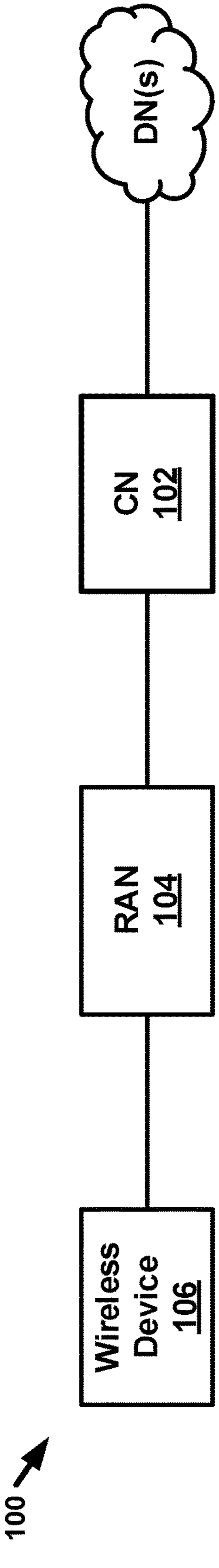
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems.

FIG. 1A shows an example communication network 100. The communication network 100 may comprise a mobile communication network. The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with the one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over/via an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a Generation Node B (gNB), an Next Generation Evolved Node B (ng-eNB), a relay node (e.g., an integrated access and backhaul (IAB) node), a donor node (e.g., a donor eNB, a donor gNB, etc.), an access point (AP) (e.g., a Wi-Fi access point), a transmission and reception point (TRP), a computing device, a device capable of wirelessly communicating, or any other device capable of sending and/or receiving signals. A base station may comprise one or more of the elements listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an eNB (e.g., associated with Evolved-Universal Terrestrial Radio Access (E-UTRA) and/or fourth-generation (4G)

standards), a remote radio head (RRH), a baseband processing unit coupled to one or more RRHs, a repeater node or relay node used to extend the coverage area of a donor node, a ng-eNB, a gNB (e.g., associated with New Radio (NR) and/or fifth-generation (5G) standards), an AP (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an AP, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
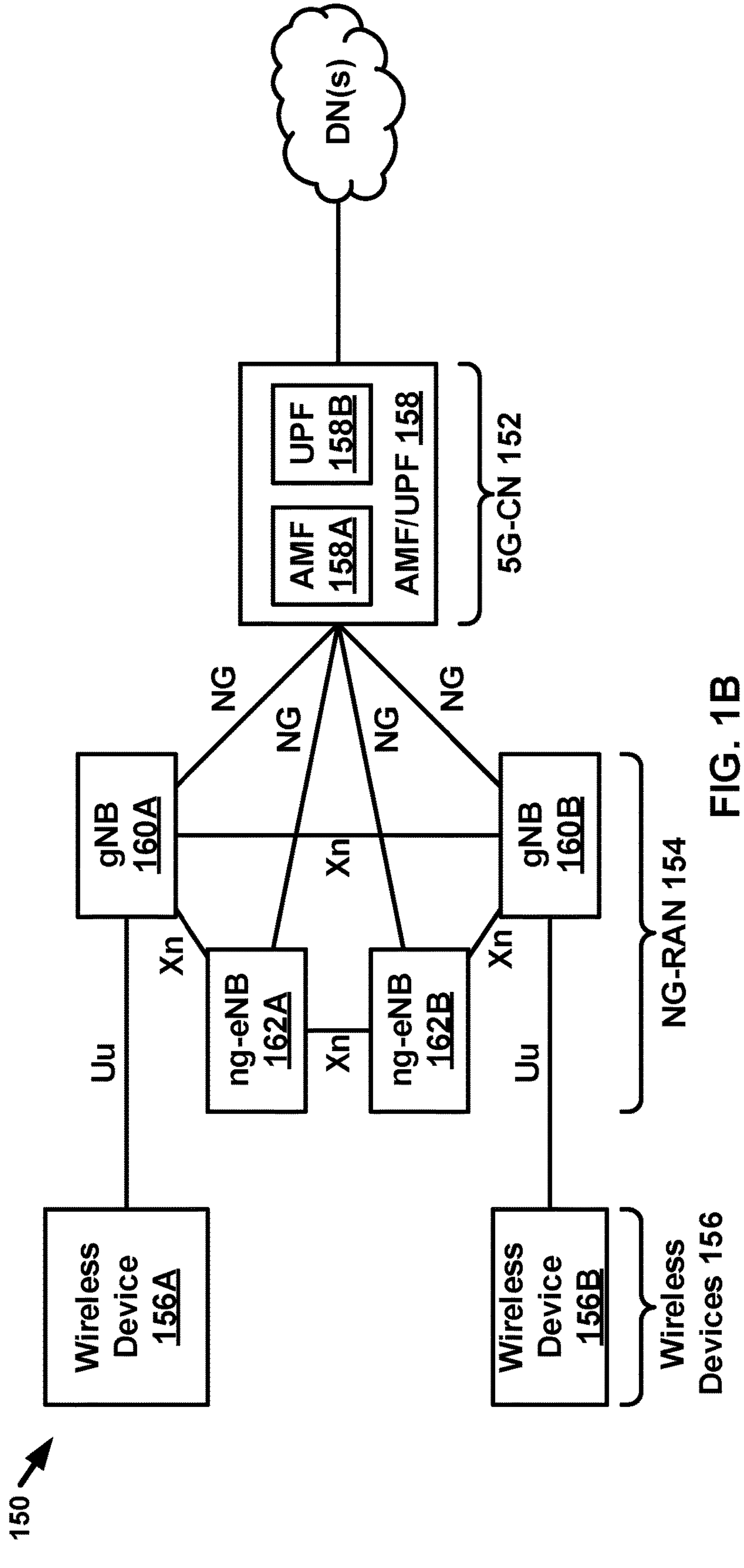

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to the one or more DNs 170. The wireless device(s) 156 may communicate with the one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs 170, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G-CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between the RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs 170, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng-eNBs comprising an ng-eNB 162A and an ng-eNB 162B (collectively ng-eNBs 162)). The RAN 154 may comprise one or more of any quantity of types of base station. The gNBs 160 and/or ng-eNBs 162 may be referred to as base stations. The base stations (e.g., the gNBs 160 and/or ng-eNBs 162) may comprise one or more sets of antennas for communicating with the wireless device(s) 156 wirelessly (e.g., an over an air interface). One or more base stations (e.g., the gNBs 160 and/or the ng-eNBs 162) may comprise multiple sets of antennas to respectively control multiple cells (or sectors). The cells of the base stations (e.g., the gNBs 160 and/or the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G-CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide E-UTRA user plane and control plane protocol terminations towards the wireless device(s) 156 via a Uu interface (e.g., where E-UTRA may refer to the 3GPP 4G radio-access technology). A base station (e.g., the ng-eNB 162B) may provide E-UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, IoT devices, hotspots, cellular repeaters, computing devices, and/or, more generally, UE. Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
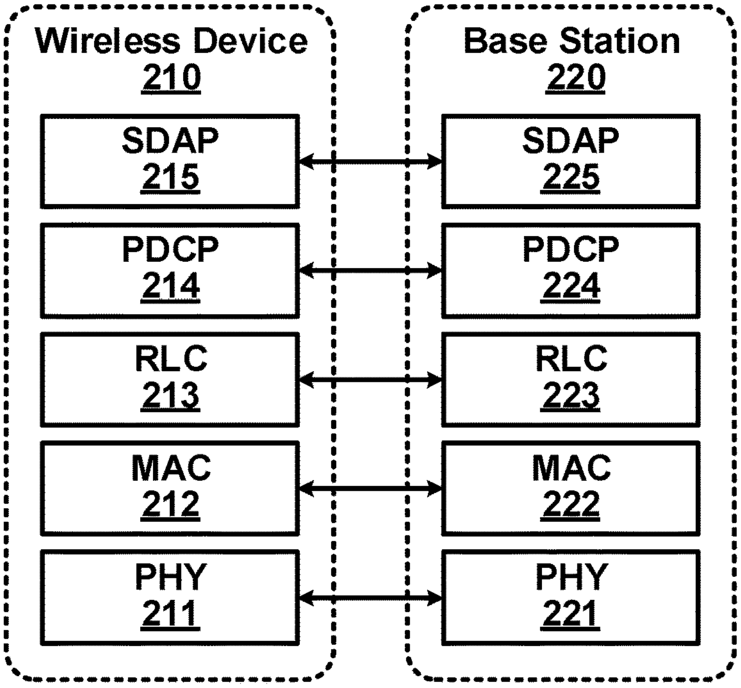
FIG. 2A shows an example user plane.
Figure 2B:
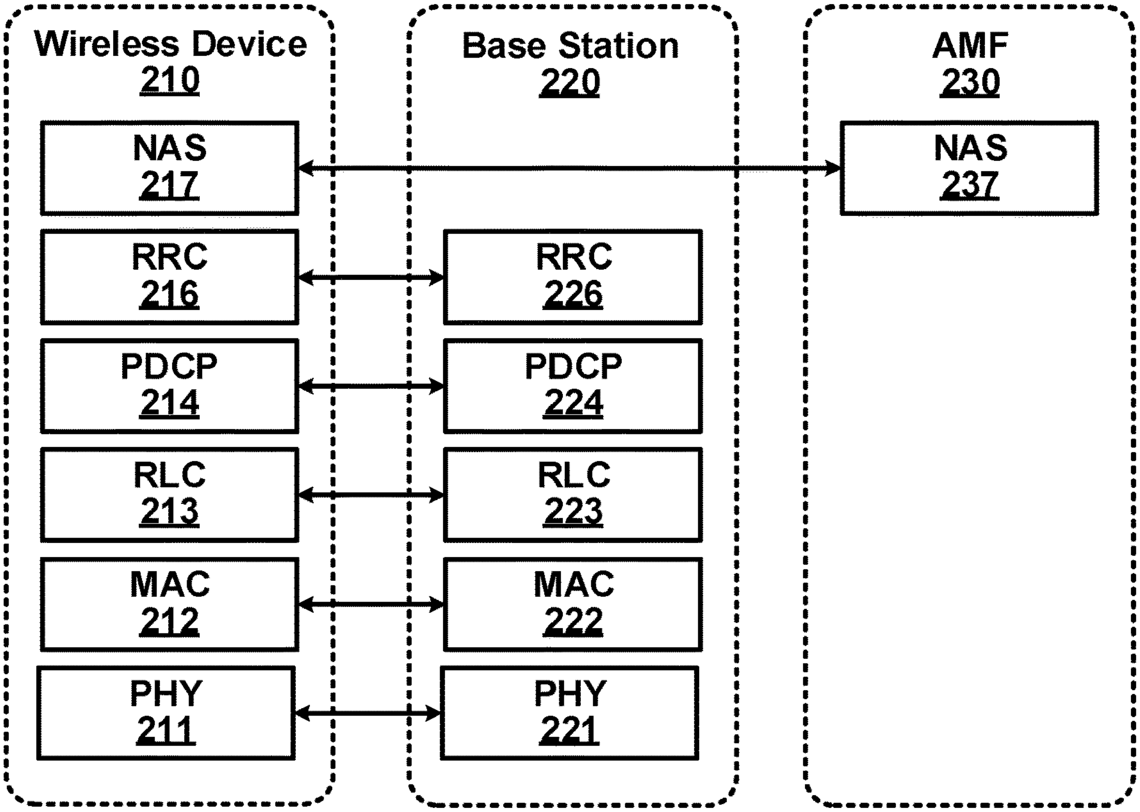
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configurations and/or the control plane configurations may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
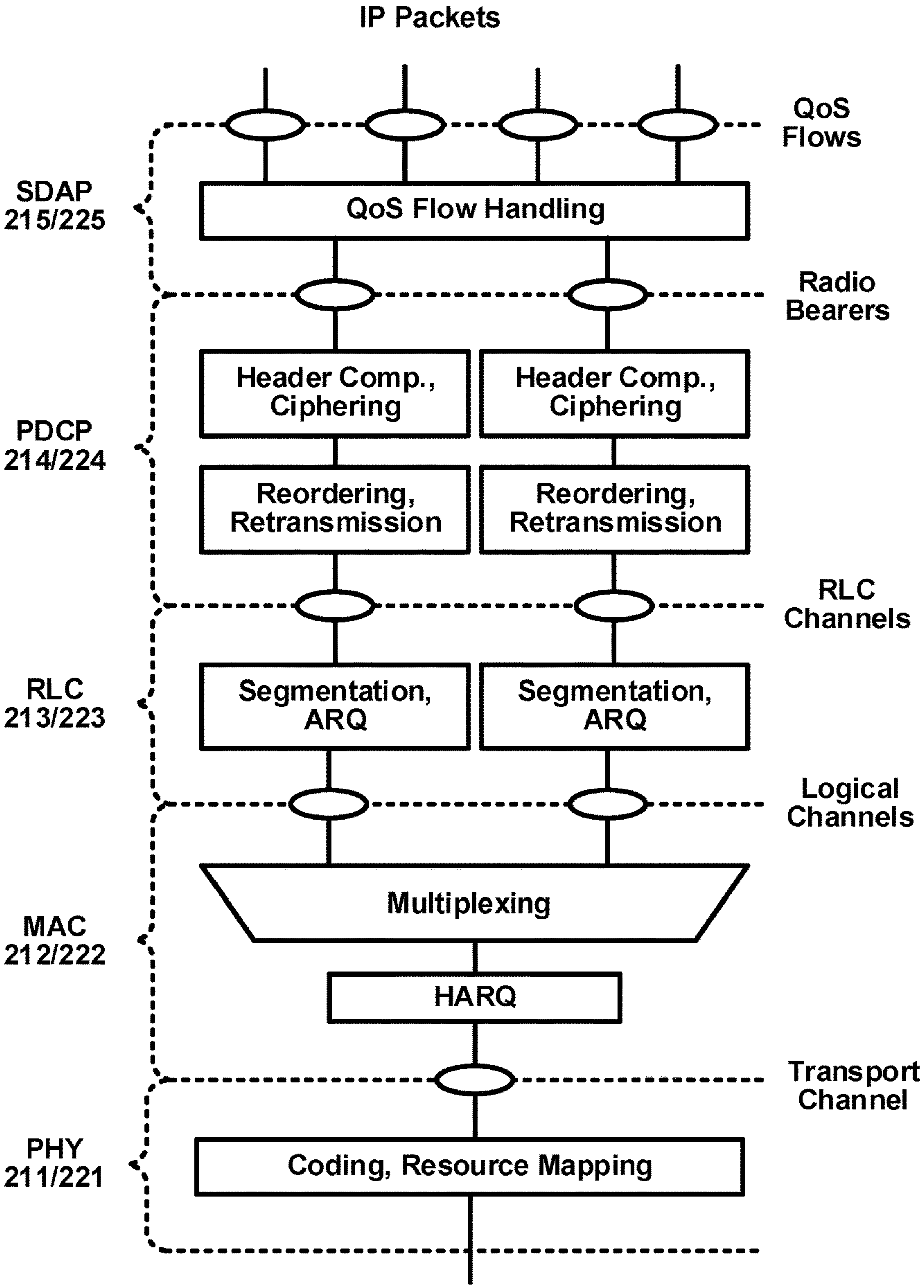
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform QoS flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows 310 of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers (e.g., RLCs 213 and 223) may perform one or more of the noted functions, for example, based on the transmission mode the RLC layer (e.g., RLCs 213 and 223) is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels 330 as a service to the PDCP layers (e.g., PDCPs 214 and 224, respectively), such as shown in FIG. 3.

The MAC layers (e.g., MACs 212 and 222) may perform multiplexing/demultiplexing of logical channels 340 and/or mapping between logical channels 340 and transport channels 350. The multiplexing/demultiplexing may comprise multiplexing/demultiplexing of data units/data portions, belonging to the one or more logical channels 340, into/from Transport Blocks (TB s) delivered to/from PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels 340 of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels 350 to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
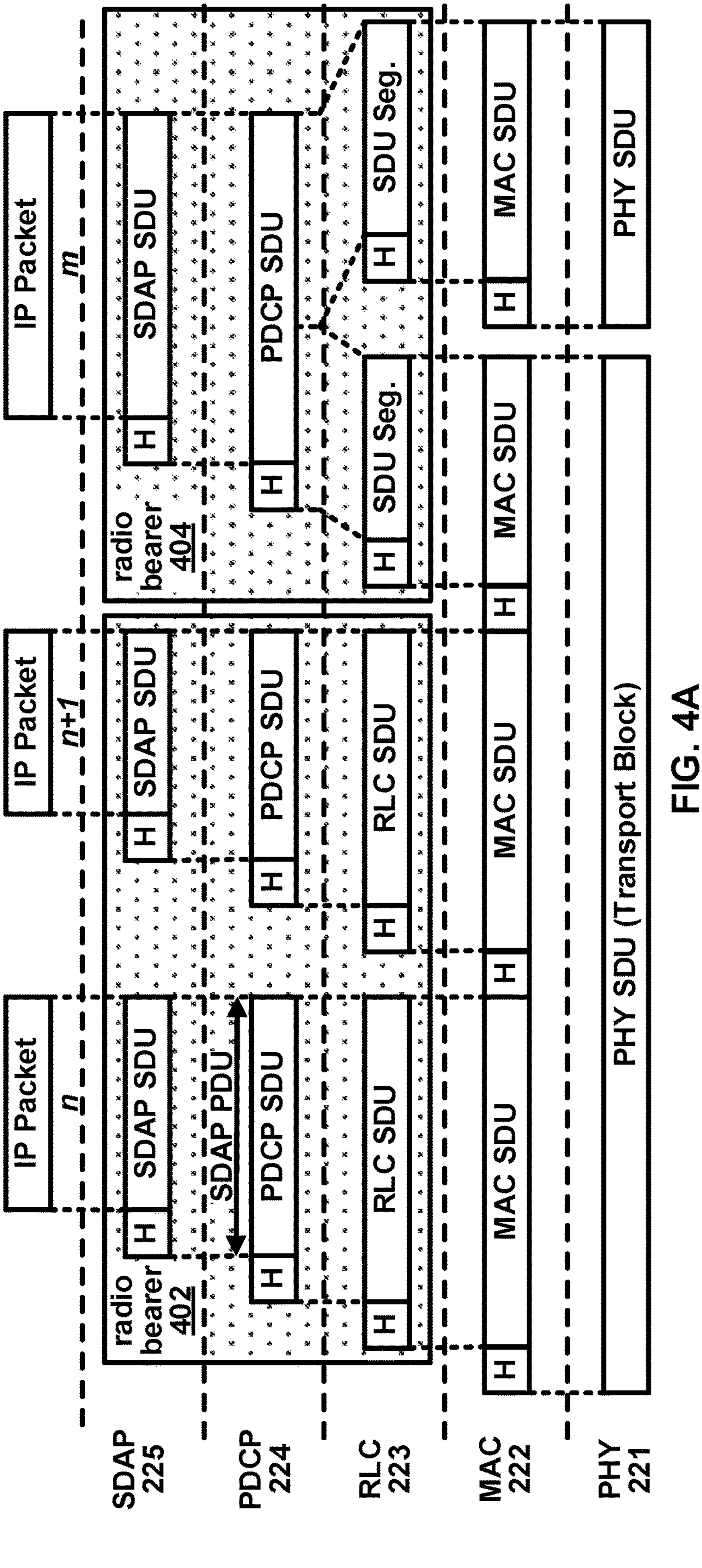
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration) . The NR MAC PDU structure may reduce a processing time and/or associated latency, for example, if the MAC PDU subheaders are computed before assembling the full MAC PDU.

Figure 4B:
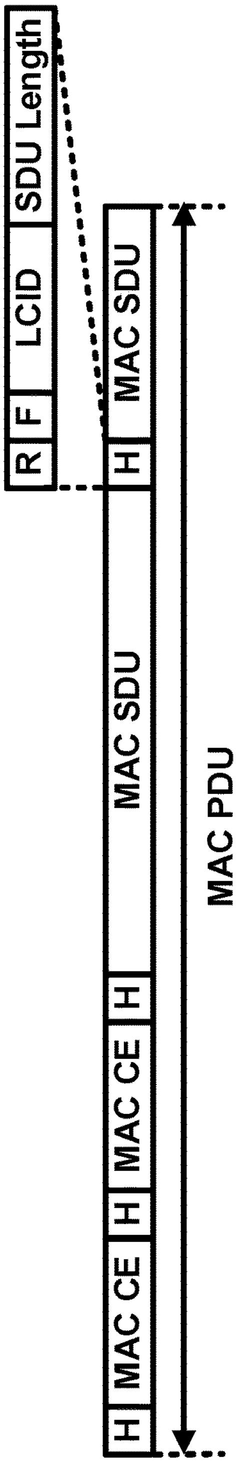
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 212 or MAC 222. As shown in FIG. 4B, two MAC CEs may be inserted into/added to the MAC PDU. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
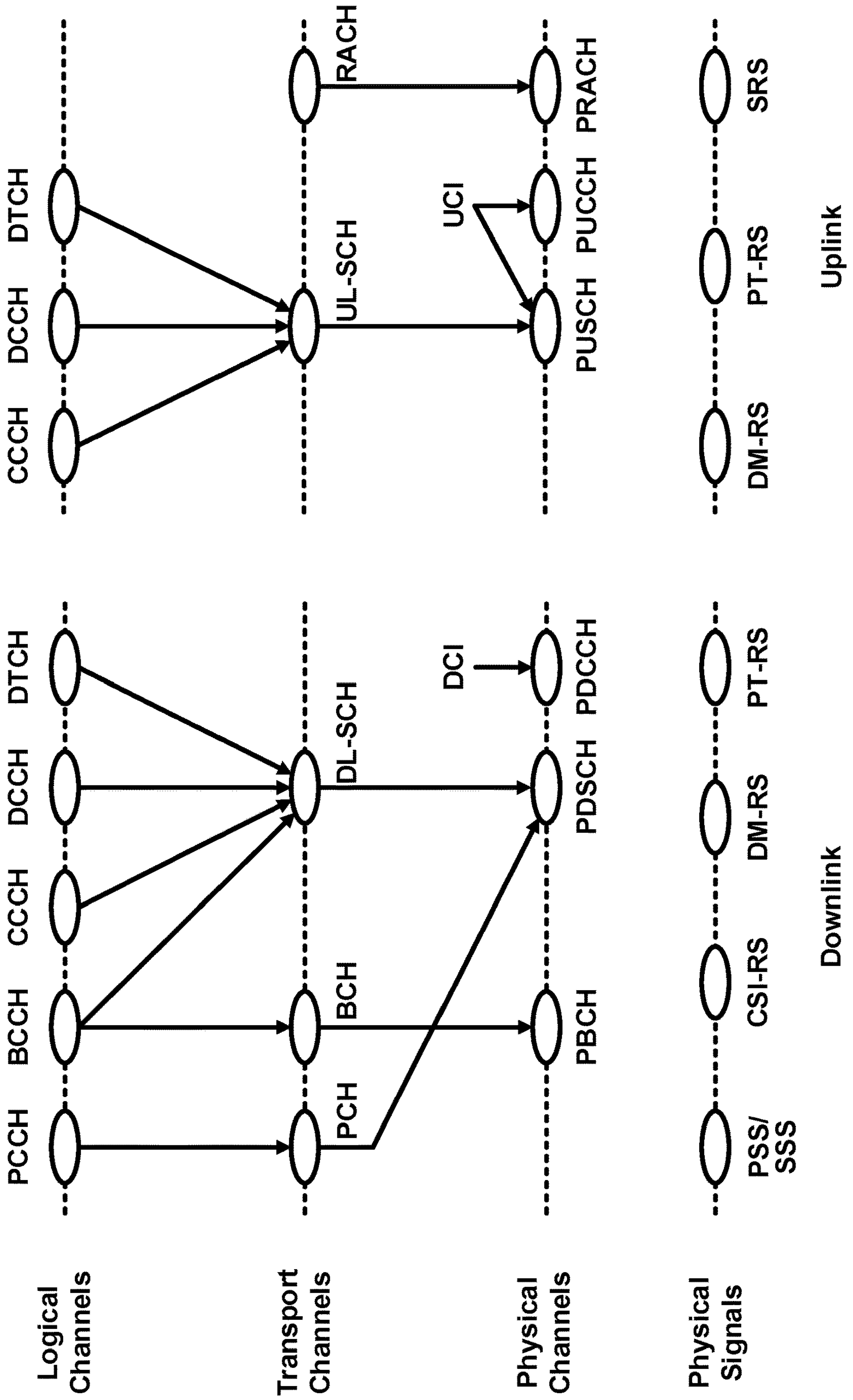
FIG. 5A shows an example mapping for downlink channels.
FIG. 5B shows an example mapping for uplink channels.

FIG. 5A shows an example mapping for downlink channels. The mapping for downlink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may comprise an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The PHY layer may generate physical signals to support the low-level operation of the PHY layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), SRS, phase-tracking reference signals (PT RS), and/or any other signals.

One or more of the channels (e.g., logical channels, transport channels, physical channels, etc.) may be used to carry out functions associated with the control plane protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHYs 211 and 221, MACs 212 and 222, RLCs 213 and 223, and PDCPs 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane protocol stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and substantially the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting and control of the reporting; detection of and recovery from radio link failure (RLF); and/or NAS message transfer. As part of establishing an RRC connection, the RRC layers 216 and 226 may establish an RRC context, which may involve configuring parameters for communication between the wireless device 210 and the RAN (e.g., the base station 220).

Figure 6:
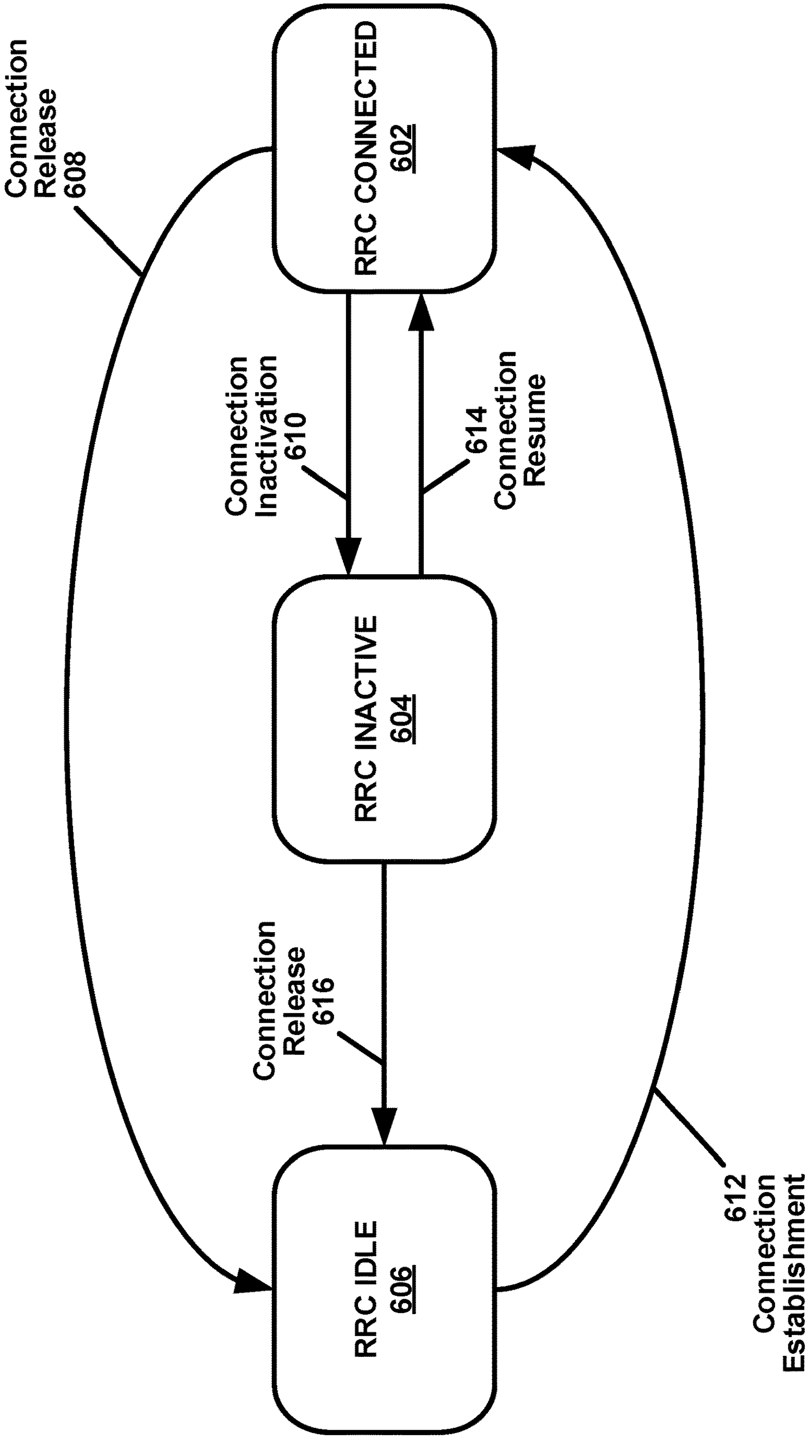
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104, the RAN 154, or any other RAN). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., the RRC connected 602) to an RRC idle state (e.g., the RRC idle 606) via a connection release procedure 608. The RRC state may transition from the RRC connected state (e.g., the RRC connected 602) to the RRC inactive state (e.g., the RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every DRX cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be substantially the same as or similar to connection release procedure 608.

An RRC state may be associated with a mobility management mechanism. During the RRC idle state (e.g., the RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC inactive state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the wireless device registration area, for example, if the wireless device moves (e.g., via a cell reselection) to a cell associated with a TAI that may not be included in the list of TAIs associated with the wireless device registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., the RRC inactive 604).

A base station (e.g., the gNBs 160 in FIG. 1B or any other base station) may be split in two parts: a central unit (e.g., a base station central unit, such as a gNB-CU) and one or more distributed units (e.g., a base station distributed unit, such as a gNB-DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM may be a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbol streams may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
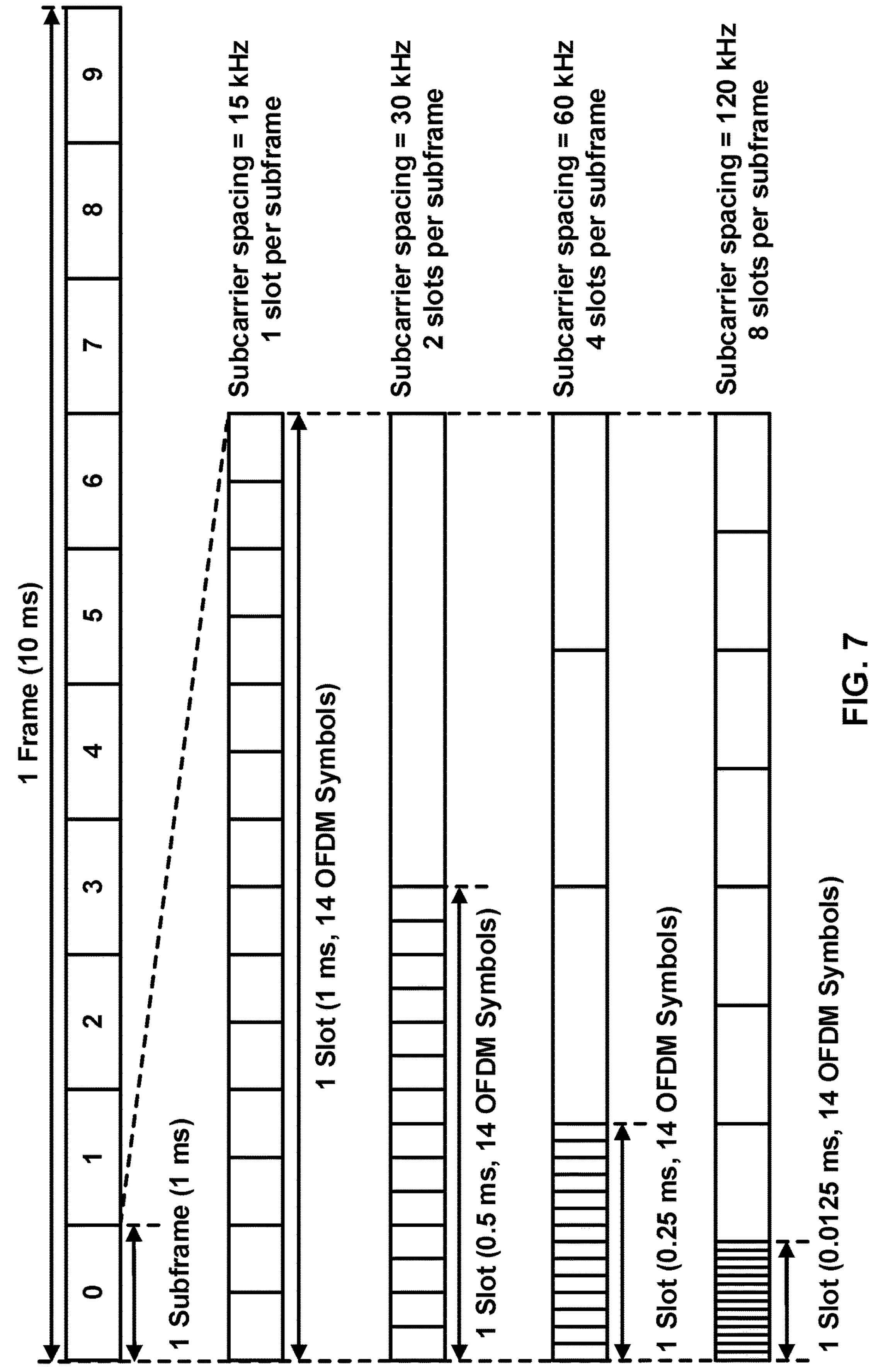
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR radio frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
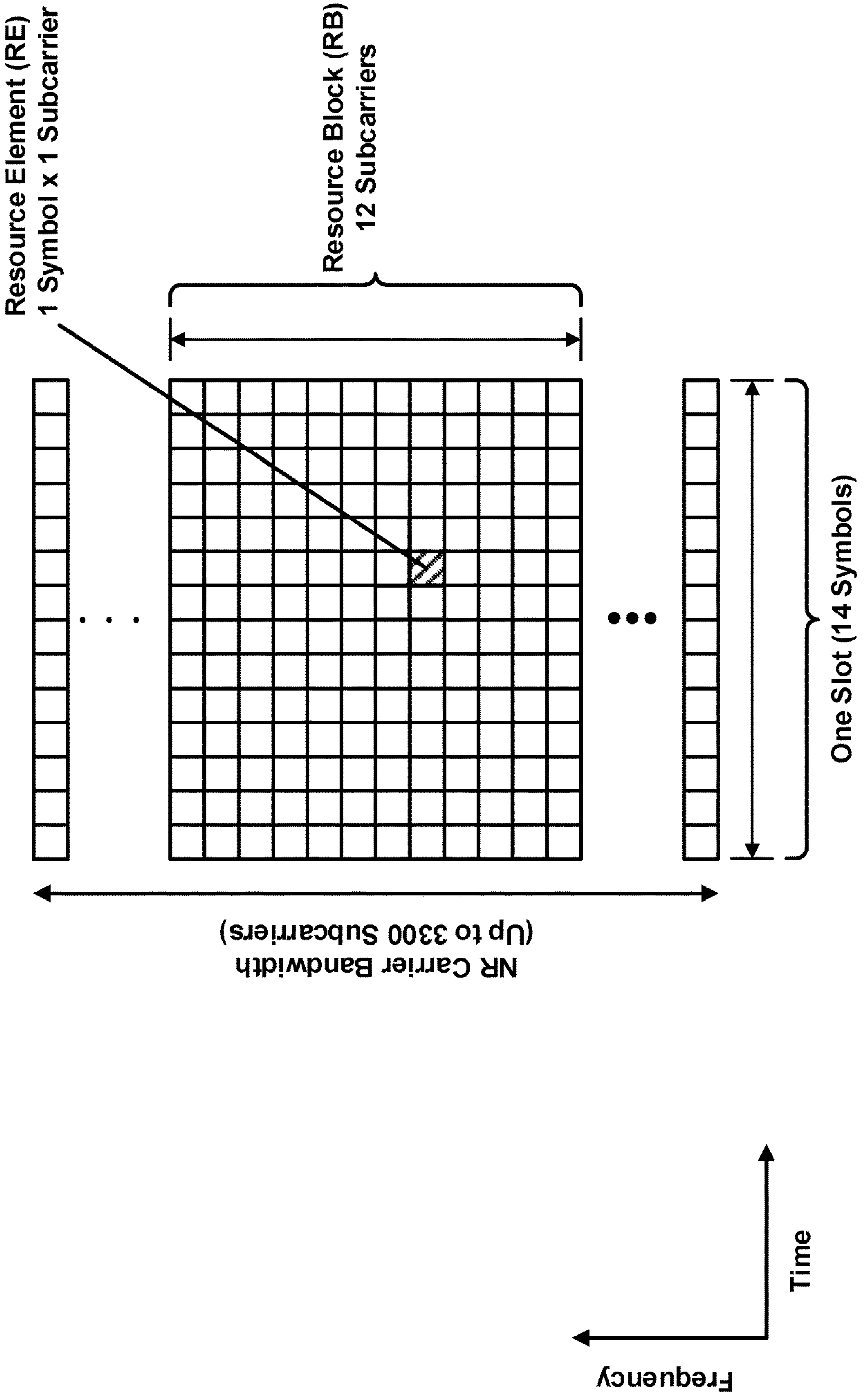
FIG. 8 shows an example resource configuration of one or more carriers.

FIG. 8 shows an example resource configuration of one or more carriers. The resource configuration may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR carrier such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in DCI. A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
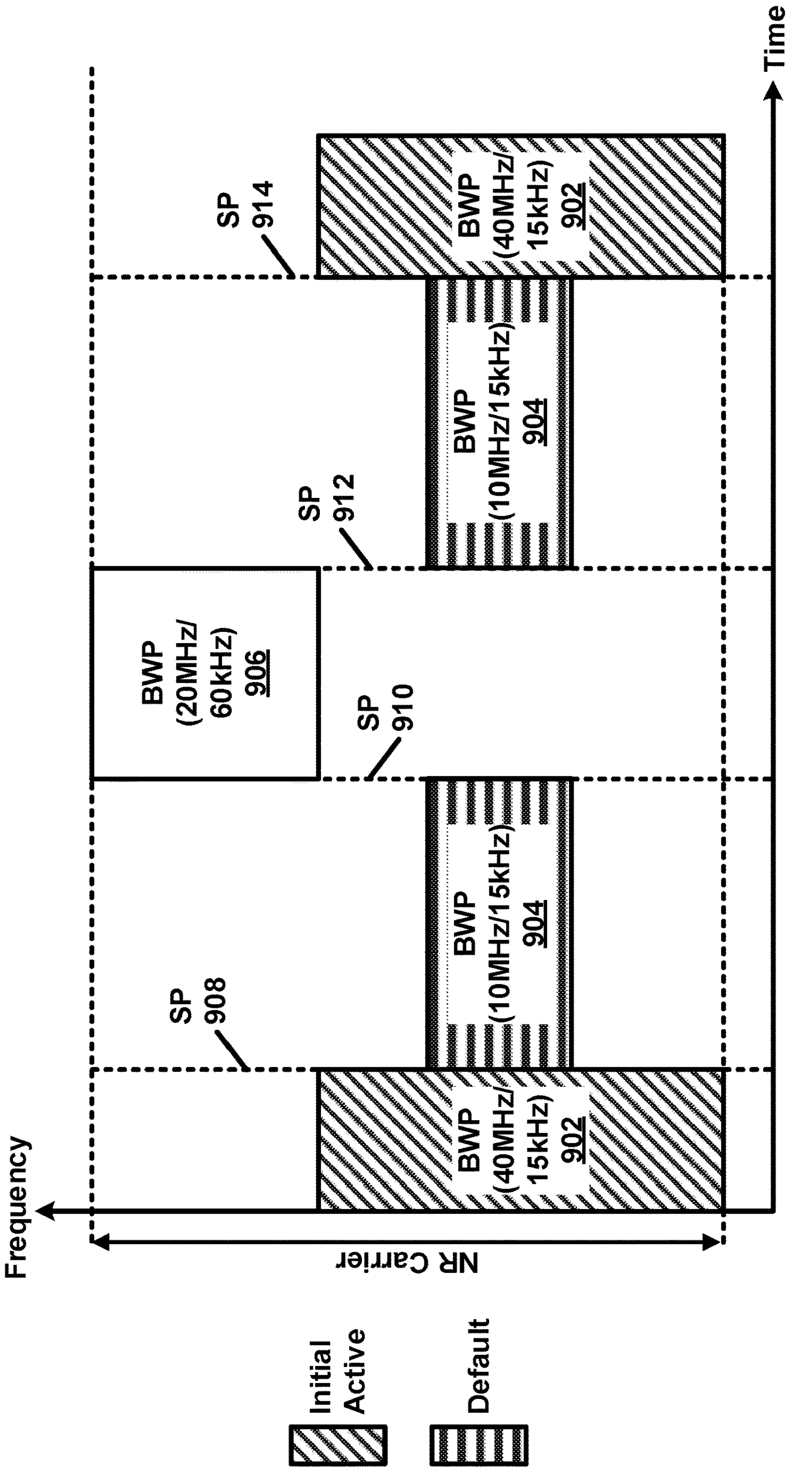
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at the switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating the BWP 904 as the active BWP. The wireless device may switch at a switching point 910 from the active BWP (e.g., the BWP 904) to the BWP 906, for example, after or in response receiving DCI indicating the BWP 906 as a new active BWP. The wireless device may switch at a switching point 912 from the active BWP (e.g., the BWP 906) to the BWP 904, for example, a based on (e.g., after or in response to) an expiry of a BWP inactivity timer. The wireless device may switch at the switching point 912 from the active BWP (e.g., the BWP 906) to the BWP 904, for example, after or in response to receiving DCI indicating the BWP 904 as a new active BWP. The wireless device may switch at a switching point 914 from the active BWP (e.g., the BWP 904) to the BWP 902, for example, after or in response receiving DCI indicating the BWP 902 as a new active BWP.

Wireless device procedures for switching BWPs on a secondary cell may be substantially the same/similar as those on a primary cell, for example, if the wireless device is configured for a secondary cell with a default downlink BWP in a set of configured downlink BWPs and a timer value. The wireless device may use the timer value and the default downlink BWP for the secondary cell in substantially the same/similar manner as the wireless device uses the timer value and/or default downlink BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
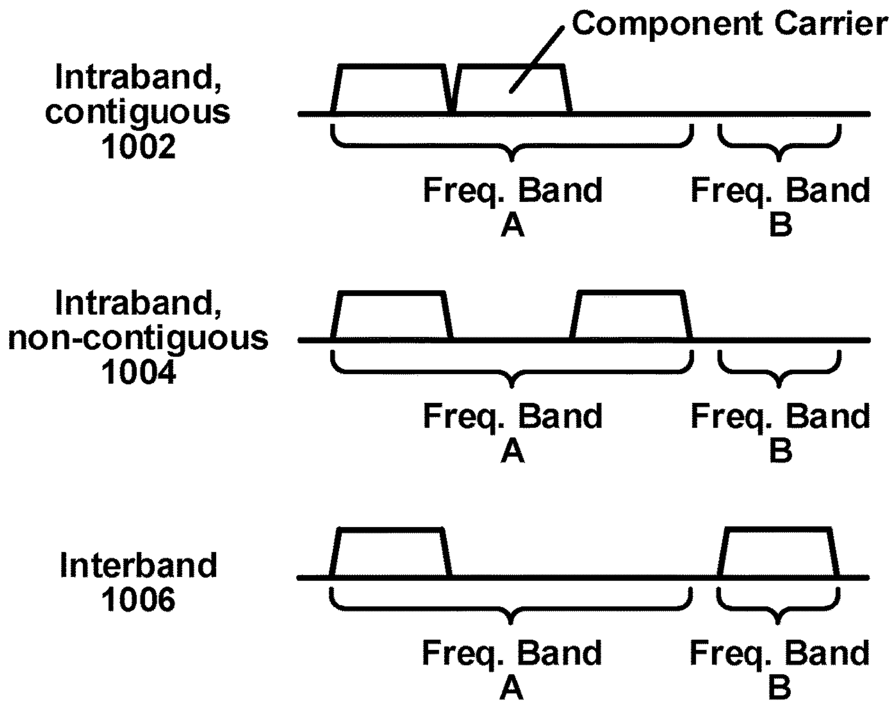
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless devices may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information for the downlink, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. UCI may comprise control information for the uplink, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
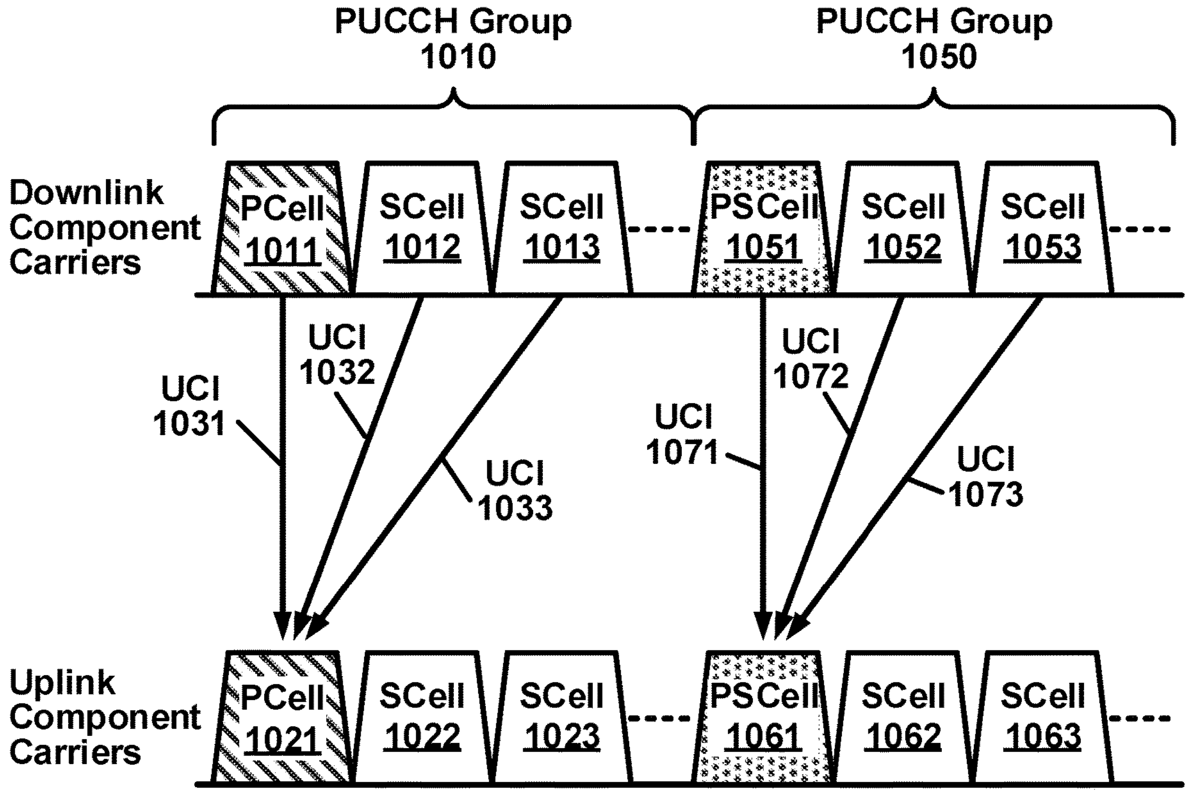
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may use/apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
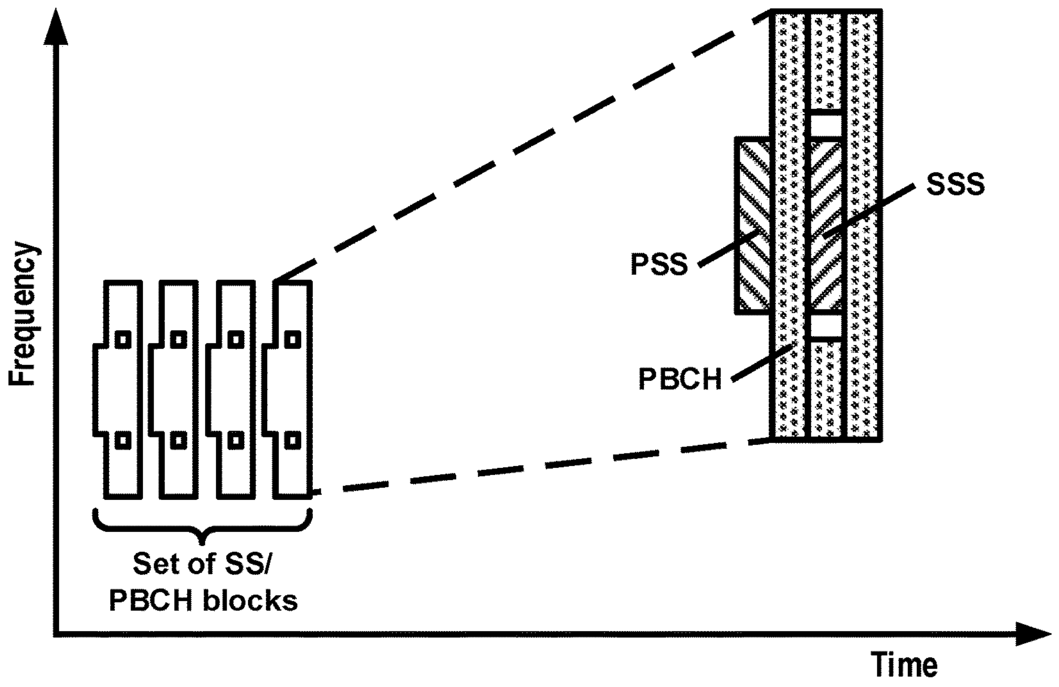
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial receiving (Rx) parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine CSI. The base station may configure the wireless device with one or more CSI-RSs for channel estimation or any other suitable purpose. The base station may configure a wireless device with one or more of substantially the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports (or any other quantity of orthogonal downlink DM-RS ports) per wireless device (e.g., for single user-MIMO). A DM-RS configuration may support up to 4 orthogonal downlink DM-RS ports (or any other quantity of orthogonal downlink DM-RS ports) per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be substantially the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with substantially the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as QCLed, for example, if one or more large-scale properties of the channel over which a first symbol on the first antenna port is conveyed may be inferred/determined from the channel over which a second symbol on a second antenna port is conveyed. The one or more large-scale properties may comprise at least one of: a delay spread; a Doppler spread; a Doppler shift; an average gain; an average delay; and/or spatial Rx parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
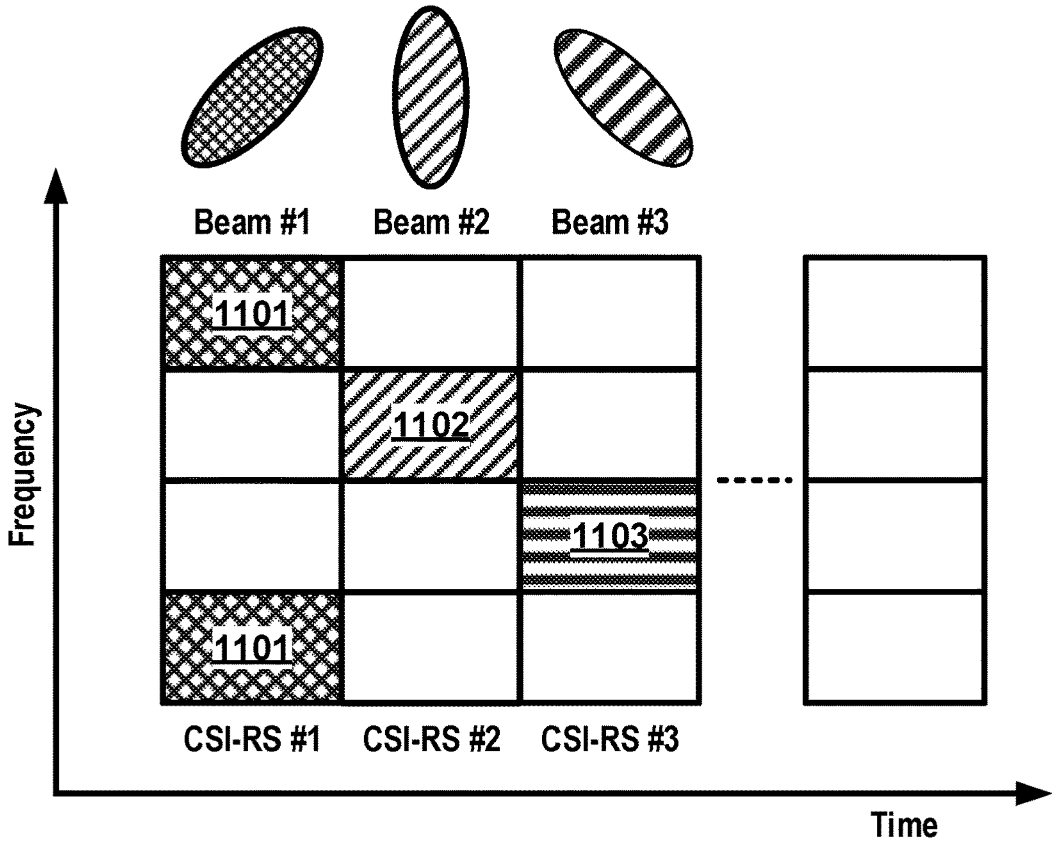
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a RB within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and RE locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, QCL parameters (e.g., QCL-scramblingidentity, crs-ports-count, mbsfn-subframeconfiglist, csi-rs-configZPid, qcl-csi-rs-configNZPid), and/or other radio resource parameters.

One or more beams may be configured for a wireless device in a wireless device-specific configuration. Three beams may be shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure a reference signal received power (RSRP) of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more SRS resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a PMI, a CQI, and/or a RI.

Figure 12A:
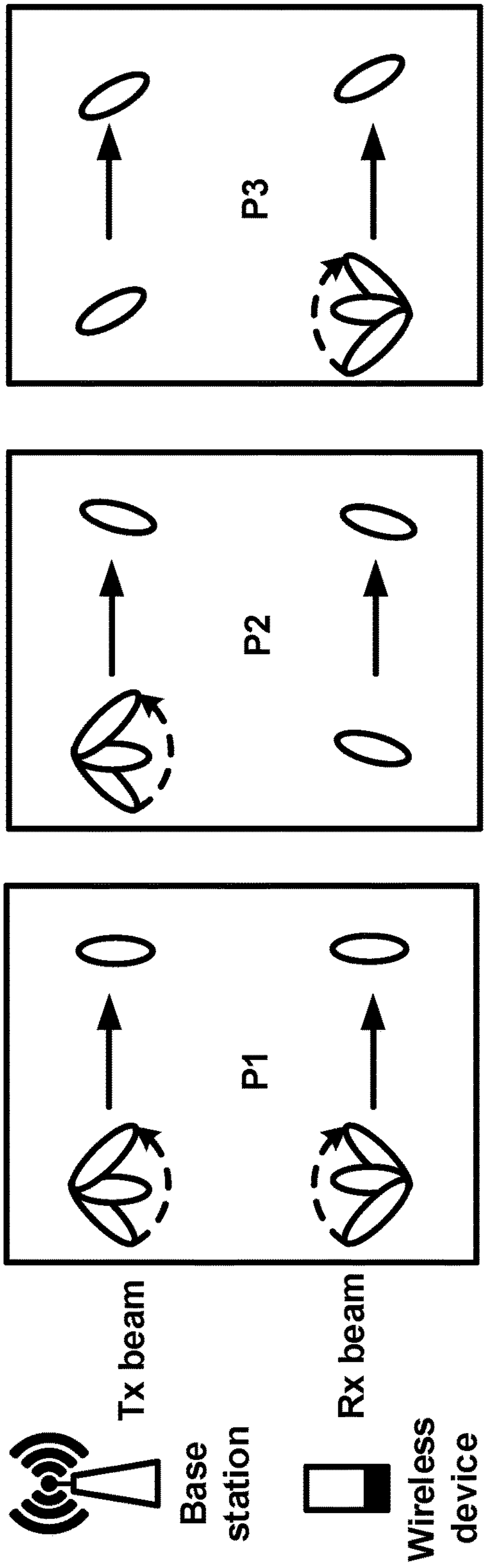
FIG. 12A shows examples of downlink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

Figure 12B:
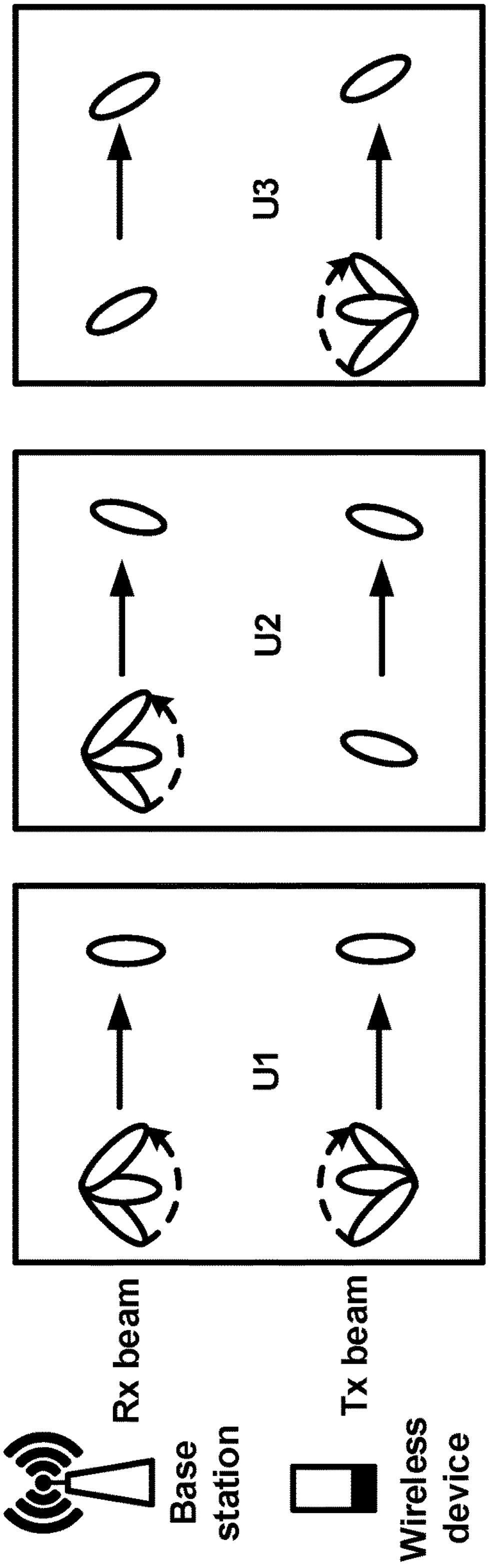
FIG. 12B shows examples of uplink beam management procedures.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the bottom row of U1 and top row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more RSs comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are substantially the same or similar as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more SIBs (e.g., or any other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
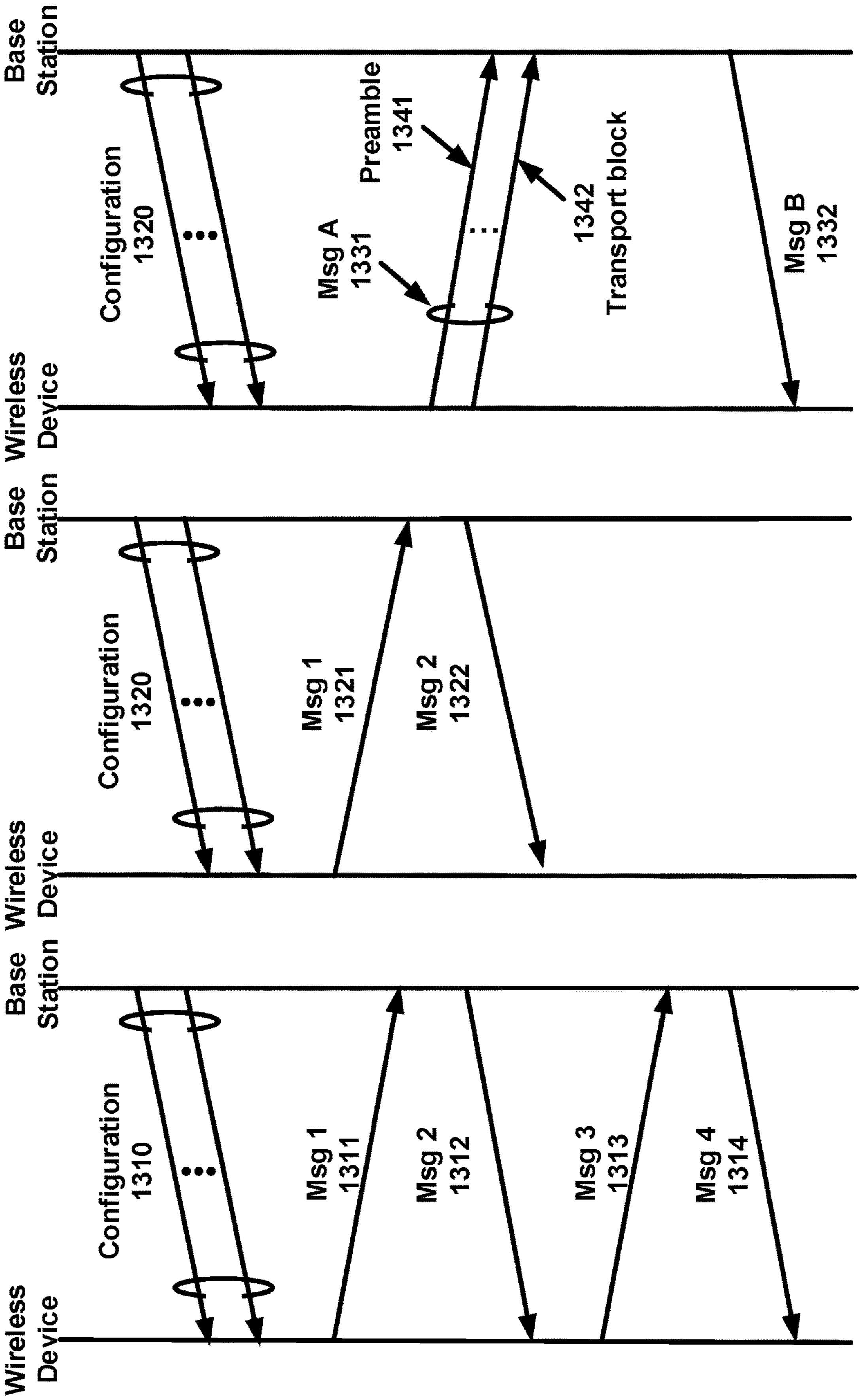
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more RACH parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more PRACH occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate at least one of: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type 1-PDCCH common search space) configured by an RRC message. The wireless device may identify/determine the RAR, for example, based on an RNTI. RNTIs may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$\text{RA-RNTI}=1+s\_id+14\times t\_id+14\times 80\times f\_id+14\times 80\times 8\times ul\_carrier\_id,$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤fid<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless device on the PDCCH (e.g., the base station may send the PDCCH to the wireless device) using a C-RNTI, for example, if the C-RNTI was included in the third message (e.g., Msg 3 1313). The random access procedure may be determined to be successfully completed, for example, if the unique C-RNTI of the wireless device is detected on the PDCCH (e.g., the PDCCH is scrambled by the C-RNTI). The fourth message (e.g., Msg 4 1314) may be received using a DL-SCH associated with a TC-RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., for the first message (e.g., Msg 1 1311) and/or the third message (e.g., Msg 3 1313)). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

The first message (e.g., Msg A 1331) may be sent/transmitted in an uplink transmission by the wireless device. The first message (e.g., Msg A 1331) may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as DCI. The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
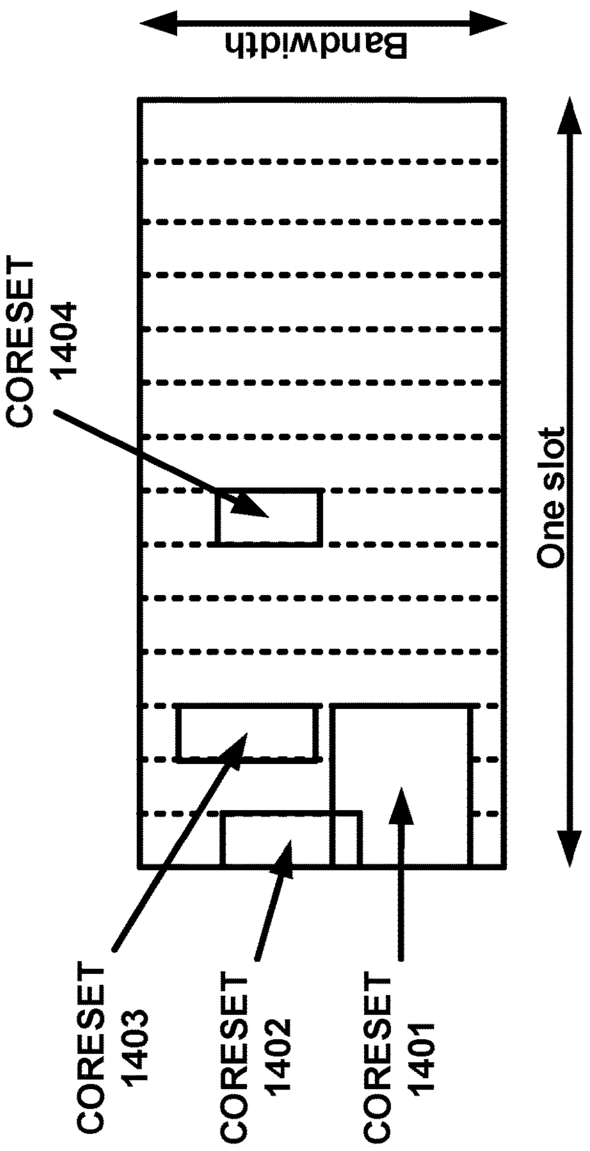
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more CORESETs. A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
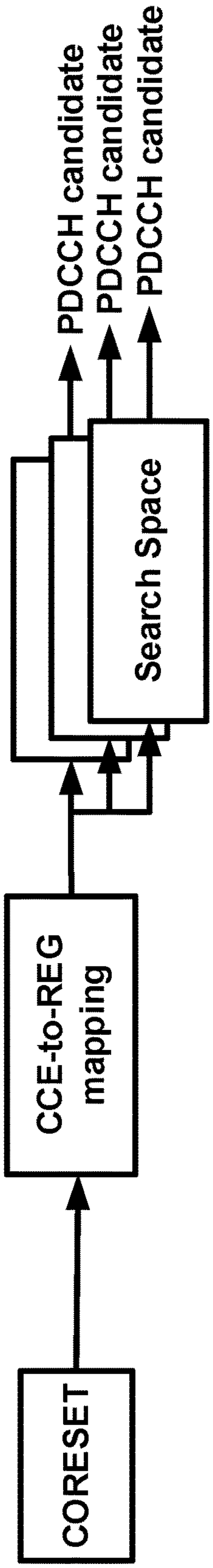
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a quantity/number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the quantity/number of CCEs, the quantity/number of PDCCH candidates in common search spaces, and/or the quantity/number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise SR. The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a quantity/number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a quantity/number of OFDM symbols (e.g., between four and fourteen OFDM symbols) and may comprise two or fewer bits. The wireless device may use PUCCH format 1, for example, if the transmission is over/via four or more symbols and the quantity/number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a quantity/number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a quantity/number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a quantity/number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from a PUCCH resource set for UCI (HARQ-ACK, CSI, and/or SR) transmission, for example, after determining the PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
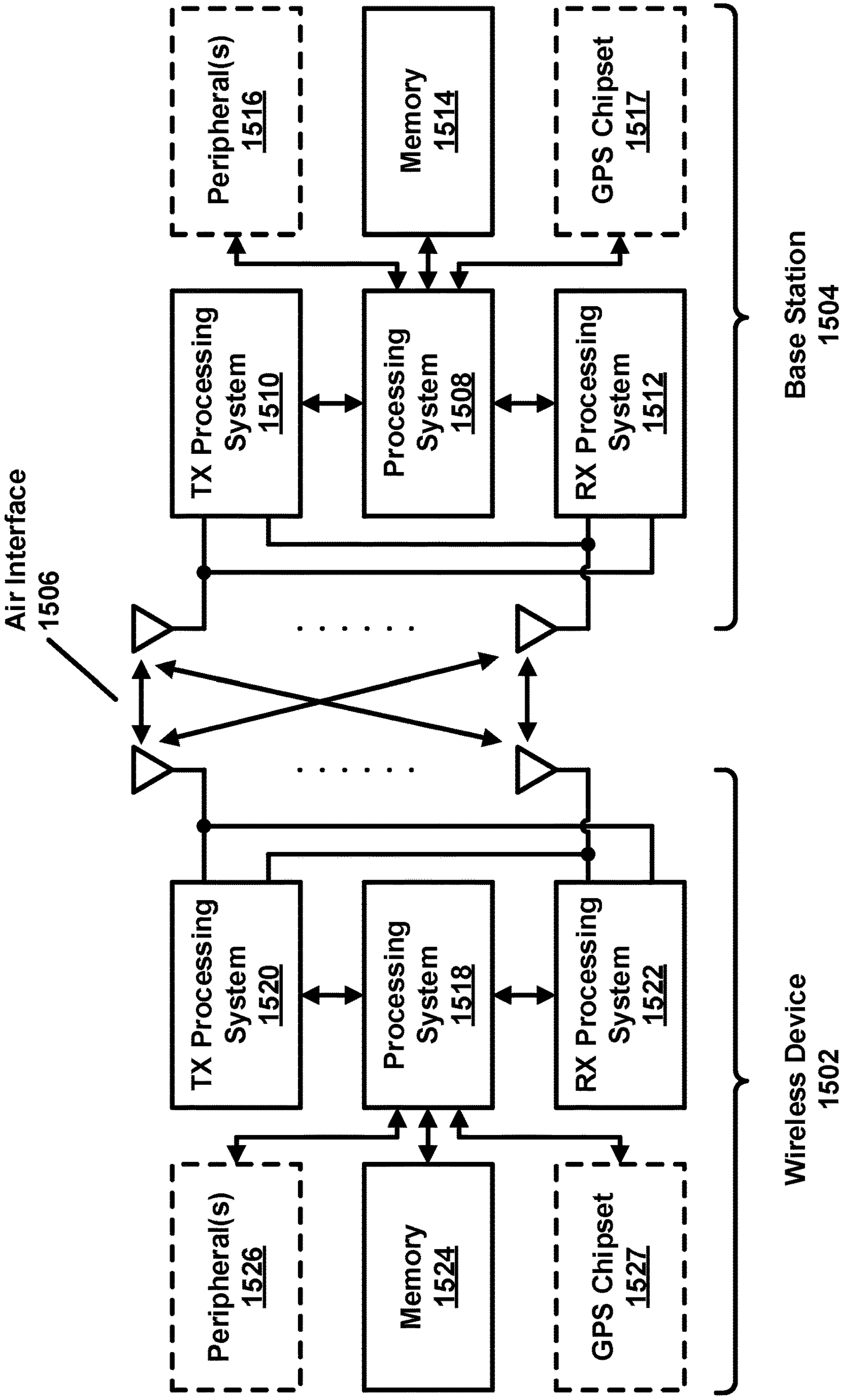
FIG. 15A shows an example of communications between a wireless device and a base station.

FIG. 15A shows an example of communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
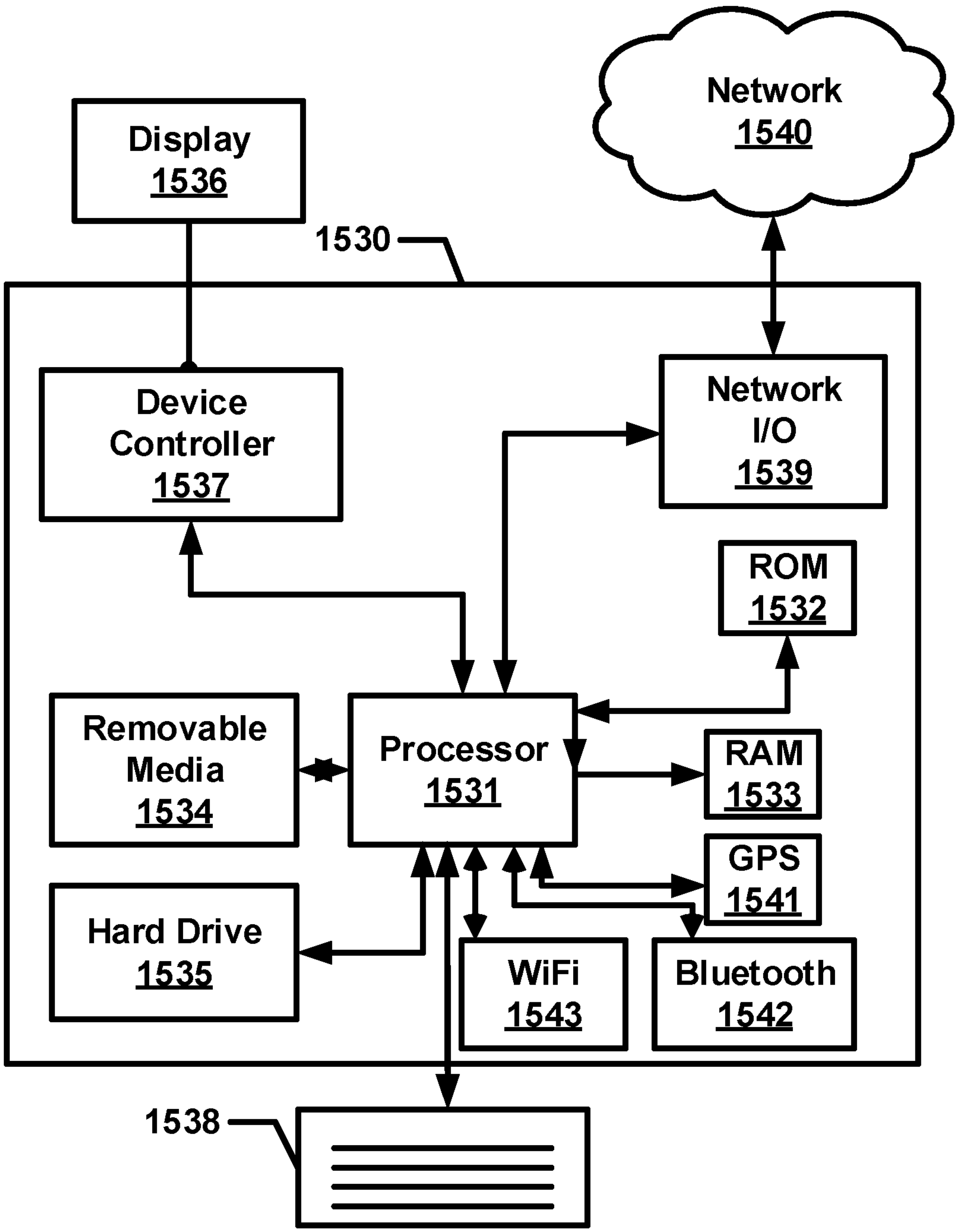
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a USB drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a GPS microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figure 16A:
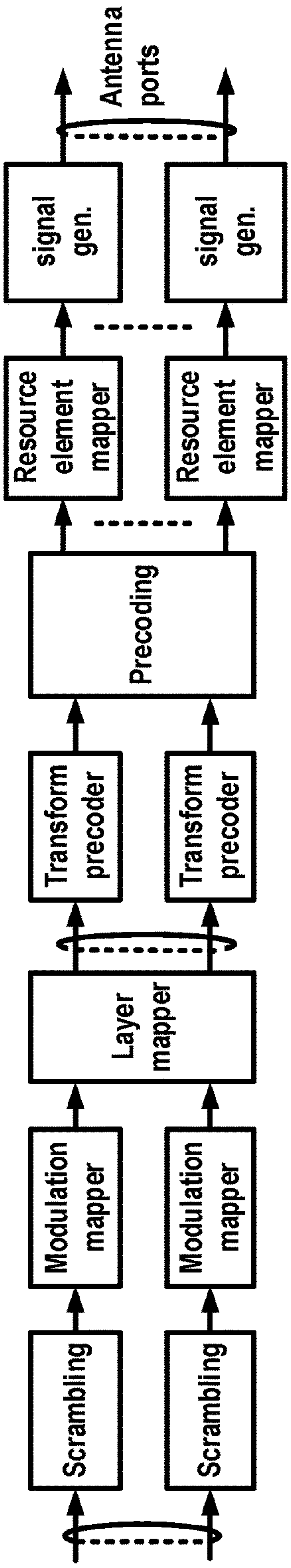
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

Figure 16B:
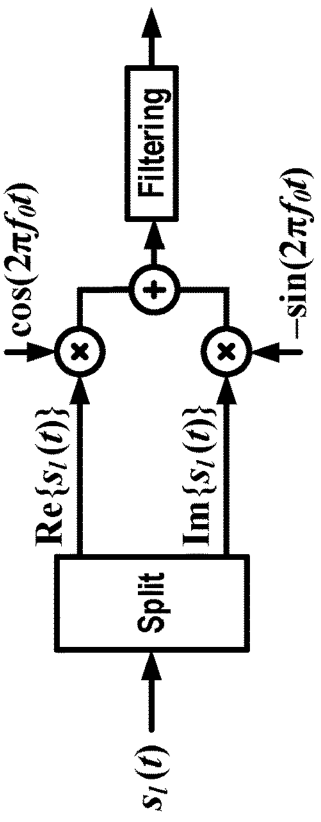

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

Figure 16D:
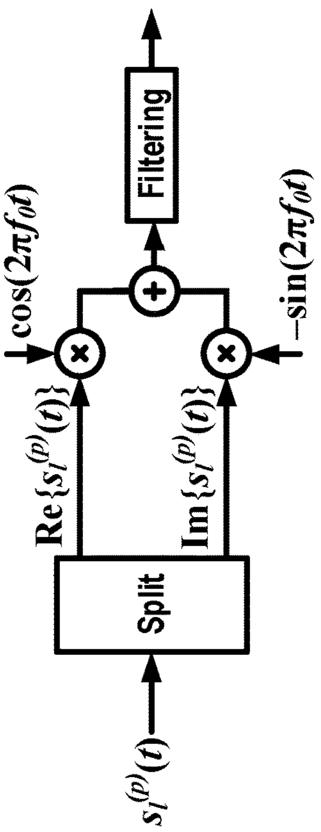
Figure 16C:
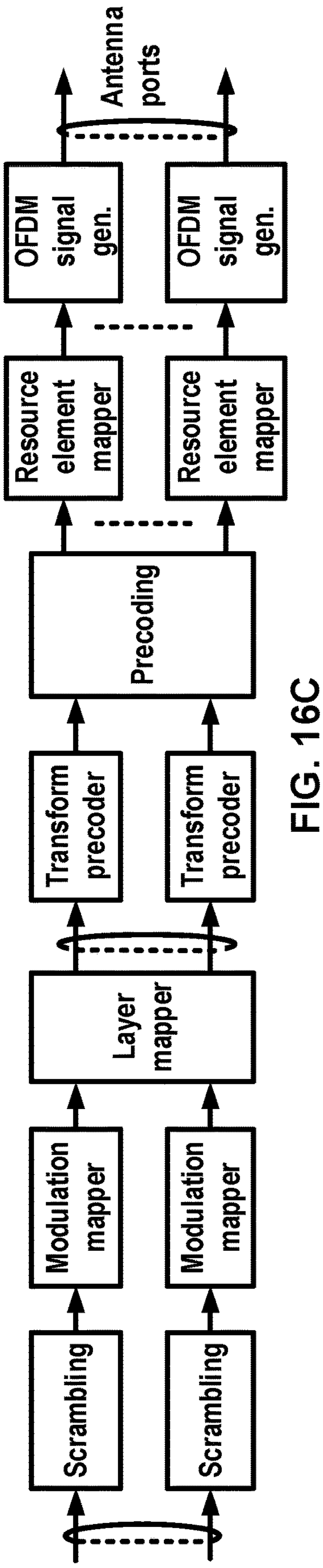

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station may communicate with a wireless device via a wireless network (e.g., a communication network). The communications may use/employ one or more radio technologies (e.g., new radio technologies, legacy radio technologies, and/or a combination thereof). The one or more radio technologies may comprise at least one of: one or multiple technologies related to a physical layer; one or multiple technologies related to a medium access control layer; and/or one or multiple technologies related to a radio resource control layer. One or more enhanced radio technologies described herein may improve performance of a wireless network. System throughput, transmission efficiencies of a wireless network, and/or data rate of transmission may be improved, for example, based on one or more configurations described herein. Battery consumption of a wireless device may be reduced, for example, based on one or more configurations described herein. Latency of data transmission between a base station and a wireless device may be improved, for example, based on one or more configurations described herein. A network coverage of a wireless network may increase, for example, based on one or more configurations described herein.

A base station may send/transmit one or more MAC PDUs to a wireless device. A MAC PDU may be a bit string that is byte aligned (e.g., aligned to a multiple of eight bits) in length. Bit strings may be represented by one or more tables in which the most significant bit may be the leftmost bit of the first line of a table, and the least significant bit may be the rightmost bit on the last line of the table. The bit string may be read from left to right and then in the reading order of the lines (e.g., from the topmost line of the table to the bottommost line of the table). The bit order of a parameter field within a MAC PDU may be represented with the first and most significant bit in the leftmost bit and the last and least significant bit in the rightmost bit.

A MAC SDU may be a bit string that is byte aligned (e.g., aligned to a multiple of eight bits) in length. A MAC SDU may be comprised in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. A MAC subheader may be placed immediately in front of a corresponding MAC SDU, MAC CE, or padding. A wireless device (e.g., the MAC entity of the wireless device) may ignore a value of reserved bits in a downlink (DL) MAC PDU.

A MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, and/or a combination thereof. The MAC SDU may be of variable size. A MAC subheader may correspond to a MAC SDU, a MAC CE, or padding.

A MAC subheader may comprise: an R field with a one-bit length; an F field with a one-bit length; an LCID field with a multi-bit length; an L field with a multi-bit length;

and/or a combination thereof, for example, if the MAC subheader corresponds to a MAC SDU, a variable-sized MAC CE, or padding.

Figure 17A:
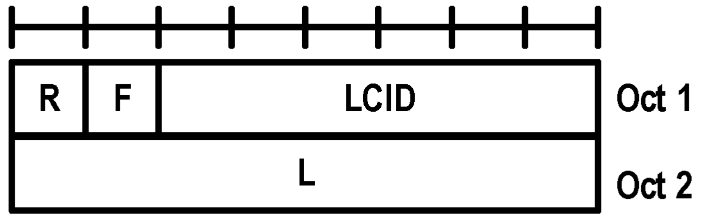
FIG. 17A, FIG. 17B, and FIG. 17C show example MAC subheaders.
Figure 17B:
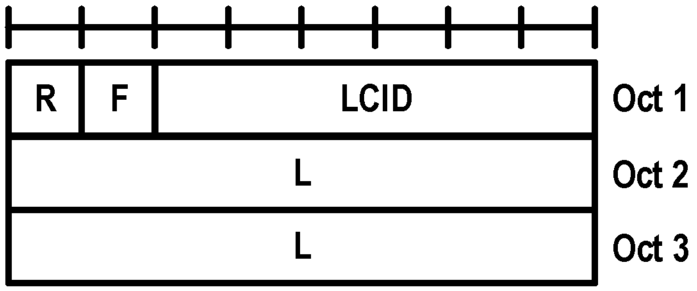
Figure 17C:
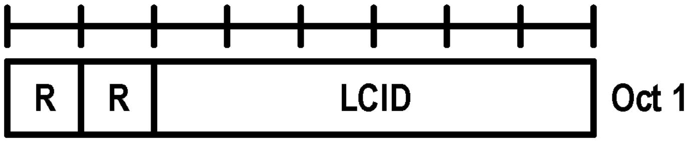

FIG. 17A shows an example of a MAC subheader. The MAC subheader may comprise an R field, an F field, an LCID field, and/or an L field. The LCID field may be six bits in length (or any other quantity of bits). The L field may be eight bits in length (or any other quantity of bits). Each of the R field and the F field may be one bit in length (or any other quantity of bits). FIG. 17B shows an example of a MAC subheader. The MAC subheader may comprise an R field, an F field, an LCID field, and/or an L field. Similar to the MAC subheader shown in FIG. 17A, the LCID field may be six bits in length (or any other quantity of bits), the R field may be one bit in length (or any other quantity of bits), and the F field may be one bit in length (or any other quantity of bits). The L field may be sixteen bits in length (or any other quantity of bits, such as greater than sixteen bits in length). A MAC subheader may comprise: an R field with a two-bit length (or any other quantity of bits) and/or an LCID field with a multi-bit length (or single bit length), for example, if the MAC subheader corresponds to a fixed sized MAC CE or padding. FIG. 17C shows an example of a MAC subheader. In the example MAC subheader shown in FIG. 17C, the LCID field may be six bits in length (or any other quantity of bits), and the R field may be two bits in length (or any other quantity of bits).

Figure 18A:
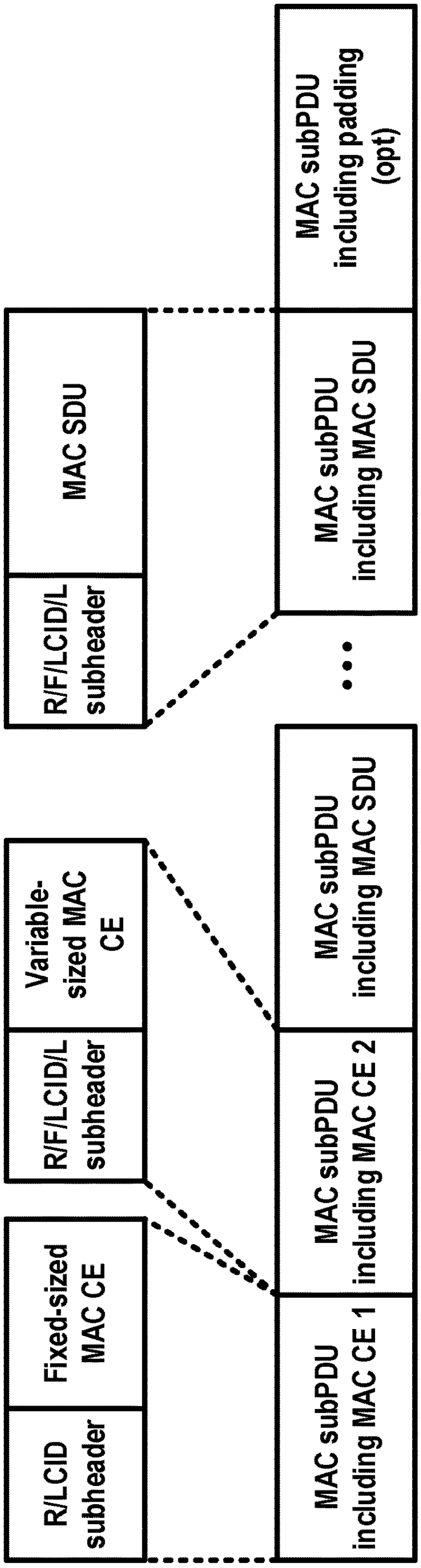
FIG. 18A and FIG. 18B show example MAC PDUs.

FIG. 18A shows an example of a MAC PDU (e.g., a DL MAC PDU). Multiple MAC CEs, such as MAC CE 1 and 2 shown in FIG. 18A, may be placed together (e.g., located within the same MAC PDU). A MAC subPDU comprising a MAC CE may be placed (e.g., located within a MAC PDU) before any MAC subPDU comprising a MAC SDU or a MAC subPDU comprising padding. MAC CE 1 may be a fixed-sized MAC CE that follows a first-type MAC subheader. The first-type MAC subheader may comprise an R field and an LCID field (e.g., similar to the MAC CE shown in FIG. 17C). MAC CE 2 may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

Figure 18B:
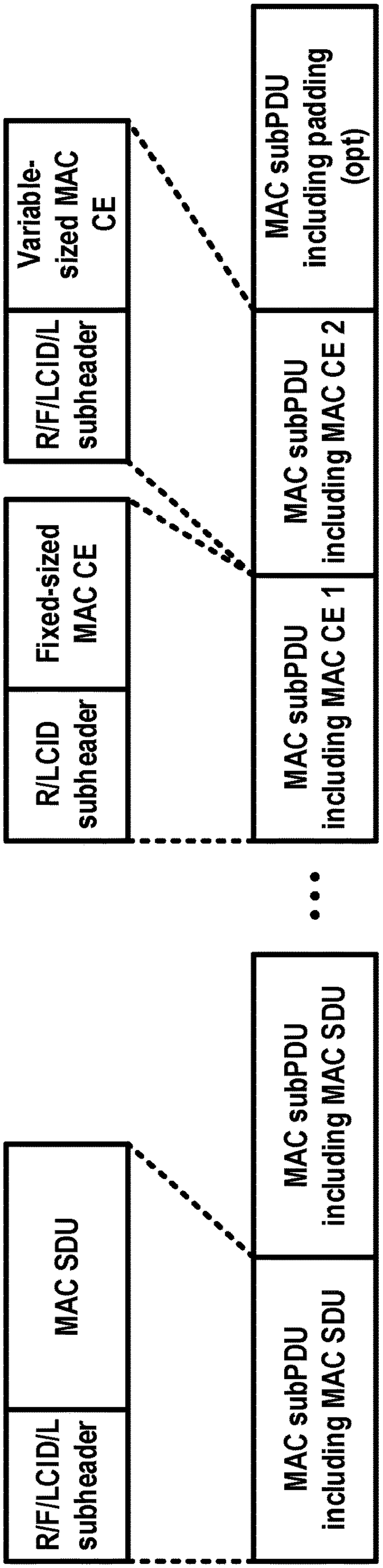

FIG. 18B shows an example of a MAC PDU (e.g., a UL MAC PDU). Multiple MAC CEs, such as MAC CE 1 and 2 shown in FIG. 18B, may be placed together (e.g., located within the same MAC PDU). A MAC subPDU comprising a MAC CE may be placed (e.g., located within a MAC PDU) after all MAC subPDUs comprising a MAC SDU. The MAC subPDU and/or the MAC subPDU comprising a MAC CE may be placed (e.g., located within a MAC PDU) before a MAC subPDU comprising padding. Similar to the MAC CEs shown in FIG. 18A, MAC CE 1 shown in FIG. 18B may be a fixed-sized MAC CE that follows a first-type MAC subheader. The first-type MAC subheader may comprise an R field and an LCID field (e.g., similar to the MAC CE shown in FIG. 17C). Similar to the MAC CEs shown in FIG. 18A, MAC CE 2 shown in FIG. 18B may be a variable-sized MAC CE that follows a second-type MAC subheader. The second-type MAC subheader may comprise an R field, an F field, an LCID field and an L field (e.g., similar to the MAC CEs shown in FIG. 17A or FIG. 17B). The size of a MAC SDU that follows the second-type MAC subheader may vary.

A base station (e.g., the MAC entity of a base station) may send/transmit one or more MAC CEs to a wireless device (e.g., a MAC entity of a wireless device). FIG. 19 shows example LCID values. The LCID values may be associated with one or more MAC CEs. The LCID values may be associated with a downlink channel, such as a DL-SCH. The one or more MAC CEs may comprise at least one of: an semi-persistent zero power CSI-RS (SP ZP CSI-RS) Resource Set Activation/Deactivation MAC CE, a PUCCH spatial relation Activation/Deactivation MAC CE, an SP SRS Activation/Deactivation MAC CE, an SP CSI reporting on PUCCH Activation/Deactivation MAC CE, a TCI State Indication for wireless device-specific (e.g., UE-specific) PDCCH MAC CE, a TCI State Indication for wireless device-specific (e.g., UE-specific) PDSCH MAC CE, an Aperiodic CSI Trigger State Subselection MAC CE, an SP CSI-RS/CSI interference measurement (CSI-IM) Resource Set Activation/Deactivation MAC CE, a wireless device (e.g., UE) contention resolution identity MAC CE, a timing advance command MAC CE, a DRX command MAC CE, a Long DRX command MAC CE, an SCell activation/deactivation MAC CE (e.g., 1 Octet), an SCell activation/deactivation MAC CE (e.g., 4 Octet), and/or a duplication activation/deactivation MAC CE. A MAC CE, such as a MAC CE sent/transmitted by a base station (e.g., a MAC entity of a base station) to a wireless device (e.g., a MAC entity of a wireless device), may be associated with (e.g., correspond to) an LCID in the MAC subheader corresponding to the MAC CE. Different MAC CEs may correspond to a different LCID in the MAC subheader corresponding to the MAC CE. An LCID having an index value "111011" in a MAC subheader may indicate that a MAC CE associated with the MAC subheader is a long DRX command MAC CE, for example, for a MAC CE associated with the downlink.

A wireless device (e.g., a MAC entity of a wireless device) may send/transmit to a base station (e.g., a MAC entity of a base station) one or more MAC CEs. FIG. 20 shows an example LCID values that may be associated with the one or more MAC CEs. The LCID values may be associated with an uplink channel, such as a UL-SCH. The one or more MAC CEs may comprise at least one of: a short buffer status report (BSR) MAC CE, a long BSR MAC CE, a C-RNTI MAC CE, a configured grant confirmation MAC CE, a single entry power headroom report (PHR) MAC CE, a multiple entry PHR MAC CE, a short truncated BSR, and/or a long truncated BSR. A MAC CE may be associated with (e.g., correspond to) an LCID in the MAC subheader corresponding to the MAC CE. Different MAC CEs may correspond to a different LCID in the MAC subheader corresponding to the MAC CE. An LCID having an index value "111011" in a MAC subheader may indicate that a MAC CE associated with the MAC subheader is a short-truncated command MAC CE, for example, for a MAC CE associated with the uplink.

Two or more CCs may be aggregated, such as in carrier aggregation (CA). A wireless device may simultaneously receive and/or transmit data via one or more CCs, for example, depending on capabilities of the wireless device (e.g., using the technique of CA). A wireless device may support CA for contiguous CCs and/or for non-contiguous CCs. CCs may be organized into cells. CCs may be organized into one PCell and one or more SCells.

A wireless device may have an RRC connection (e.g., one RRC connection) with a network, for example, if the wireless device is configured with CA. During an RRC connection establishment/re-establishment/handover, a cell providing/sending/configuring NAS mobility information may be a serving cell. During an RRC connection re-establishment/handover procedure, a cell providing/sending/configuring a security input may be a serving cell. The serving cell may be a PCell. A base station may send/transmit, to a wireless device, one or more messages comprising configuration parameters of a plurality of SCells, for example, depending on capabilities of the wireless device.

A base station and/or a wireless device may use/employ an activation/deactivation mechanism of an SCell, for example, if configured with CA. The base station and/or the wireless device may use/employ an activation/deactivation mechanism of an SCell, for example, to improve battery use and/or power consumption of the wireless device. A base station may activate or deactivate at least one of one or more SCells, for example, if a wireless device is configured with the one or more SCells. An SCell may be deactivated unless an SCell state associated with the SCell is set to an activated state (e.g., "activated") or a dormant state (e.g., "dormant"), for example, after configuring the SCell.

A wireless device may activate/deactivate an SCell. A wireless device may activate/deactivate a cell, for example, based on (e.g., after or in response to) receiving an SCell Activation/Deactivation MAC CE. The SCell Activation/Deactivation MAC CE may comprise one or more fields associated with one or more SCells, respectively, to indicate activation or deactivation of the one or more SCells. The SCell Activation/Deactivation MAC CE may correspond to one octet comprising seven fields associated with up to seven SCells, respectively, for example, if the aggregated cell has less than eight SCells. The SCell Activation/Deactivation MAC CE may comprise an R field. The SCell Activation/Deactivation MAC CE may comprise a plurality of octets comprising more than seven fields associated with more than seven SCells, for example, if the aggregated cell has more than seven SCells.

Figure 21A:
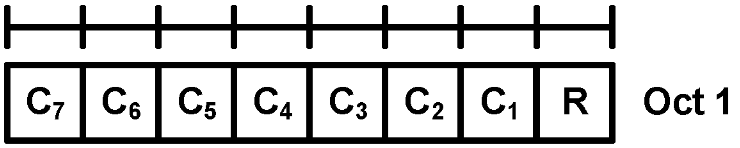
FIG. 21A and FIG. 21B show example secondary cell (SCell) Activation/Deactivation MAC control elements (CEs).

FIG. 21A shows an example SCell Activation/Deactivation MAC CE of one octet. A first MAC PDU subheader comprising a first LCID (e.g., '111010' as shown in FIG. 19) may indicate/identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first quantity/number of C-fields (e.g., seven or any other quantity/number) and a second quantity/number of R-fields (e.g., one or any other quantity/number).

Figure 21B:
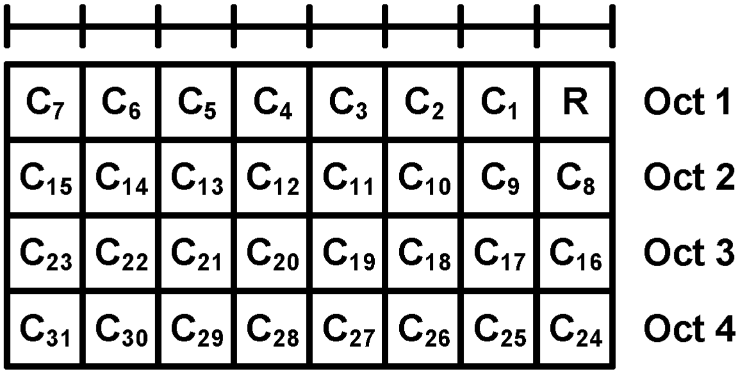

FIG. 21B shows an example SCell Activation/Deactivation MAC CE of four octets. A second MAC PDU subheader comprising a second LCID (e.g., '111001' as shown in FIG. 19) may indicate/identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third quantity/number of C-fields (e.g., 31 or any other quantity/number) and a fourth quantity/number of R-fields (e.g., 1 or any other quantity/number).

As shown in FIG. 21A and/or FIG. 21B, a Ci field may indicate an activation/deactivation status of an SCell with/corresponding to an SCell index i, for example, if an SCell with/corresponding to SCell index i is configured. An SCell with an SCell index i may be activated, for example, if the Ci field is set to one. An SCell with an SCell index i may be deactivated, for example, if the Ci field is set to zero. The wireless device may ignore the Ci field, for example, if there is no SCell configured with SCell index i. An R field may indicate a reserved bit. The R field may be set to zero or any other value (e.g., for other purposes).

A base station may configure a wireless device with uplink (UL) BWPs and downlink (DL) BWPs to enable bandwidth adaptation (BA) on a PCell. The base station may further configure the wireless device with at least DL BWP(s) (i.e., there may be no UL BWPs in the UL) to enable BA on an SCell, for example, if carrier aggregation is configured. An initial active BWP may be a first BWP used for initial access, for example, for a PCell. A first active BWP may be a second BWP configured for the wireless device to operate on a SCell upon the SCell being activated. A base station and/or a wireless device may independently switch a DL BWP and an UL BWP, for example, in paired spectrum (e.g., FDD). A base station and/or a wireless device may simultaneously switch a DL BWP and an UL BWP, for example, in unpaired spectrum (e.g., TDD).

A base station and/or a wireless device may switch a BWP between configured BWPs using a DCI message or a BWP inactivity timer. The base station and/or the wireless device may switch an active BWP to a default BWP based on (e.g., after or in response to) an expiry of the BWP inactivity timer associated with the serving cell, for example, if the BWP inactivity timer is configured for a serving cell. The default BWP may be configured by the network. One UL BWP for an uplink carrier (e.g., each uplink carrier) and one DL BWP may be active at a time in an active serving cell, for example, if FDD systems are configured with BA. One DL/UL BWP pair may be active at a time in an active serving cell, for example, for TDD systems. Operating on the one UL BWP and the one DL BWP (or the one DL/UL pair) may improve wireless device battery consumption. BWPs other than the one active UL BWP and the one active DL BWP that the wireless device may work on may be deactivated. The wireless device may not monitor PDCCH transmission, for example, on deactivated BWPs. The wireless device may not send (e.g., transmit) on PUCCH, PRACH, and UL-SCH, for example, on deactivated BWPs.

A serving cell may be configured with at most a first number/quantity (e.g., four) of BWPs. There may be one active BWP at any point in time, for example, for an activated serving cell. A BWP switching for a serving cell may be used to activate an inactive BWP and deactivate an active BWP at a time. The BWP switching may be controlled by a PDCCH transmission indicating a downlink assignment or an uplink grant. The BWP switching may be controlled by a BWP inactivity timer (e.g., bwp-InactivityTimer). The BWP switching may be controlled by a wireless device (e.g., a MAC entity of the wireless device) based on (e.g., after or in response to) initiating a Random Access procedure. One BWP may be initially active without receiving a PDCCH transmission indicating a downlink assignment or an uplink grant, for example, upon addition of an SpCell or activation of an SCell. The active BWP for a serving cell may be indicated by configuration parameter(s) (e.g., parameters of RRC message) and/or PDCCH transmission. A DL BWP may be paired with a UL BWP for unpaired spectrum, and BWP switching may be common for both UL and DL.

Figure 22:
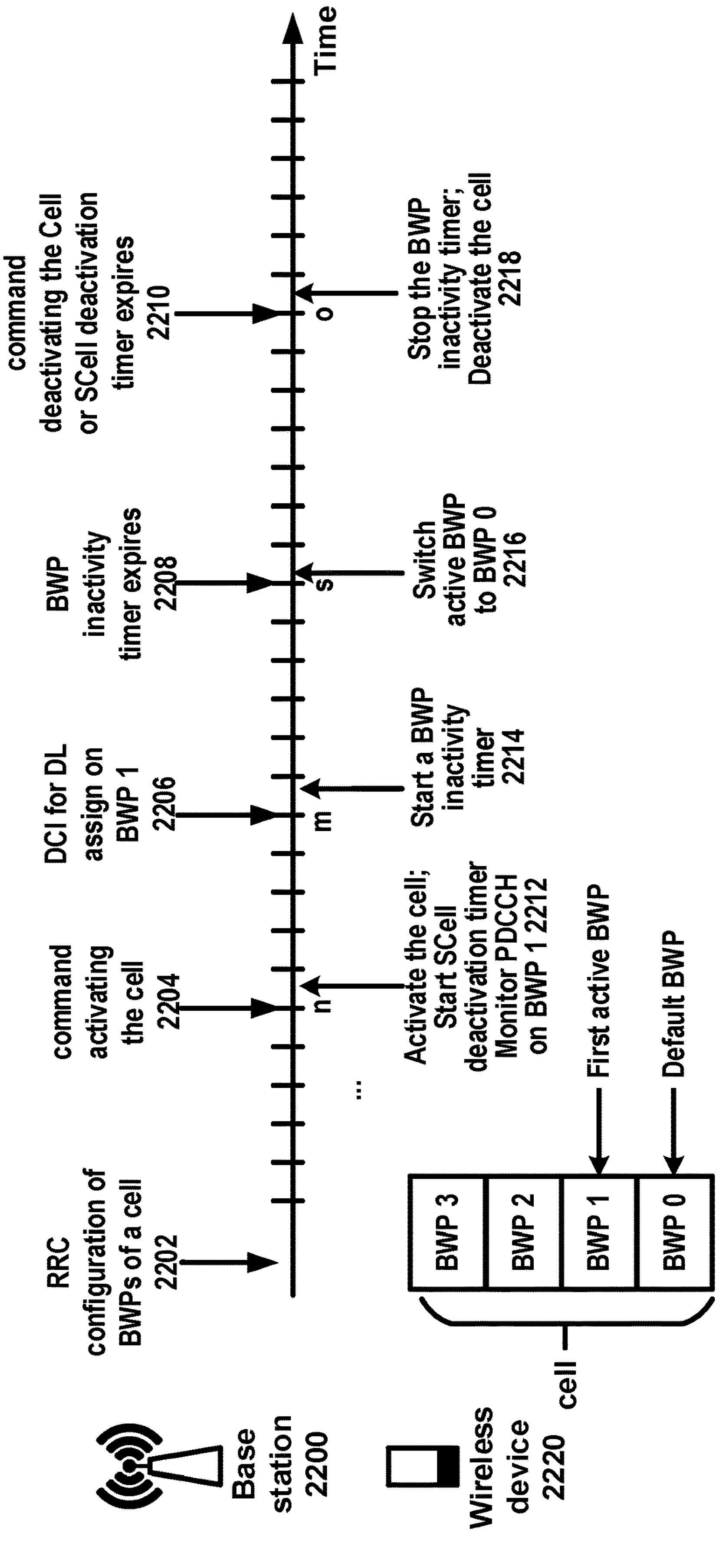
FIG. 22 shows an example of BWP activation/deactivation.

FIG. 22 shows an example of BWP activation/deactivation. The BWP activation/deactivation may be on a cell (e.g., PCell or SCell). The BWP activation/deactivation may be associated with BWP switching (e.g., BWP switching may comprise the BWP activation/deactivation). A wireless device 2220 may receive (e.g., detect) at step 2202, (e.g., from a base station 2200), at least one message (e.g., RRC message) comprising parameters of a cell and one or more BWPs associated with the cell. The RRC message may comprise at least one of: RRC connection reconfiguration message (e.g., RRCReconfiguration), RRC connection reestablishment message (e.g., RRCRestablishment), and/or RRC connection setup message (e.g., RRCSetup). Among the one or more BWPs, at least one BWP may be configured as the first active BWP (e.g., BWP 1), one BWP as the default BWP (e.g., BWP 0). The wireless device 2220 may receive (e.g., detect) a command at step 2204 (e.g., RRC message, MAC CE or DCI message) to activate the cell at an nth slot. The wireless device 2220 may not receive (e.g., detect) a command activating a cell, for example, a PCell. The wireless device 2220 may activate the PCell at step 2212, for example, after the wireless device 2220 receives/detects RRC message comprising configuration parameters of the PCell. The wireless device 2220 may start monitoring a PDCCH transmission on BWP 1 based on (e.g., after or in response to) activating the PCell at step 2212.

The wireless device 2220 may start (or restart) at step 2214, a BWP inactivity timer (e.g., bwp-InactivityTimer) at an mth slot based on (e.g., after or in response to) receiving a DCI message 2206 indicating DL assignment on BWP 1. The wireless device 2220 may switch back at step 2216 to the default BWP (e.g., BWP 0) as an active BWP, for example, if the BWP inactivity timer expires at step 2208, at sth slot. At step 2210, the wireless device 2220 may deactivate the cell and/or stop the BWP inactivity timer, for example, if a secondary cell deactivation timer (e.g., sCell-DeactivationTimer) expires at step 2210 (e.g., if the cell is a SCell). The wireless device 2220 may not deactivate the cell and may not apply or use a secondary cell deactivation timer (e.g., sCellDeactivationTimer) on the PCell, for example, based on the cell being a PCell.

A wireless device (e.g., a MAC entity of the wireless device) may apply or use various operations on an active BWP for an activated serving cell configured with a BWP. The various operations may comprise at least one of: sending (e.g., transmitting) on UL-SCH, sending (e.g., transmitting) on RACH, monitoring a PDCCH transmission, sending (e.g., transmitting) PUCCH, receiving DL-SCH, and/or (re-) initializing any suspended configured uplink grants of configured grant Type 1 according to a stored configuration, if any.

A wireless device (e.g., a MAC entity of the wireless device) may not perform certain operations, for example, on an inactive BWP for an activated serving cell (e.g., each activated serving cell) configured with a BWP. The certain operations may include at least one of sending (e.g., transmit) on UL-SCH, sending (e.g., transmit) on RACH, monitoring a PDCCH transmission, sending (e.g., transmit) PUCCH, sending (e.g., transmit) SRS, or receiving DL-SCH. The wireless device (e.g., the MAC entity of the wireless device) may clear any configured downlink assignment and configured uplink grant of configured grant Type 2, and/or suspend any configured uplink grant of configured Type 1, for example, on the inactive BWP for the activated serving cell (e.g., each activated serving cell) configured with the BWP.

A wireless device may perform a BWP switching of a serving cell to a BWP indicated by a PDCCH transmission, for example, if a wireless device (e.g., a MAC entity of the wireless device) receives/detects the PDCCH transmission for the BWP switching and a random access procedure associated with the serving cell is not ongoing. A bandwidth part indicator field value may indicate the active DL BWP, from the configured DL BWP set, for DL receptions, for example, if the bandwidth part indicator field is configured in DCI format 1_1. A bandwidth part indicator field value may indicate the active UL BWP, from the configured UL BWP set, for UL transmissions, for example, if the bandwidth part indicator field is configured in DCI format 0_1.

A wireless device may be provided by a higher layer parameter such as a default DL BWP (e.g., Default-DL-BWP) among the configured DL BWPs, for example, for a primary cell. A default DL BWP may be the initial active DL BWP, for example, if a wireless device is not provided with the default DL BWP by the higher layer parameter (e.g., Default-DL-BWP). A wireless device may be provided with a higher layer parameter such as a value of a timer for the primary cell (e.g., bwp-InactivityTimer). The wireless device may increment the timer, if running, every interval of 1 millisecond for frequency range 1 or every 0.5 milliseconds for frequency range 2, for example, if the wireless device may not detect a DCI format 1_1 for paired spectrum operation or if the wireless device may not detect a DCI format 1_1 or DCI format 0_1 for unpaired spectrum operation during the interval.

Procedures of a wireless device on the secondary cell may be substantially the same as on the primary cell using a timer value for a secondary cell and the default DL BWP for the secondary cell, for example, if the wireless device is configured for the secondary cell with a higher layer parameter (e.g., Default-DL-BWP) indicating a default DL BWP among the configured DL BWPs and the wireless device is configured with a higher layer parameter (e.g., bwp-InactivityTimer) indicating the timer value. A wireless device may use an indicated DL BWP and an indicated UL BWP on a secondary cell respectively as a first active DL BWP and a first active UL BWP on the secondary cell or carrier, for example, if the wireless device is configured by a higher layer parameter (e.g., Active-BWP-DL-SCell) associated with the first active DL BWP and by a higher layer parameter (e.g., Active-BWP-UL-SCell) associated with the first active UL BWP on the secondary cell or carrier.

A set of PDCCH candidates for a wireless device to monitor may be referred to as PDCCH search space sets. A search space set may comprise a CSS set or a USS set. A wireless device may monitor PDCCH transmission candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by a SI-RNTI on the primary cell of the MCG, a Type 1-PDCCH CSS set configured by ra-SearchSpace in PDCCH-ConfigCommon for a DCI format with CRC scrambled by a RA-RNTI, a MsgB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

A wireless device may determine a PDCCH transmission monitoring occasion on an active DL BWP based on one or more PDCCH transmission configuration parameters (e.g., as described with respect to FIG. 27) comprising at least one of: a PDCCH transmission monitoring periodicity, a PDCCH transmission monitoring offset, or a PDCCH transmission monitoring pattern within a slot. For a search space set (SS s), the wireless device may determine that a PDCCH transmission monitoring occasion(s) exists in a slot with number/quantity $$n_{s,f}^{\mu}$$

in a frame with number/quantity $$n_f \text{ if } (n_f \cdot N_{slot}^{frame,\mu} + n_{s,f}^{\mu} - o_s) \bmod k_s = 0.N_{slot}^{frame,\mu}$$

may be a number/quantity of slots in a frame if numerology μ is configured. $o_s$ may be a slot offset indicated in the PDCCH transmission configuration parameters. $k_s$ may be a PDCCH transmission monitoring periodicity indicated in the PDCCH transmission configuration parameters. The wireless device may monitor PDCCH transmission candidates for the search space set for $T_s$ consecutive slots, starting from slot $$n_{s,f}^{\mu},$$

and may not monitor PDCCH transmission candidates for search space set s for the next $k_s-T_s$ consecutive slots. A USS at CCE aggregation level $L\in\{1, 2, 4, 8, 16\}$ may be defined by a set of PDCCH transmission candidates for CCE aggregation level L.

A wireless device may decide, for a search space set s associated with CORESET p, CCE indexes for aggregation level L corresponding to PDCCH transmission candidate $m_{s,n_{CI}}$ of the search space set in slot $$n_{s,f}^{\mu}$$

for an active DL BWP of a serving cell corresponding to carrier indicator field value $n_{CI}$ as $$L\cdot\left\{\left(Y_{p,n_{s,f}^{\mu}}+\left\lfloor\frac{m_{s,n_{CI}}\cdot N_{CCE,p}}{L\cdot M_{s,max}^{(L)}}\right\rfloor+n_{CI}\right)\bmod\lfloor N_{CCE,p}/L\rfloor\right\}+i,$$

where, $$Y_{p,n_{s,f}^{\mu}}=0 \text{ for any } CSS;\; Y_{p,n_{s,f}^{\mu}}=\left(A_p\cdot Y_{p,n_{s,f}^{\mu}-1}\right)\bmod D$$

for a USS, $Y_{p,-1}=n_{RNTI}\neq 0$, $A_p=39827$ for p mod 3=0, $A_p=39829$ for p mod 3=1, $A_p=39839$ for p mod 3=2, and D=65537; i=0, . . . , L−1; $N_{CCE,p}$ is the number/quantity of CCEs, numbered/quantified from 0 to $N_{CCE,p}-1$, in CORESET p; $n_{CI}$ is the carrier indicator field value if the wireless device is configured with a carrier indicator field by CrossCarrierSchedulingConfig for the serving cell on which PDCCH transmission is monitored; otherwise, including for any CSS, $$n_{CI}=0;\; m_{s,n_{CI}}=0, \ldots , M_{s,n_{CI}}^{(L)}-1,$$

where $$M_{s,n_{CI}}^{(L)}$$

is the number/quantity of PDCCH transmission candidates the wireless device is configured to monitor for aggregation level L of a search space set s for a serving cell corresponding to $n_{CI}$; for any CSS, $$M_{s,max}^{(L)}=M_{s,0}^{(L)};\text{ for a } USS,\; M_{s,max}^{(L)}$$

is the maximum of $$M_{s,n_{CI}}^{(L)}$$

over configured $n_{CI}$ values for a CCE aggregation level L of search space set s; and the RNTI value used for $n_{RNTI}$ is the C-RNTI.

A wireless device may monitor a set of PDCCH transmission candidates according to configuration parameters of a search space set comprising a plurality of search spaces. The wireless device may monitor a set of PDCCH transmission candidates in one or more CORESETs for detecting one or more DCI messages. A CORESET may be configured, for example, as described with respect to FIG. 26. Monitoring may comprise decoding one or more PDCCH transmission candidates of the set of the PDCCH transmission candidates according to the monitored DCI formats. Monitoring may comprise decoding a DCI content of one or more PDCCH transmission candidates with possible (or configured) PDCCH transmission locations, possible (or configured) PDCCH transmission formats (e.g., number/quantity of CCEs, number/quantity of PDCCH transmission candidates in common search spaces, and/or number/quantity of PDCCH transmission candidates in the wireless device-specific search spaces (e.g., the UE-specific search spaces)) and possible (or configured) DCI formats. The decoding may be referred to as blind decoding. The possible DCI formats may be based on examples of FIG. 23.

FIG. 23 shows examples of various DCI formats. The various DCI formats may be used, for example, by a base station to send (e.g., transmit) control information (e.g., to a wireless device and/or to be used by the wireless device) for PDCCH transmission monitoring. Different DCI formats may comprise different DCI fields and/or have different DCI payload sizes. Different DCI formats may have different signaling purposes. DCI format 0_0 may be used to schedule PUSCH transmission in one cell. DCI format 0_1 may be used to schedule one or multiple PUSCH transmissions in one cell or indicate CG-DFI (configured grant-Downlink Feedback Information) for configured grant PUSCH transmission, etc. The DCI format(s), that the wireless device may monitor for reception via a search space, may be configured.

FIG. 24A shows an example MIB message. FIG. 24A shows example configuration parameters of a MIB of a cell. The cell may be a PCell (or any other cell). A wireless device may receive a MIB via a PBCH. The wireless device may receive the MIB, for example, based on receiving a PSS and/or an SSS. The configuration parameters of a MIB may comprise/indicate a SFN (e.g., indicated via a higher layer parameter systemFrameNumber), subcarrier spacing indication (e.g., indicated via a higher layer parameter subCarrierSpacingCommon), a frequency domain offset (e.g., indicated via a higher layer parameter ssb-SubcarrierOffset) between SSB and overall resource block grid in number of subcarriers, a parameter indicating whether the cell is barred (e.g., indicated via a higher layer parameter cellBarred), a DMRS position indication (e.g., indicated via a higher layer parameter dmrs-TypeA-Position) indicating position of DMRS, parameters of a CORESET and a search space of a PDCCH (e.g., indicated via a higher layer parameter pdcch-ConfigSIB1) comprising a common CORESET, a common search space and necessary PDCCH parameters, etc. Each of the higher layer parameters may be indicated via one or bits. For example, the SFN may be indicated using 6 bits (or any other quantity of bits).

A configuration parameter (e.g., pdcch-ConfigSIB1) may comprise a first parameter (e.g., controlResourceSetZero) indicating a common CORESET of an initial BWP of the cell. The common CORESET may be associated with an indicator/index (e.g., 0, or any other indicator). For example, the common CORESET may be CORESET 0. The first parameter may be an integer between 0 and 15 (or any other integer). Each integer (e.g., between 0 and 15, or any other integer) may indicate/identify a configuration of CORESET 0.

FIG. 24B shows an example configuration of a CORESET. The CORESET may be CORESET 0 (or any other CORESET). A wireless device may determine an SSB and CORESET 0 multiplexing pattern, a quantity/number of RBs for CORESET 0, a quantity/number of symbols for CORESET 0, an RB offset for CORESET 0, for example, based on a value of the first parameter (e.g., controlResourceSetZero).

A higher layer parameter (e.g., pdcch-ConfigSIB1) may comprise a second parameter (e.g., searchSpaceZero). The second parameter may indicate a common search space of the initial BWP of the cell. The common search space may be associated with an indicator/index (e.g., 0, or any other indicator). For example, the common search space may be search space 0. The second parameter may be an integer between 0 and 15 (or any other integer). Each integer (e.g., between 0 and 15, or any other integer) may identify a configuration of search space 0.

FIG. 24C shows an example configuration of a search space. The search space may be search space 0 (or any other search space). A wireless device may determine one or more parameters (e.g., O, M) for slot determination for PDCCH monitoring, a first symbol indicator/index for PDCCH monitoring, and/or a quantity/number of search spaces per slot, for example, based on a value of the second parameter (e.g., searchSpaceZero). For example, for operation without shared spectrum channel access and for the SS/PBCH block and CORESET multiplexing pattern 1, the wireless device may monitor PDCCH (e.g., in the Type0-PDCCH CSS set) over two slots. For SS/PBCH block with index i, the wireless device may determine an index of slot $n_0$ as $$n_0 = (O \cdot 2^{\mu} + \lfloor i \cdot M \rfloor) \bmod N_{slot}^{frame,\mu}.$$

Slot $n_0$ is may be in a frame with a SFN $SFN_C$ that satisfies the condition $SFN_c \bmod 2=0$ (e.g., if $$\lfloor (O \cdot 2^{\mu} + \lfloor i \cdot M \rfloor) / N_{slot}^{frame,\mu} \rfloor \bmod 2 = 0),$$

or in a frame with a SFN that $SFN_C$ satisfies the condition $$SFN_c \bmod 2 = 1 \ (\text{e.g., if } \lfloor (O \cdot 2^{\mu} + \lfloor i \cdot M \rfloor) / N_{slot}^{frame,\mu} \rfloor \bmod 2 = 1),$$

where $\mu \in \{0, 1, 2, 3, 5, 6\}$ based on the SCS for PDCCH receptions in the CORESET.

A wireless device may monitor a PDCCH for receiving DCI. The wireless device may monitor a search space 0 of a CORESET 0 for receiving the DCI. The DCI may schedule a SIB1. For example, a SIB1 message may be similar to as described with respect to FIG. 25. The wireless device may receive the DCI with CRC scrambled with a SI-RNTI dedicated for receiving the SIB1.

FIG. 25 shows an example SIB. The SIB may comprise one or more configuration parameters (e.g., RRC configuration parameters). A SIB (e.g., SIB1) may be sent/transmitted to one or more wireless devices. For example, the SIB may be broadcasted to multiple wireless devices. The SIB may contain information for evaluating/determining whether a wireless device is allowed to access a cell, information of paging configuration, and/or scheduling configuration of other system information. A SIB may comprise radio resource configuration information that may be common for multiple wireless devices and barring information used/applied to a unified access control. A base station may send/transmit, to a wireless device (or a plurality of wireless devices), one or more SIB information messages. As shown in FIG. 25, parameters of the one or more SIB information messages may comprise: one or more parameters for cell selection related to a serving cell (e.g., cellSelectionInfo), one or more configuration parameters of a serving cell (e.g., in ServingCellConfigCommonSIB information element (IE)), and/or one or more other parameters. The ServingCellConfigCommonSIB IE may comprise at least one of: common downlink parameters (e.g., in DownlinkConfigCommonSIB IE) of the serving cell, common uplink parameters (e.g., in UplinkConfigCommonSIB IE) of the serving cell, and/or other parameters.

A DownlinkConfigCommonSIB IE may comprise parameters of an initial downlink BWP (e.g., indicated via initialDownlinkBWP IE) of the serving cell (e.g., SpCell). The parameters of the initial downlink BWP may be comprised in a BWP-DownlinkCommon IE (e.g., as shown in FIG. 26). The BWP-DownlinkCommon IE may be used to configure common parameters of a downlink BWP of the serving cell. The base station may configure a parameter (e.g., locationAndBandwidth) such that the initial downlink BWP may comprise an entire CORESET (e.g., CORESET 0) of the serving cell in the frequency domain. The wireless device may use/apply the parameter locationAndBandwidth based on reception of the parameter. The wireless device may use/apply the parameter locationAndBandwidth to determine the frequency position of signals in relation to the frequency as indicated via locationAndBandwidth. The wireless device may keep CORESET 0, for example, until after reception of an RRC setup message (e.g., RRCSetup), RRC resume message (e.g., RRCResume) and/or an RRC re-establishment message (e.g., RRCReestablishment).

The DownlinkConfigCommonSIB IE may comprise parameters of a paging channel configuration. The parameters may comprise a paging cycle value (T, e.g., indicated by defaultPagingCycle IE), a parameter indicating total quantity/number (N) of paging frames (PFs) (e.g., indicated by nAndPagingFrameOffset IE) and paging frame offset in a paging DRX cycle (e.g., indicated by parameter PF_offset), a quantity/number (Ns) for total paging occasions (POs) per PF, a first PDCCH monitoring occasion indication parameter (e.g., firstPDCCH-MonitoringOccasionofPO IE) indicating a first PDCCH monitoring occasion for paging of each PO of a PF. The wireless device may monitor a PDCCH for receiving a paging message, for example, based on parameters of a PCCH configuration.

A parameter (e.g., first-PDCCH-MonitoringOccasionOfPO) may be signaled in SIB1 for paging in initial DL BWP. The parameter first-PDCCH-MonitoringOccasionOfPO may be signaled in the corresponding BWP configuration, for example, for paging in a DL BWP other than the initial DL BWP.

FIG. 26 shows example RRC configuration parameters. The configuration parameters may be RRC configuration parameters for a downlink BWP of a serving cell. The configuration parameters may be indicated via a higher layer parameter BWP-DownlinkCommon IE. A base station may send/transmit to a wireless device (or a plurality of wireless devices) one or more configuration parameters of a downlink BWP (e.g., initial downlink BWP) of a serving cell. The one or more configuration parameters of the downlink BWP may comprise: one or more generic BWP parameters of the downlink BWP, one or more cell-specific parameters for PDCCH of the downlink BWP (e.g., in pdcch-ConfigCommon IE), one or more cell specific parameters for the PDSCH of the BWP (e.g., in pdsch-ConfigCommon IE), and/or one or more other parameters. A pdcch-ConfigCommon IE may comprise parameters of CORESET 0 (e.g., indicated via parameter controlResourceSetZero) which may be used in any common or wireless device-specific search spaces. A value of the controlResourceSetZero may be interpreted in the same manner as the corresponding bits in MIB parameter pdcch-ConfigSIB1. A pdcch-ConfigCommon IE may comprise parameters (e.g., in commonControlResourceSet) of an additional common control resource set which may be configured and used for any common or wireless device-specific search space. The network may use a parameter ControlResourceSetId other than 0 for this ControlResourceSet, for example, if the network configures commonControlResourceSet. The network may configure the commonControlResourceSet in SIB1 such that the SIB1 is contained within the bandwidth of CORESET 0. A pdcch-ConfigCommon IE may comprise parameters (e.g., in commonSearchSpaceList) of a list of additional common search spaces. Parameters of a search space may be implemented based on example of FIG. 27. A pdcch-ConfigCommon IE may indicate, from a list of search spaces, a search space for paging (e.g., via parameter pagingSearchSpace), a search space for random access procedure (e.g., via parameter ra-SearchSpace), a search space for SIB1 message (e.g., via parameter searchSpaceSIB1), a common search space 0 (e.g., via parameter searchSpaceZero), and/or one or more other search spaces.

A CORESET may be associated with a CORESET indicator/index (e.g., indicated via parameter ControlResourceSetId). A CORESET may be implemented based on examples described with respect to FIG. 14A and/or FIG. 14B. The CORESET index 0 may identify a common CORESET configured in MIB and in ServingCellConfigCommon (e.g., indicated via controlResourceSetZero). The CORESET index 0 may not be used in the ControlResourceSet IE. The CORESET index with other values may identify CORESETs configured by dedicated signaling or in SIB1. The controlResourceSetId may be unique among the BWPs of a serving cell. A CORESET may be associated with coresetPoolIndex indicating an index of a CORESET pool for the CORESET. A CORESET may be associated with a time duration parameter (e.g., duration) indicating contiguous time duration of the CORESET (e.g., in terms of a quantity/number of symbols). Configuration parameters of a CORESET may comprise at least one of: frequency resource indication (e.g., frequencyDomainResources), a CCE-REG mapping type indicator (e.g., cce-REG-MappingType), a plurality of TCI states, and/or an indicator indicating whether a TCI is present in a DCI, etc. The frequency resource indication (e.g., comprising a quantity/number of bits, such as 45 bits, or any other quantity of bits) may indicate frequency domain resources. Each bit of the frequency resource indication may correspond to a group of RBs (e.g., 6 RBs, or any other quantity of RBs), with the grouping starting from the first RB group in a BWP of a cell (e.g., SpCell, SCell). For example, the first (e.g., left-most, most significant) bit may correspond to the first RB group in the BWP, with the other bits sequentially corresponding to other RB groups. A bit that is set to 1 may indicate that an RB group, corresponding to the bit, is contained in the frequency domain resource of the CORESET. Bits corresponding to a group of RBs not fully contained in the BWP within which the CORESET is configured may be set to zero.

FIG. 27 shows an example configuration of a search space. The configuration of the search space may be within a SearchSpace IE. One or more search space configuration parameters of a search space may comprise at least one of: a search space ID (e.g., searchSpaceId), a CORESET indicator (ID) (e.g., controlResourceSetId), a monitoring slot periodicity and offset parameter (e.g., monitoringSlotPeriodicityAndOffset), a search space time duration value (e.g., duration), a monitoring symbol indication (e.g., monitoringSymbolsWithinSlot), a quantity/number of candidates for an aggregation level (e.g., nrofCandidates), and/or a search space type indicating a common search space type or a wireless device-specific search space type (e.g., searchSpaceType). The monitoring slot periodicity and offset parameter may indicate slots (e.g., in a radio frame) and slot offset (e.g., related to a starting of a radio frame) for PDCCH monitoring. The monitoring symbol indication may indicate symbol(s), of a slot, in which a wireless device may monitor a PDCCH on the search space. The control resource set ID may indicate/identify a CORESET on which a search space may be located.

A wireless device, in an RRC idle state (e.g., RRC_IDLE) or in an RRC inactive state (e.g., RRC_INACTIVE), may periodically monitor POs for receiving paging message(s) for the wireless device. The wireless device, in an RRC idle state or an RRC inactive state and before monitoring the POs, may wake up at a time before each PO for preparation and/or to activate (e.g., turn on) all components in preparation of data reception (e.g., warm up stage). The gap between the waking up and the PO may be set to be sufficient to accommodate all the processing requirements. The wireless device may perform, after the warming up, timing acquisition from SSB and coarse synchronization, frequency and time tracking, time and frequency offset compensation, and/or calibration of local oscillator. The wireless device, after warm up, may monitor a PDCCH for a paging DCI via one or more PDCCH monitoring occasions. The wireless device may monitor the PDCCH, for example, based on configuration parameters of the PCCH configuration (e.g., as configured in SIB1). The configuration parameters of the PCCH configuration may be as described with respect to FIG. 25.

Figure 28:
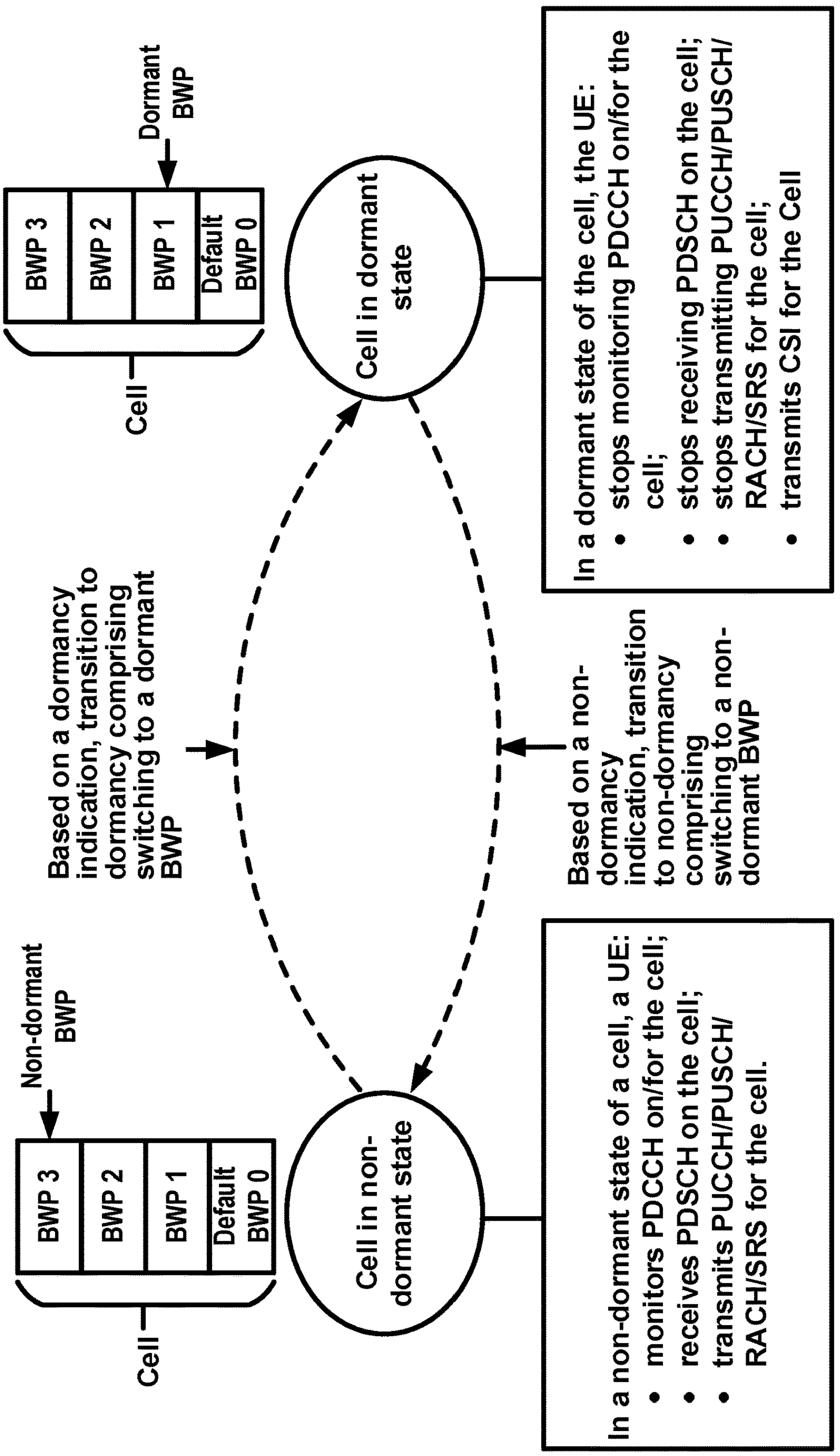
FIG. 28 shows example dormancy management.

FIG. 28 shows example cell dormancy management. Cell dormancy management may comprise transitioning between a dormant state and a non-dormant state. The example transitioning may be for operations on an SCell. A base station may send/transmit, to a wireless device, one or more RRC messages. The one or more RRC messages may comprise configuration parameters of the SCell. The SCell may comprise a plurality of BWPs. Among the plurality of BWPs, a first BWP (e.g., BWP 3) may be configured as a non-dormant BWP, and/or a second BWP (e.g., BWP 1) may be configured as a dormant BWP. A default BWP (e.g., BWP 0) may be configured in the plurality of BWPs. The non-dormant BWP may be a BWP which the wireless device may activate, for example, based on/in response to transitioning the SCell from a dormant state to a non-dormant state. The dormant BWP may be a BWP which the wireless device may switch to based on/in response to transitioning the SCell from a non-dormant state to a dormant state. The configuration parameters may indicate one or more search spaces and/or CORESETs configured on the non-dormant BWP. The configuration parameters may indicate no search spaces or no CORESETs for the dormant BWP. The configuration parameter may indicate CSI reporting configuration parameters for the dormant BWP.

An active BWP for the SCell may be a dormant BWP, a non-dormant BWP, or a default BWP. A default BWP may be different from a dormant BWP. The configuration parameters may indicate one or more search spaces and/or one or more CORESETs configured on the default BWP. A wireless device may switch to the default BWP as an active BWP, for example, if a BWP inactivity timer expires or based on receiving a DCI indicating switching to the default BWP. The wireless device may perform (e.g., if the default BWP is an active BWP), at least one of: monitoring PDCCH on the default BWP of the SCell, receiving a PDSCH transmission via the default BWP of the SCell, sending a PUSCH transmission via the default BWP of the SCell, sending an SRS via the default BWP of the SCell, and/or sending a CSI report (e.g., in a periodic, aperiodic, and/or semi-persistent manner) for the default BWP of the SCell. The wireless device may switch to the dormant BWP as an active BWP of the SCell, for example, if receiving a dormancy/non-dormancy indication indicating a dormant state for a SCell. The wireless device may (e.g., based on/in response to switching to the dormant BWP) perform at least one of: refraining from monitoring a PDCCH on the dormant BWP of the SCell (or for the SCell if the SCell is cross-carrier scheduled by another cell), refraining from receiving a PDSCH transmission via the dormant BWP of the SCell, refraining from sending a PUSCH transmission via the dormant BWP of the SCell, refraining from sending SRS via the dormant BWP of the SCell, and/or sending a CSI report (e.g., periodic, aperiodic, and/or semi-persistent CSI report) for the dormant BWP of the SCell.

A base station may send/transmit, to a wireless device, DCI via a PDCCH resource. The DCI may comprise a dormancy/non-dormancy indication indicating a dormant state or a non-dormant state for the SCell. The wireless device may (e.g., based on the dormancy/non-dormancy indication indicating a dormant state for the SCell): transition the SCell to the dormant state (e.g., if the SCell is in a non-dormant state before receiving the DCI), or maintain the SCell in the dormant state (e.g., if the SCell is in the dormant state before receiving the DCI). Transitioning the SCell to the dormant state may comprise switching to the dormant BWP (e.g., configured by the base station) of the SCell. The wireless device may (e.g., based on the dormancy/non-dormancy indication indicating a non-dormant state for the SCell): transition the SCell to the non-dormant state (e.g., if the SCell is in a dormant state before receiving the DCI), or maintain the S Cell in the non-dormant state (e.g., if the SCell is in the non-dormant state before receiving the DCI). Transitioning the SCell to the non-dormant state may comprise switching to a non-dormant BWP (e.g., configured by the base station) of the SCell.

The wireless device may switch to the non-dormant BWP (e.g., BWP 3), configured by the base station, as an active BWP of the SCell, for example, based on transitioning the SCell from a dormant state to a non-dormant state. The wireless device may perform (e.g., based on the switching to the non-dormant BWP as the active BWP of the SCell) at least one of: monitoring PDCCH on the active BWP of the SCell (or monitoring PDCCH for the SCell if the SCell is configured to be cross-carrier scheduled by another cell), receiving a PDSCH transmission via the active BWP of the SCell, and/or sending a PUCCH transmission, a PUSCH transmission, a RACH transmission and/or an SRS transmission via the active BWP (e.g., if the active BWP is an uplink BWP).

The wireless device may switch to the dormant BWP (e.g., BWP 1 of the SCell), configured by the base station, for example, based on transitioning the SCell from a non-dormant state to a dormant state. The wireless device may perform (e.g., based on the switching to the dormant BWP of the SCell) at least one of: refraining from monitoring PDCCH on the dormant BWP of the SCell (or refraining from monitoring PDCCH for the SCell if a the SCell is configured to be cross-carrier scheduled by another cell), refraining from receiving a PDSCH transmission via the dormant BWP of the SCell, refraining from sending a PUCCH transmission, a PUSCH transmission, a RACH transmission, and/or an SRS transmission via the dormant BWP (e.g., if the dormant BWP is an uplink BWP), and/or sending a CSI report for the dormant BWP of the SCell (e.g., based on the CSI reporting configuration parameters configured on the dormant BWP of the SCell).

DRX operation may be used by a wireless device to improve the wireless device battery lifetime. With DRX configured, the wireless device may discontinuously monitor downlink control channel, for example, PDCCH or EPDCCH. A base station may configure DRX operation with a set of DRX parameters, for example, using RRC configuration. The set of DRX parameters may be selected based on the application type such that the wireless device may reduce power and resource consumption. The wireless device may receive data packets with an extended delay, since the wireless device may be in DRX Sleep/Off state at the time of data arrival at the wireless device and the base station may wait until the wireless device transitions to the DRX ON state, for example, based on (e.g., after or in response to) DRX being configured/activated.

For a DRX mode, the wireless device may power down most of its circuitry, for example, if there are no packets to be received. The wireless device may monitor PDCCH discontinuously in the DRX mode. The wireless device may monitor the PDCCH continuously, for example, if a DRX operation is not configured. For this time the wireless device listens to the downlink (DL) (or monitors PDCCHs) which is called DRX Active state. In a DRX mode, a time for which the wireless device doesn't listen/monitor PDCCH is called DRX Sleep state.

Figure 29:
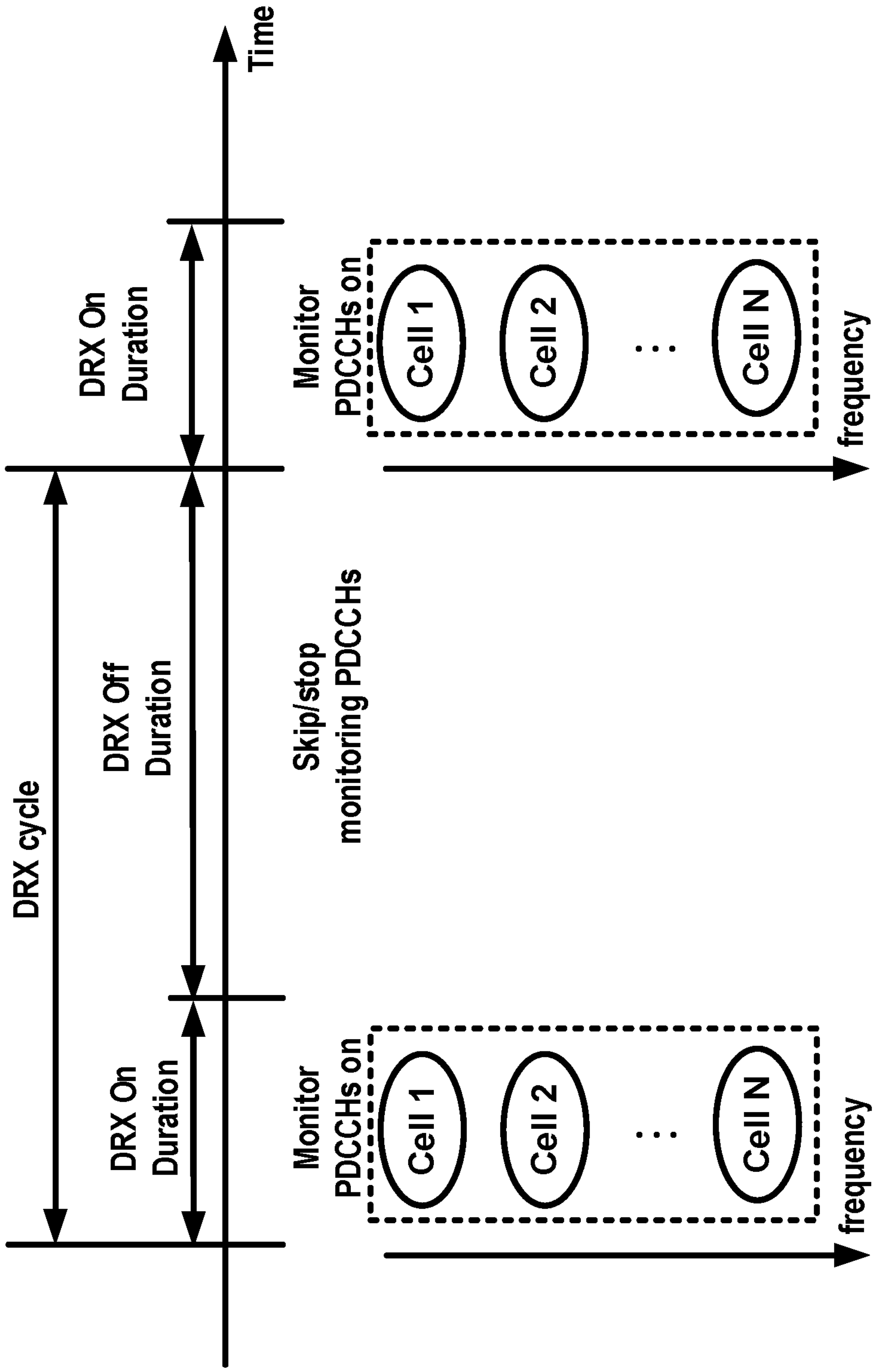
FIG. 29 shows an example of DRX configuration for a wireless device.

FIG. 29 shows an example of DRX configuration for a wireless device. A base station may send (e.g., transmit) an RRC message comprising one or more DRX parameters of a DRX cycle. The one or more parameters may comprise a first parameter and/or a second parameter. The first parameter may indicate a first time/window value of the DRX Active state (e.g., DRX on duration) of the DRX cycle. The second parameter may indicate a second time of the DRX Sleep state (e.g., DRX Off duration) of the DRX cycle. The one or more parameters may further comprise a time duration of the DRX cycle. For the DRX Active state, the wireless device may monitor PDCCHs for detecting one or more DCIs on a serving cell. For the DRX Sleep state, the wireless device may stop monitoring PDCCHs on the serving cell. The wireless device may monitor all PDCCHs on (or for) the multiple cells for the DRX Active state, for example, if multiple cells are in active state. For the DRX off duration, the wireless device may stop monitoring all PDCCH on (or for) the multiple cells. The wireless device may repeat the DRX operations according to the one or more DRX parameters.

DRX may be beneficial to the base station. The wireless device may be sending (e.g., transmitting) periodic CSI and/or SRS frequently (e.g., based on the configuration), for example, if DRX is not configured. With DRX, for DRX OFF periods, the wireless device may not send (e.g., transmit) periodic CSI and/or SRS. The base station may assign these resources to the other wireless devices to improve resource utilization efficiency.

The MAC entity may be configured by RRC with a DRX functionality that controls the wireless device's downlink control channel (e.g., PDCCH) monitoring activity for a plurality of RNTIs for the MAC entity. The plurality of RNTIs may comprise at least one of: C-RNTI; CS-RNTI; INT-RNTI; SP-CSI-RNTI; SFI-RNTI; TPC-PUCCH-RNTI; TPC-PUSCH-RNTI; Semi-Persistent Scheduling C-RNTI; eIMTA-RNTI; SL-RNTI; SL-V-RNTI; CC-RNTI; or SRS-TPC-RNTI. The MAC entity may monitor the PDCCH discontinuously using the DRX operation (e.g., if DRX is configured), for example, based on being RRC_CONNECTED; otherwise the MAC entity may monitor the PDCCH continuously.

RRC may control DRX operation by configuring a plurality of timers. The plurality of timers may comprise: a DRX On duration timer (e.g., drx-onDurationTimer); a DRX inactivity timer (e.g., drx-InactivityTimer); a downlink DRX HARQ round trip time (RTT) timer (e.g., drx-HARQ-RTT-TimerDL); an uplink DRX HARQ RTT Timer (e.g., drx-HARQ-RTT-TimerUL); a downlink retransmission timer (e.g., drx-RetransmissionTimerDL); an uplink retransmission timer (e.g., drx-RetransmissionTimerUL); one or more parameters of a short DRX configuration (e.g., drx-ShortCycle and/or drx-ShortCycleTimer)) and one or more parameters of a long DRX configuration (e.g., drx-LongCycle). Time granularity for DRX timers may be in terms of PDCCH subframes (e.g., indicated as psf in the DRX configurations), and/or in terms of milliseconds.

Based on a DRX cycle being configured, the Active Time of the DRX operation may include the time for which at least one timer is running. The at least one timer may comprise drx-onDurationTimer, drx-InactivityTimer, drx-RetransmissionTimerDL, drx-RetransmissionTimerUL, and/or mac-ContentionResolutionTimer. For the Active time of the DRX operation, the wireless device may monitor PDCCH with RNTI(s) impacted by the DRX operation. The RNTIs may comprise C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and/or AI-RNTI.

A timer (e.g., a drx-Inactivity-Timer) may specify a time duration for which the wireless device may be active, for example, after successfully decoding a PDCCH indicating a new transmission (UL or DL or SL). This timer may be restarted upon receiving PDCCH for a new transmission (UL or DL or SL). The wireless device may transition to a DRX mode (e.g., using a short DRX cycle or a long DRX cycle), for example, based on the expiry of this timer. a cycle (e.g., a drx-ShortCycle) may be a first type of DRX cycle (e.g., if configured) that needs to be followed, for example, if the wireless device enters DRX mode. An IE (e.g., a DRX-Config IE) may indicate the length of the short cycle. A timer (e.g., a drx-ShortCycleTimer) may be expressed as multiples of a cycle (e.g., a shortDRX-Cycle). The timer may indicate the number of initial DRX cycles to follow the short DRX cycle, for example, before entering the long DRX cycle. A timer (e.g., a drx-onDurationTimer) may specify the time duration at the beginning of a DRX Cycle (e.g., DRX ON). A timer (e.g., a drx-onDurationTimer) may indicate the time duration, for example, before entering the sleep mode (DRX OFF). A timer (e.g., a drx-HARQ-RTT-TimerDL) may specify a minimum duration from the time new transmission is received and, for example, before the wireless device may expect a retransmission of a same packet. This timer may be fixed and may not be configured by RRC. A timer (e.g., a drx-RetransmissionTimerDL) may indicate a maximum duration for which the wireless device may be monitoring PDCCH, for example, if a retransmission from the eNodeB is expected by the wireless device.

The Active Time may comprise the time for which a Scheduling Request is sent on PUCCH and is pending, for example, based on (e.g., after or in response to) a DRX cycle being configured. Based on (e.g., after or in response to) a DRX cycle being configured, the Active Time may comprise the time for which an uplink grant for a pending HARQ retransmission can occur and there is data in the corresponding HARQ buffer for synchronous HARQ process. The Active Time may comprise the time for which a PDCCH may indicate a new transmission addressed to the C-RNTI of the MAC entity has not been received, for example, after successful reception of a Random Access Response for the preamble not selected by the MAC entity, for example, based on a DRX cycle being configured.

A timer, such as a DL HARQ RTT Timer (e.g., drx-HARQ-RTT-TimerDL), may expire in a subframe and the data of the corresponding HARQ process may not be successfully decoded. The MAC entity may start the timer (e.g., the drx-RetransmissionTimerDL) for the corresponding HARQ process. A UL HARQ RTT Timer (e.g., drx-HARQ-RTT-TimerUL) may expire in a subframe. The MAC entity may start the timer (e.g., the drx-RetransmissionTimerUL) for the corresponding HARQ process.

A wireless device may receive a DRX Command MAC CE and/or a Long DRX Command MAC CE (e.g., based on examples described herein with respect to FIG. 19). The MAC entity of the wireless device may stop a timer (e.g., a drx-onDurationTimer) and/or stop another timer (e.g., drx-InactivityTimer), for example, based on receiving the DRX Command MAC CE and/or the long DRX Command MAC CE. The MAC entity may start or restart a timer (e.g., a drx-ShortCycleTimer) and/or may use a cycle (e.g., Short DRX Cycle), for example, if an inactivity timer (e.g., drx-InactivityTimer) expires and/or if the cycle is being configured. For example, the MAC entity may use a cycle (e.g., the Long DRX cycle).

A timer (e.g., a drx-ShortCycleTimer) may expire in a subframe. The MAC entity may use a cycle (e.g., the Long DRX cycle). A Long DRX Command MAC control element may be received. The MAC entity may stop a timer (e.g., a drx-ShortCycleTimer) and may use the Long DRX cycle.

The wireless device may start a timer (e.g., a drx-onDurationTimer), for example, after a value (e.g., drx-SlotOffset) from the beginning of the subframe, wherein drx-SlotOffset may be a value (configured in the DRX configuration parameters) indicating a delay, for example, before starting the drx-onDurationTimer, for example, if the Short DRX Cycle is used and [(SFN*10)+subframe number] modulo (drx-ShortCycle)=(drxStartOffset) modulo (drx-ShortCycle). The wireless device may start a timer (e.g., drx-onDurationTimer), for example, after a value (e.g., drx-SlotOffset) from the beginning of the subframe, wherein drx-SlotOffset may be a value (configured in the DRX configuration parameters) indicating a delay, for example, before starting the drx-onDurationTimer, for example, if the Long DRX Cycle is used and [(SFN*10)+subframe number] modulo (drx-longCycle)=drxStartOffset.

Figure 30:
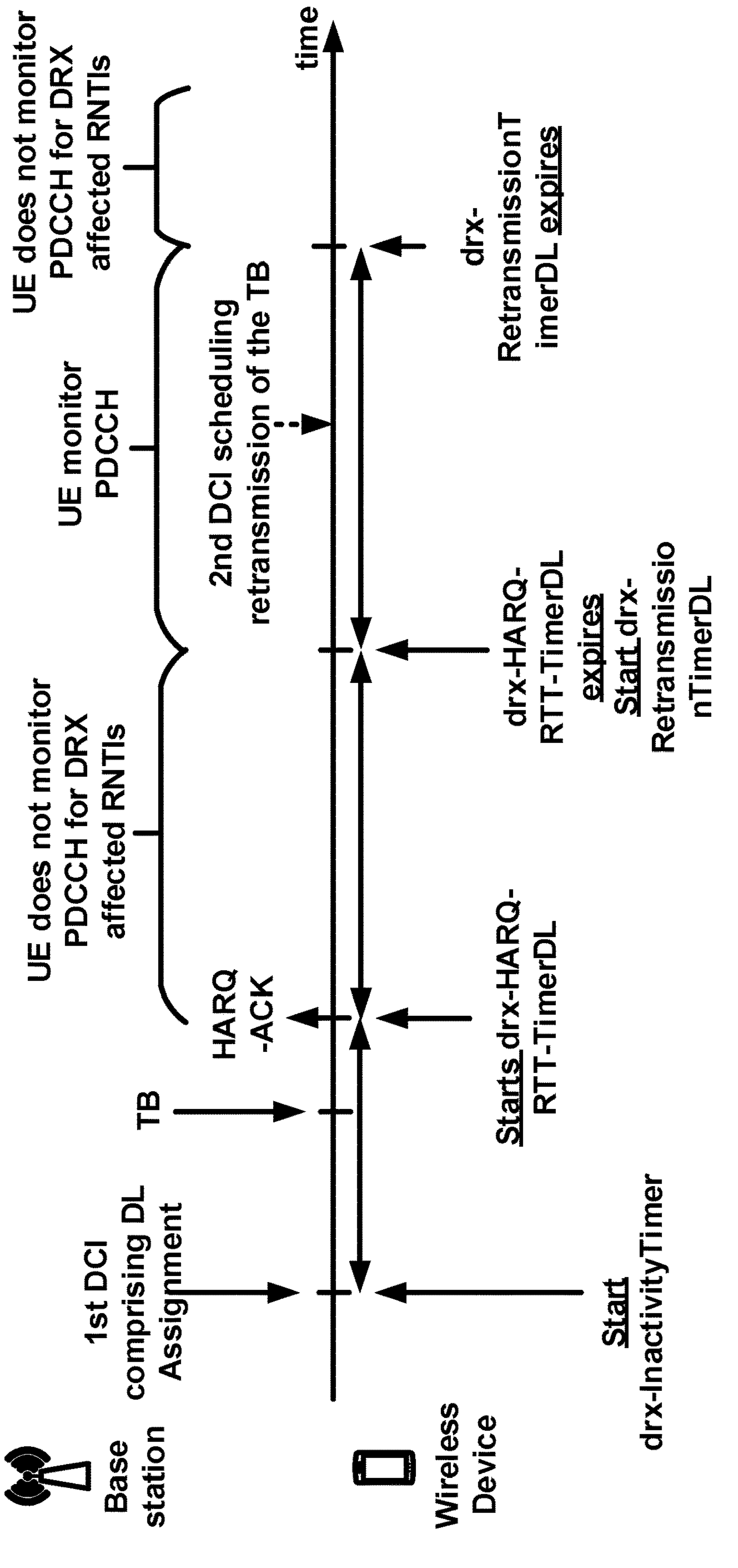
FIG. 30 shows an example of DRX configuration for a wireless device.

FIG. 30 shows an example of DRX configuration for a wireless device. A base station may send (e.g., transmit) an RRC message comprising configuration parameters of DRX operation. The configuration parameters may comprise a first timer value for a DRX inactivity timer (e.g., drx-InactivityTimer), a second timer value for a HARQ RTT timer (e.g., drx-HARQ-RTT-TimerDL, drx-HARQ-RTT-TimerUL), a third timer value for a HARQ retransmission timer (e.g., drx-RetransmissionTimerDL and/or drx-RetransmissionTimerUL).

A base station may send (e.g., transmit), via a PDCCH, DCI (e.g., first DCI) comprising downlink assignment for a TB, to a wireless device (such as shown in FIG. 30). The wireless device may start the drx-InactivityTimer, for example, based on (e.g., after or in response to) receiving the DCI. The wireless device may monitor the PDCCH, for example, for a timer (e.g., the drx-InactivityTimer) running. The wireless device may receive a TB based on receiving the DCI. The wireless device may send (e.g., transmit) a NACK to the base station upon unsuccessful decoding the TB. The wireless device may start a HARQ RTT Timer (e.g., drx-HARQ-RTT-TimerDL) in the first symbol, for example, after the end of sending (e.g., transmitting) the NACK. The wireless device may stop a retransmission timer (e.g., the drx-RetransmissionTimerDL) for a HARQ process corresponding to the TB. The wireless device may stop monitoring the PDCCH for one or more RNTI(s) impacted by the DRX operation, for example, for the HARQ RTT Timer running. The one or more RNTI(s) may comprise C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and/or AI-RNTI.

The wireless device may monitor the PDCCH and start a HARQ retransmission timer (e.g., drx-RetransmissionTimerDL), for example, if the HARQ RTT Timer expires (such as shown in FIG. 30). The wireless device, for monitoring the PDCCH, may receive second DCI (e.g., second DCI in FIG. 30) scheduling retransmission of the TB, for example, if the HARQ retransmission timer is running. The wireless device may stop monitoring the PDCCH, for example, if not receiving the second DCI (e.g., before the HARQ retransmission timer expires).

Figure 31A:
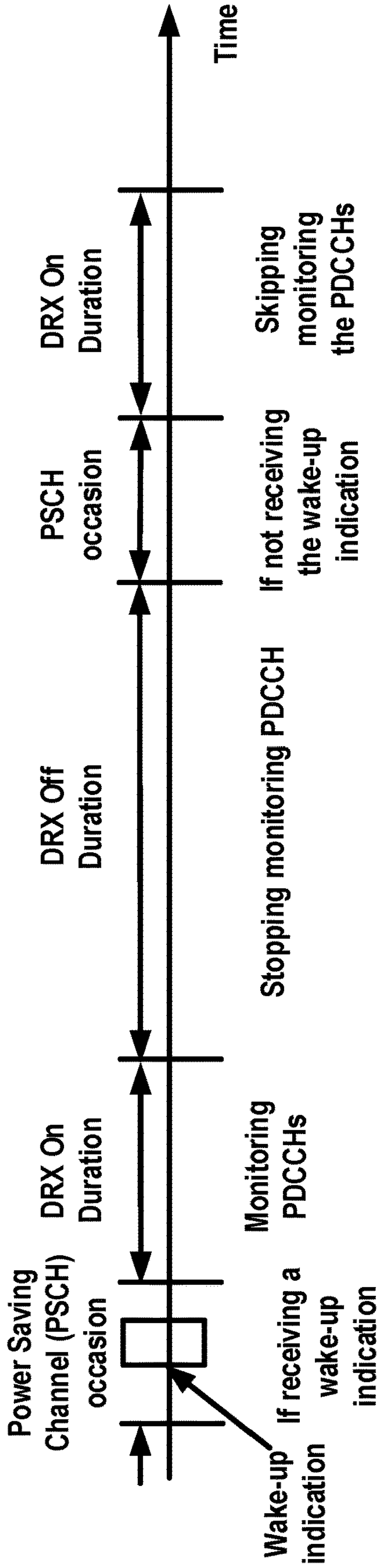
FIG. 31A and FIG. 31B show examples of power saving operations of a wireless device.

FIG. 31A shows an example power saving operation for a wireless device. The example power saving operation of FIG. 31A may be based on a wake-up indication. A base station may send/transmit one or more messages comprising parameters of a wake-up duration (e.g., a power saving duration, or a power saving channel (PSCH) occasion), to a wireless device. The wake-up duration may be located at (e.g., start from) a time that is a quantity/number of slots (or symbols) before a DRX ON duration of a DRX cycle. The quantity/number of slots (or symbols) may be a gap between a wake-up duration and a DRX ON duration. A DRX cycle may be implemented based on examples, such as described with respect to FIG. 29. The quantity of slots may be configured in the one or more RRC messages or may be predefined as a fixed value. The gap may be used for at least one of: synchronization with the base station, measuring reference signals, and/or retuning RF parameters. The gap may be determined based on a capability of the wireless device and/or the base station. The parameters of the wake-up duration may be pre-defined without RRC configuration. The wake-up mechanism may be based on a wake-up indication (e.g., via a PSCH). The parameters of the wake-up duration may comprise at least one of: a PSCH channel format (e.g., numerology, DCI format, PDCCH format), a periodicity of the PSCH, a control resource set, and/or a search space of the PSCH. The wireless device may monitor the PSCH for receiving the wake-up signal during the wake-up duration, for example, if configured with the parameters of the wake-up duration. The wireless device may monitor the PSCH for detecting a wake-up indication during the PSCH occasion/wake-up duration, for example, if configured with the parameters of the PSCH occasion. The wireless device may wake up to monitor PDCCHs in a DRX active time (e.g., comprising DRX ON duration) of a next DRX cycle according to the DRX configuration, for example, based on/in response to receiving the wake-up signal/channel (or a wake-up indication via the PSCH). The wireless device may monitor PDCCHs in the DRX active time (e.g., when drx-onDurationTimer is running), for example, based on/in response to receiving the wake-up indication via the PSCH. The wireless device may go back to sleep if the wireless device does not receive PDCCH transmissions in the DRX active time. The wireless device may stay in a sleep state during the DRX OFF duration of the DRX cycle. The wireless device may skip monitoring PDCCHs in the DRX active time, for example, if the wireless device doesn't receive the wake-up signal/channel (or a wake-up indication via the PSCH) during the wake-up duration (or the PSCH occasion). The wireless device may skip monitoring PDCCHs in the DRX active time, for example, if the wireless device receives, during the wake-up duration (or the PSCH occasion), an indication indicating skipping PDCCH monitoring.

Figure 31B:
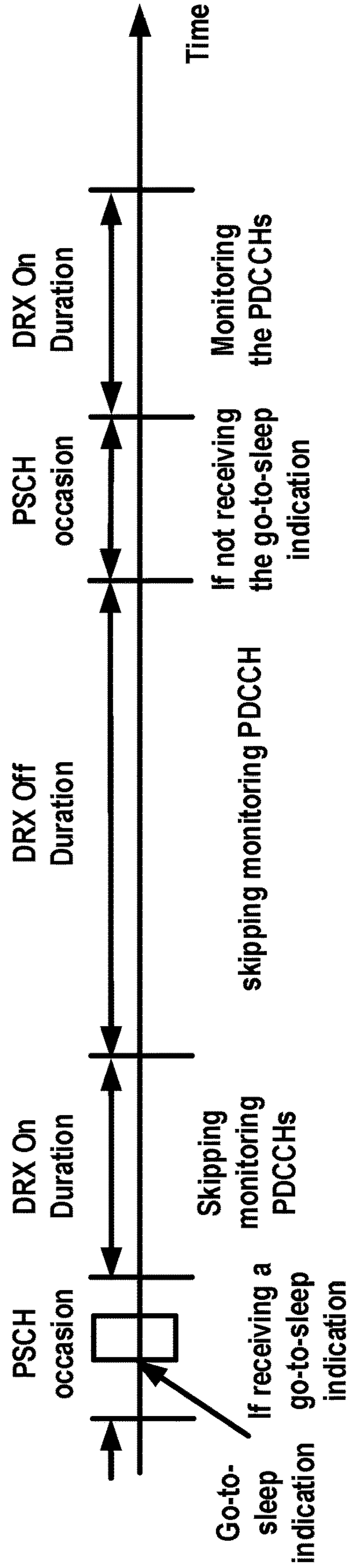

FIG. 31B shows an example power saving operation for a wireless device. The power saving operation of FIG. 31B may be based on go-to-sleep indication. The wireless device may go back to sleep and skip monitoring PDCCHs during the DRX active time (e.g., during a next DRX ON duration of a DRX cycle), for example, based on/in response to receiving a go-to-sleep indication via the PSCH. The wireless device may monitor PDCCH during the DRX active time, according to the configuration parameters of the DRX operation, for example, if the wireless device doesn't receive the go-to-sleep indication via the PSCH during the wake-up duration. The power saving mechanisms of FIGS. 31A and 31B may reduce power consumption for PDCCH monitoring during the DRX active time.

A power saving operation may be based on combining the operations described with respect to FIG. 31A and FIG. 31B. A base station may send/transmit a power saving indication, in DCI via a PSCH, indicating whether the wireless device may wake up for a next DRX ON duration or skip the next DRX ON duration. The wireless device may receive the DCI via the PSCH. The wireless device may wake up for next DRX ON duration, for example, based on/in response to the power saving indication indicating that the wireless device may wake up for next DRX ON duration. The wireless device may monitor PDCCH in the next DRX ON duration in response to the waking up. The wireless device may go to sleep during or skip the next DRX ON duration, for example, based on/in response to the power saving indication indicating the wireless device may skip (or go to sleep) for next DRX ON duration. The wireless device may skip monitoring PDCCH in the next DRX ON duration, for example, based on/in response to the power saving indication indicating the wireless device shall go to sleep for next DRX ON duration. Various examples described with respect to FIG. 30, FIG. 31A, and/or FIG. 31B may be extended and/or combined to further improve power consumption of a wireless device and/or signaling overhead of a base station.

Figure 32A:
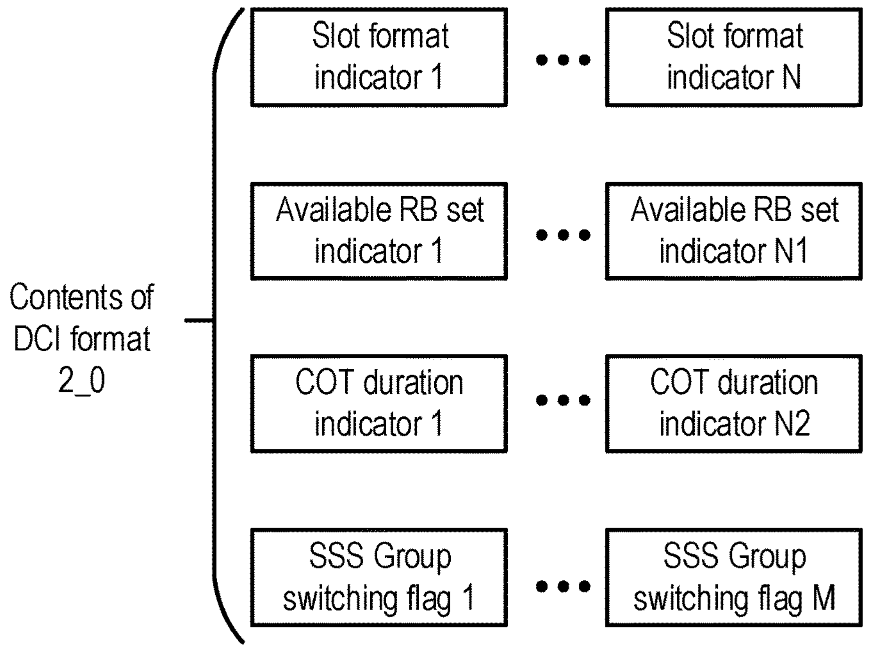
FIG. 32A and FIG. 32B show examples of search space set group (SSSG) switching for power saving of a wireless device.

FIG. 32A shows an example of SSSG switching for power saving of a wireless device. The example of FIG. 32A may comprise an example DCI format. The DCI format may correspond to DCI format 2_0 and may comprise one or more search space set groups (or SSSGs) switching indications (or SSSG switching flags). The DCI format 2_0 may comprise one or more slot format indicators (e.g., slot format indicator 1, slot format indicator 2, . . . slot format indicator N), one or more available RB set indicators, one or more channel occupancy time (COT) duration indications, and/or one or more SSSG switching flags. Each of the one or more SSSG switching flags may correspond to a respective cell group of a plurality of cell groups. Each cell group of the plurality of cell groups may comprise one or more cells. An SSSG switching flag, of the one or more SSSG switching flags, corresponding to a cell group, may indicate switching from a first SSSG to a second SSSG for each cell of the cell group, for example, if the SSSG switching flag is set to a first value. The SSSG switching flag may indicate switching from the second SSSG to the first SSSG for each cell of the cell group, for example, if the SSSG switching flag is set to a second value.

Figure 32B:
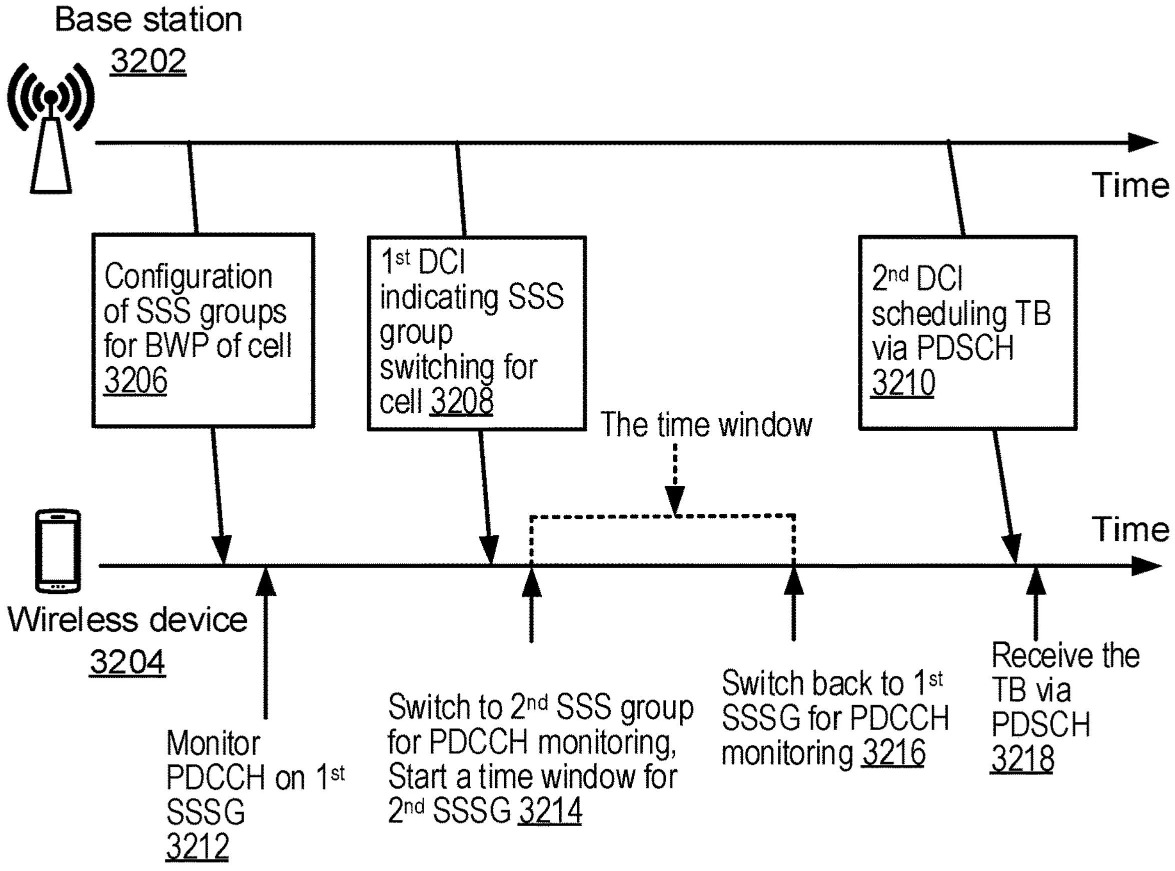

FIG. 32B shows an example of SSSG switching for power saving of a wireless device. The SSSG switching may be based on DCI (e.g., corresponding to DCI format 2_0, or other DCI formats as described with respect to FIG. 23). A wireless device 3004 may receive configuration 3006 of SSSG for a BWP of a cell. The configuration 3006 may comprise a plurality of parameters. The configuration 3006 may be via RRC messaging and/or SIB1 messaging.

The wireless device 3004 may be provided/indicated with a group indicator/index for a search space set (e.g., a Type3-PDCCH CSS set, a USS set, or any other type of search space set) by a parameter (e.g., searchSpaceGroupIdList, as described with respect to FIG. 27) for PDCCH monitoring on a serving cell.

The wireless device 3004 may or may not be provided/indicated with the parameter searchSpaceGroupIdList for a search space set. The SSSG switching as described with respect to FIG. 32B may not be applicable for PDCCH monitoring on the search space, for example, if the search space set is not configured with searchSpaceGroupIdList. The wireless device 3004 may monitor the search space set on a BWP, without switching away from the search space set, for PDCCH monitoring, for example, if the search space set is not configured with searchSpaceGroupIdList.

SSSG switching as shown in FIG. 32B may use/apply to all serving cells within each group, for example, if the wireless device 3004 is provided/indicated with parameter cellGroupsForSwitchList (e.g., as described with respect to FIG. 26), indicating one or more groups of serving cells. The SSSG switching as described with respect to FIG. 32B may use/apply only to a serving cell for which the wireless device 3004 is provided/indicated with parameter searchSpaceGroupIdList, for example, if the wireless device 3004 is not provided/indicated with the parameter cellGroupsForSwitchList. The wireless device 3004 may reset PDCCH monitoring according to search space sets with a specific group index (e.g., group index 0), for example, if a wireless device 3004 is provided/indicated with parameter searchSpaceGroupIdList.

The wireless device 3004 may be provided/indicated with parameter searchSpaceSwitchDelay (e.g., as shown in FIG. 26) with a quantity/number of symbols $P_{switch}$ based on wireless device processing capability (e.g., wireless device processing capability 1, wireless device processing capability 2, etc.) and sub-carrier spacing (SCS) configuration II. Wireless device processing capability 1 for SCS configuration μ may use/apply unless the wireless device 3004 indicates support for wireless device processing capability 2. For example, $P_{switch}$ may be 25 for wireless device capability 1 and μ=0, $P_{switch}$ may be 25 for wireless device capability 1 and μ=1, $P_{switch}$ may be 25 for wireless device capability 1 and μ=2, $P_{switch}$ may be 10 for wireless device capability 2 and μ=0, $P_{switch}$ may be 12 for wireless device capability 2 and μ=1, and $P_{switch}$ may be 22 for wireless device capability 2 and μ=2, etc.

The wireless device 3004 may be provided/indicated with parameter searchSpaceSwitchTimer (in units of slots, e.g., as shown in FIG. 26). The parameter searchSpaceSwitchTimer may be with a timer value for a serving cell for which the wireless device 3004 is provided with the parameter searchSpaceGroupIdList or may be for a set of serving cells indicated by parameter cellGroupsForSwitchList (e.g., if provided). The wireless device 3004 may decrement the timer value by one after each slot based on a reference SCS configuration that is a smallest SCS configuration μ among all configured downlink BWPs in the serving cell, or in the set of serving cells. The wireless device 3004 may maintain the reference SCS configuration during the timer decrement procedure.

Parameter searchSpaceSwitchTimer may be defined as a value in unit of slots. The parameter searchSpaceSwitchTimer may indicate a time duration for monitoring PDCCH in the active downlink BWP of the serving cell before moving to a default search space group (e.g., search space group 0). The timer value may be based on SCS. A valid timer value may be one of {1, . . . , 20}, for example, if SCS is 15 kHz. A valid timer value may be one of {1, . . . , 40}, for example, if SCS is 30 kHz. A valid timer value may be one of {1, . . . , 80}, for example, if SCS is 60 kHz. The base station may configure a same timer value for all serving cells in a same cell group as indicated by parameter CellGroupForSwitch.

The wireless device 3004 may monitor (e.g., step 3012) PDCCH on a first SSSG (e.g., search space sets with group index 0) based on configuration of SSSG of a BWP of a cell (e.g., via configuration 3006). The wireless device 3004 may be provided/indicated with SearchSpaceSwitchTrigger indicating a location of a SSSG switching flag field for a serving cell as present in DCI (e.g., DCI corresponding to a DCI format 2_0). The parameter SearchSpaceSwitchTrigger may be configured as shown in FIG. 27.

The wireless device 3004 may receive DCI 3008 (e.g., with DCI format 2_0). The DCI 3008 may indicate a SSSG switching for the cell, for example, if a value of the SSSG switching flag field in the DCI 3008 is 1 (or any other predefined value). The wireless device 3004 may switch (e.g., step 3014) to a second SSSG for PDCCH monitoring. The wireless device 3004 may start monitoring PDCCH on the second SSSG (e.g., search space sets with group index 1) and stop monitoring PDCCH on the first SSSG (or the search space sets with group index 0) for the serving cell. The wireless device 3004 may start monitoring PDCCH on the second SSSG (e.g., search space sets with group index 1) and stop monitoring PDCCH on the first SSSG at a first slot that is at least $P_{switch}$ symbols after a last symbol of the PDCCH comprising the DCI. The wireless device 3004 may start window (e.g., start a search space switching timer), for example, based on switching to the second SSSG. The wireless device 3004 may set the timer value of the search space switching timer to the value provided/indicated by parameter searchSpaceSwitchTimer, for example, based on receiving the DCI.

The wireless device 3004 may monitor PDCCH on the second SSSG (e.g., search space sets with group index 1) based on configuration of SSSGs of a BWP of a cell. The wireless device 3004 may be indicated, via parameter SearchSpaceSwitchTrigger, a location of a SSSG switching flag field for a serving cell in DCI (e.g., corresponding to DCI format 2_0). The wireless device 3004 may receive DCI. The DCI may indicate SSSG switching for the cell, for example, if a value of the SSSG switching flag field in the DCI is 0. The wireless device 3004 may start monitoring PDCCH on search space sets with group index 0 and stop monitoring PDCCH on search space sets with group index 1 for the serving cell, for example, if a value of the SSSG switching flag field in the DCI is 0. The wireless device 3004 may start monitoring the PDCCH on search space sets with group index 0 and stop monitoring PDCCH on search space sets with group index 1 at a first slot that is at least switch symbols after the last symbol of the PDCCH comprising the DCI.

The wireless device 3004 may start monitoring PDCCH for the serving cell on the second SSSG (e.g., search space sets with group index 1), and stop monitoring PDCCH on the first SSSG (e.g., search space sets with group index 0), for example, if the wireless device 3004 initially monitors PDCCH for the serving cell on the first SSSG. The wireless device 3004 may start monitoring PDCCH for the serving cell on the second SSSG and stop monitoring PDCCH on the first SSSG at the beginning of the first slot that is at least $P_{switch}$ symbols after a slot where the timer expires or after a last symbol of a remaining channel occupancy duration for the serving cell (e.g., as indicated by the DCI 3008).

The wireless device 3004 may or may not be provided/indicated with parameter SearchSpaceSwitchTrigger for a serving cell. For example, the parameter SearchSpaceSwitchTrigger may be absent in configuration parameters corresponding to SlotFormatIndicator (e.g., wherein SlotFormatIndicator is configured for monitoring a Group-Common-PDCCH for Slot-Format-Indicators (SFI)). The DCI 3008 (e.g., corresponding to DCI format 2_0) may not comprise a SSSG switching flag field, for example, based on the parameter SearchSpaceSwitchTrigger not being provided. The wireless device 3004 may start monitoring PDCCH on the second SSSG (e.g., a search space sets with group index 1) and stop monitoring PDCCH according on the first SSSG (e.g., a search space sets with group index 0) for the serving cell, for example, if the parameter SearchSpaceSwitchTrigger is not provided and if the wireless device 3004 detects DCI based on monitoring PDCCH on the first SSSG. The wireless device 3004 may start monitoring PDCCH on the second SSSG and stop monitoring PDCCH on the first SSSG at a first slot that is at least $P_{switch}$ symbols after the last symbol of the PDCCH comprising the DCI. The wireless device 3004 may set (or restart) the timer value to the value provided by parameter searchSpaceSwitchTimer, for example, if the wireless device 3004 detects DCI based on monitoring PDCCH in any search space set.

The wireless device 3004 may or may not be provided/indicated with parameter SearchSpaceSwitchTrigger for a serving cell. The wireless device 3004 may start monitoring PDCCH for the serving cell according to the second SSSG (e.g., search space sets with group index 1), and stop monitoring PDCCH according to the first SSSG (e.g., a search space sets with group index 0), for the serving cell, for example, if the parameter SearchSpaceSwitchTrigger is not provided and if the wireless device 3004 initially monitors PDCCH for a serving cell according to the first SSSG. The wireless device 3004 may start monitoring PDCCH for the serving cell according to the second SSSG and stop monitoring PDCCH according to the first SSSG at the beginning of the first slot that is at least $P_{switch}$ symbols after a slot where the timer expires. The wireless device 3004 may start monitoring PDCCH for the serving cell according to the second SSSG and stop monitoring PDCCH according to the first SSSG after a last symbol of a remaining channel occupancy duration for the serving cell that is indicated by DCI format 2_0, for example, if the wireless device 3004 is provided with a search space set to monitor PDCCH for detecting a DCI format 2_0.

The wireless device 3004 may switch back to the first SSSG for PDCCH monitoring (e.g., step 3016), for example, based on/after an expiration of the timer. The wireless device 3004 may start monitoring PDCCH on the first SSSG and stop monitoring PDCCH on the second SSSG, for example, based on expiration of the timer. The wireless device 3004 may receive second DCI 3010 based on the PDCCH monitoring. The second DCI 3010 may schedule a TB via a PDSCH. The wireless device 3004 may receive (e.g., step 3018) the TB via the PDSCH and based on the scheduling indicated via the second DCI 3010.

The wireless device 3004 may determine a slot and a symbol in a slot to start or stop PDCCH monitoring on search space sets for a serving cell for which the wireless device 3004 is provided/indicated with parameter searchSpaceGroupIdList. The wireless device 3004 may start or stop PDCCH monitoring on search space sets for a serving cell if parameter cellGroupsForSwitchList is provided/indicated for a set of serving cells, based on the smallest SCS configuration μ among all configured downlink BWPs. The downlink BWPs may be in the serving cell or in the set of serving cells and, if any, in the serving cell where the wireless device 3004 receives a PDCCH transmission and detects a corresponding DCI format 2_0 (e.g., triggering the start or stop of PDCCH monitoring on search space sets).

Figure 33:
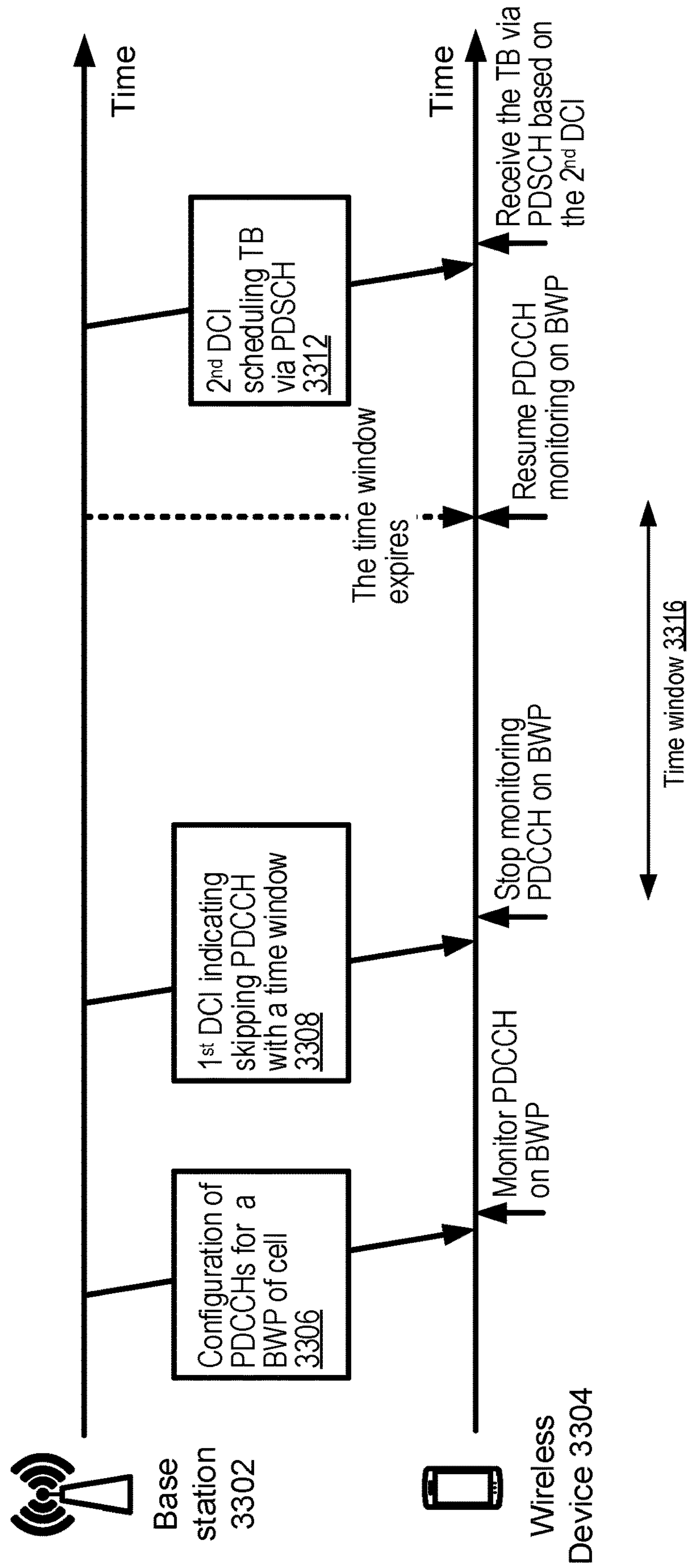
FIG. 33 shows an example of physical downlink control channel (PDCCH) skipping for power saving of a wireless device.

FIG. 33 shows an example PDCCH skipping for power saving of a wireless device. A base station 3302 may send/transmit, to a wireless device 3304, one or more RRC messages comprising configuration parameters 3306. The configuration parameters 3306 may be for a PDCCH for a BWP of a cell (e.g., as described with respect to FIG. 26 and/or FIG. 27). The wireless device 3304 may monitor PDCCH on the BWP, for example, based on the configuration parameters 3306 of the PDCCH. The BWP may a downlink BWP which may be in an active state. The wireless device 3304 may activate the BWP as described with respect to FIG. 22.

The wireless device 3304 may receive first DCI 3308 indicating skipping the PDCCH (e.g., monitoring/receiving via the PDCCH) within a time window 3316. A time value (e.g., duration) for the time window 3316 may be indicated by the first DCI 3308 or configured by the one or more RRC messages. The wireless device 3304 may stop monitoring the PDCCH on the BWP, for example, based on/in response to receiving the first DCI 3308. Stopping monitoring PDCCH on the BWP may comprise stopping monitoring the PDCCH on one or more SSSGs configured on the BWP. The wireless device 3304 may maintain an active state of the BWP. The first DCI 3308 may not indicate an active BWP switching. The base station 3302 may not send/transmit a PDCCH transmission to the wireless device 3304, for example, within/during the time window 3316 (or when a timer associated with the time window 3316 is running).

The wireless device 3304 may resume PDCCH monitoring on the BWP, for example, based on/after the expiration of the time window 3316. The wireless device 3304 may receive second DCI 3312 scheduling TB via a PDSCH, for example, based on resuming PDCCH monitoring. The wireless device 3304 may receive the TB via the PDSCH scheduled by the second DCI 3312. The base station 3302 may send/transmit the second DCI 3312 to the wireless device 3304, for example, based on/in response to expiration of the time window 3316.

A base station may send/transmit one or more SSBs (e.g., periodically) to a wireless device or a plurality of wireless devices. The wireless device (in RRC idle state, RRC inactive state, or RRC connected state) may use the one or more SSBs for time and frequency synchronization with a cell of the base station. An SSB, comprising a PSS, a SSS, a PBCH, and/or a PBCH DM-RS, may be sent/transmitted (e.g., as described with respect to FIG. 11A). An SSB may occupy a quantity/number (e.g., 4, or any other quantity) of OFDM symbols. The base station may send/transmit one or more SSBs in an SSB burst (e.g., to enable beam-sweeping for PSS/SSS and PBCH). An SSB burst may comprise a set of SSBs, with each SSB potentially being transmitted via a corresponding different beam. SSBs, in the SSB burst, may be transmitted using time-division multiplexing. An SSB burst may be within a time window (e.g., a 5 ms window, or a window of any other duration) and may be either located in first-half or in the second-half of a radio frame (e.g., with a duration of 10 ms, or any other duration). An SSB burst may be equivalently referred to as a transmission window (e.g., 5 ms, or any other time duration) in which the set of SSBs are transmitted.

The base station may indicate a transmission periodicity of SSB via an RRC message (e.g., a SIB1 message). For example, the transmission periodicity may be indicated using parameter ssb-PeriodicityServingCell as present in ServingCellConfigCommonSIB of a SIB1 message (e.g., as shown in FIG. 25). A candidate value of the transmission periodicity may be in a range of {5 ms, 10 ms, 20 ms, 40 ms, 80 ms, 160 ms}. The transmission periodicity may have any other value. A maximum quantity/number of candidate SSBs ($L_{max}$) within an SSB burst may depend on a carrier frequency/band of the cell. For example, $L_{max}$=4 if $f_c$<=3 GHz. $L_{max}$=8 if 3 GHz<$f_c$<=6 GHz. $L_{max}$=64 if $f_c$>=6 GHz, etc., wherein $f_c$ may be the carrier frequency of the cell. A starting OFDM symbol indicator/index, of a candidate SSB (e.g., occupying 4 OFDM symbols) within an SSB burst (e.g., comprised in a 5 ms time window), may depend on an SCS and a carrier frequency band of the cell.

FIG. 34 shows an example of SSB configurations. FIG. 34 shows an example table for determination of a starting OFDM symbol index of candidate SSBs. OFDM starting symbols may be determined as a function of a SCS and carrier frequency. For example, starting OFDM symbol indexes of SSBs in an SSB burst, for a cell configured with 15 kHz SCS and carrier frequency fc<3 GHz (e.g., $L_{max}$=4), may be 2, 8, 16, and 22. OFDM symbols in a half-frame may be indexed with the first symbol of the first slot being indexed as 0. Starting OFDM symbol indexes of SSBs in an SSB burst, for a cell configured with 15 kHz and carrier frequency 3 GHz<fc<6 GHz ($L_{max}$=8) may be 2, 8, 16, 22, 30, 36, 44 and 50. Starting OFDM symbol indexes for other SCSs and carrier frequencies may be similarly determined in accordance with the table shown in FIG. 34. The base station may send/transmit only one SSB by using the first SSB starting position, for example, if the base station is not transmitting the SSBs with beam forming.

Figure 35:
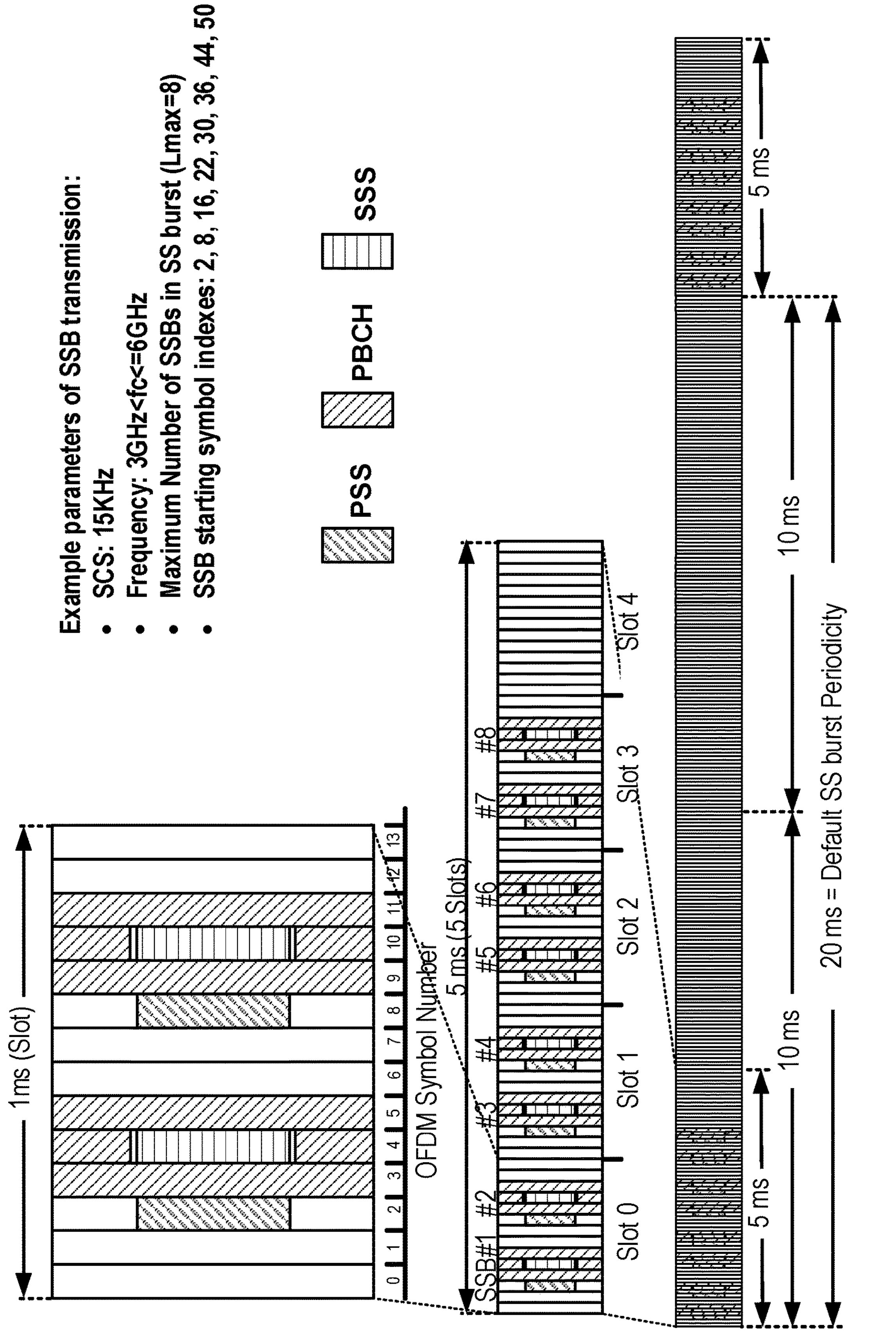
FIG. 35 shows an example of SSB transmissions of a base station.

FIG. 35 shows an example of SSB transmissions of a base station. An SCS of the cell may be 15 kHz, and the cell may be configured with carrier frequency G, such that 3 GHz<fc<=6 GHz. A maximum quantity of candidate SSBs in an SSB burst may be 8 ($L_{max}$=8), for example, based on the value of $f_c$. Starting symbols for SSB transmission may be determined in accordance with the table shown in FIG. 34. SSB #1 may start at symbol 2 (of 70 symbols included in 5 ms half-frame), SSB #2 may start at symbol #8, SSB #3 may start at symbol #16, SSB #4 may start at symbol #22, SSB #5 may start at symbol #30, SSB #6 may start at symbol #36, SSB #7 may start at symbol #44, and SSB #8 may start at symbol 50. The SSB burst may be transmitted in the first half (and not the second half) of a radio frame (with 10 ms duration).

The SSB burst (and each SSB of the SSB burst) may be sent/transmitted with a periodicity. A default periodicity of an SSB burst may be 20 ms (e.g., as shown in FIG. 35, or any other duration of time). The default transmission periodicity may be a periodicity, for example, before a wireless device may receive a SIB1 message for initial access of the cell. For example, the base station, with 20 ms transmission periodicity of SSB (or SSB burst), may send/transmit the SSB burst in the first 5 ms of each 20 ms period. The base station may not send/transmit the SSB burst in the rest 15 ms of the each 20 ms period.

A base station may send/transmit RRC messages (e.g., SIB1 messages) indicating cell specific configuration parameters of SSB transmission. The cell specific configuration parameters may comprise a value for a transmission periodicity (e.g., parameter ssb-PeriodicityServingCell) of an SSB burst and locations (e.g., presence) of SSBs (e.g., active SSBs), of a plurality of candidate SSBs, in the SSB burst. The plurality of candidate SSBs (e.g., starting symbols of candidate SSBs) may be determined as described with respect to FIG. 34. The cell specific configuration parameters may comprise a position indication of an SSB in an SSB burst (e.g., parameter ssb-PositionsInBurst). The position indication may comprise a first bitmap (e.g., groupPresence) and a second bitmap (e.g., inOneGroup) indicating locations/presence of SSBs in an SSB burst.

Carrier frequency $f_c$ and SCS may determine a maximum quantity of candidate SSBs in an SSB burst (e.g., as described with respect to FIG. 34). The position indication (e.g., parameter ssb-PositionsInBurst) may indicate SSBs (e.g., active SSBs, positions of the active SSBs), of a plurality of candidate SSBs, that are sent/transmitted in the SSB burst (e.g., as further described with respect to FIG. 36). A base station may indicate the transmitted active SSBs and/or a quantity of the active SSBs, in an SSB burst, using the position indication (e.g., parameter ssb-PositionsInBurst). The position indication may be transmitted by the base station, for example, via an RRC message and/or DCI.

Figure 36:
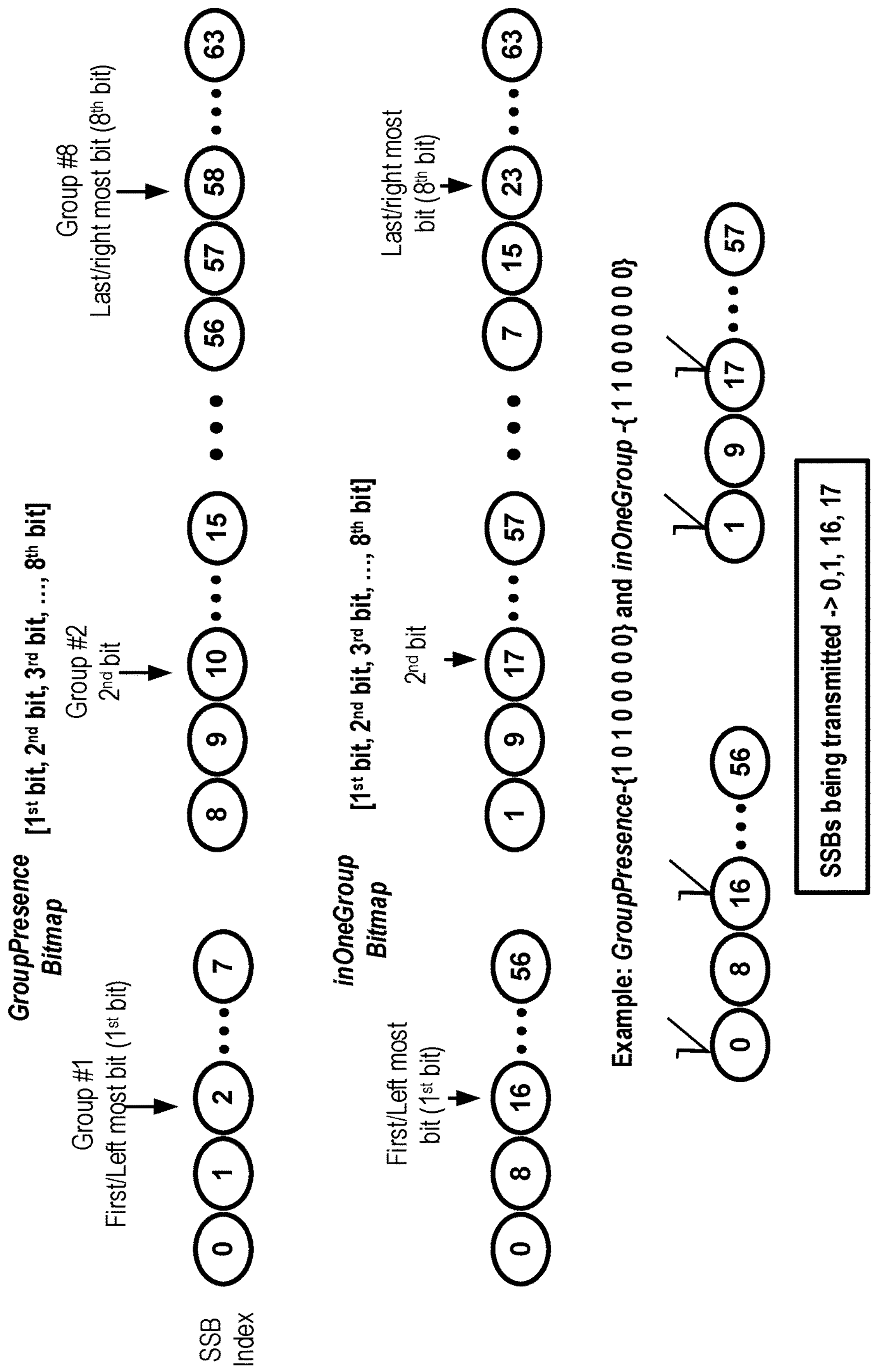
FIG. 36 shows an example of SSB transmissions of a base station.

FIG. 36 shows an example of SSB transmissions of a base station. Indication of SSB location may be in form of an indication of a presence of an SSB group among a plurality of SSB groups. Each group may comprise a subset of a plurality of candidate SSBs (e.g., maximum possible quantity of candidate SSBs) in an SSB burst. For example, a maximum possible quantity of candidate SSBs in an SSB burst may be equal to 64 (e.g., for SCS=120 kHz or 240 kHz, and $f_c$>6 GHz). The candidate SSBs in the SSB burst may comprise SSBs with indexes from 0 to 63. The candidate SSBs in an SSB burst may be divided into SSB groups.

A first bitmap (e.g., parameter groupPresence) may comprise a quantity of bits (e.g., 8, or any other quantity). The first bitmap may be configured/indicated by the SIB1 message. Each bit of the first bitmap may correspond to a respective group of SSB groups. As shown in FIG. 36, a first bit (e.g., left most bit of the first bitmap) may correspond to a first SSB group comprising first SSB (with SSB index 0), second SSB (with SSB index 1), . . . and $8^{th}$ SSB (with SSB index 7). A second bit (e.g., the second bit of the first bitmap) may correspond to a second SSB group comprising 9th SSB (with SSB index 8), 10th SSB (with SSB index 9), . . . and 16th SSB (with SSB index 15). A last bit (e.g., right most bit of the first bitmap) may correspond to an $8^{th}$ SSB group comprising $57^{th}$ SSB (with SSB index 56), $58^{th}$ SSB (with SSB index 57), . . . and 6fourth SSB (with SSB index 63), etc. An SSB may belong/correspond to at most one SSB group of the first SSB groups. A bit, of the first bitmap, may indicate whether the base station may send/transmit an SSB group, corresponding to the bit, in an SSB burst. The bit being set to a first value (e.g., 1) may indicate that the corresponding SSB group may be sent/transmitted in the SSB burst by the base station. The bit being set to a second value (e.g., 0) may indicate that the corresponding SSB group is not sent/transmitted in the SSB burst by the base station, or vice versa.

A second bitmap (e.g., parameter inOneGroup) may comprise a quantity of bits (e.g., 8, or any other quantity). Each bit of the second bitmap may correspond to a respective group of SSB groups. A first bit (e.g., left most bit of the second bitmap) may correspond to a first SSB group comprising first SSB (with SSB index 0), second SSB (with SSB index 8), . . . and $8^{th}$ SSB (with SSB index 56). A second bit (e.g., the second bit of the second bitmap) may correspond to a second SSB group comprising first SSB (with SSB index 1), second SSB (with SSB index 9), . . . and 8th SSB (with SSB index 57). A last bit (e.g., right most bit of the second bitmap) may correspond to an $8^{th}$ SSB group comprising first SSB (with SSB index 7), second SSB (with SSB index 15), . . . and $8^{th}$ SSB (with SSB index 63), etc. An SSB may belong/correspond to at most one SSB group of the second SSB groups. A bit, of the second bitmap, may indicate whether the base station may send/transmit an SSB group, corresponding to the bit, in an SSB burst. The bit being set to a first value (e.g., 1) may indicate that the corresponding SSB group is sent/transmitted in the SSB burst by the base station. The bit being set to a second value (e.g., 0) may indicate that the corresponding SSB group is not sent/transmitted in the SSB burst by the base station, or vice versa.

The plurality of SSBs (e.g., with SSB index from 0 to 63) may be grouped, for the first bitmap, into first SSB groups. Each of the first SSB groups may comprise SSBs with continuous SSB indexes. A first SSB group of the first SSB groups may comprise SSBs with SSB indexes from 0 to 7, a second SSB group may comprise SSB indexes from 8 to 15, etc. The plurality of SSBs may be also grouped, for the second bitmap, into second SSB groups. Each of the second SSB groups may comprise SSBs with discontinuous SSB indexes. A first SSB group of the second SSB groups may comprise SSBs with SSB indexes {0, 8, 16, . . . 56}. A second SSB group of the second SSB groups comprises SSBs with SSB indexes {1, 9, 17, . . . 57}, etc. SSB index gap between two neighboring SSB indexes in a second SSB group may be equal to 8 (or any other value).

Not all bits of the first and the second bitmap may be considered for determining an SSB group is sent/transmitted or not. A maximum quantity of SSBs within an SSB burst may be equal to four if fc≤3 GHz (e.g., in accordance with FIG. 34). A wireless device may determine that the four leftmost bits of a bitmap (e.g., the first bitmap and/or the second bitmap) are valid. The wireless device may ignore the four rightmost bits of the first bitmap and/or the second bitmap.

As shown in FIG. 36, the first bitmap may be indicated, by the base station, as {1 0 1 0 0 0 0 0} and the second bitmap may be indicated as {1 1 0 0 0 0 0 0}. The base station may send/transmit SSBs with indexes {0 1 16 17} in an SSB burst, for example, based on the grouping configuration of the first SSB groups and the second SSB groups and further based on the first bitmap and the second bitmap.

A base station may send/transmit a MIB via PBCH. The MIB may indicate configuration parameters (e.g., for CORESET 0), for a wireless device monitoring a PDCCH, for scheduling a SIB1 message. The base station may send/transmit a MIB message with a transmission periodicity of 80 ms (or with any other first periodicity). The same MIB message may be repeated (according to SSB periodicity) within the 80 ms. Contents of the MIB message may be the same over the 80 ms period. The same MIB may be sent/transmitted over all SSBs within an SSB burst. The PBCH transmission (e.g., MIB) may indicate that there is no associated SIB1. A wireless device may be pointed to/indicated another frequency from where to search for an SSB that is associated with a SIB1 as well as a frequency range where the wireless device may assume no SSB associated with SIB1 is present, for example, if the PBCH transmission indicates that there is no associated SIB1. The indicated frequency range may be confined within a contiguous spectrum allocation of the same operator in which SSB is detected.

A base station may send/transmit a SIB1 message with a periodicity of 160 ms (or with any other second periodicity). The base station may transmit the same SIB1 message with variable transmission repetition periodicity within 160 ms. A default transmission repetition periodicity of SIB1 may be 20 ms (or any other third periodicity). The base station may determine an actual transmission repetition periodicity based on network implementation. SIB1 repetition transmission period may be 20 ms, for example, for SSB and CORESET multiplexing pattern 1. SIB1 transmission repetition period may be the same as the SSB period, for example, for SSB and CORESET multiplexing patterns 2 or 3. SIB1 may comprise information regarding availability and scheduling (e.g., mapping of SIBs to system information (SI) message, periodicity, SI window size) of other SIBs and/or an indication whether one or more SIBs are only provided on demand. Configuration parameters needed by a wireless device to perform an SI request may be indicated in the SIB1 if the one or more SIBs are only provided on demand.

A base station may enable a power saving operation for a wireless device due to limited battery capacity of the wireless device. A base station may enable a power saving operation for a wireless device, for example, based on active BWP management (such as shown in FIG. 22), SCell dormancy mechanism (such as shown in FIG. 28), wake-up/go-to-sleep indication (such as shown in FIG. 31A and/or FIG. 31B), SSSG switching on an active BWP (such as shown in FIG. 32A and/FIG. 32B), and/or PDCCH skipping (such as shown in FIG. 33). A base station may not be able to save energy from the viewpoint of the base station, (e.g., if the base station is required to send/transmit some always-on downlink signals periodically (e.g., SSB, MIB, SIB1, SIB2, periodic CSI-RS, etc.) in some time period even for which there is no active wireless device sending/transmitting to and/or receiving from the base station), for example, if indicating a power saving operation for a wireless device (e.g., based on examples described herein with respect to FIG. 22, FIG. 28, FIG. 31A, FIG. 31B, FIG. 32A, FIG. 32B, and/or FIG. 33). The base station may be required to send/transmit some always-on downlink signals periodically (e.g., SSB, MIB, SIB1, SIB2, periodic CSI-RS, etc.), for example, if the base station transitions a cell into a dormant state by switching an active BWP to a dormant BWP of the cell (e.g., such as described with respect to FIG. 28).

A base station may send/transmit an RRC message (e.g., SIB1) indicating a longer periodicity for the always-on downlink signal transmission, for example, if the base station needs to reduce periodicity of the always-on downlink signal transmission. A base station may send/transmit RRC reconfiguration messages to a wireless device in a source cell (e.g., each wireless device in a source cell) to indicate a handover to a neighbor cell, for example, before determining to power off (e.g., both RF modules and base band units (BBUs)) for energy saving. A wireless device in the source cell (e.g., each wireless device in the source cell) may perform a 4-step or 2-step RACH procedure to perform the handover to the neighbor cell and then break/tear the RRC connection with the source cell. The base station may turn off (RF parts and BBUs, etc.) for energy saving, for example, after the wireless devices complete the handover procedure to neighbor cells. Sending/transmitting the RRC message indicating a change of periodicity of always-on downlink signals and/or sending (e.g., transmitting) the RRC message requesting handover (to neighbor cells) may not be efficient, for example, considering a dynamic and fast-changing traffic pattern of different wireless devices in 5G system and/or future system.

In at least some wireless communications, network energy saving operation may comprise shutting down some cells and/or reducing periodicity of SSB/SIB1/SIB2 with or without beam sweeping, which may be different from the power saving operations, for a wireless device, such as described herein with respect to FIG. 22, FIG. 28, FIG. 31A, FIG. 31B, FIG. 32A, FIG. 32B and/or FIG. 33. Shutting down cells (entirely or partially) may lead to negative impact on data transmission latency and/or power consumption for the access process. Existing SSB may be modified towards a lighter version by carrying no or minimal information, for example, such as PSS, which may be called as "light SSB". This "light SSB" may be combined with other techniques such as less frequent SSB transmission (e.g., with a periodicity >20 msec), and/or with "on-demand SSB"; where "on-demand SSB" is the SSB transmission that is triggered by a wireless device via a UL trigger signal. A base station may send/transmit this "light SSB" and, the wireless devices may react by sending/transmitting an uplink trigger signal, for example, if there are wireless devices monitoring this "light SSB" and trying to access the network. The base station may start sending/transmitting the full-blown SSB, for example, based on reception of the uplink trigger signal. The network can adjust the SSB transmission configuration to respond to the wireless device's indication, for example, after receiving the uplink trigger signal.

Network energy saving operation may comprise a BS DTX configuration/mode/state/operation, (e.g., similar to wireless device DRX configuration, such as a wireless device DRX configuration described herein with respect to FIG. 29, FIG. 30, FIG. 31A and/or FIG. 31B). For a BS DTX operation, the base station may (periodically) power-on a cell (or a plurality of cells) for a first time duration and then power-off the cell for a second time duration. In the first time duration for which the cell is powered on (or in a first power state/mode), the base station may send/transmit periodic downlink signals (e.g., SIBs/SSBs/CSI-RSs/TRSs), downlink control channels (PDCCH), downlink shared channels (PDSCH), etc. In the second time duration for which the cell is powered off (or in a second power state/mode), the base station may reduce transmission power/bandwidth/beam of the periodic downlink signals, stop transmission of the periodic downlink signals, and/or stop transmission of PDCCH/PDSCH. The base station may perform the DTX operation periodically, for example, by configuring a periodicity of a DTX cycle comprising the first time duration for the power-on state and the second time duration for the power-off state. The base station may perform a one-shot DTX operation, for example, by indicating a time duration for the one-shot DTX operation, wherein the time duration comprises a first time duration for the power-on state and a second time duration for the power-off state.

In at least some wireless communications, a base station may operate in BS DTX mode/operation/configuration for a given cell and with a given pattern (e.g., a DTX on duration and a DTX off duration in a DTX cycle). A wireless device may determine to use the BS DTX pattern in the cell as its DRX pattern. A network might not need to configure DRX per wireless device in the cell separately. Requiring all wireless devices in the cell to use the same DRX pattern may increase power consumption of the wireless devices. Wireless devices in the cell (e.g., all wireless devices in the cell) may be required to monitor PDCCHs in the long period, even though there is wireless device(s), in the cell, having less volume of data to be sent/transmitted and/or received within the long period, for example, if a DTX on duration (for which the cell is in a power-on state) is configured with a long period (10 ms, 100 ms, or even longer). At least some wireless communications may increase power consumption of a wireless device, for example, if the base station is in DTX operation.

A wireless device may be configured with both a cell level (and/or BS level) DTX configuration and a wireless device specific DRX configuration to further improve the power consumption of a wireless device, for example, if the base station is in DTX operation. The wireless device specific DRX configuration may be configured/associated with a first pattern (e.g., on/off period) different from a second pattern (e.g., on/off period) of the cell level DTX configuration. The wireless device may not align with the base station regarding a state of the cell, PDCCH monitoring, CSI reporting, DRX related timers, etc., for example, if performing both the cell level DTX operation and the wireless device specific DRX operation on cell(s). Misalignment between the wireless device and the base station, for example, if performing the cell level DTX operation and the wireless device specific DRX operation, may increase power consumption of the wireless device and/or the base station, increase uplink interference and/or increase data transmission latency. Improvements described herein may provide for coordinating the cell DTX operation and the wireless device specific DRX operation—specifically, coordinating management of the state of the cell, PDCCH monitoring, CSI reporting, and/or management of DRX related timers, etc., to reduce power consumption of the wireless device and/or the base station, to reduce uplink interference, and/or to reduce data transmission latency.

A wireless device may determine that the cell is in a first power state (e.g., a power-on state or a first power mode) after/based on receiving a first message indicating configuration parameters of a cell DTX configuration/operation and, for example, before receiving a second message indicating to enable the cell DTX configuration/operation. For example, the cell may remain in the first power state after the base station sends/transmits the first message and, for example, before sending/transmitting the second message. The wireless device may perform the DRX operation according to the wireless device specific DRX configuration, for example, based on the cell being in the first power state. The wireless device may align with the base station regarding whether the cell is in a power-on state (or a first power state/mode) or a power-off state (or a second power state/mode), for example, if a cell level DTX operation is configured and has not been enabled. The alignment of the (power) state/mode of the cell between the wireless device and the base station may provide advantages such as improved power consumption of the wireless device and/or improved CSI report quality.

Wireless device specific DRX operation may be enabled within a first time duration for which the cell is in a DTX on duration of a cell DTX configuration and/or disabled (e.g., not performed) within a second time duration for which the cell is in a DTX off duration of the cell DTX configuration. Enabling/performing wireless device specific DRX operation may comprise starting a DRX on duration timer of the wireless device specific DRX operation in a first slot, for example, if the first slot is within the DTX on duration of the cell. Disabling/not performing the wireless device specific DRX operation may comprise stopping/disabling the DRX on duration timer of the wireless device specific DRX operation in a second slot, for example, if the second slot is within the DTX off duration of the cell. Enabling the wireless device-specific DRX operation within a time for which the cell is in a DTX on state (and/or disabling/not performing the wireless device-specific DRX operation within a time for which the cell is in a DTX off state) may provide advantages such as improved power consumption and/or more efficient use of resources.

A wireless device switching from an RRC idle state to an RRC active state may not yet have received an indication of network energy saving for a cell of the base station. Determining whether the cell is in a non-energy saving state, for example, by the wireless device, before receiving MAC CE/DCI indicating enabling of a DTX mode may comprise the cell powering on for a first time and then powering off for a second time periodically. The network energy saving state of the cell between the wireless device and the base station may be misaligned, for example, if the wireless device is in a DRX off state when the base station submits a network energy saving indication in a DCI. Monitoring PDCCH, for example, by a wireless device for the DCI with a RNTI dedicated for network energy saving indications regardless of whether the wireless device is in a DRX active state. Wireless device power consumption may be increased based on a wireless device being in DRX active time, which may occur due to a DRX on duration timer running. The DRX on duration timer may be stopped, for example, by the wireless device, if the wireless device receives a network energy saving indication. The DRX on duration timer may be stopped, for example, by the wireless device, if the cell is in a power off state based on a DTX configuration of the cell. The DRX on duration timer may be started, for example, by the wireless device, if the timer is not running if the cell is in a power on state based on the DTX configuration of the cell. A wireless device may have difficulty determining whether to apply a network energy saving indication, for example, if it is configured with multiple DRX cell groups wherein a cell group (e.g., each cell group) is configured with a cell group specific DRX configuration. One or more of multiple DRX cell groups may be determined, for example, by the wireless device, based on at least one of: a first cell on which the network energy saving indication is received, the contents of the network energy saving indication, and/or other factors. Operating in the manner described herein may provide advantages such as saving energy/bandwidth, indicating a cell DTX state to wireless devices, coordinating DTX and DRX, and/or more efficient use of communication resources.

In at least some wireless technologies, network energy saving operation may comprise shutting down some cells or reducing periodicity of SSB/SIB1/SIB2 with or without beam sweeping, which may be different from the power saving operations for a wireless device, such as described herein with respect to FIG. 22, FIG. 28, FIG. 31A, FIG. 31B, FIG. 32A, FIG. 32B and/or FIG. 33. Shutting down cells (entirely or partially) may lead to negative impact on data transmission latency and/or power consumption during the access process. Another option may comprise modifying SSB towards a lighter version by carrying no or minimal info, such as PSS for example, which may be called as "light SSB". This "light SSB" could be combined with other techniques such as less frequent SSB transmission (e.g., with a periodicity >20 msec), or with "on-demand SSB"; where "on-demand SSB" is the SSB transmission that is triggered by UE via an UL trigger signal. As an example, a base station may transmit this "light SSB" and if there are wireless devices monitoring this "light SSB" and trying to access the network, the wireless devices may react by transmitting an uplink trigger signal. Upon reception of the uplink trigger signal, the base station may start transmitting the full-blown SSB. In an example, after receiving the uplink trigger signal, the network can adjust the SSB transmission configuration to respond to the wireless device's indication.

A base station may be equipped with multiple transmission reception points (TRPs) to improve spectrum efficiency and/or transmission robustness. The base station may transmit DL signals/channels via intra-cell multiple TRPs and/or via inter-cell multiple TRPs. A base station may be equipped with more than one TRP. A first TRP may be physically located at a different place from a second TRP. The first TRP may be connected with the second TRP via a backhaul link (e.g., wired link or wireless link), the backhaul link being ideal backhaul link with zero or neglectable transmission latency, or the backhaul link being non-ideal backhaul link. A first TRP may be implemented with antenna elements, RF chain and/or baseband processor independently configured/managed from a second TRP.

Figure 37A:
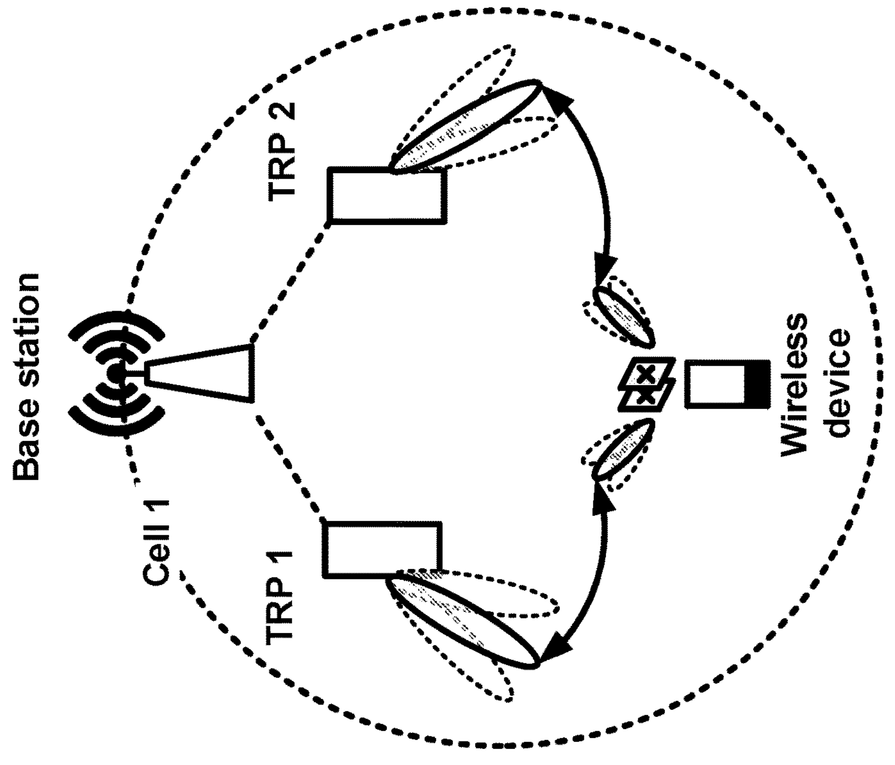
FIG. 37A and FIG. 37B show examples of multiple transmission and reception point (TRP) configurations.
Figure 37B:
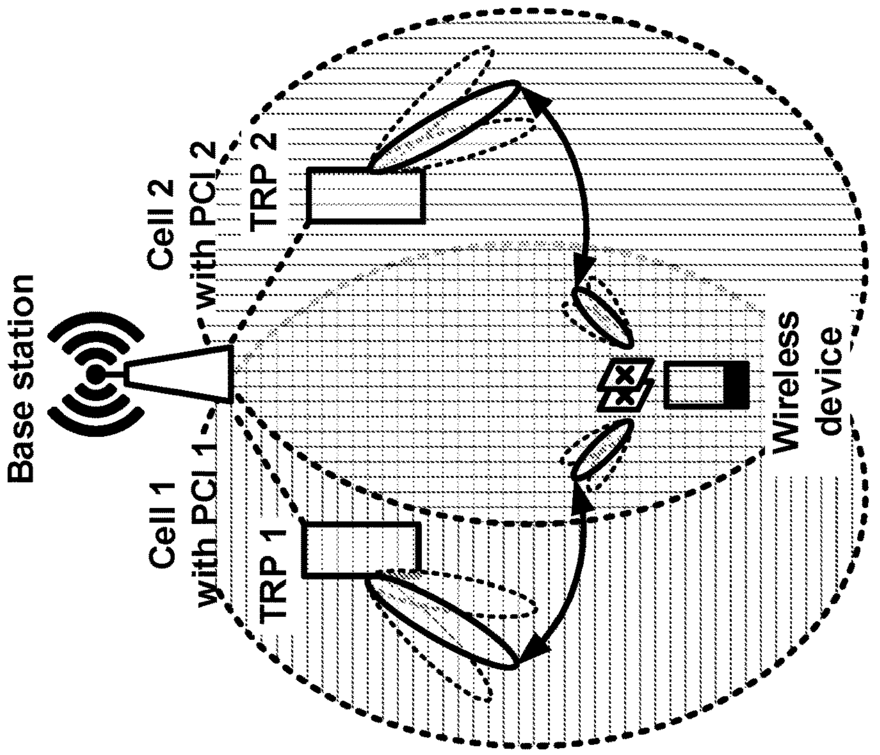

FIG. 37A and FIG. 37B show examples of multiple transmission and reception point (TRP) configurations. FIG. 37A shows an example of a communication between a base station (equipped with multiple TRPs) and a wireless device (equipped with single panel or multiple panels) based on intra-cell TRPs. Transmission and reception with multiple TRPs may improve system throughput and/or transmission robustness for a wireless communication in a high frequency (e.g., above 6 GHz). The multiple TRPs may be associated with a same physical cell identifier (PCI). Multiple TRPs on which PDCCH/PDSCH/PUCCH/PUSCH resources of a cell are shared may be referred to as intra-cell TRPs (or intra-PCI TRPs).

A TRP of multiple TRPs of the base station may be indicated/identified by at least one of: a TRP identifier (ID), a virtual cell index, or a reference signal index (or group index). In an example, in a cell, a TRP may be identified by a control resource set (coreset) group (or pool) index (e.g., CORESETPoolIndex as shown in FIG. 26) of a coreset group from which a DCI is transmitted from the base station on a coreset. A TRP ID of a TRP may comprise a TRP index indicated in the DCI. A TRP ID of a TRP may comprise a TCI state group index of a TCI state group. A TCI state group may comprise at least one TCI state with which the wireless device receives the downlink TBs, or with which the base station transmits the downlink TBs.

A base station may transmit to a wireless device one or more RRC messages comprising configuration parameters of a plurality of CORESETs on a cell (or a BWP of the cell). One of the plurality of CORESETs (e.g., each of the plurality of CORESETs) may be identified with a CORESET index and may be associated with (or configured with) a CORESET pool (or group) index. One or more CORESETs, of the plurality of CORESETs, having a same CORESET pool index may indicate that DCIs received on the one or more CORESETs are transmitted from a same TRP of a plurality of TRPs of the base station. The wireless device may determine receiving beams (or spatial domain filters) for PDCCHs/PDSCHs based on a TCI indication (e.g., DCI) and a CORESET pool index associated with a CORESET for the DCI.

A wireless device may receive multiple PDCCHs scheduling fully/partially/non-overlapped PDSCHs in time and frequency domain, for example, if the wireless device receives one or more RRC messages (e.g., PDCCH-Config IE) comprising a first CORESET pool index (e.g., CORESETPoolIndex) value and a second CORESET pool index in ControlResourceSet IE. The wireless device may determine the reception of full/partially overlapped PDSCHs in time domain only when PDCCHs that schedule two PDSCHs are associated to different ControlResourceSets having different values of CORESETPoolIndex.

A wireless device may assume (or determine) that the ControlResourceSet is assigned with CORESETPoolIndex as 0 for a ControlResourceSet without CORESETPoolIndex. Scheduling information for receiving a PDSCH is indicated and carried only by the corresponding PDCCH, for example, if the wireless device is scheduled with full/partially/non-overlapped PDSCHs in time and frequency domain. The wireless device may be expected to be scheduled with the same active BWP and the same SCS. A wireless device can be scheduled with at most two codewords simultaneously when the wireless device is scheduled with full/partially overlapped PDSCHs in time and frequency domain.

The wireless device may be allowed to the following operations, for example, if PDCCHs that schedule two PDSCHs are associated to different ControlResourceSets having different values of CORESETPoolIndex: for any two HARQ process IDs in a given scheduled cell, if the wireless device is scheduled to start receiving a first PDSCH starting in symbol j by a PDCCH associated with a value of CORESETpoolIndex ending in symbol i, the wireless device can be scheduled to receive a PDSCH starting earlier than the end of the first PDSCH with a PDCCH associated with a different value of CORESETpoolIndex that ends later than symbol i; in a given scheduled cell, the wireless device can receive a first PDSCH in slot i, with the corresponding HARQ-ACK assigned to be transmitted in slot j, and a second PDSCH associated with a value of CORESETpoolIndex different from that of the first PDSCH starting later than the first PDSCH with its corresponding HARQ-ACK assigned to be transmitted in a slot before slot j.

For example, if a wireless device configured by higher layer parameter PDCCH-Config that contains two different values of CORESETPoolIndex in ControlResourceSet, for both cases, when tci-PresentInDCI is set to 'enabled' and tci-PresentInDCI is not configured in RRC connected mode, for example, if the offset between the reception of the DL DCI and the corresponding PDSCH is less than the threshold timeDurationForQCL, the wireless device may assume that the DM-RS ports of PDSCH associated with a value of CORESETPoolIndex of a serving cell are quasi co-located with the RS(s) with respect to the QCL parameter(s) used for PDCCH quasi co-location indication of the CORESET associated with a monitored search space with the lowest CORESET-ID among CORESETs, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the wireless device. For example, if the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint indicates two TCI states, the wireless device may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states.

FIG. 37B shows an example of a communication between a base station (equipped with multiple TRPs) and a wireless device (equipped with single panel or multiple panels) based on inter-cell TRPs (or inter-PCI TRPs). In this case, the multiple TRPs may be associated with different PCIs. The multiple TRPs may be associated with (or belong to) different physical cells (Cell 1 with PCI 1 and Cell 2 with PCI 2), which may be referred to as inter-cell TRPs (or inter-PCI TRPs). A cell may be a serving cell or a non-serving (neighbor) cell of the wireless device. A base station may configure Cell 2 with PCI 2 as a part of Cell 1 with PCI 1 (e.g., a second TRP with a second PCI different from a first PCI of a first TRP), in which case, the wireless device may receive first SSBs from Cell 1 with PCI 1 and receive second SSBs from Cell 2 with PCI 2, for example, if operating the inter-cell TRPs for a wireless device. The first SSBs and the second SSBs may have different configuration parameters, wherein the configuration parameters may be implemented such as described herein with respect to FIG. 34, FIG. 35 and/or FIG. 36. With the inter-cell TRPs, the wireless device may receive PDCCHs/PDSCHs and/or transmit PUCCH/PUSCHs on Cell 1 with PCI1 and Cell 2 with PCI 2 with different TCI states (e.g., one being associated with one of the first SSBs, another being associated with one of the second SSBs, etc.).

A serving cell may be a cell (e.g., PCell, SCell, PSCell, etc.) on which the wireless device receives SSB/CSI-RS/PDCCH/PDSCH and/or transmits PUCCH/PUSCH/SRS etc. The serving cell may be identified by a serving cell index (e.g., ServCellIndex or SCellIndex configured in RRC message). For a wireless device in RRC_CONNECTED not configured with CA/DC, there may only be one serving cell comprising of the primary cell. For a wireless device in RRC_CONNECTED configured with CA/DC the term 'serving cells' may be used to denote the set of cells comprising of the Special Cell(s) and all secondary cells. For a wireless device configured with CA, a cell providing additional radio resources on top of Special Cell may be referred to as a secondary cell. A non-serving (or neighbor) cell may be a cell on which the wireless device does not receive MIBs/SIBs/PDCCH/PDSCH and/or does not transmit PUCCH/PUSCH/SRS etc. The non-serving cell may have a physical cell identifier (PCI) different from a PCI of a serving cell. The non-serving cell may not be identified by (or associated with) a serving cell index (e.g., ServCellIndex or SCellIndex). The wireless device may rely on a SSB of a non-serving cell for Tx/Rx beam (or spatial domain filter) determination (for PDCCH/PDSCH/PUCCH/PUSCH/CSI-RS/SRS for a serving cell, etc.), for example, if a TCI state of the serving cell is associated with (e.g., in TCI-state IE of TS 38.331) a SSB of the non-serving cell. The base station may not transmit RRC messages configuring resources of PDCCH/PDSCH/PUCCH/PUSCH/SRS of a non-serving cell for the wireless device.

For a specific wireless device, Cell 1 may be a serving cell and may be associated with a first TRP (TRP 1). Cell 2 may be a non-serving (or neighbor) cell and may be associated with a second TRP. A base station may transmit to a wireless device one or more RRC messages comprising configuration parameters of Cell 1. The configuration parameters of Cell 1 may indicate a plurality of additional PCI configurations (e.g., SSB-MTC-AdditionalPCI IE) for a plurality of (non-serving or neighbor) cells for cell 1, each additional PCI configuration corresponding to a (non-serving or neighbor) cell having a PCI different from the PCI value of the serving cell, and comprising: an additional PCI index (AdditionalPCIIndex) identifying the additional PCI configuration, a PCI of the non-serving cell, a SSB periodicity indication, position indications of (candidate) SSBs in a SSB burst, a transmission power indication of SSBs, etc. The configuration parameter of Cell 1 may further indicate a plurality of TCI states. A TCI state (e.g., each TCI state) of the plurality of TCI states may be associated with one or more TCI parameters comprising a TCI state identifier identifying the TCI state, one or more QCL information parameters comprising a SSB index identifying the SSB and a QCL type indicator indicating a QCL type of a plurality of QCL types, for example, if the SSB is transmitted via Cell 1 (or in another serving cell). For example, if a SSB of a TCI state is transmitted via a non-serving (neighbor) cell, the TCI state may be further associated with an additional PCI index (AdditionalPCIIndex) indicating a (non-serving or neighbor) cell configured in the SSB-MTC-AdditionalPCI IE. Similar to intra-cell multiple TRPs, the wireless device may receive downlink signals and/or transmit uplink signals based on a TCI state (activated/indicated) associated with a TRP. A difference between intra-cell multiple TRPs and inter-cell multiple TRPs may be that a reference RS of a TCI state for a serving cell may come from (or be transmitted via) a (non-serving or neighbor) cell for the latter cases. A SSB may be implemented based on examples described herein with respect to FIG. 34, FIG. 35 and/or FIG. 36.

Cell 1 may be a serving cell for a wireless device. Cell 2 may be a (non-serving or neighbor) cell associated with Cell 1 for the wireless device. Cell 2 may be a serving cell for a second wireless device. Cell 1 may be a (non-serving or neighbor) cell for the second wireless device. Different wireless devices may have different serving cells and non-serving/neighbor cells.

The base station may use both TRPs for transmissions via Cell 1 to a wireless device. The base station may indicate (by DCI/MAC CE) a first TCI state associated with an SSB/CSI-RS transmitted via Cell 1 (or another serving cell) for a first transmission (via PDCCH/PDSCH/PUSCH/PUCCH/SRS resources of Cell 1) to the wireless device. The base station may indicate (by the same DCI/MAC CE or another DCI/MAC CE) a second TCI state associated with a second SSB transmitted via Cell 2 (which is the non-serving/neighbor) cell indicated by AdditionalPCIIndex in TCI configuration parameters) for a second transmission (via PDCCH/PDSCH/PUSCH/PUCCH/SRS resources of Cell 1) to the wireless device. The second SSB transmitted via Cell 2 may be different from the first SSB transmitted via Cell 1. Using two TCI states from two TRPs (one may be from a serving cell and another may be from a non-serving/neighbor cell) may avoid executing time-consuming handover (HO) between Cell 1 to Cell 2 and improve coverage if the wireless device is moving at the edge of Cell 1 and Cell 2.

A wireless device may be provided two TCI states, each TCI state corresponding to a TRP of multiple TRPs (e.g., such as described with respect to FIGS. 37A and 37B). A TCI state may be referred to as a channel-specific TCI state, when the TCI state is used for a specific channel (e.g., PDSCH/PDCCH/PUCCH/PUSCH), where different channels may be associated with different channel-specific TCI states. A TCI state may be referred to as a unified TCI state, when the TCI state is used for multiple channels (e.g., PDSCH/PDCCH/PUCCH/PUSCH), where different channels may be associated with the same unified TCI state. The base station may transmit RRC messages indicating whether a TCI state is a unified TCI state for the wireless device.

A base station may perform data/signaling transmissions based on intra-cell multiple TRPs (e.g., which may be referred to as Intra-cell M-TRP or Intra-PCI M-TRP) for a wireless device, for example, if the wireless device is close to the center of a cell, has more data to deliver and/or requires high reliability (e.g., for URLLC service), for example, such as described with respect to FIGS. 37A and 37B. The base station may perform data/signaling transmissions based on inter-cell multiple TRPs (e.g., which may be referred to as Inter-cell M-TRP or Inter-PCI M-TRP) for a wireless device, for example, when the wireless device is at the edge of a cell and is (moving or located) in the coverage of another cell (which may be or may not be a serving cell of the wireless device).

In at least some technologies, a base station may enable a power saving operation for a wireless device due to limited battery capacity of the wireless device, for example, based on BWP management (e.g., such as described with respect to FIG. 22), SCell dormancy mechanism (e.g., such as described with respect to FIG. 28), wake-up/go-to-sleep indication (e.g., such as described with respect to in FIG. 31A and/or FIG. 31B), SSSG switching on an active BWP (e.g., such as described with respect to FIG. 32A and/FIG. 32B), and/or PDCCH skipping (e.g., such as described with respect to FIG. 33).

A base station, for example, if indicating a power saving operation for a wireless device (e.g., such as described with respect to FIG. 22, FIG. 28, FIG. 31A, FIG. 31B, FIG. 32A, FIG. 32B and/or FIG. 33), may not be able to save energy from the viewpoint of the base station, for example, if the base station is required to transmit some always-on downlink signals periodically (e.g., SSB, MIB, SIB1, SIB2, periodic CSI-RS, etc.) in some time period even when there is no active wireless device in transmitting to/receiving from the base station. The base station may be required to transmit some always-on downlink signals periodically (e.g., SSB, MIB, SIB1, SIB2, periodic CSI-RS, etc.), for example, if the base station transitions a cell into a dormant state by switching an active BWP to a dormant BWP of the cell, for example, such as described above with respect to FIG. 28.

For example, if a base station needs to reduce periodicity of the always-on downlink signal transmission for network energy saving, the base station may transmit a RRC message (e.g., SIB1) indicating a longer periodicity for the always-on downlink signal transmission. A base station may transmit RRC reconfiguration messages to each wireless device in a source cell to indicate a handover to a neighbor cell, for example, before determining to power off (e.g., both RF modules and base band units (BBUs)) for network energy saving. A handover (HO) procedure may be implemented (e.g., such as described herein with respect to FIG. 38).

Figure 38:
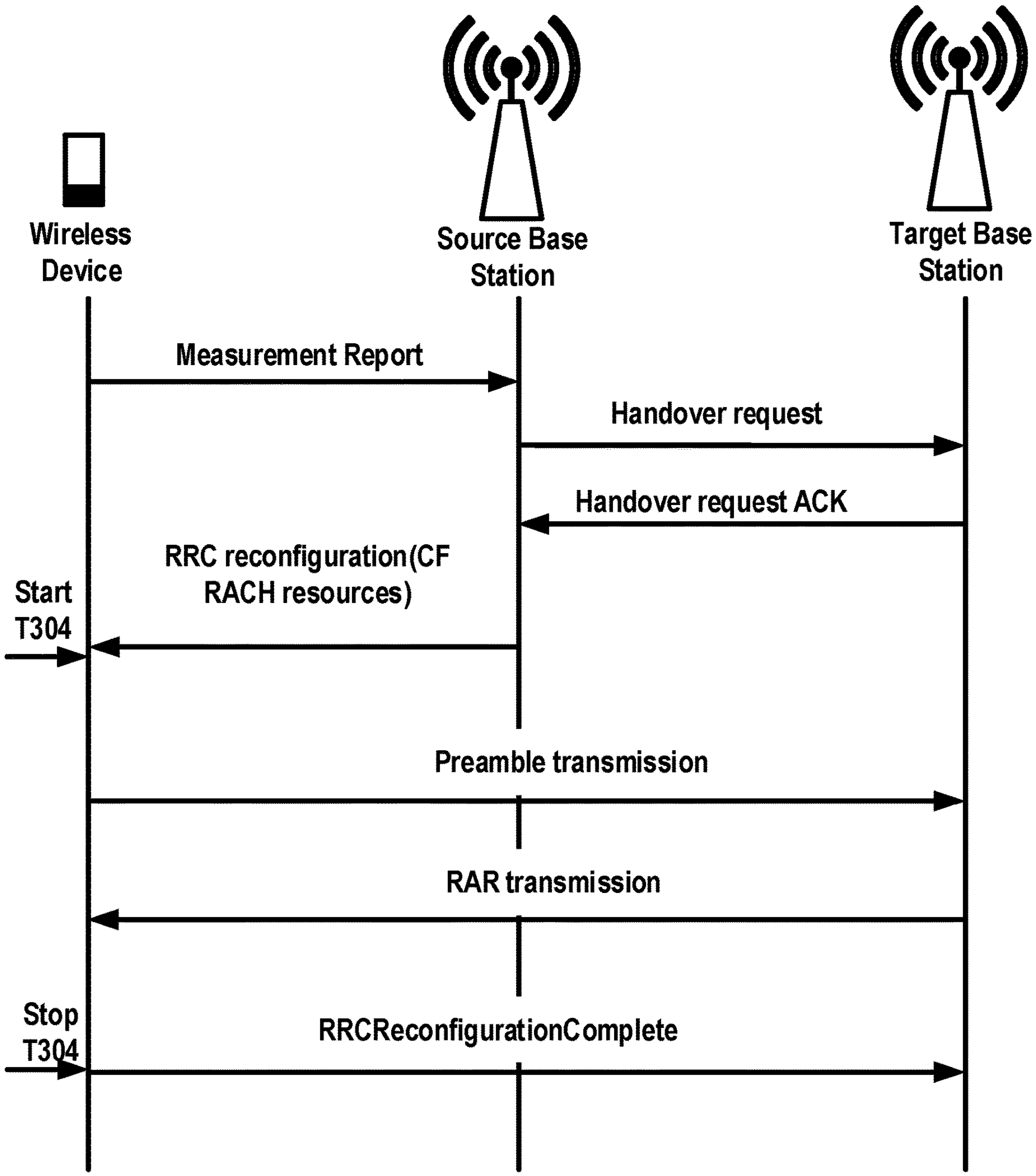
FIG. 38 shows an example of layer 3 based handover procedure.

FIG. 38 shows an example of layer 3 based handover procedure. FIG. 38 shows an example of executing HO procedure from a source base station (e.g., gNB) to a target base station for a wireless device.

For network-controlled mobility in RRC_CONNECTED, the PCell may be changed using an RRC connection reconfiguration message (e.g., RRCReconfiguration) including reconfigurationWithSync (in NR specifications) or mobilityControlInfo in LTE specifications (handover). The SCell (s) may be changed using the RRC connection reconfiguration message either with or without the reconfigurationWithSync or mobilityControlInfo. The network may trigger the HO procedure, for example, based on radio conditions, load, QoS, UE category, and/or the like. The RRC connection reconfiguration message may be implemented such as described herein with respect to FIG. 39 and FIG. 40.

The network may configure the wireless device to perform measurement reporting (possibly including the configuration of measurement gaps). The measurement reporting is a layer 3 reporting, different from layer 1 CSI reporting. The wireless device may transmit one or more measurement reports to the source base station (e.g., gNB) (and/or source PCell). The network may initiate HO blindly, for example without having received measurement reports from the wireless device. The source base station (e.g., gNB) may prepare one or more target cells, for example, before sending the HO message to the wireless device. The source base station (e.g., gNB) may select a target PCell.

The source base station (e.g., gNB) may provide the target base station with a list of best cells on each frequency for which measurement information is available (e.g., in order of decreasing RSRP values), for example, based on the one or more measurement reports from the wireless device. The source base station may also include available measurement information for the cells provided in the list. The target base station may decide which cells are configured for use after HO, which may include cells other than the ones indicated by the source base station. The source base station may transmit a HO request to the target base station. The target base station may response with a HO message. In the HO message, the target base station may indicate access stratum configuration to be used in the target cell(s) for the wireless device.

The source base station (e.g., gNB) may transparently (e.g., by not altering values/content) forward the HO message/information received from the target base station to the wireless device. In the HO message, RACH resource configuration may be configured for the wireless device to access a cell in the target base station. When appropriate, the source base station may initiate data forwarding for (a subset of) the dedicated radio bearers.

The wireless device may start a HO timer (e.g., T304) with an initial timer value, for example, after receiving the HO message. The HO timer may be configured in the HO message. Based on the HO message, the wireless device may apply the RRC parameters of a target PCell and/or a cell group (MCG/SCG) associated with the target PCell of the target base station and perform downlink synchronization to the target base station. After or in response to performing downlink synchronization (e.g., searching a suitable/detectable SSB from candidate SSBs configured on the target base station, such as described with respect to FIG. 35 and/or FIG. 36) to the target base station, the wireless device may initiate a random access (e.g., contention-free, or contention-based, such as described with respect to FIG. 13A, FIG. 13B and/or FIG. 13C) procedure attempting to access the target gNB at the available RACH occasion according to a RACH resource selection, where the available RACH occasion may be configured in the RACH resource configuration (e.g., such as described herein with respect to FIG. 40). RAN may ensure the preamble is available from the first RACH occasion the wireless device may use, for example, if allocating a dedicated preamble for the random access in the target gNB.

The wireless device may activate the uplink BWP configured with firstActiveUplinkBWP-id and/or the downlink BWP configured with firstActiveDownlinkBWP-id on the target PCell upon performing HO to the target PCell. The wireless device may perform UL synchronization by conducting RACH procedure, for example, based on applying the RRC parameters of a target PCell and/or completing the downlink synchronization with the target PCell (e.g., such as described with respect to FIG. 13A, FIG. 13B and/or FIG. 13C). The performing UL synchronization may comprise transmitting a preamble via an active uplink BWP (e.g., a BWP configured as firstActiveUplinkBWP-id such as described with respect to FIG. 39) of uplink BWPs of the target PCell, monitoring PDCCH on an active downlink BWP (e.g., a BWP configured as firstActiveDownlinkBWP-id such as described with respect to FIG. 39) for receiving a RAR comprising a TA which is used for PUSCH/PUCCH transmission via the target PCell, receiving the RAR and/or obtaining the TA. The wireless device may obtain the TA to be used for PUSCH/PUCCH transmission via the target PCell, for example, based on (e.g., after) completing the UL synchronization. The wireless device, for example, by using the TA to adjust uplink transmission timing, may transmit PUSCH/PUCCH via the target PCell. The adjusting uplink transmission timing may comprise advancing or delaying the transmissions by an amount indicated by a value of the TA, for example, to ensure the uplink signals received at the target PCell are aligned (in time domain) with uplink signals transmitted from other wireless devices.

The wireless device may release RRC configuration parameters of the source PCell and an MCG/SCG associated with the source PCell. A HO triggered by receiving a RRC reconfiguration message (e.g., RRCReconfiguration) comprising the HO command/message (e.g., by including reconfigurationWithSync (in NR specifications) or mobilityControlInfo in LTE specifications (handover)) is referred to as a normal HO, an unconditional HO, which is in contrast with a conditional HO (CHO) which is described herein with respect to FIG. 41.

The wireless device may transmit a preamble to the target base station (e.g., gNB) via a RACH resource. The RACH resource may be selected from a plurality of RACH resources (e.g., configured in rach-ConfigDedicated IE such as descried with respect to FIG. 39 and FIG. 40) based on SSBs/CSI-RSs measurements of the target base station. The wireless device may select a (best) SSB/CSI-RS of the configured SSBs/CSI-RSs of the target gNB. The wireless device may select a SSB/CSI-RS, from the configured SSBs/CSI-RSs of the target base station (e.g., gNB), with a RSRP value greater than a RSRP threshold configured for the RA procedure. The wireless device then determines a RACH occasion (e.g., time domain resources, etc.) associated with the selected SSB/CSI-RS and determines the preamble associated with the selected SSB/CSI-RS.

The target base station (e.g., gNB) may receive the preamble transmitted from the wireless device. The target base station may transmit a random access response (RAR) to the wireless device, where the RAR comprises the preamble transmitted by the wireless device. The RAR may further comprise a TAC to be used for uplink transmission via the target PCell. The wireless device may complete the random access procedure, for example, based on (e.g., in response to) receiving the RAR comprising the preamble. The wireless device may stop the HO timer (T304), for example, based on (e.g., in response to) completing the random access procedure. The wireless device may transmit an RRC reconfiguration complete message to the target base station, after completing the random access procedure, or before completing the random access procedure. The wireless device, after completing the random access procedure towards the target base station, may apply first parts of CQI reporting configuration, SR configuration and SRS configuration that do not require the wireless device to know a system frame number (SFN) of the target base station. The wireless device may apply second parts of measurement and radio resource configuration that require the wireless device to know the SFN of the target base station (e.g., measurement gaps, periodic CQI reporting, SR configuration, SRS configuration), upon acquiring the SFN of the target base station, for example, based on (e.g., after or in response to) completing the random access procedure towards the target PCell.

For network energy saving purposes, a base station may instruct each wireless device in a source cell to perform a 4-step or 2-step RACH-based (contention free) HO to a neighbor cell, for example, based on HO procedure. After the wireless devices complete the HO procedure to neighbor cells, the base station may turn off (RF parts and BBUs, etc.) for energy saving.

FIG. 39 shows an example of a radio resource control (RRC) message for layer 3 based handover. FIG. 39 shows an example embodiment of RRC message for HO. A base station may transmit, and/or a wireless device may receive, an RRC reconfiguration message (e.g., RRCReconfiguration-IEs) indicating an RRC connection modification. It may convey information for measurement configuration, mobility control, radio resource configuration (including RB s, MAC main configuration and physical channel configuration) and AS security configuration. The RRC reconfiguration message may comprise a configuration of a master cell group (masterCellGroup). The master cell group may be associated with a SpCell (SpCellConfig). When the SpCellConfig comprises a reconfiguration with Sync (reconfigurationWithSync), the wireless device determines that the SpCell is a target PCell for the HO. The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. In an example, a dedicated RACH resource may comprise one or more RACH occasions, one or more SSBs, one or more CSI-RSs, one or more RA preamble indexes, etc.

FIG. 40 shows an example of an RRC message for layer 3 based handover. FIG. 40 shows an example embodiment of RRC messages for RACH resource configuration for HO procedure. The reconfigurationWithSync IE comprises a dedicated RACH resource indicated by a rach-ConfigDedicated IE (e.g., such as described with respect to FIG. 39).

An IE such as a rach-ConfigDedicated IE may comprise a contention free RA resource indicated by a CFRA IE. The cfra IE may comprise a plurality of occasions indicated by a rach-ConfigGeneric IE, a ssb-perRACH-Occasion IE, a plurality of resources associated with SSB (indicated by a ssb IE) and/or CSI-RS (indicated by a csirs IE). An IE such as a ssb-perRACH-Occasion IE may indicate a number of SSBs per RACH occasion. An IE such as a rach-ConfigGeneric IE may indicate configuration of CFRA occasions. The wireless device may ignore preambleReceivedTargetPower, preambleTransMax, powerRampingStep, ra-ResponseWindow signaled within this field and use the corresponding values provided in RACH-ConfigCommon.

The resources (resources IE) comprise the ssb IE, for example, if the plurality of resources for the CFRA configured in the reconfigurationWithSync IE are associated with SSBs. The ssb IE may comprise a list of CFRA SSB resources (ssb-ResourceList) and an indication of PRACH occasion mask index (ra-ssb-OccasionMaskIndex). One or more of the list of CFRA SSB resources (e.g., each of the list of CFRA SSB resources) may comprise a SSB index, a RA preamble index, etc. The ra-ssb-OccasionMaskIndex may indicate a PRACH mask index for RA resource selection. The mask may be valid for all SSB resources signaled in ssb-ResourceList.

The resources (resources IE) may comprise the csirs IE, for example, if the plurality of resources for the CFRA configured in the reconfigurationWithSync IE are associated with CSI-RSs. The csirs IE may comprise a list of CFRA CSI-RS resources (csirs-ResourceList) and a RSRP threshold (rsrp-ThresholdCSI-RS). One or more of the list of CFRA CSI-RS resources (e.g., each of the list of CFRA CSI-RS resources) may comprise a CSI-RS index, a list of RA occasions (ra-OccasionList), a RA preamble index, etc.

Executing the HO triggered by receiving a RRC reconfiguration message comprising a reconfigurationWithSync IE may introduce HO latency (e.g., too-late HO), for example, if a wireless device is moving in a network deployed with multiple small cells (e.g., with hundreds of meters of cell coverage of a cell). An improved HO mechanism, based on measurement event triggering, is proposed to reduce the HO latency such as described herein with respect to FIG. 41.

Figure 41:
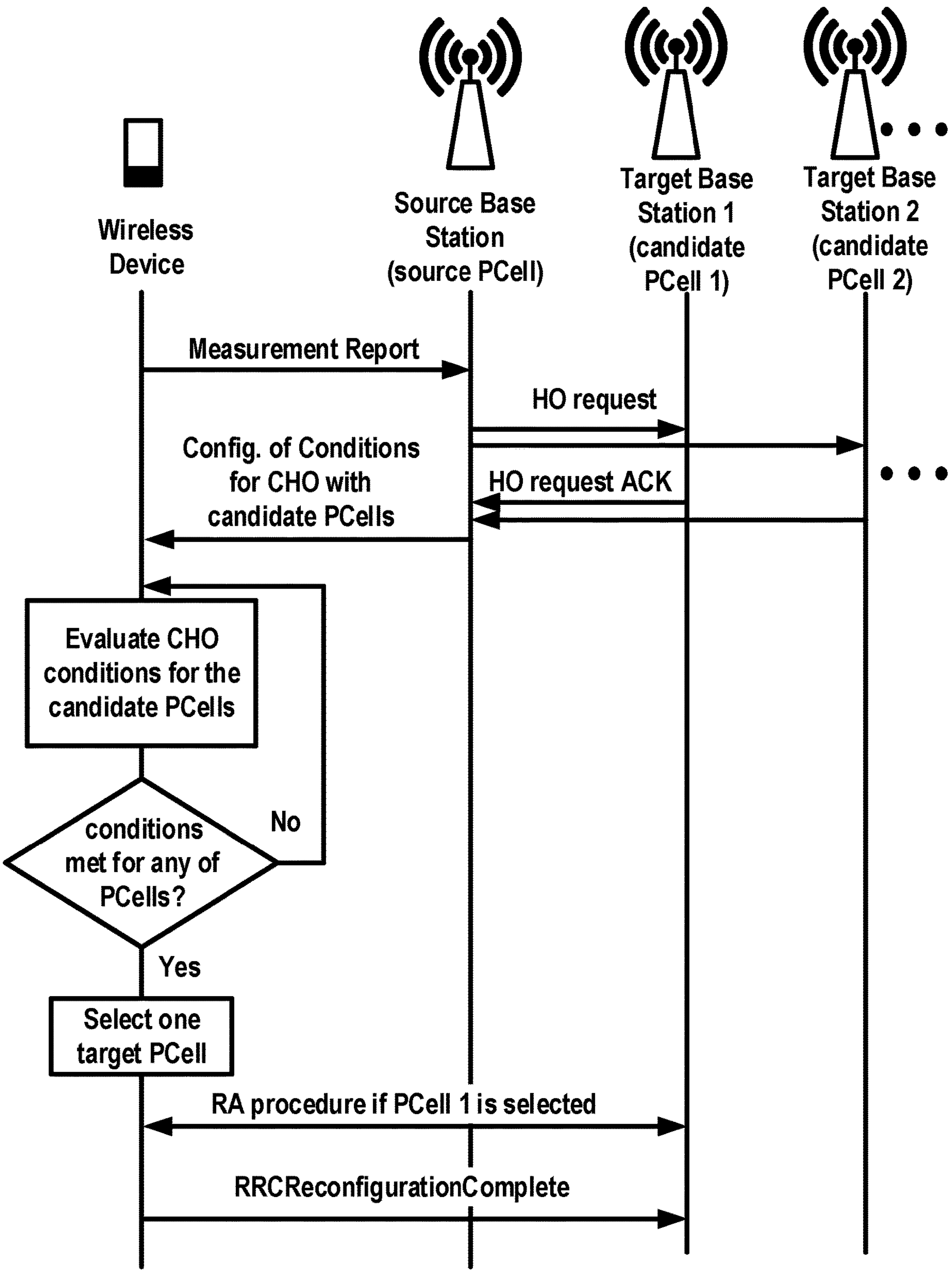
FIG. 41 shows an example of layer 3 based conditional handover procedure.

FIG. 41 shows an example of layer 3 based conditional handover procedure. FIG. 41 shows an example of a conditional handover (CHO) procedure. In an example the network (e.g., a base station, a source gNB) may configure the wireless device to perform measurement reporting (possibly including the configuration of measurement gaps) for a plurality of neighbor cells (e.g., cells from a candidate target base station 1, a candidate target base station 2, etc.). The measurement reporting may be a layer 3 reporting, different from layer 1 CSI reporting. The wireless device may transmit one or more measurement reports 4105 to the source base station (e.g., gNB) (or source PCell).

The source base station (e.g., gNB) may provide the target base station with a list of best cells on each frequency for which measurement information is available, for example, in order of decreasing RSRP, for example, based on the one or more measurement reports from the wireless device. The source base station may also include available measurement information for the cells provided in the list. The target base station may decide which cells are configured for use after the CHO, which may include cells other than the ones indicated by the source base station. In an example the source base station may transmit a HO 4110 request to the target base station. The target base station may respond with a HO message 4115. In the HO message, for example, the target base station may indicate access stratum configuration (e.g., RRC configurations of the target cells) to be used in the target cell(s) for the wireless device.

The source base station (e.g., gNB) may transparently (e.g., by not altering values/content) forward the handover (e.g., contained in RRC reconfiguration messages of the target base station) message/information received from the target base station to the wireless device. The source base station may configure a CHO procedure different from a normal HO procedure 4120 (e.g., such as described with respect to FIG. 38, FIG. 39 and/or FIG. 40), by comprising a conditional reconfiguration message (e.g., conditionalReconfiguration IE in RRC reconfiguration message, which will be described later in FIG. 42). The conditional reconfiguration message may comprise a list of candidate target PCells, each candidate target PCell being associated with dedicated RACH resources for the RA procedure in case a CHO is executed to the candidate target PCell. A CHO execution condition (or RRC reconfiguration condition) may also be configured for each of the candidate target PCells, etc. A CHO execution condition may comprise a measurement event A3 where a candidate target PCell becomes amount of offset better than the current PCell (e.g., the PCell of the source gNB), a measurement event A4 where a candidate target PCell becomes better than absolute threshold configured in the RRC reconfiguration message, a measurement event A5 where the current PCell becomes worse than a first absolute threshold, and a candidate target PCell becomes better than a second absolute threshold, etc.

The wireless device, according to the received RRC reconfiguration messages comprising parameters of a CHO procedure, may evaluate 4125 the (RRC) reconfiguration conditions for the list of candidate target PCells and/or the current/source PCell. The wireless device may measure RSRP/RSRQ of SSBs/CSI-RSs of each candidate target PCell of the list of candidate target PCells. Different from the normal HO procedure described with respect to FIG. 38, the wireless device may not execute the HO to the target PCell in response to receiving the RRC reconfiguration messages comprising the parameters of the CHO procedure. The wireless device may execute the HO to a target PCell for the CHO, for example, if the (RRC) reconfiguration condition(s) of the target PCell are met (or satisfied) 4130. The wireless device may keep evaluating the reconfiguration conditions for the list of the candidate target PCells 4125, for example, until an expiry of a HO timer, or receiving a RRC reconfiguration indicating an abort of the CHO procedure.

The wireless device may execute the CHO procedure towards the first candidate target PCell, for example, based on (e.g., in response to) a reconfiguration condition of a first candidate target PCell (e.g., PCell 1) being met or satisfied. The wireless device may select one of multiple candidate target PCells 4135 by its implementation when the multiple candidate target PCells have reconfiguration conditions satisfied or met.

Executing the CHO procedure towards the first candidate target PCell may be the same as or similar to executing the HO procedure such as described with respect to FIG. 38. By executing the CHO procedure, the wireless device may release RRC configuration parameters of the source PCell and the MCG associated with the source PCell, apply the RRC configuration parameters of the PCell 1, reset MAC, perform cell group configuration for the received MCG comprised in the RRC reconfiguration message of the PCell 1, and/or perform RA procedure to the PCell 1 4140, etc.

The MCG of the RRC reconfiguration message of the PCell 1 may be associated with a SpCell (SpCellConfig) on the target base station 1. The wireless device may determine that the SpCell is a target PCell (PCell 1) for the HO, for example, if the sPCellConfig comprises a reconfiguration with Sync (reconfigurationWithSync). The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. A dedicated RACH resource may comprise one or more RACH occasions, one or more SSBs, one or more CSI-RSs, one or more RA preamble indexes, etc. The wireless device may perform cell group configuration for the received master cell group comprised in the RRC reconfiguration message 4145 (e.g., RRCReconfigurationComplete) of the PCell 1 on the target base station 1 such as described with respect to FIG. 38.

FIG. 42 shows an example of an RRC message for layer based conditional handover procedure. FIG. 42 shows an example of RRC message for CHO. A base station may transmit, and/or a wireless device may receive, a RRC reconfiguration message (e.g., RRCReconfiguration-V1610-IEs) indicating an RRC connection modification. The RRC reconfiguration message may be comprised in a (parent) RRC reconfiguration message (e.g., RRCReconfiguration-IEs) such as described with respect to FIG. 39, where the (parent) RRC reconfiguration message may comprise (L3 beam/cell) measurement configuration (e.g., measConfig IE).

The RRC reconfiguration message (e.g., RRCReconfiguration-V1610-IEs) may comprise a conditional reconfiguration IE (conditionalReconfiguration IE). The conditional reconfiguration IE may comprise a list of conditional reconfigurations (condReconfigToAddModList). Each conditional reconfiguration corresponds to a respective candidate target cell (PCell) of a list of candidate target cells. For each conditional reconfiguration of the list of conditional reconfigurations, the base station may indicate one or more measurement events (condExecutionCond) for triggering the CHO on the candidate target PCell, a RRC reconfiguration message (condRRCReconfig) of a candidate target cell (PCell) which is received by the source base station (e.g., gNB) from the target base station via X2/Xn interface. The RRC reconfiguration message of the candidate target cell may be implemented such as described with respect to FIG. 39 and/or FIG. 40. The RRC reconfiguration message may comprise a configuration of a master cell group (masterCellGroup) for the target base station. The master cell group may be associated with a SpCell (SpCellConfig). The SpCell may be a target PCell for executing the CHO, for example, if the sPCellConfig comprises a reconfiguration with Sync (reconfigurationWithSync). The reconfiguration with sync (reconfigurationWithSync) may comprise cell common parameters (spCellConfigCommon) of the target PCell, a RNTI (newUE-Identity) identifying the wireless device in the target PCell, a value of T304, a dedicated RACH resource (rach-ConfigDedicated), etc. A dedicated RACH resource may comprise one or more RACH occasions, one or more SSBs, one or more CSI-RSs, one or more RA preamble indexes, etc.

A measurement event (condExecutionCond) for triggering the CHO on the candidate target PCell may be an execution condition that needs to be fulfilled (at the wireless device) in order to trigger the execution of a conditional reconfiguration for CHO. The indication of the measurement event may point to a measurement ID (MeasId) which identifies a measurement configuration of a plurality of measurement configurations (e.g., comprised in measConfig IE) configured by the source base station. The measurement configuration may be associated with a measurement event (or a conditional event) of a plurality of measurements. A conditional event may comprise a conditional event A3, conditional event A4, and/or conditional event A5, etc. A conditional event A3 is that a candidate target PCell becomes amount of offset better than the current PCell (e.g., the PCell of the source gNB). A conditional event A4 is that a candidate target PCell becomes better than an absolute threshold configured in the RRC reconfiguration message. A conditional event A5 is that the current PCell becomes worse than a first absolute threshold and a candidate target PCell becomes better than a second absolute threshold, etc.

Executing CHO by the wireless device's decision based on evaluating reconfiguration conditions (long-term and/or layer 3 beam/cell measurements against one or more configured thresholds) on a plurality of candidate target cells may cause load unbalanced on cells, and/or lead to CHO failure in case that the target cell changes its configuration (e.g., for network energy saving) during the CHO condition evaluation, etc. An improved handover based on layer 1 or layer 2 signaling triggering is described herein with respect to FIG. 43. A layer 1 or layer 2 triggered handover may be referred to a layer 1 or layer 2 triggered mobility (LTM) procedure. A layer 1 signaling may comprise a DCI transmitted via a PDCCH. A layer 2 signaling may comprise a MAC CE scheduled by a DCI. Layer 1 or layer 2 (e.g., which may be referred to as layer 1/2) signaling is different from Layer 3 signaling, for HO/CHO, which comprises RRC reconfiguration message.

Figure 43:
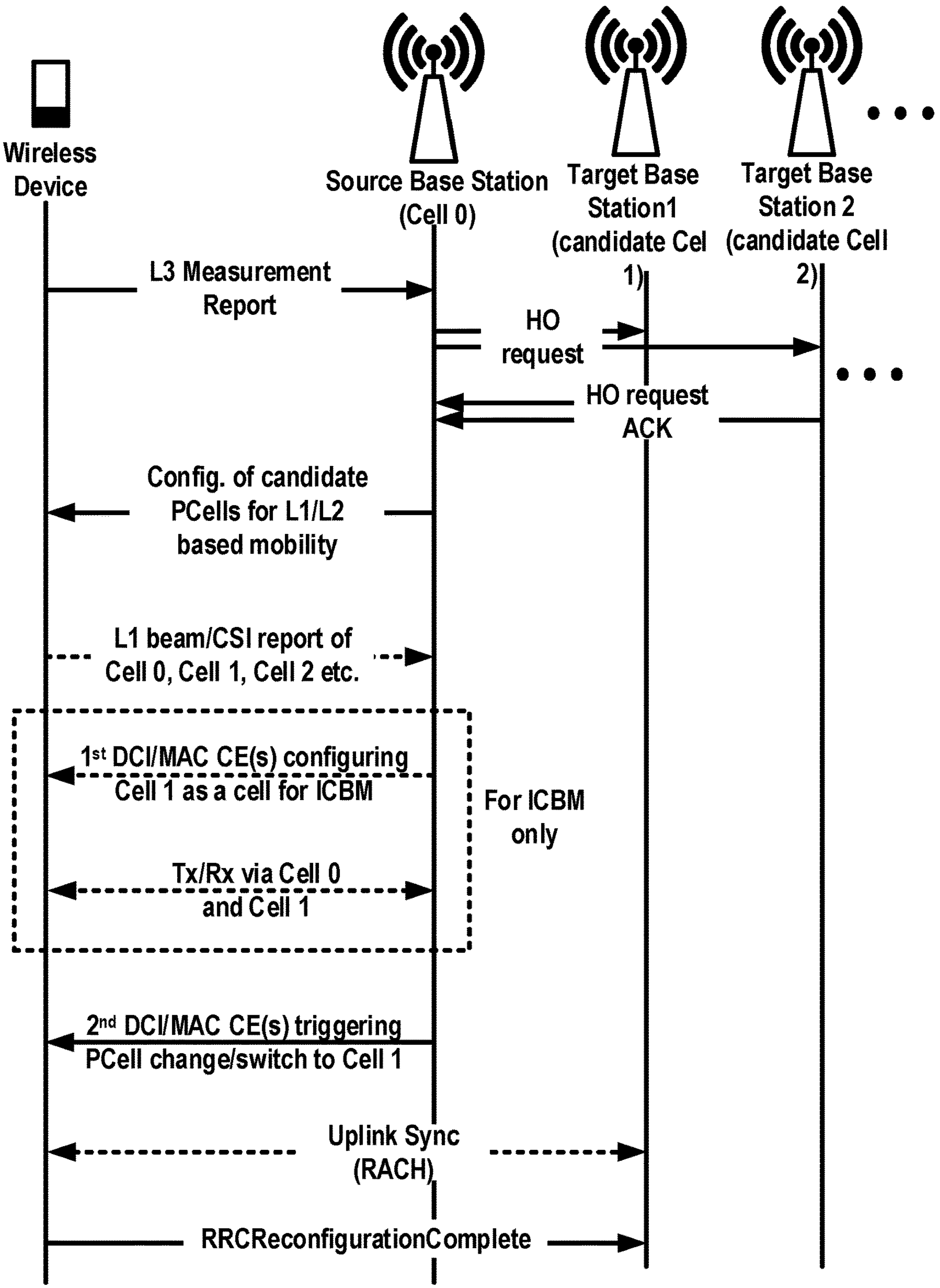
FIG. 43 shows an example of layer 1 or layer 2 based handover.

FIG. 43 shows an example of layer 1 or layer 2 based handover. FIG. 43 shows an example embodiment of layer 1 or layer 2 triggered HO procedure. The network (e.g., a base station, a source gNB) may configure the wireless device to perform measurement reporting (possibly including the configuration of measurement gaps) for a plurality of neighbor cells (e.g., cells from a candidate target base station 1, a candidate target base station 2, etc.). The measurement reporting may be a layer 3 reporting, different from layer 1 CSI reporting. The wireless device may transmit one or more measurement reports to the source base station (or source PCell, cell 0 in FIG. 43).

The source base station (e.g., gNB) may provide the target base station with a list of best cells on each frequency for which measurement information is available, for example, in order of decreasing RSRP, for example, based on the one or more measurement reports from the wireless device. The source base station may also include available measurement information for the cells provided in the list. The target base station may decide which cells are configured for use (as a target PCell, and/or one or more SCells) after HO, which may include cells other than the ones indicated by the source base station. The source base station may transmit a HO request to the target base station. The target base station may response with a HO message. In the HO message, the target base station may indicate access stratum configuration (e.g., RRC configurations of the target cells) to be used in the target cell(s) for the wireless device.

The source base station may transparently (e.g., by not altering values/content) forward the HO (e.g., contained in RRC reconfiguration messages of the target base station, cell group configuration IE of the target base station, and/or SpCell configuration IE of a target PCell/SCells of the target gNB) message/information received from the target base station to the wireless device.

The source base station may configure a Layer 1 or layer 2 signaling based HO (PCell switching/changing, mobility, etc.) procedure different from a normal HO procedure (e.g., such as described with respect to FIG. 38, FIG. 39 and/or FIG. 40) and/or a CHO procedure (e.g., such as described with respect to FIG. 41 and/or FIG. 42), by comprising a Layer 1 or layer 2 candidate PCell configuration message (e.g., a newly defined candidates-L1L2-Config IE) in RRC reconfiguration message of the source gNB. The Layer 1 or layer 2 candidate PCell configuration message may comprise a list of candidate target PCells, each candidate target PCell being associated with dedicated RACH resources for the RA procedure in case a Layer 1 or layer 2 signaling based HO is trigged by a Layer 1 or layer 2 signaling and executed to the candidate target PCell, etc. There may be multiple options for parameter configurations of a candidate target PCell.

As a first option for the parameter configuration, for each candidate target PCell, the RRC reconfiguration message of the source gNB may comprise a (capsuled) RRC reconfiguration message (e.g., RRCReconfiguration), of a candidate target base station (e.g., gNB), received by the source base station from a candidate target base station via X2/Xn interface. The (capsuled) RRC reconfiguration message, of the candidate target gNB, may reuse the same signaling structure of the RRC reconfiguration message of the source base station, such as described with respect to FIG. 39 and/or FIG. 40.

As a second option for the parameter configuration, for each candidate target PCell, the RRC reconfiguration message of the source base station (e.g., gNB) may comprise a (capsuled) cell group configuration message (e.g., CellGroupConfig), of a candidate target base station, received by the source base station from a candidate target gNB via X2/Xn interface. The (capsuled) cell group configuration message, of the candidate target gNB, may reuse the same signaling structure of the cell group configuration message of the source gNB, such as described with respect to FIG. 39 and/or FIG. 40. The second option may reduce signaling overhead of the parameter configuration of a candidate target PCell compared with the first option.

As a third option for the parameter configuration, for each candidate target PCell, the RRC reconfiguration message of the source base station (e.g., gNB) may comprise a (capsuled) SpCell configuration message (e.g., SpCellConfig), of a candidate target base station, received by the source base station from a candidate target base station via X2/Xn interface. The (capsuled) SpCell configuration message, of the candidate target base station, may reuse the same signaling structure of the SpCell configuration message of the source base station, such as described with respect to FIG. 39 and/or FIG. 40. The third option may reduce signaling overhead of the parameter configuration of a candidate target PCell compared with the second option.

For a candidate target PCell (e.g., each candidate target PCell), the source base station may indicate cell common and/or wireless-device-specific parameters (e.g., SSBs/CSI-RSs, BWPs, RACH resources, PDCCH/PDSCH/PUCCH/PUSCH resources etc.). The wireless device, according to the received RRC reconfiguration messages comprising parameters of a Layer 1 or layer 2 signaling based HO procedure, may perform Layer 1 or layer 2 measurement report (CSI/beam) for the list of candidate target PCells and/or the current PCell. The layer 1 or layer 2 measurement report may comprise layer 1 RSRP, layer 1 RSRQ, PMI, RI, layer 1 SINR, CQI, etc. The layer 1 or layer 2 measurement report may be transmitted with a periodicity configured by the source gNB. The layer 1 or layer 2 measurement report may be triggered when the measurement of the CSI/beam of a candidate target PCell is greater than a threshold, or (amount of offset) greater than the current PCell, etc.

The base station may perform an inter-cell beam management (ICBM) procedure before transmitting a Layer 1 or layer 2 signaling triggering the HO procedure comprising switching PCell from the source base station (e.g., gNB) to a target base station. The ICBM procedure may allow the base station and the wireless device to use resources (time/frequency/spatial) of the target base station (or a PCell/SCell of the target base station) without executing HO procedure to the target base station, therefore reducing frequently executing the HO procedure. The ICBM procedure may allow the base station and the wireless device to synchronize time/frequency/beam to a target PCell of the target base station before executing the HO, which may reduce HO latency. The ICBM may be implemented such as described herein with respect to FIG. 44.

The source gNB may transmit to the wireless device a first DCI/MAC CE configuring/indicating a first candidate target cell (e.g., Cell 1) of the candidate target cells (PCells/SCells) as a neighbor or non-serving cell, in addition to the current PCell (e.g., Cell 0), for the wireless device, for example, based on (e.g., in response to) the ICBM procedure being configured. The base station may select the first candidate target cell from the candidate target cells, based on layer 1 or layer 2 measurement report from the wireless device.

The first DCI/MAC CE (e.g., activating TCI states) may indicate that a reference RS (e.g., SSB/CSI-RS) associated with a first TCI state is from the first candidate target cell (Cell 1) (e.g., by associating the reference RS with an additional PCI, of Celli, different from a PCI of the Cell 0), in addition to a reference RS associated with a second TCI state being from the current PCell (Cell 0). Association between a reference signal and a TCI state may be implemented based on example embodiments described above with respect to FIG. 37B. Activating, by a DCI/MAC CE, a TCI state with a RS of a neighbor (non-serving) cell as a reference RS, may allow the base station to use a beam of the neighbor cell to transmit downlink signals/channels or to receive uplink signals/channels, and/or use a beam of the current cell for the transmissions/receptions, without performing HO to the neighbor cell for the transmissions/receptions.

The wireless device may apply the first TCI state and the second TCI state for downlink reception and/or uplink transmission, for example, based on (e.g., in response to) receiving the first DCI/MAC CE. Applying the first TCI state and the second TCI state for downlink reception may comprise: receiving (from Cell 1) PDCCH/PDSCH/CSI-RS with a reception beam/filter same as that for receiving the reference signal, transmitted from Cell 1, according to (or associated with) the first TCI state, and receiving (from cell 0) PDCCH/PDSCH/CSI-RS with a reception beam/filter same as that for receiving the reference signal, transmitted from Cell 0, according to (or associated with) the second TCI state. Applying the first TCI state and the second TCI state for uplink transmission may comprise: transmitting (via Cell 1) PUCCH/PUSCH/SRS with a transmission beam/filter same as that for receiving the reference signal, transmitted from Cell 1, according to (or associated with) the first TCI state, and transmitting (via cell 0) PUCCH/PUSCH/SRS with a transmission beam/filter same as that for receiving the reference signal, transmitted from Cell 0, according to (or associated with) the second TCI state.

The base station may skip performing the ICBM procedure before transmitting the Layer 1 or layer 2 signaling triggering the HO procedure. The base station may skip performing the ICBM procedure, for example, when beamforming is not used in the target PCell, if there is no good SSB(s) from the target PCell, if there is no available radio resources from the target PCell to accommodate the wireless device, and/or when the wireless device does not support ICBM and/or when the base station does not support ICBM.

The source base station may determine to handover the wireless device from the source base station (Cell 0) to the target base station (Cell 1). The source base station may determine the handover based on a load/traffic condition, a CSI/beam report of the target gNB, a location/trajectory of the wireless device, a network energy saving strategy (e.g., the source base station determines to turn of the Cell 0 and/or one or more SCells for power saving), etc.

The source base station may transmit a second DCI/MAC CE indicating a PCell changing from the current PCell (Cell 0) to a new cell (e.g., Cell 1). The new cell may be one of the neighbor (non-serving) cells used in the ICBM procedure (e.g., indicated by the first DCI/MAC CE). The new cell may be cell 1 in the example of FIG. 43. When the ICBM procedure is supported and/or configured, the wireless device, for example, before executing HO procedure indicated by the source base station, has already synchronized with the target base station regarding which beam should be used for transmission/reception via the target base station, which is different from layer 3 signaling based (C)HO (as shown in FIG. 38 and/or FIG. 41) where the wireless device needs to synchronize to the target base station upon executing the HO/CHO and then obtains an indication of a new beam to be used for the target gNB.

The new cell may be one of a plurality of neighbor (non-serving) cells comprised in L1 beam/CSI report, e.g., with the best measurement report, with the distance closest to the wireless device, etc., when the ICBM procedure is not configured/supported/indicated/activated for the new cell. The wireless device may change the PCell from cell 0 to cell 1, for example, based on (e.g., in response to) receiving the second DCI/MAC CE. The wireless device may apply the (stored/received) RRC parameters (comprised in RRCReconfiguration, CellGroupConfig, and/or SpCellConfig IE) of the target PCell (cell 1) as the current PCell.

The wireless device may skip downlink (time/frequency/beam) synchronization (e.g., monitoring MIB/SSB/SIBs and/or selecting a SSB as a reference for downlink reception and/or uplink transmission) in case the wireless device has already synchronized with the target PCell based on the ICBM procedure, for example, if the ICBM is configured/supported/indicated/activated before receiving the second DCI/MAC CE. The wireless device may skip performing RA procedure towards the target PCell before transmitting to and/or receiving from the target PCell, for example, when the target PCell is close to the source PCell, or the uplink TA is same or similar for the source PCell and the target PCell, or the dedicated RACH resource is not configured in the RRC reconfiguration message of the target PCell. The wireless device may perform downlink synchronization (SSB/PBCH/SIBs monitoring) and/or uplink synchronization (RA procedure) for the layer 1 or layer 2 signaling based HO (e.g., when ICBM is not configured/indicated/supported/activated) as it does for layer 3 signaling based HO/CHO such as described with respect to FIG. 38, FIG. 39, FIG. 40, FIG. 41 and/or FIG. 42.

Figure 44:
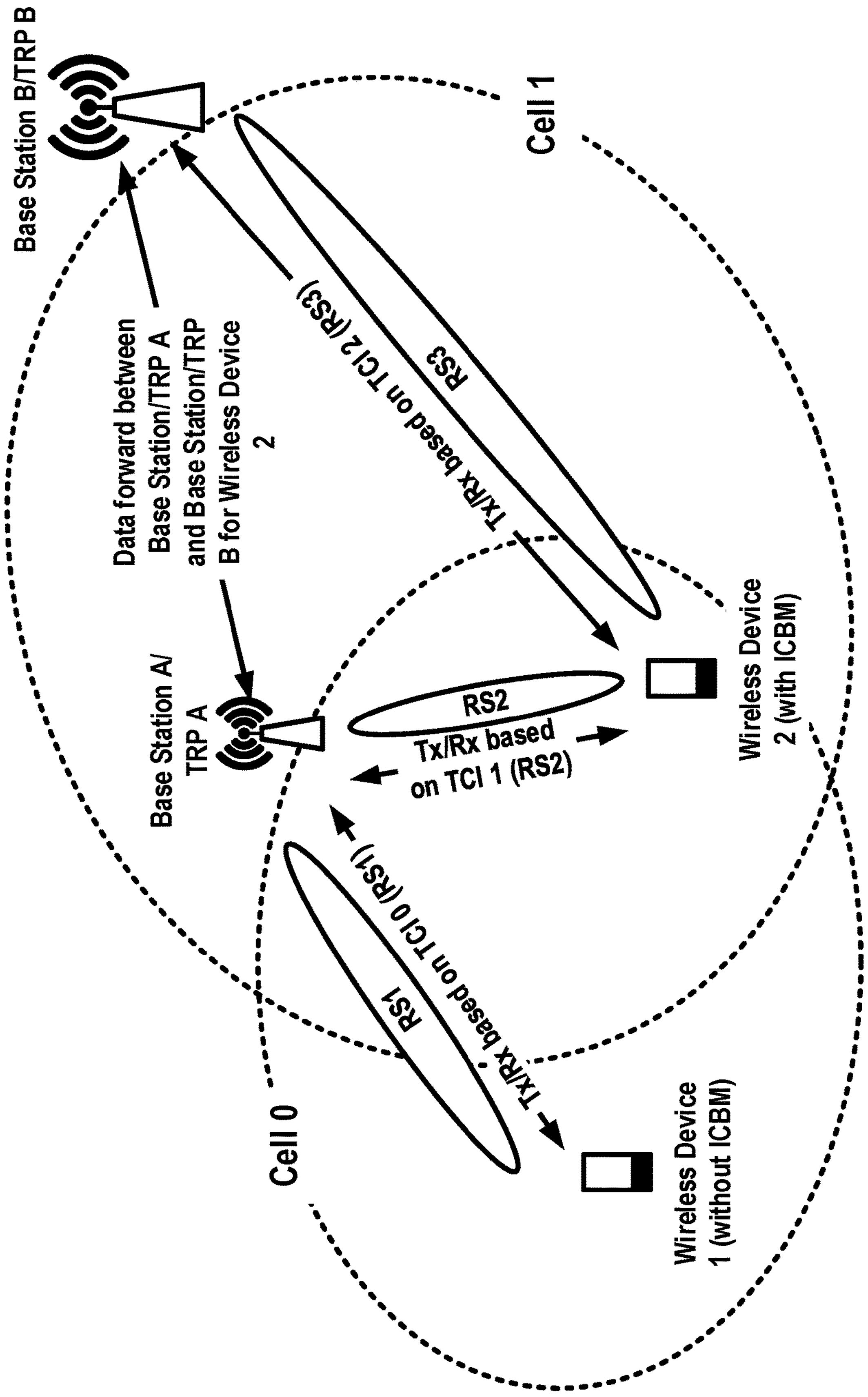
FIG. 44 shows an example of inter-cell beam management.

FIG. 44 shows an example of inter-cell beam management. FIG. 44 shows an example of an ICBM procedure. A first wireless device (wireless device 1) may be in the coverage of Cell 0 deployed under a first node (e.g., base station A or TRP A). wireless device 1 is not in the coverage of Cell 1 deployed under a second node (e.g., base station B or TRP B). Cell 0 and Cell 1 have different PCIs. Wireless device 1 may use the RSs (e.g., RS1) transmitted from Cell 0 as a reference RS for a TCI state (which is used for beam/spatial domain filter determination for downlink reception and/or uplink transmission (Tx/Rx based TCI state 0 associated with RS1)). Wireless device 1 may not use RSs (e.g., RS2 and/or RS3) transmitted from Cell 1 as the reference RS for the TCI state. Wireless device 1 configured with a TCI state, associated with a RS of a serving cell with a first PCI and not associated with a RS of another cell with a second PCI different from the first PCI, may be referred to as a wireless device (e.g., UE) without (configured/activated) ICBM herein.

A second wireless device (wireless device 2) may be in the coverage of Cell 0 deployed under a first node (e.g., base station A or TRP A). Wireless device 2 is also in the coverage of Cell 1 deployed under a second node (e.g., base station B or TRP B). Cell 0 and Cell 1 have different PCIs. Wireless device 2 may use the RSs (e.g., RS2) transmitted from Cell 0 as a reference RS for a first TCI state (which is used for beam/spatial domain filter determination for downlink reception and/or uplink transmission via Cell 0 (Tx/Rx based TCI state 1 associated with RS2)). Wireless device 2 may use RSs (e.g., RS3) transmitted from Cell 1 as the reference RS for a second TCI state (which is used for beam/spatial domain filter determination for downlink reception and/or uplink transmission via Cell 1 (Tx/Rx based TCI state 2 associated with RS3)). Wireless device 2 configured with a first TCI state, associated with a RS of a serving cell with a first PCI and also configured with a second TCI state associated with a RS of another cell with a second PCI different from the first PCI, may be referred to as a wireless device (e.g., UE) with (configured/activated) ICBM herein.

For example, if base station B or TRP B receives uplink signals/channels with the second TCI state, it may forward the uplink signals/channels to base station A or TRPA for processing. A base station such as base station A or TRP A may forward downlink signals/channels to base station B or TRP B to transmit with the second TCI state to the wireless device. Cell 1 with the second PCI different from the first PCI of Cell 0 may be considered/configured as a part (e.g., a second TRP with a second PCI different from a first PCI of a first TRP) of cell 0 for wireless device 2, for example, such as described with respect to FIG. 37B. The PDCCH/PDSCH/PUCCH/PUSCH resources may be shared between Cell 1 and Cell 0 in a way that is transparent to wireless device 2. SSBs/CSI-RSs of Cell 0 may not share the same resources with SSBs/CSI-RSs of Cell 1. SSBs/CSI-RSs of Cell 0 may have configuration parameters (e.g., number of beams, periodicity, transmission power, etc.) different than configuration parameters of SSBs/CSI-RSs of Cell 1.

Cell 1 with the second PCI different from the first PCI of Cell 0 may be considered/configured as a separate cell different from cell 0 for wireless device 2, for example, when Cell 1 is configured as a candidate target cell such as described with respect to FIG. 39 and/or FIG. 42. Cell resources (SSB/CSI-RS/PDCCH/PDSCH/PUCCH/PUSCH) may not be shared between Cell 1 and Cell 0. Cell 1 has configuration parameters, of the cell resources, different from (or independent of) configuration parameters of the cell resources of Cell 0.

As described herein, a base station may perform network energy saving operation when carrier aggregation (CA) is supported. In CA operation, a wireless device may be configured with a set of secondary cells (SCell) in addition to a primary cell (PCell). In at least some technologies, PCell/SCell configurations may be wireless-device-specific configured. A CC configured as a PCell for a wireless device may be (separately and/or independently) configured as a SCell for another wireless device. From network power consumption perspective, it may be beneficial to turn off some CCs and keep a common CC serving as PCell for UEs in RRC_CONNECTED state when the cell load is low. To achieve this goal, a base station may request the wireless device to perform PCell switch when the ongoing CC serving as PCell is not the common CC serving as PCell for the purpose of network power savings. A PCell switch may be achieved by L3-based HO/CHO (such as described with respect to FIG. 38 and/or FIG. 40), for example, based on (e.g., after) witching to a new PCell, the gNB may deactivate the old PCell or send/transition it to a dormant state. In at least some technologies. The RRC reconfiguration may not be fast enough to react to dynamic arrival load. To improve network energy saving, dynamic PCell switching based on wireless-device-specific DCI or group common DCI may be performed, such as described herein.

Figure 45:
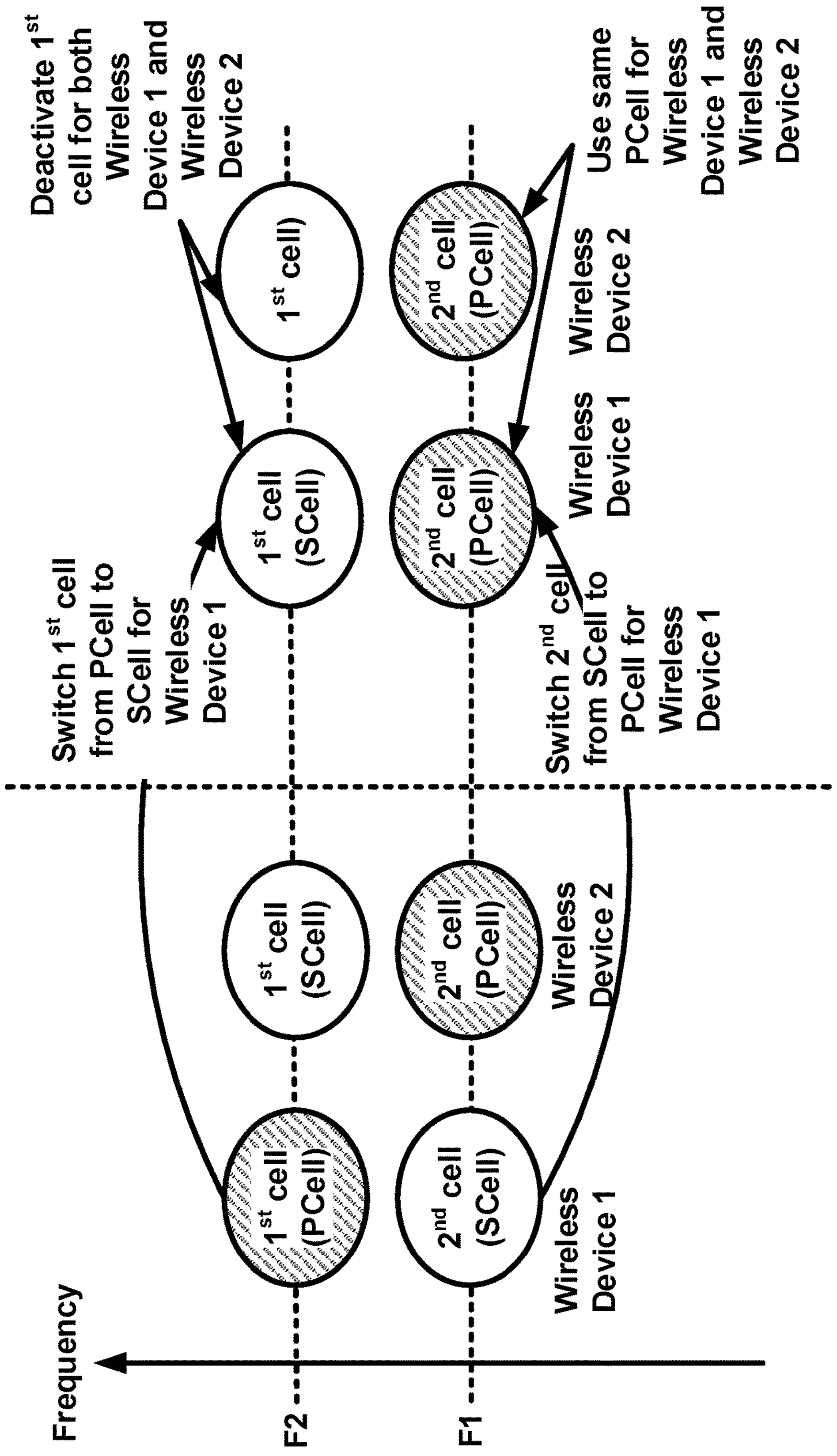
FIG. 45 shows an example of PCell switching for network energy saving

FIG. 45 shows an example of PCell switching for network energy saving. FIG. 45 shows an example of dynamic PCell switching for network energy saving. In an example, a first wireless device (e.g., wireless device 1) may be configured with a plurality of cells comprising a PCell (e.g., first cell located in frequency point F2) and a SCell (e.g., second cell located in frequency point F1). A second wireless device (e.g., wireless device 2) may be configured with a plurality of cells comprising a PCell (e.g., second cell located in frequency point F1) and a SCell (e.g., first cell located in frequency point F2). The PCell of wireless device 1 may be served/configured as a SCell for wireless device 2. The PCell of wireless device 2 may be served/configured as a SCell for wireless device 1.

A PCell may be a cell where the base station may transmit NAS related information (e.g., mobility) and/or security related information to a wireless device. The PCell may be a cell where the base station may maintain a RRC connection with the wireless device. Via the PCell (instead of a SCell), the wireless device performs an initial (RRC) connection establishment procedure or initiates a (RRC) connection re-establishment procedure.

In a non-energy-saving state, the base station may use first cell as PCell and/or use second cell as SCell to communicate with wireless device 1. In the non-energy-saving state, the base station may use second cell as PCell and/or use first cell as SCell to communicate with wireless device 2. Using different PCells to serve different wireless devices may balance signaling overhead for different cells.

To achieve dynamic PCell switching for network energy saving, the base station may transmit a L1 signaling (e.g., a group common DCI or a wireless-device-specific DCI) indicating a PCell switching for wireless device 1 and/or other wireless devices (e.g., .UEs). The L1 signaling may indicate to wireless device 1 that PCell is switched from first cell to second cell for wireless device 1 and/or SCell is switched from second cell to first cell. In response to receiving the L1 signaling, wireless device 1 may switch the PCell and the SCell. Wireless device 1 and wireless device 2 now may be served with the same cell (e.g., second cell) as the PCell, for example, based on (e.g., after) switching the PCell and the SCell. The same PCell for wireless device 1 and wireless device 2 may be referred to as a group common PCell. Based on wireless device 1 and wireless device 2 being served with the same PCell, the base station may deactivate (transition to dormancy or turn off) first cell without connection lost with wireless device 1 and wireless device 2.

For enabling the network energy saving, the base station may use a group common DCI indicating, for a plurality of wireless devices, a PCell changing/switching to a common PCell, for example, if the base station is medium or heavily loaded (e.g., with more than 5 or 10 wireless devices connected to the base station). For enabling the network energy saving, the base station may use the UE-specific DCI/MAC CE (to each wireless device) indicating a PCell changing/switching, for example, such as described with respect to FIG. 43, (e.g., if the current PCell of each wireless device is not a common PCell of the base station), for example, if the base station is light loaded (e.g., with one or two wireless devices connected to the base station).

Dynamic PCell switching may allow the base station to turn off some cells without RRC connection lost with wireless devices. In at least some technologies, a base station may configure, for a wireless device, RRC configuration parameters (SSBs, RACH resources, MAC parameters, PHY cell common and/or UE-specific parameters, as shown in FIG. 39, FIG. 40 and/or FIG. 42) of a target PCell for performing (C)HO to the target PCell from a source PCell. When performing the (C)HO to the target PCell, the wireless device may use the received/stored RRC configuration parameters. The wireless device may start to perform downlink synchronization towards the target PCell (e.g., time/frequency alignment by monitoring the SSBs configured on the target PCell, e.g., according to 3GPP TS 38.213 Section 4—Synchronization procedures). The wireless device may start to perform uplink synchronization, for example, by initiating a (CF)RA procedure based on the RACH resources configured on the target PCell, for example, based on (e.g., after) the downlink synchronization is complete. The wireless device may receive a timing advance command in a RAR corresponding to a preamble transmitted by the wireless device.

In at least some technologies, for transmitting a preamble for the CFRA procedure, when multiple beams are used for SSB transmissions (e.g., such as described with respect to FIG. 35 and/or FIG. 36) by the base station, the wireless device may select, based on a RSRP value of a first SSB being greater than a RSRP threshold, the first SSB from a plurality of candidate SSBs configured in the RACH resources (e.g., such as described with respect to FIG. 40) on the target PCell. The wireless device may determine the preamble with a preamble index associated with the selected first SSB according to RACH resource configuration parameters. The wireless device may determine a next available PRACH occasion from PRACH occasions corresponding to the selected first SSB permitted by the restrictions given by the ra-ssb-OccasionMaskIndex configured in the rach-ConfigDedicated IE (e.g., such as described with respect to FIG. 40, for example, based on (e.g., after) selecting the first SSB. The wireless device may transmit the preamble via the determined PRACH occasion to the target PCell. The wireless device may monitor a PDCCH of the target PCell for receiving a RAR corresponding to the preamble. The wireless device may receive the RAR comprising the preamble index and/or a TA command. The wireless device may complete the CFRA procedure. The CFRA procedure may be implemented such as described with respect to FIG. 13B. The wireless device may receive, from the target PCell, a beam indication (or a TCI state indication) used for PDCCH/PDSCH/CSI-RS reception and/or PUCCH/PUSCH/SRS transmission for the target PCell, for example, based on (e.g., after) completing the CFRA procedure. The wireless device may apply the beam (or the TCI state) for PDCCH/PDSCH/CSI-RS reception and/or PUCCH/PUSCH/SRS transmission for the target PCell. In at least some technologies, the wireless device may perform downlink synchronization and uplink synchronization, beam alignment/management via a target PCell, for example, based on (e.g., after) receiving a HO command (e.g., RRC reconfiguration with a ReconfigurationWithSync IE). Performing downlink synchronization, uplink synchronization and/or beam alignment may be time consuming.

Figure 46A:
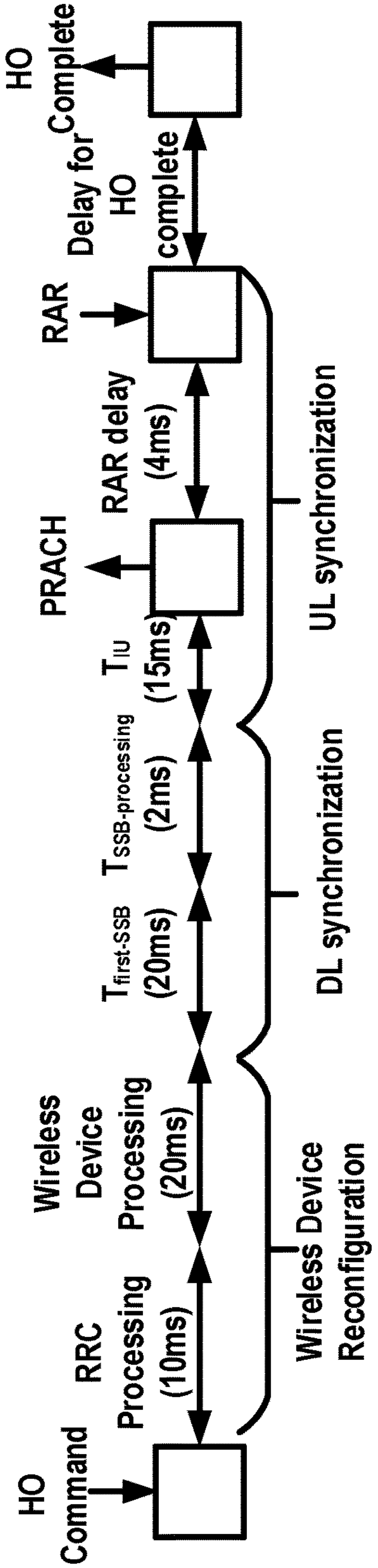
FIG. 46A and FIG. 46B show examples of timelines of PCell switching.
Figure 46B:
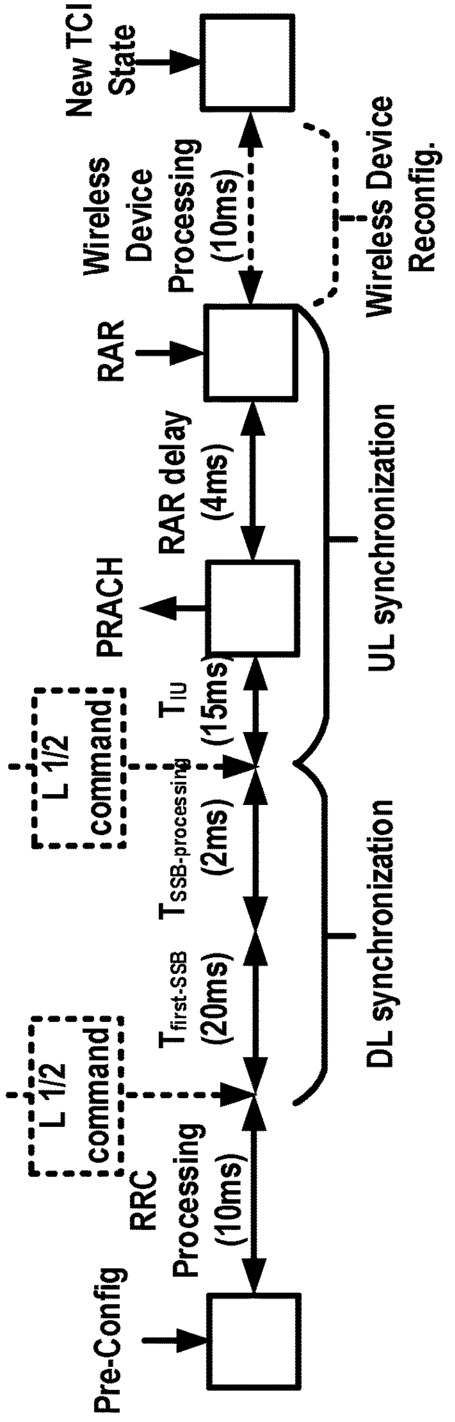

FIG. 46A and FIG. 46B show examples of timelines of PCell switching. FIG. 46A shows an example of timeline of layer 3 based HO procedure. The wireless device may spend around 10 ms for RRC message processing (PDCCH/PDSCH decoding, ACK/NACK feedback etc.) and then spend 20 ms for wireless device processing (e.g., loading RRC/MAC/PHY related parameters to memory unit of the wireless device, etc.), for example, if a wireless device receives a HO command (e.g., a RRC reconfiguration message such as described with respect to FIG. 38, FIG. 39 and/or FIG. 40). This process of RRC message processing and wireless device processing may be referred to as wireless device reconfiguration. Then the wireless device may spend more than 20 ms for searching for a first SSB (Tfirst-SSB) and may need additional 2 ms for processing the SSB (TSSB-processing). The SSB searching and processing may be referred to as downlink (DL) synchronization. The wireless device may spend around 20 ms for uplink (UL) synchronization comprising a first time period of an interruption uncertainty (TIU) in acquiring a first available PRACH occasion for a preamble transmission in the target cell, a second time period used for PRACH transmission, a third time period (4 ms in FIG. 46A) for monitoring PDCCH for receiving a RAR corresponding to the preamble transmission, and/or receiving/decoding the RAR. TIU (15 ms in FIG. 46A) can be up to the summation of SSB to PRACH occasion association period and 10 ms. There may be additional time period for processing and coding a RRC message for a HO complete indication. The HO procedure may increase PCell switching latency.

FIG. 46B shows an example of timeline of a layer 1 or layer 2 triggered HO procedure for mobility management and/or network energy saving. The wireless device may receive a RRC reconfiguration message, for example, before a wireless device receives a HO command (e.g., a Layer 1 or layer 2 command such as described with respect to FIG. 43 and/or FIG. 45). The wireless device may spend 10 ms for RRC processing.

The base station may transmit a layer 1 or layer 2 command indicating a PCell switching, for example, such as described with respect to FIG. 43 (e.g., without ICBM configured/activated), for example, based on (e.g., after) transmitting the RRC reconfiguration message. The wireless device may perform DL synchronization and/or UL synchronization, for example, based on (e.g., in response to) receiving the layer 1 or layer 2 command indicating the PCell switching. The wireless device may receive a TCI state indication of the new PCell for PDCCH/PDSCH reception and/or PUCCH/PUSCH transmission via the new PCell, for example, after completing the DL/UL synchronization. The wireless device may conduct wireless device reconfiguration after completing the DL/UL synchronization. The wireless device reconfiguration may be conducted upon receiving the RRC reconfiguration message, rather than after completing the DL/UL synchronization, for example, if the wireless device supports the UE reconfiguration after receiving the RRC reconfiguration message. The latency for HO to the new PCell may comprise DL synchronization, UL synchronization, and TCI state indication and/or application.

A cell switching command may be used to indicate PCell switching for the wireless device. Before the cell switching command is sent/received, an early time alignment (TA) acquisition may be performed. For example, a preamble may be sent to a target cell to acquire an early time alignment prior to PCell switching. In at least some wireless technologies, a wireless device may transmit a preamble to a target PCell for early time alignment acquisition, for example, before receiving a cell switching command indicating PCell switching to the target PCell. In at least some wireless technologies, since none of the UL BWPs of the target PCell may be activated before receiving a cell switching command, it may be unclear which UL BWP the wireless device should use for the preamble transmission. In at least some wireless technologies, for example, different from PDCCH order-based preamble transmission via an SCell, a wireless device may transmit a preamble via a candidate cell which is inter-frequency deployed with a serving cell. In at least some wireless technologies, transmitting the preamble without considering the frequency retuning gap according to the legacy PDCCH order may result in failure of the transmission.

The wireless device may transmit the preamble via an UL BWP of the target PCell, which may be determined by indications configured by an RRC message (e.g., firstActiveUplinkBWP-id and/or initialUplinkBWP). The wireless device may transmit the preamble via an UL BWP ID (dedicated to early time alignment switching) of the target PCell, wherein the UL BWP is not yet activated, for example before receiving a MAC CE indicating cell switching. The wireless device may transmit the preamble via an UL BWP of the target PCell, which may be indicated in a PDCCH order, wherein the UL BWP is in a deactivated state. The wireless device may transmit the preamble via an active UL BWP of the source cell, or via an active BWP of an active SCell on which the wireless device receives the PDCCH order, for example, if the source PCell is intra-frequency deployed with the target PCell. The wireless device may transmit the preamble via a frequency resource, of the target PCell, according to a frequency reference point indicated by an RRC message for a layer 1 and/or layer 2 triggered mobility (LTM) procedure, wherein the frequency resource is different from firstActiveUplinkBWP-id and/or initialUplinkBWP. Improvements described herein may provide for faster cell switching, improved efficiency, decreased latency, etc.

Figure 47:
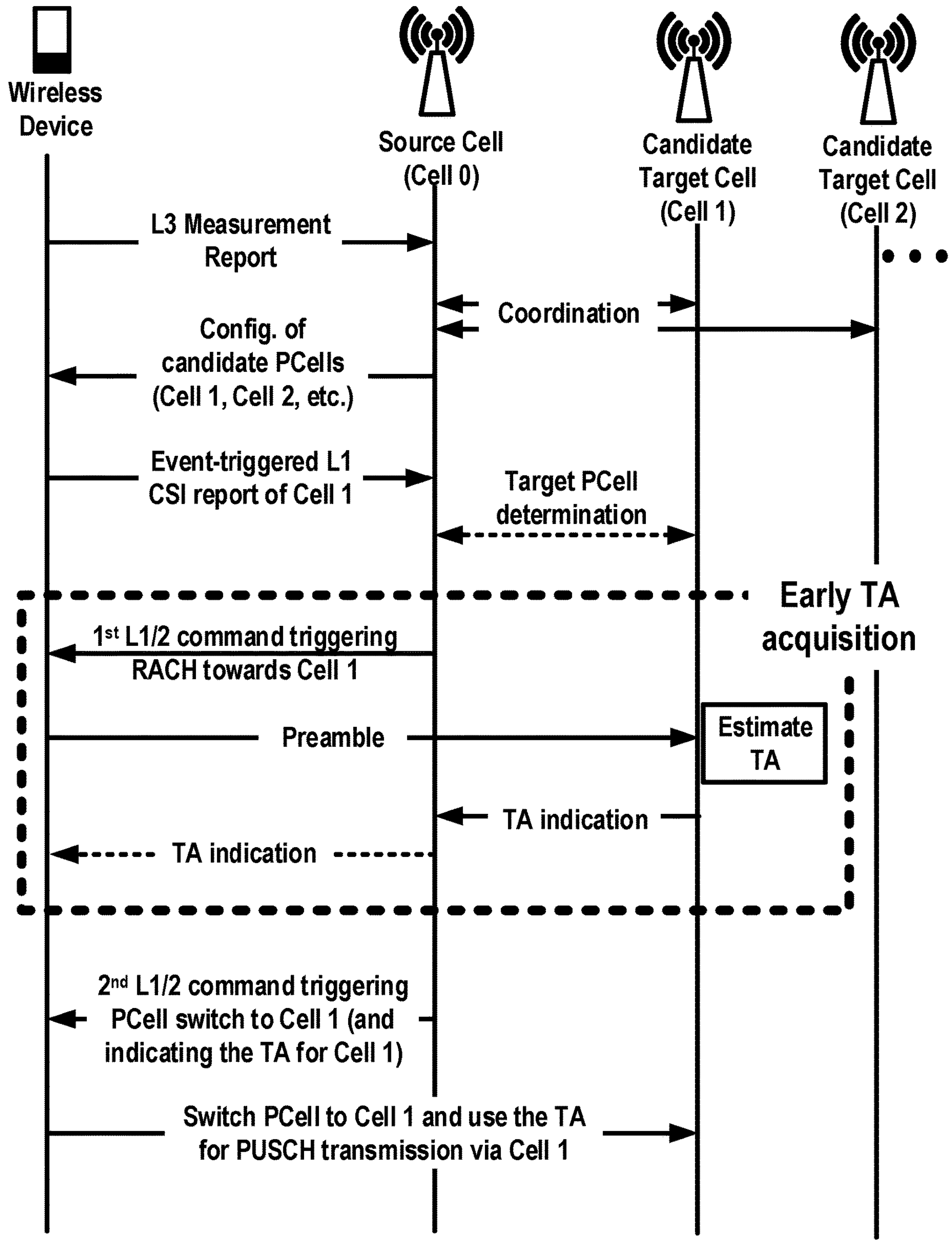
FIG. 47 shows an example of PCell switching/changing.

The transmission of the preamble may be determined based on consideration of frequency retuning between frequencies of the source PCell and the target PCell. The transmission timing of the preamble may be determined based on a physical uplink shared channel (PUSCH) preparation time according to a wireless device processing capability. The transmission timing of the preamble may be determined based on an uplink BWP switching delay. The transmission timing of the preamble may be determined based on an uplink transmission switching delay. Improvements described herein may provide for successful preamble transmissions, fast cell switching, etc. FIG. 47 shows an example of PCell switching/changing. FIG. 47 shows an example of dynamic PCell switching. A wireless device may receive, and/or a base station may transmit, one or more RRC messages (e.g., first RRC message) comprising configuration parameters (e.g., indication in FIG. 47) indicting a PCell (first cell in a cell group) and candidate cells (e.g., second cells) for PCell switching.

The wireless device may perform UL synchronization by conducting RACH procedure, for example, based on (e.g., after) receiving the cell switching command (e.g., such as described with respect to FIG. 13A, FIG. 13B and/or FIG. 13C). The performing UL synchronization may comprise (e.g., such as described with respect to FIG. 46A and/or FIG. 46B), transmitting a preamble via an active uplink BWP (e.g., a BWP configured as firstActiveUplinkBWP-id such as described with respect to FIG. 39) of uplink BWPs of the target PCell, monitoring PDCCH on an active downlink BWP (e.g., a BWP configured as firstActiveDownlinkBWP-id such as described with respect to FIG. 39) of the target PCell for receiving a RAR comprising a TA which is used for PUSCH/PUCCH transmission via the target PCell, receiving the RAR, and/or obtaining the TA. The wireless device may activate the uplink BWP configured with firstActiveUplinkBWP-id and the downlink BWP configured with firstActiveDownlinkBWP-id on the target PCell upon performing HO to the target PCell. The wireless device may obtain the TA to be used for PUSCH/PUCCH transmission via the target PCell, for example, based on (e.g., after) completing the UL synchronization. The wireless device, for example, may use the TA to adjust uplink transmission timing and transmit PUSCH/PUCCH via the target PCell based on the adjusted timing. The adjusting uplink transmission timing may comprise advancing or delaying the transmissions by an amount indicated by a value of the TA, for example, to ensure the uplink signals received at the target PCell are aligned (in time domain) with uplink signals transmitted from other wireless devices.

To further reduce HO latency, especially the latency introduced for uplink synchronization, an early time alignment acquisition scheme may be used. FIG. 47 shows an example of early time alignment acquisition (or ETA)-based HO procedure. Early time alignment acquisition may be referred to as early uplink synchronization in this specification. A network (e.g., a base station, a source base station, a source gNB) may configure a wireless device to perform measurement reporting (possibly including the configuration of measurement gaps) for a plurality of neighbor cells (e.g., Cell 1 from a candidate target base station 1, Cell 2 from a candidate target base station 2, etc.). The measurement reporting may be a layer 3 reporting, different from layer 1 CSI reporting. The wireless device may transmit one or more measurement reports to the source base station (or source PCell, Cell 0 in FIG. 47).

The source base station (e.g., gNB) may provide the target base station with a list of best cells on each frequency for which measurement information is available, for example, in order of decreasing RSRP, for example, based on the one or more measurement reports from the wireless device. The source base station may also include available measurement information for the cells provided in the list. The target base station may decide which cells are configured for use (as a target PCell, and/or one or more SCells) after HO, which may include cells other than the ones indicated by the source base station.

The source base station (e.g., gNB) may transmit a HO request to the target base station. The target base station may respond with a HO message. In the HO message, the target base station may indicate access stratum configuration (e.g., RRC configurations of the target cells) to be used in the target cell(s) for the wireless device. The source base station may transparently (e.g., by not altering values/content) forward the HO (e.g., contained in RRC reconfiguration messages of the target base station, cell group configuration IE of the target base station, and/or SpCell configuration IE of a target PCell/SCells of the target base station) message/information received from the target gNB to the wireless device.

The source base station (e.g., gNB) may configure a layer for layer 2 signaling based HO (PCell switching/changing, mobility, etc.) procedure different from a normal HO procedure (e.g., such as described with respect to FIG. 38, FIG. 39 and/or FIG. 40) and/or a CHO procedure (e.g., such as described with respect to FIG. 41 and/or FIG. 42), by comprising a layer 1 or layer 2 candidate PCell configuration message (e.g., a newly defined candidates-L1L2-Config IE) in RRC reconfiguration message of the source base station. The candidates-L1L2-Config IE may be implemented based on examples of FIG. 49A, FIG. 49B, FIG. 49C and/or FIG. 49D which will be described later. The layer 1 or layer 2 candidate PCell configuration message may comprise a list of candidate target PCells, wherein a candidate target PCell (e.g., each candidate target PCell) being associated with dedicated RACH resources for the RA procedure in case a layer 1 or layer 2 signaling based HO is trigged by a layer 1 or layer 2 signaling and executed to the candidate target PCell, etc. There may be multiple options for parameter configurations of a candidate target PCell.

As a first option for the parameter configuration, for a candidate target PCell (e.g., for each candidate target PCell), the RRC reconfiguration message of the source base station (e.g., gNB) may comprise a (capsuled) RRC reconfiguration message (e.g., RRCReconfiguration), of a candidate target base station, received by the source base station from a candidate target base station via X2/Xn interface. The (capsuled) RRC reconfiguration message, of the candidate target base station, may reuse the same signaling structure of the RRC reconfiguration message of the source base station, for example, such as described with respect to FIG. 39 and/or FIG. 40.

For a candidate target PCell (e.g., each candidate target PCell), the RRC reconfiguration message of the source base station (e.g., gNB) may comprise a (capsuled) cell group configuration message (e.g., CellGroupConfig), of a candidate target base station, received by the source base station from a candidate target base station via X2/Xn interface, for example, as a second option for the parameter configuration. The (capsuled) cell group configuration message, of the candidate target base station, may reuse the same signaling structure of the cell group configuration message of the source base station (e.g., such as described with respect to FIG. 39 and/or FIG. 40). The second option may reduce signaling overhead of the parameter configuration of a candidate target PCell compared with the first option.

For a candidate target PCell (e.g., each candidate target PCell), the RRC reconfiguration message of the source base station (e.g., gNB) may comprise a (capsuled) SpCell configuration message (e.g., SpCellConfig), of a candidate target base station, received by the source base station from a candidate target base station via X2/Xn interface, for example, as a third option for the parameter configuration. The (capsuled) SpCell configuration message, of the candidate target base station, may reuse the same signaling structure of the SpCell configuration message of the source base station, for example, such as described with respect to FIG. 39 and/or FIG. 40. The third option may reduce signaling overhead of the parameter configuration of a candidate target PCell compared with the second option. For a candidate target PCell (e.g., each candidate target PCell), the source base station may indicate cell common and/or wireless device specific parameters (e.g., SSBs/CSI-RSs, BWPs, RACH resources, PDCCH/PDSCH/PUCCH/PUSCH resources etc.).

The wireless device, for example, according to the received RRC reconfiguration messages comprising parameters of a layer 1 or layer 2 signaling based HO procedure, may perform layer 1 or layer 2 measurement report (CSI/beam) for the list of candidate target PCells and/or the current PCell. The layer 1 or layer 2 measurement report may comprise layer 1 RSRP, layer 1 RSRQ, PMI, RI, layer 1 SINR, CQI, etc.

The layer 1 or layer 2 measurement report may be triggered when the measurement of the CSI/beam of a candidate target PCell is greater than a threshold, or (amount of offset) greater than the current PCell, etc. The layer 1 or layer 2 measurement report may be transmitted with a periodicity configured by the source base station. The layer 1 or layer 2 measurement report may be contained in a UCI via PUCCH/PUSCH, or a MAC CE (e.g., event-triggered, associated with a configured SR for the transmission of the MAC CE).

The wireless device may determine that Cell 1 has better channel quality than Cell 0. The wireless device may transmit the layer 1 or layer 2 measurement report indicating that Cell 1 has better channel quality than Cell 0. The source base station and/or the target base station may determine which cell is used as the target PCell. The source base station, upon receiving the layer 1 or layer 2 measurement report, may coordinate with the candidate target base station regarding whether Cell 1 could be used as a target PCell for future HO.

The source base station (e.g., according to the request of the target base station if there is no time alignment obtained before for Cell 1), may transmit, from Cell 0 (or an activated SCell of the wireless device) a first layer 1 or layer 2 (1st L1/2) command (e.g., a DCI/MAC CE/RRC message) triggering a preamble transmission (RACH, or other uplink signals like SRS) towards Cell 1, for example, if determining Cell 1 should be used as the target PCell for other HO. The DCI may be based on a PDCCH order in at least some wireless technologies.

The wireless device may transmit the preamble (or SRS which is not shown in FIG. 47) to the target PCell (Cell 1), for example, based on receiving the first layer 1 or layer 2 command. The target base station may monitor a PRACH occasion for receiving the preamble to estimate the TA used for future uplink transmission from the wireless device, for example, based on (e.g., after) the wireless device switches the PCell from Cell 0 to Cell 1. The target base station may forward the estimated TA for Cell 1 to the source base station.

The source base station may transmit the forwarded TA to the wireless device, for example, via a RAR message, or via a TAC MA CE. In this case, the wireless device may monitor PDCCH (on Cell 0) for receiving the RAR message in at least some wireless technologies (e.g., such as described with respect to FIG. 13A, FIG. 13B and/or FIG. 13C). The wireless device may maintain a TAT for a TAG associated with Cell 1. The wireless device may maintain Cell 1 as a non-serving cell. The TAC MAC CE may indicate (e.g., one or more bitfields of the MAC CE) whether the TAC is for a serving cell (or a TAG associated the serving cell) or for a non-serving cell (e.g., Cell 1).

The source base station may skip transmitting the forwarded TA to the wireless device. The source base station may indicate the TA together with a second layer 1 or layer 2 command indicating/triggering PCell switching from Cell 0 to Cell 1. In this case, the wireless device may skip monitoring PDCCH (on Cell 0) for receiving the RAR message.

The transmission of a preamble to a target PCell, for example, before receiving a (P)Cell switching command (with or without comprising a TA estimated by the target base station for the target PCell) indicating to switch the PCell to the target PCell, may be referred to as an early time alignment acquisition (ETA) procedure/process/feature/scheme in this specification. By implementing the ETA, for example, before the wireless device performs the HO, the target base station may obtain the TA to be used by the wireless device, for example, based on (e.g., after) performing the HO to the target PCell. The TA for the target PCell may be transmitted in a RAR or combined together with the layer 1 or layer 2 (L1 or L2) command indicating the PCell switching. Compared with the timelines shown in FIG. 46A and/or FIG. 46B, the wireless device may skip the RA procedure, for example, based on (e.g., after) receiving the L1 or L2 command indicating the PCell switching based on the TA for the target PCell already being obtained by the ETA procedure. The ETA procedure may reduce the latency for uplink synchronization with the target PCell upon performing HO procedure (or PCell switching procedure).

The wireless device may receive a second L1 or L2 command indicating the PCell switching from Cell 0 to Cell 1. The second L1 or L2 command may further indicate the TA (forwarded from the target base station to the source base station and used for the target PCell in future), for example, if the TA is not received before receiving the second L1 or L2 command. The wireless device may switch the PCell from Cell 0 to Cell 1 and transmit PUSCH/PUCCH via Cell 1 based on the TA, for example, based on (e.g., in response to) receiving the second L1 or L2 command. Switching the PCell from Cell 0 to Cell 1 may comprise at least one of: applying RRC configuration parameters of Cell 1, stopping applying RRC configuration parameters of Cell 0, resetting/reconfiguring MAC entity, receiving RRC messages/MIB/SSBs/SIBs/PDCCHs/PDSCHs from Cell 1, and/or stopping receiving RRC messages/MIB/SSBs/SIBs/PDCCHs/PDSCHs from Cell 0.

In at least some wireless technologies, a wireless device may activate an uplink BWP (e.g., with a BWP ID configured as firstActiveUplinkBWP-id) of a plurality of uplink BWPs of a target PCell in response to performing RRC reconfiguration (e.g., triggered by receiving RRC reconfiguration message comprising a ReconfigurationWithSync IE, or triggered by receiving a L1 or L2 cell switch command), for example, such as described with respect to FIG. 38, FIG. 46A and/or FIG. 46B. The L1 or L2 cell switch command may be (equivalently) referred to as a L1 or L2 PCell switching command, L1 or L2 handover command, L1 or L2 cell switching indication, etc., in this specification. The L1 or L2 cell switch command may be a DCI or a MAC CE. The wireless device may perform a RA procedure to obtain TA for the target PCell, for example, based on activating the uplink BWP of the target PCell. In this specification, a cell switch or handover triggered by the L1 or L2 command may be referred to as a L1 or L2 triggered mobility (LTM) procedure, or a LTM.

In at least some wireless technologies, a wireless device may receive a PDCCH order (e.g., a DCI format 1_0 with C-RNTI and FDRA field being set to all ones) triggering a RA procedure on a serving Cell. The wireless device may transmit a preamble, indicated by the PDCCH order, via an active uplink BWP of the serving cell, for example, if receiving the PDCCH order via an active downlink BWP of the same serving cell. The wireless device may monitor PDCCH for receiving a RAR corresponding to the preamble, for example, via an active downlink BWP of a PCell.

In at least some wireless technologies, the wireless device may switch the active uplink BWP to a BWP indicated by initialUplinkBWP configured for the serving cell for transmitting the preamble, for example, if PRACH occasions for the preamble transmission is not configured on the active uplink BWP of the serving cell. The wireless device may switch the active downlink BWP of the PCell to a BWP indicated by initialDownlinkBWP of the PCell for monitoring PDCCH for receiving the RAR corresponding to the transmitting the preamble, for example, if the serving cell is a PCell (or a PSCell).

In at least some wireless technologies, the wireless device may switch the active downlink BWP of the serving cell to a downlink BWP with the same bwp-id as the active uplink BWP of the serving cell for receiving a RAR corresponding to the transmitting the preamble via the active uplink BWP of the serving cell (e.g., if the active downlink BWP does not have the same bwp-Id as the active uplink BWP), for example, if PRACH occasions for the preamble transmission are configured on the active uplink BWP of the serving cell and/or if the serving cell is a PCell (or a PSCell).

In at least some wireless technologies, the wireless device may activate an uplink BWP of a serving cell (e.g., a PCell or a SCell or a target PCell) and then transmit a preamble by initiating a RA procedure via the activated uplink BWP, for example, triggered by a PDCCH order or a RRC reconfiguration message, and/or a L1 or L2 cell switch command. The wireless device may communicate with the serving cell via the activated uplink BWP, for example, based on (e.g., after) obtaining a TA based on the RA procedure.

In at least some wireless technologies, the wireless device may transmit a preamble via an active uplink BWP (e.g., with a BWP id configured as firstActiveUplinkBWP-id) of a target PCell and may monitor PDCCH, via an activated downlink BWP (e.g., with a BWP id configured as firstActiveDownlinkBWP-id) of the target PCell, for receiving a RAR corresponding to the preamble, for example, if a RA procedure is triggered by an RRC reconfiguration configured with a ReconfigurationWithSync IE, or is triggered by receiving a L1 or L2 cell switch command.

In at least some wireless technologies, the wireless device may determine whether to use a current active uplink BWP or an uplink BWP indicated by initialUplinkBWP of the serving cell based on whether PRACH occasions are configured on the current active uplink BWP. The wireless device may determines\ whether to use a current active downlink BWP or a downlink BWP indicated by initialDownlinkBWP of the serving cell, for receiving a RAR corresponding to the preamble, for example, based on whether the PRACH occasions are configured on the serving cell, whether the serving cell is a PCell, and/or whether the current active downlink BWP has the same bwp-id as the active uplink BWP for the preamble transmission, for example, if the RA procedure is triggered by the PDCCH order.

The wireless device may receive a PDCCH order (e.g., first L1 or L2 command), via a source PCell, indicating a preamble transmission via a target PCell before the wireless device receives a L1 or L2 cell switch command (e.g., second L1 or L2 command), for example, if implementing the early time alignment acquisition (e.g., such as described with respect to FIG. 47). Different from at least some L3 based HO (e.g., such as described with FIG. 38) and/or RA procedure triggered by L1 or L2 cell switch command (e.g., such as described with respect to FIG. 43), the wireless device may not switch the PCell to the target PCell, for example, even if the wireless device performs the ETA procedure towards the target PCell until receiving the L1 or L2 cell switch command. By implementing at least some wireless technologies, the wireless device may not activate a downlink BWP and/or an uplink BWP of the target PCell, for example, before performing the PCell switching, for example, based on receiving the L1 or L2 cell switch command. The wireless device may have difficulty in determining where to transmit the preamble via the target PCell, for example, if the target PCell is configured with a plurality of uplink BWPs and given that none of the plurality of uplink BWPs is activated yet before performing the actual PCell switching upon receiving the L1 or L2 cell switch command. At least some wireless technologies may cause misalignment between the wireless device and the target PCell regarding radio resources for the transmission of the preamble for the ETA procedure. Misalignment may increase power consumption of the wireless device, and/or HO latency. Improvements described herein may comprise advantages such as reducing power consumption of the wireless device and/or reducing HO latency.

A wireless device may receive from a base station one or more RRC message(s) comprising configuration parameters of a first cell and a second cell, wherein the second cell comprises uplink BWPs. The wireless device may receive, via the first cell as a PCell, a DCI comprising a PDCCH order indicating a transmission of a preamble to (or via) the second cell. The wireless device may transmit the preamble via an uplink BWP of the uplink BWPs of the second cell. The wireless device may receive, via the first cell, a MAC CE indicating: switching the PCell from the first cell to the second cell, and a TAC for the second cell. The wireless device may switch the PCell to the second cell, wherein the switching comprises activating the uplink BWP and transmitting uplink signals based on the TAC and via the uplink BWP. The wireless device may determine the uplink BWP, for the preamble transmission, as a BWP configured with firstActiveUplinkBWP-id of the second cell, for example, based on (e.g., in response) to receiving the PDCCH order via the first cell.

The wireless device may use a current active uplink BWP (or switch the active uplink BWP to an uplink BWP indicated by initialUplinkBWP, for example, if PRACH occasions are not configured on the current active uplink BWP) of a serving cell, for example, based on (e.g., in response to) receiving a PDCCH order via the same serving cell. Using the BWP configured with firstActiveUplinkBWP-id of the second cell for the preamble transmission may allow the target base station to correctly estimate the TA for the wireless device to use for uplink transmission via (the same uplink BWP of) the target PCell in future, for example, if the wireless device receives a L1 L2 cell switch command.

The wireless device may activate the uplink BWP configured with firstActiveUplinkBWP-id of the second cell, for example, based on receiving the RRC reconfiguration message or based on receiving a L1 or L2 cell switch command. The RRC reconfiguration message and/or the L1 or L2 cell switch command may be different from the PDCCH order. The PDCCH order may be received via a PDCCH of the first cell with a DCI format 1_0 with C-RNTI and FDRA fields being set to all ones. The PDCCH order may not indicate PCell switch. The wireless device may not activate the uplink BWP configured with firstActiveUplinkBWP-id of the second cell for the preamble transmission, for example, based on receiving the PDCCH order. The wireless device may maintain the uplink BWP in the deactivated state during a time period, for example, if and/or based on (e.g., after) the wireless device transmits the preamble via the uplink BWP. The time period may be determined based on the wireless device's capability for retuning the RF chain to the frequency of the uplink BWP and transmitting the preamble and/or retuning the RF chain back to the frequency of the source PCell. The wireless device may turn on the RF chain (or retune the RF) according to radio configuration (frequency location) of the uplink BWP for the wireless device to transmit the preamble via the second cell. The wireless device may turn off the RF chain on the uplink BWP of the second cell after the wireless device completes the preamble transmission. The wireless device may resume uplink transmission via the source PCell, for example, based on (e.g., after) the wireless device completes the preamble transmission via the target PCell. Improvements described herein may comprise advantages such as reducing interruption of uplink transmission to the source PCell during the ETA procedure.

The wireless device may determine the uplink BWP, for the preamble transmission, as a BWP indicated by a BWP indicator of the PDCCH order, for example, based on (e.g., in response to) receiving the PDCCH order via the first cell. The BWP indicator of the PDCCH order may indicate the BWP of a plurality of BWPs of the second cell. The PDCCH order may comprise a cell indication indicating the second cell. Improvements described herein may comprise advantages such as allowing the base station to dynamically indicate an uplink BWP of the second cell for the preamble transmission for the ETA procedure.

A wireless device may receive from a base station RRC message(s) comprising configuration parameters of a first cell and a second cell, wherein the second cell comprises uplink BWPs. The wireless device may receive, via the first cell as a PCell, a PDCCH order indicating a transmission of a preamble to (or via) the second cell. The wireless device, based on (e.g., in response to) receiving the PDCCH order, may activate a first uplink BWP (e.g., indicated by firstActiveUplinkBWP-id) of the uplink BWPs of the second cell. The wireless device may transmit the preamble via the first uplink BWP based on activating the first uplink BWP. The wireless device may start a first timer associated with the transmitting the preamble, for example, based on (e.g., in response to) transmitting the preamble (or in response to activating the first uplink BWP). The first timer may be configured in the configuration parameters of the second cell. The first timer may be different from a BWP inactivity timer (e.g., bwp-InactivityTimer) of the second cell. The first timer may be shorter than the BWP inactivity timer. The wireless device may maintain the first uplink BWP in activated state, for example, if the first timer is running.

The wireless device may receive, via the first cell, a MAC CE indicating: switching the PCell from the first cell to the second cell, and/or a TAC for the second cell, for example, if the first timer is running. The wireless device may switch the PCell to the second cell, wherein the switching comprises transmitting uplink signals based on the TAC and/or via the first uplink BWP, for example, based on the first uplink BWP being in the activated state in response to the first timer being running. The wireless device may stop the first timer, for example, based on transmitting the uplink signals via the first uplink BWP. The wireless device may start the BWP inactivity timer, for example, based on transmitting the uplink signals via the first uplink BWP.

The wireless device may deactivate the first uplink BWP of the second cell, for example, if the first timer expires. The wireless device may receive, for example, based on (e.g., after) the first timer expires and/or via the first cell, a control element indicating: switching the PCell from the first cell to the second cell, and/or a TAC for the second cell. The wireless device may switch the PCell to the second cell, wherein the switching comprises activating the first uplink BWP and/or transmitting uplink signals based on the TAC and via the first uplink BWP. The wireless device may activate the first uplink BWP based on the first uplink BWP being deactivated, for example, based on (e.g., in response to) the expiry of the first timer.

The wireless device may temporarily activate an uplink BWP (e.g., indicated by firstActiveUplinkBWP-id) of the target PCell for a preamble transmission via the second cell, for example, based on receiving the PDCCH order via a source PCell. The wireless device may maintain the uplink BWP active for a time period (e.g., if a timer configured for the preamble transmission is running). The wireless device may (e.g., automatically) deactivate the uplink BWP, for example, based on (e.g., after) the time period. The wireless device may skip activating the uplink BWP and/or may transmit PUSCH/PUCCH on the uplink BWP of the second cell, for example, if the wireless device receives a L1 or L2 cell switch command during the time period (or when the timer is running). The wireless device may activate the uplink BWP and/or transmit PUSCH/PUCCH on the uplink BWP of the second cell, for example, if the wireless device receives a L1/2 cell switch command after the time period (or when the timer expires).

The activation of a BWP of the second cell (a target PCell), for example, before receiving a L1 or L2 cell switch command indicating a PCell switching to the target PCell may be referred to as an early (downlink/uplink) BWP activation. The activation of the BWP of the second cell may be based on (e.g., in response to) receiving a PDCCH order triggering a preamble transmission via the second cell. The PDCCH order may not comprise a BWP ID. The PDCCH order may be received, for example, before receiving the L1 or L2 cell switch command. Early BWP activation may reduce HO latency, since the wireless device may not need to perform BWP activation upon receiving the L1 or L2 cell switch command. Early BWP activation may increase power consumption of the wireless device since the wireless device may maintain (or may not switch off) the RF chain for the uplink BWP as long as the uplink BWP is active on the target PCell.

The wireless device may determine the frequency resources for a transmission of a preamble indicated by the PDCCH order, wherein the frequency resources are determined based on configuration parameters (e.g., a starting PRB indication and/or a number of PRBs) of an uplink BWP (e.g., indicated by firstActiveUplinkBWP-id) of the target PCell, for example, regardless of whether the wireless device activates an uplink BWP of the target PCell upon receiving the PDCCH order on a source PCell. Example embodiments may align the base station and the wireless device regarding the resources for the transmission of the preamble.

Figure 48A:
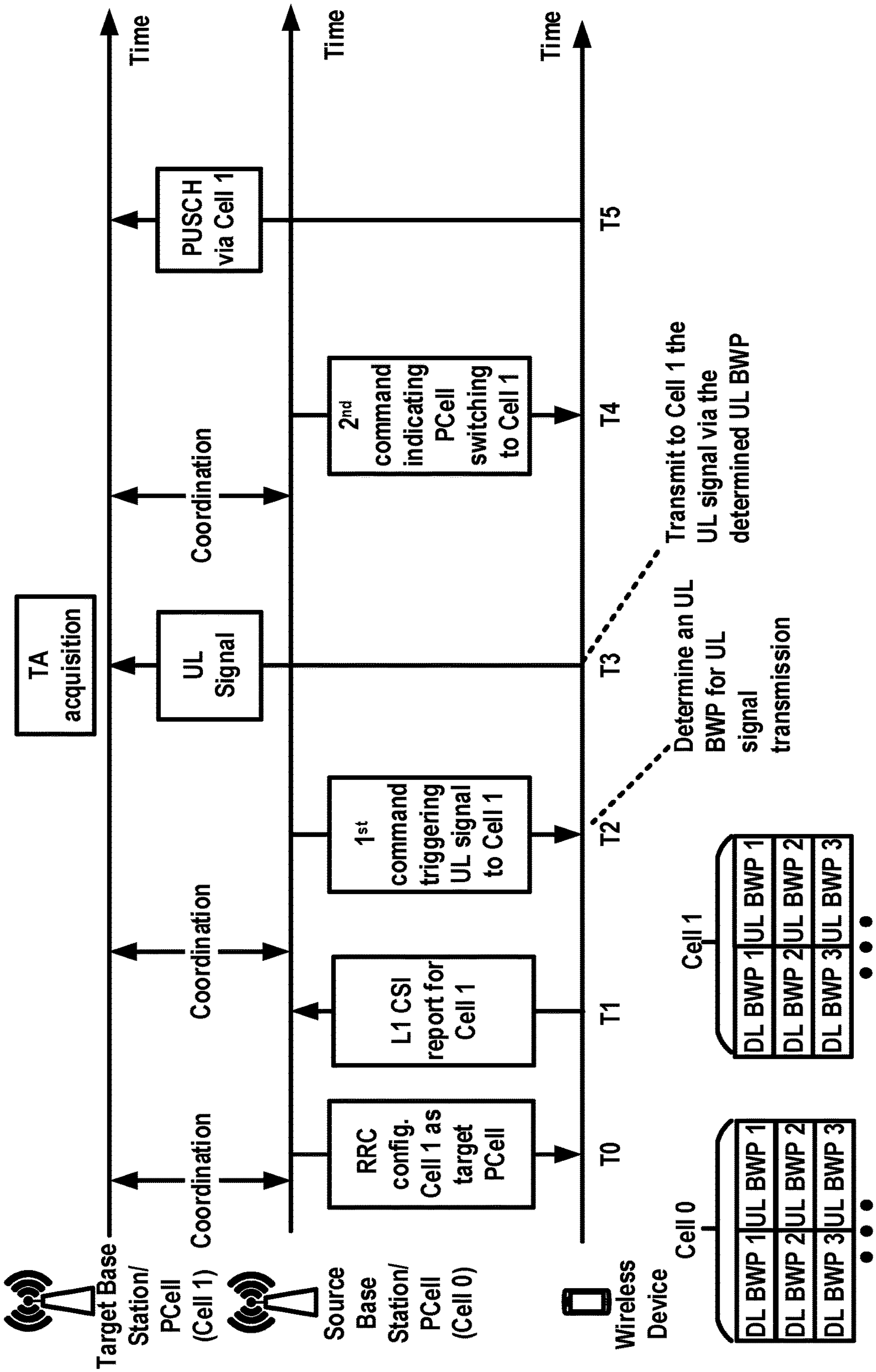
FIG. 48A shows an example of early time alignment acquisition for fast cell switching.

FIG. 48A shows an example of early time alignment acquisition for fast cell switching. FIG. 48A shows an example of ETA-based handover (or PCell switching) based on the example of FIG. 47. A wireless device may receive (at TO), and/or a base station/gNB (via a source PCell, Cell 0 in FIG. 48) may transmit, one or more RRC messages comprising configuration parameters of Cell 1 as a candidate target PCell for HO, for example, based on L1 or L2 cell switch command. The one or more RRC messages may further comprise configuration parameters of Cell 0 as the source PCell. The source PCell may be referred to as a (current) PCell before the wireless device performs HO to the target PCell in this specification.

The one or more RRC messages may be implemented such as described with respect to FIG. 24A, FIG. 24B, FIG. 24C, FIG. 25, FIG. 26, FIG. 27, FIG. 39, FIG. 40, FIG. 42, FIG. 49A, FIG. 49B, FIG. 49C, and/or FIG. 49D. One or more examples such as those described with respect to FIG. 24A, FIG. 24B, FIG. 24C, FIG. 25, FIG. 26, and/or FIG. 27 may be used for configuring configuration parameters of Cell 0 as the PCell. One or more examples such as those described with respect to FIG. 39, FIG. 40, FIG. 42, FIG. 49A, FIG. 49B, FIG. 49C, and/or FIG. 49D may be used for configuring configuration parameters of the second cells. The base station configured with the source PCell may be referred to as a source base station/gNB. The source base station may communicate with a target base station/gNB (configured with Cell 1) to coordinate whether Cell 1 is used as a candidate target PCell for the wireless device in the source base station. The one or more RRC message may configure a plurality of candidate target PCells including Cell 1. One of the plurality of candidate target PCells (e.g., each of the plurality of candidate target PCells) may be associated with configuration parameters based on example embodiments described above.

A PCell may be a cell in a cell group (e.g., MCG or SCG) for maintaining RRC connection between the base station and the wireless device. The cell group may comprise one or more SCells. A cell of the plurality of candidate target PCells including Cell 1 may be a neighbor or a non-serving cell of the wireless device (e.g., such as described with respect to FIG. 38).

A cell of the plurality of candidate target PCells including Cell 1 may be a cell configured for ICBM associated with Cell 0 (e.g., as a part of Cell 0, or as a separate cell from Cell 0), for example, such as described with respect to FIG. 37B, FIG. 43 and/or FIG. 44. A cell of the plurality of candidate target PCells including Cell 1 may be a serving cell (or a SCell) of the wireless device, for example, such as described with respect to FIG. 45.

The base station may transmit NAS related information (e.g., mobility) and/or security related information to a wireless device, for example, via the PCell (Cell 0) (e.g., not via a SCell of the cell group comprising the PCell). The base station may maintain an RRC connection with the wireless device, for example, via the PCell (Cell 0). The wireless device may perform an initial (RRC) connection establishment procedure or initiate a (RRC) connection re-establishment procedure, for example, via the PCell (Cell 0).

The configuration parameters of Cell 0 may indicate a plurality of DL BWPs and/or a plurality of UL BWPs configured for Cell 0. The plurality of DL BWPs may comprise DL BWP 1, DL BWP 2, etc. The plurality of UL BWPs may comprise UL BWP 1, UL BWP 2, etc. A BWP may be implemented such as described with respect to FIG. 9, FIG. 22 and/or FIG. 28. There may be at most one active DL BWP and at most one active UL BWP in Cell 0.

The configuration parameters of Cell 1 may indicate a plurality of DL BWPs and a plurality of UL BWPs configured for Cell 1. The plurality of DL BWPs may comprise DL BWP 1, DL BWP 2, etc. The plurality of UL BWPs may comprise UL BWP 1, UL BWP 2, etc. A BWP may be implemented such as described with respect to FIG. 9, FIG. 22 and/or FIG. 28. There may be no active DL BWP and no active UL BWP in Cell 1, for example, if Cell 1 is configured as a non-serving cell, until performing HO to Cell 1.

The wireless device may communicate with the base station via Cell 0 and/or one or more SCells, for example, based on receiving the one or more RRC messages (e.g., at TO). Communicating with the base station may comprise receiving MIBs/SIBs/CSI-RSs/PDCCH/PDSCH and/or transmitting RACH/PUSCH/PUCCH/SRS.

The wireless device, for example, according to the one or more received RRC messages, comprising parameters of Cell 0 and/or Cell 1 (or a plurality of candidate target PCells), may perform layer 1 or layer 2 measurement report (CSI/beam) for the plurality of candidate target PCells and/or Cell 0. The layer 1 or layer 2 measurement report may comprise layer 1 RSRP, layer 1 RSRQ, PMI, RI, layer 1 SINR, CQI, etc. The layer 1 or layer 2 measurement report may be event-triggered, for example, if the measurement of the CSI/beam of a candidate target PCell (e.g., Cell 1) is greater than a threshold, or (amount of offset) greater than Cell 0, etc.

In an example, the layer 1 or layer 2 measurement report may be transmitted with a periodicity configured by the source base station. The layer 1 or layer 2 measurement report may be contained in a UCI via PUCCH/PUSCH, or a MAC CE (e.g., event-triggered, associated with a configured SR for the transmission of the MAC CE).

The wireless device may determine that Cell 1 has better channel quality than Cell 0. The wireless device may transmit, for example, at T1, the layer 1 or layer 2 measurement report (L1 CSI report for Cell 1) indicating that Cell 1 has better channel quality than Cell 0. The source base station and/or the target base station may determine/coordinate whether Cell 1 is used as the target PCell for future cell switching, for example, based on receiving the layer 1 or layer 2 measurement report.

The source base station (e.g., according to the request of the target base station if there is no time alignment obtained before for Cell 1), may transmit, at T2, from Cell 0 (or an activated SCell of the wireless device) a first command (1st command) triggering an uplink transmission to (or via) Cell 1, for example, if determining Cell 1 is used as the target PCell for future HO. The uplink transmission may be a transmission of a RACH preamble and/or other uplink signals like SRS. The uplink transmission of a preamble/SRS is to allow the target base station and/or the source base station to estimate a TA for uplink transmission via Cell 1. The first command may be a Layer 1 or Layer 2 command (e.g., a DCI/MAC CE/RRC message) or an RRC message. The DCI may be based on a PDCCH order in existing technology. The DCI may be a new PDCCH order different from the existing PDCCH order.

In an example, the first command may comprise at least one of: a SSB index indicating a SSB of a plurality of SSBs of Cell 1, a RA preamble index, a PRACH mask index, a cell indication indicating Cell 1, an UL/SUL indicator, etc. The wireless device may determine on which UL BWP of a cell (Cell 0 or Cell 1) the wireless device transmits the uplink signal (preamble or SRS, etc.), for example, based on (e.g., in response to) receiving the first command via Cell 0 (or an active DL BWP of Cell 0) at T2.

The wireless device may determine the uplink BWP, for the preamble/SRS transmission via Cell 1, as a BWP configured with firstActiveUplinkBWP-id (or initialUplinkBWP) of Cell 1, for example, based on (e.g., in response to) receiving the PDCCH order via Cell 0. Using the BWP configured with firstActiveUplinkBWP-id (or initialUplinkBWP) of Cell 1 for the preamble/SRS transmission may allow the target base station to correctly estimate the TA for the wireless device to use for uplink transmission via (the same uplink BWP of) Cell 1, for example, if the wireless device receives a second command indicating PCell switching to Cell 1 (e.g., at T4 as shown in FIG. 48A).

The wireless device may determine the uplink BWP, for the preamble transmission, as a BWP of Cell 1, indicated by a BWP indicator of the PDCCH order, for example, based on (e.g., in response to) receiving the PDCCH order via Cell 0. The BWP indicator of the PDCCH order may indicate the BWP of a plurality of BWPs of Cell 1. The PDCCH order may comprise a cell indication indicating Cell 1 from a plurality of candidate target PCells. Improvements described herein may comprise advantages such as allowing the base station to dynamically indicate an uplink BWP of Cell 1 for the preamble transmission for early time alignment acquisition.

The wireless device may determine a frequency reference point for the preamble/SRS transmission via Cell 1. The frequency reference point may be a starting PRB of the uplink BWP indicated by firstActiveUplinkBWP-id (or initialUplinkBWP) of Cell 1. The frequency reference point may be indicated as a separate parameter, for the preamble/SRS transmission for the ETA acquisition for Cell 1, different from firstActiveUplinkBWP-id (or initialUplinkBWP) of Cell 1.

The wireless device may not activate the determined uplink BWP (indicated by firstActiveUplinkBWP-id (or initialUplinkBWP) or indicated by the PDCCH order) of Cell 1 upon receiving the PDCCH order (1st command) at T2. The wireless device may maintain the uplink BWP in the deactivated state during a time period, for example, if the wireless device transmits the preamble/SRS via the uplink BWP. The time period may be determined based on the wireless device's capability for retuning the RF chain to the frequency of the uplink BWP and/or transmitting the preamble and retuning the RF chain back to the frequency of the source PCell. The time period may be implemented such as described with respect to FIG. 49A, FIG. 49B, FIG. 50 and/or FIG. 51 which will be described later. During the timer period, the wireless device may stop uplink transmission via Cell 0 (and/or one or more active SCells).

In at least some wireless technologies, the wireless device may use a current active uplink BWP (or switch the active uplink BWP to an uplink BWP indicated by initialUplinkBWP if PRACH occasions are not configured on the current active uplink BWP) of a serving cell, based on, (e.g., in response to) receiving a PDCCH order via the same serving cell. Improvements described herein may comprise advantages such as allowing the target base station to correctly estimate the TA for the wireless device to use for uplink transmission via (the same uplink BWP of) Cell 1 (e.g., if the wireless device receives a L1 or layer 2 cell switch command), for example, by using the BWP configured with firstActiveUplinkBWP-id of Cell 1, or dedicated frequency resources configured on Cell 1, for the preamble/SRS transmission based on receiving a PDCCH order via Cell 0.

The wireless device may turn on the RF chain (or retune the RF chain, switch the RF chain, etc.) according to radio configuration (frequency location) of the uplink BWP for the wireless device to transmit the preamble/SRS via Cell 1 (e.g., when Cell 1 is a non-serving cell). The wireless device may turn off the RF chain on the uplink BWP of Cell 1, for example, based on (e.g., after) the wireless device completes the preamble/SRS transmission. The wireless device may resume uplink transmission via Cell 0 (e.g., by switching back the RF chain to the frequency of an active uplink BWP of Cell 0), for example, based on (e.g., after) the wireless device completes the preamble transmission via Cell 1. Improvements described herein may comprise advantages such as reducing interruption of uplink transmission via Cell 0 during the ETA procedure.

The wireless device may determine a frequency location for the preamble/SRS transmission, for example, based on the determined uplink BWP of Cell 1. The wireless device may determine the frequency location of the preamble/SRS transmission, for example, based on a starting PRB of the determine uplink BWP and a frequency offset indication for a PRACH configuration for the preamble transmission (or for an SRS configuration for the SRS transmission). The wireless device may transmit (e.g., at T3) the uplink signal (preamble/SRS) via Cell 1, for example, based on the determined frequency location. The target base station may monitor the uplink signal at T3 (e.g., based on coordination between the source base station and the target base station) to detect the uplink signal for TA estimation/acquisition.

The target base station may coordinate the indication of the estimated TA with the source base station. The target base station may forward the estimated TA for Cell 1 to the source base station. The source base station may transmit the forwarded TA to the wireless device, for example, via a RAR message, or via a TAC MA CE. The wireless device may monitor PDCCH (on Cell 0) for receiving the RAR message based on at least some wireless technologies (e.g., such as described with respect to FIG. 13A, FIG. 49C.13B and/or FIG. 13C). The wireless device may maintain a TAT for a TAG associated with Cell 1. The wireless device may maintain Cell 1 as a non-serving cell.

The source base station may skip transmitting the forwarded TA to the wireless device. The source base station may indicate the TA together with a second layer 1 or layer 2 command (second command at T4 as shown in FIG. 48A) indicating/triggering PCell switching from Cell 0 to Cell 1. The wireless device may skip monitoring PDCCH (on Cell 0) for receiving the RAR message.

The wireless device may communicate with the source base station (via Cell 0 and/or one or more activated SCells), for example, comprising receiving downlink signals (PDCCH/PDSCH) after the wireless device transmits the preamble/SRS via Cell 1. The wireless device may not monitor PDCCH via Cell 1, for example, based on (e.g., after) the wireless device transmits the preamble/SRS via Cell 1. The source base station may transmit a second command (e.g., DCI/MAC CE) indicating a PCell switch/change from Cell 0 to Cell 1.

The second DCI/MAC CE may be implemented such as described with respect to FIG. 49A, FIG. 49B, and/or FIG. 49C. The base station may transmit the second DCI/MAC CE for L1 or L2 mobility management, for example, based on example embodiments described above with respect to FIG. 43.

The layer 1 or layer 2 measurement report may be transmitted with a periodicity configured by the source base station. The layer 1 or layer 2 measurement report may be contained in a UCI via PUCCH/PUSCH, or a MAC CE (e.g., event-triggered, associated with a configured SR for the transmission of the MAC CE).

The wireless device may determine that Cell 1 has better channel quality than Cell 0. The wireless device may transmit, for example, at T1, the layer 1 or layer 2 measurement report (L1 CSI report for Cell 1) indicating that Cell 1 has better channel quality than Cell 0. The source base station and the target base station may determine/coordinate whether Cell 1 is used as the target PCell for future cell switching, for example, based on, receiving the layer 1 or layer 2 measurement report.

The source base station (e.g., according to the request of the target base station if there is no time alignment obtained before for Cell 1), may transmit, at T2, from Cell 0 (or an activated SCell of the wireless device) a first command (1st command) triggering an uplink transmission to (or via) Cell 1, for example, if determining Cell 1 is used as the target PCell for future HO. The uplink transmission may be a transmission of a RACH preamble or other uplink signals like SRS. The uplink transmission of a preamble/SRS may allow the target base station and/or the source base station to estimate a TA for future uplink transmission via Cell 1. The first command may be a Layer 1 or Layer 2 command (e.g., a DCI/MAC CE/RRC message) or an RRC message. The DCI may be based on a PDCCH order in at least some wireless technologies. The DCI may be a new PDCCH order different from the a PDCCH order.

The first command may comprise at least one of: a SSB index indicating a SSB of a plurality of SSBs of Cell 1, a RA preamble index, a PRACH mask index, a cell indication indicating Cell 1, an UL/SUL indicator, etc. The wireless device may determine on which UL BWP of a cell (Cell 0 or Cell 1) the wireless device transmits the uplink signal (preamble or SRS, etc.), for example, based on (e.g., in response to) receiving the first command via Cell 0 (or an active DL BWP of Cell 0) at T2.

The wireless device may determine the uplink BWP, for the preamble/SRS transmission via Cell 1, as a BWP configured with firstActiveUplinkBWP-id (or initialUplinkBWP) of Cell 1, for example, based on (e.g., in response to) receiving the PDCCH order via Cell 0. Using the BWP configured with firstActiveUplinkBWP-id (or initialUplinkBWP) of Cell 1 for the preamble/SRS transmission may allow the target base station to correctly estimate the TA for the wireless device to use for uplink transmission via (the same uplink BWP of) Cell 1 in future when the wireless device receives a second command indicating PCell switching to Cell 1 (e.g., at T4 as shown in FIG. 48A).

The wireless device may determine the uplink BWP, for the preamble transmission, as a BWP, of Cell 1, indicated by a BWP indicator of the PDCCH order, for example, based on (e.g., in response to) receiving the PDCCH order via Cell 0. The BWP indicator of the PDCCH order may indicate the BWP of a plurality of BWPs of Cell 1. The PDCCH order may further comprise a cell indication indicating Cell 1 from a plurality of candidate target PCells. Improvements described herein may provide for advantages such as allowing the base station to dynamically indicate an uplink BWP of Cell 1 for the preamble transmission for early time alignment acquisition.

The wireless device may determine a frequency reference point for the preamble/SRS transmission via Cell 1. The frequency reference point may be a starting PRB of the uplink BWP indicated by firstActiveUplinkBWP-id (or initialUplinkBWP) of Cell 1. The frequency reference point may be indicated as a separate parameter, for the preamble/SRS transmission for the ETA acquisition for Cell 1, different from firstActiveUplinkBWP-id (or initialUplinkBWP) of Cell 1.

The wireless device may not activate the determined uplink BWP (indicated by firstActiveUplinkBWP-id (or initialUplinkBWP) or indicated by the PDCCH order) of Cell 1 upon receiving the PDCCH order (first command) at T2. The wireless device may maintain the uplink BWP in the deactivated state during a time period, for example, if the wireless device transmits the preamble/SRS via the uplink BWP. The time period may be determined based on wireless device's capability for retuning the RF chain to the frequency of the uplink BWP and transmitting the preamble and retuning the RF chain back to the frequency of the source PCell. The time period may be implemented such as described with respect to FIG. 50 and/or FIG. 51 which will be described later. During the timer period, the wireless device may stop uplink transmission via Cell 0 (and/or one or more active SCells).

In at least some wireless technologies, the wireless device may use a current active uplink BWP (or switch the active uplink BWP to an uplink BWP indicated by initialUplinkBWP, for example, if PRACH occasions are not configured on the current active uplink BWP) of a serving cell in response to receiving a PDCCH order via the same serving cell. Improvements described herein may provide for advantages such as allowing the target base station to correctly estimate the TA for the wireless device to use for uplink transmission via (the same uplink BWP of) Cell 1 in future when the wireless device receives a L1/2 cell switch command, for example, by using the BWP configured with firstActiveUplinkBWP-id of Cell 1 for the preamble/SRS transmission upon receiving a PDCCH order via Cell 0.

The wireless device may turn on the RF chain (or retune the RF chain, switch the RF chain) according to radio configuration (frequency location) of the uplink BWP for the wireless device to transmit the preamble/SRS via Cell 1 (e.g., when Cell 1 is a non-serving cell). The wireless device may turn off the RF chain on the uplink BWP of Cell 1, for example, based on (e.g., after) the wireless device completes the preamble/SRS transmission. The wireless device may resume uplink transmission via Cell 0 (e.g., by switching back the RF chain to the frequency of an active uplink BWP of Cell 0) after the wireless device completes the preamble transmission via Cell 1. Improvements described herein may provide for advantages such as reducing interruption of uplink transmission via Cell 0 during the ETA procedure.

The wireless device may determine a frequency location for the preamble/SRS transmission, for example, based on the determined uplink BWP of Cell 1. The wireless device may determine the frequency location of the preamble/SRS transmission, for example, based on a starting PRB of the determine uplink BWP and a frequency offset indication for a PRACH configuration for the preamble transmission (or for an SRS configuration for the SRS transmission). The wireless device may transmit (e.g., at T3) the uplink signal (preamble/SRS) via Cell 1, for example, based on the determined frequency location. The target base station may monitor the uplink signal at T3 (e.g., based on coordination between the source base station and the target base station) to detect the uplink signal for TA estimation/acquisition.

The target base station may coordinate the indication of the estimated TA with the source base station. The target base station may forward the estimated TA for Cell 1 to the source base station.

The source base station may transmit the forwarded TA to the wireless device, for example, via a RAR message, or via a TAC MA CE. The wireless device may monitor PDCCH (on Cell 0) for receiving the RAR message based on at least some wireless technologies (e.g., such as described with respect to FIG. 13A, FIG. 13B and/or FIG. 13C). The wireless device may maintain a TAT for a TAG associated with Cell 1. The wireless device may maintain Cell 1 as a non-serving cell.

The source base station may skip transmitting the forwarded TA to the wireless device. The source base station may indicate the TA together with a second layer 1 or layer 2 command (second command at T4 as shown in FIG. 48A) indicating/triggering PCell switching from Cell 0 to Cell 1. The wireless device may skip monitoring PDCCH (on Cell 0) for receiving the RAR message.

The wireless device may communicate with the source base station (via Cell 0 and/or one or more activated SCells), for example, comprising receiving downlink signals (PDCCH/PDSCH) after the wireless device transmits the preamble/SRS via Cell 1. The wireless device may not monitor PDCCH via Cell 1, for example, based on (e.g., after) the wireless device transmits the preamble/SRS via Cell 1.

The source base station may transmit a second command (e.g., DCI/MAC CE) indicating a PCell switch/change from Cell 0 to Cell 1. The base station may transmit the second command for L1 or L2-triggered mobility, for example, such as described with respect to FIG. 43.

The base station may transmit the second command for network energy saving, for example, such as described with respect to FIG. 45. The second command may indicate a transition of the base station from a non-energy saving state (mode/period/configuration, or a full power state/mode, or a normal power state/mode) to an energy saving state. For example, in the non-energy-saving state, the base station may transmit (and/or the wireless device may receive) MIBs/SSBs/CSI-RSs/TRSs/PDCCHs/PDSCHs via Cell 0 and may activate one or more SCells of a cell group for each wireless device. For example, in the energy-saving state, the base station may transmit (and/or the wireless device may receive) MIBs/SSBs/CSI-RSs/PDCCHs/PDSCHs via a group common PCell (e.g., Cell 1) for all wireless devices and may deactivate (or turn off) other cells (e.g., SCells) for all wireless devices. The wireless device and/or the base station (or the source base station) may work in the non-energy-saving state between T1 and T4. The wireless device and/or the base station (or the source base station) may work in the energy saving state starting from T4. The second command may comprise at least one of: a cell indication indicating Cell 1, a TA indication indicating a TA value obtained based on the preamble/SRS transmission via Cell 1, a TCI state indication indicating a beam to be used for Tx/Rx on Cell 1, one or more BWP indications indicating a (downlink and/or uplink) BWP to be activated on Cell 1, a RACH procedure enabling/disabling indication, etc.

The second command (received at T4) may not comprise a BWP indication for Cell 1. The wireless device may determine the BWP, to be activated on Cell 1 upon receiving the second command at T4, the same as the uplink BWP on which the wireless device transmits the preamble/SRS upon receiving the first command at T2. A BWP indicated by firstActiveUplinkBWP-id of Cell 1 may be activated by the wireless device upon performing RRC (re-)configuration based on layer 3 HO procedure (e.g., such as described with respect to FIG. 38), or upon receiving the second command indicating the PCell switching (e.g., such as described with respect to FIG. 48A). The BWP indicated by firstActiveUplinkBWP-id of Cell 1 may also be used for preamble/SRS transmission via Cell 1 upon receiving the first command (e.g., PDCCH order) indicating a preamble/SRS transmission via Cell 1. Improvements described herein may provide for advantages comprising allowing the wireless device to use correct TA for uplink transmission on the target PCell, for example, by using the same BWP for transmitting the preamble/SRS for the ETA procedure (triggered by the first command) and performing PCell switching (triggered by the second command).

The wireless device may apply the TA value for uplink transmission (at T5) via Cell 1, for example, based on (e.g., in response to) receiving the second command indicating the PCell change/switch to Cell 1 at T4. The uplink transmission may comprise PUSCH, PUCCH and/or SRS. Improvements described herein may provide for advantages such as allowing the wireless device to skip RACH procedure and/or apply the correct TA for uplink transmission timing for the target PCell, for example, by indicating the TA and cell switch together in a L1/2 cell switch command. Improvements described herein may provide for advantages such as reducing cell switch latency.

The wireless device may configure Cell 1 as the PCell and/or may stop using Cell 0 as the PCell, for example, based on (e.g., in response to) in response to receiving the second command. The wireless device may stop applying RRC configuration parameters of Cell 0 and/or may apply RRC configuration parameters of Cell 1, for example, based on (e.g., in response to) receiving the second command. The wireless device may stop receiving RRC messages from Cell 0 and/or may start receiving RRC messages from Cell 1, for example, based on (e.g., in response to) receiving the second command.

The wireless device may retune RF chain to a frequency center of a target PCell for the preamble/SRS transmission (for TA estimation at the target PCell). The frequency center of the target PCell may be the same as or different from a frequency center of the source PCell. Transmission of the preamble/SRS based on an uplink BWP of the target PCell may not be efficient, for example, when the source PCell and the target PCell are within a frequency band.

FIG. 48A may be modified to reduce uplink transmission interruptions when performing the ETA procedure. The wireless device may determine to use an active uplink BWP of Cell 0 for the preamble/SRS transmission to the target base station, for example, based on receiving the first command at T2. The wireless device may determine to use an active uplink BWP of Cell 0 for the preamble/SRS transmission based on the active uplink BWP (e.g., 1st BWP) of cell 0 being associated with an uplink BWP (2nd BWP) identified by firstActiveUplinkBWP-id of Cell 1. The active uplink BWP of Cell 0 may be associated with the uplink BWP identified by firstActiveUplinkBWP-id of Cell 1 based on frequency resources (location and bandwidth) of 1st BWP comprising frequency resources of 2nd BWP, frequency resources of 2nd BWP comprising frequency resources of 1st BWP, Cell 0 and Cell 1 being in a same frequency range (FR 1/or FR 2), or in a same frequency band, etc.

The wireless device may switch an active uplink BWP of Cell 0 to a first uplink BWP of Cell 0 for the preamble/SRS transmission to the target base station, (e.g., if the active uplink BWP of Cell 0 is not associated with an uplink BWP identified by firstActiveUplinkBWP-id of Cell 1), for example, based on receiving the first command via Cell 0 at T2. The wireless device may determine the first uplink BWP (1st BWP), from a plurality of uplink BWPs of Cell 0, as a BWP being associated with an uplink BWP (2nd BWP) identified by firstActiveUplinkBWP-id of Cell 1. The first uplink BWP of Cell 0 may be associated with the uplink BWP identified by firstActiveUplinkBWP-id of Cell 1 based on frequency resources (location and bandwidth) of 1st BWP comprising frequency resources of 2nd BWP, frequency resources of 2nd BWP comprising frequency resources of 1st BWP, etc.

The wireless device may determine whether to transmit the preamble/SRS via an active uplink BWP of Cell 0 or via an uplink BWP of Cell 1 based on indication of the first command (e.g., PDCCH order received at T2). The wireless device may determine the uplink BWP of Cell 1 for the preamble/SRS transmission, for example, based on (e.g., in response to) the first command indicating the preamble/SRS transmission via Cell 1 (e.g., such as described with respect to FIG. 48A). The wireless device may determine the uplink BWP of Cell 0 for the preamble/SRS transmission based on at least some wireless technologies, for example, based on (e.g., in response to) the first command indicating the preamble/SRS transmission via Cell 0.

The first command may indicate whether the preamble/SRS transmission is via Cell 0 or via Cell 1 based on one or more fields of the first command. The one or more fields may comprise a cell indication, and/or a bit field indicating whether the PDCCH order is for the ETA procedure.

The wireless device may transmit the preamble/SRS via an active uplink BWP of the cell (the serving cell), for example, based on (e.g., in response to) the cell indication indicating a cell being one of serving cells (e.g., SCells) of the wireless device, based on at least some wireless technologies. The wireless device may transmit the preamble/SRS via an uplink BWP (e.g., determined such as described with respect to FIG. 48A) of the cell (the non-serving cell), for example, based on (e.g., in response to) the cell indication indicating that a cell is not one of serving cells (e.g., SCells) of the wireless device or indicating that the cell is Cell 1 which is a non-serving cell.

The wireless device may transmit the preamble/SRS via an uplink BWP (e.g., determined such as described with respect to FIG. 48A) of the cell (the non-serving cell), for example, based on (e.g., in response to) the bit field of the PDCCH order indicating that the PDCCH order is not for the ETA procedure for a non-serving cell (or is for legacy time alignment acquisition for a serving cell). The wireless device may transmit the preamble/SRS via an active uplink BWP of the cell (the serving cell), for example, based on (e.g., in response to) the bit field indicating that the PDCCH order is for legacy time alignment acquisition for a serving cell (or is not for the ETA procedure for a non-serving cell), based on at least some wireless technologies.

Figure 48B:
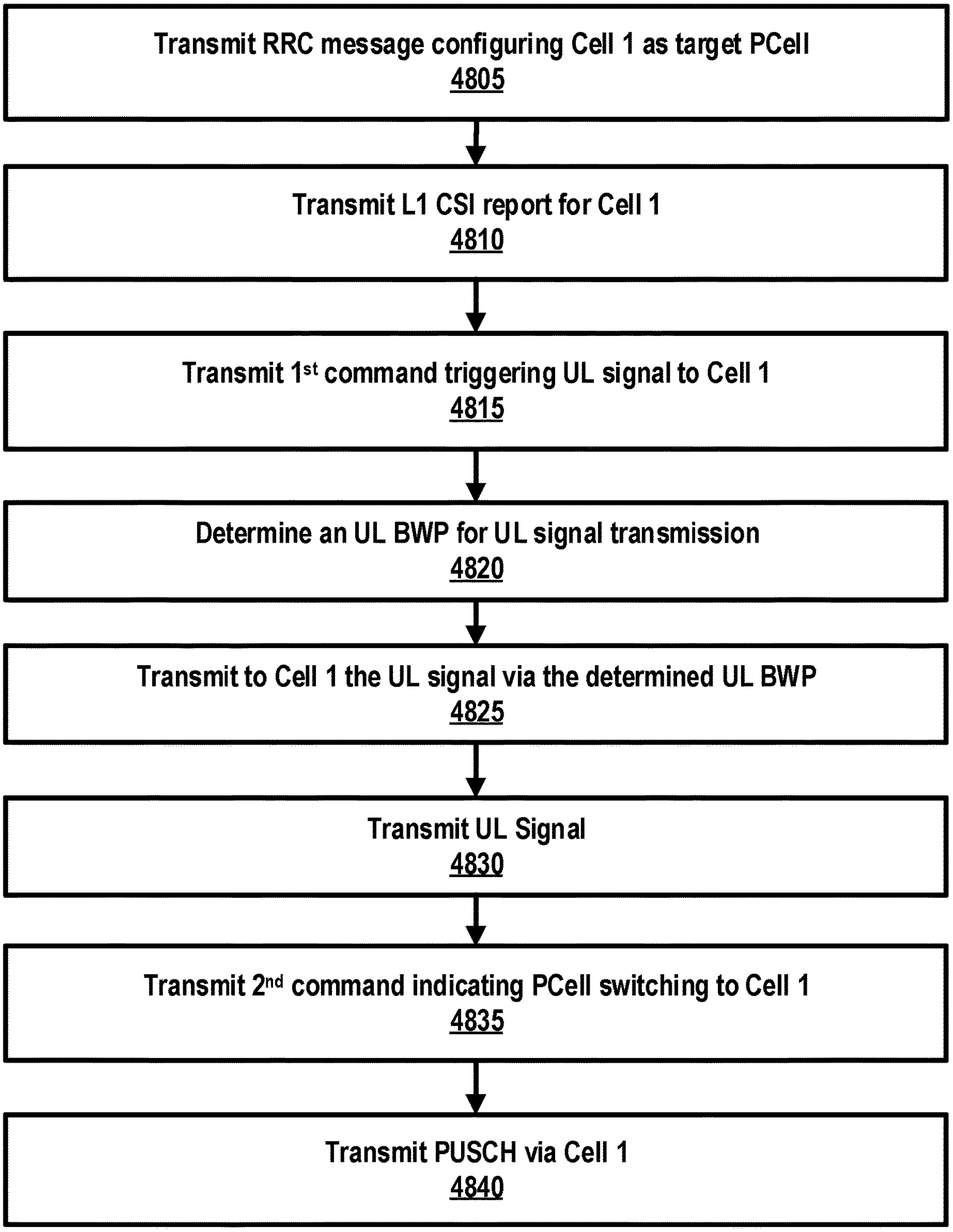
FIG. 48B shows an example method for early time alignment acquisition for fast cell switching.

FIG. 48B shows an example method of early time alignment acquisition for fast cell switching. At 4805, an RRC message configuring Cell 1 as a target PCell may be transmitted. For example, a source base station/PCell (Cell 0) may transmit the RRC message to a wireless device. At 4810, an L1 CSI report for Cell 1 may be transmitted. For example, the wireless device may transmit the L1 CSI report to the source base station/PCell (Cell 0). At 4815, a first command triggering an uplink signal to Cell 1 may be transmitted. For example, the source base station/PCell (Cell 0) may transmit the first command. At 4820, an uplink BWP for uplink transmission may be determined. For example, the uplink BWP may be determined at T2. At 4825, the uplink signal may be transmitted to Cell 1 via the determined uplink BWP. For example, the uplink signal may be transmitted at T3. At 4830, the uplink signal may be transmitted. For example, the wireless device may transmit the uplink signal to a target base station/PCell (Cell 1). The time alignment acquisition may occur. At 4835, a second command may be transmitted indicating PCell switching to Cell 1. For example, the second command may be transmitted from the source base station/PCell (Cell 0) to the wireless device. At 4840, PUSCH transmissions may be transmitted via Cell 1. For example, the wireless device may transmit the PUSCH transmission to the target base station/PCell (Cell 1).

FIG. 49A, FIG. 49B, FIG. 49C, and FIG. 49D show example embodiments of target PCell configurations for PCell switching. FIG. 49A, FIG. 49B, FIG. 49C and/or FIG. 49D show example embodiments of candidate target cell (PCells/SCells) configuration based on example embodiments described above with respect to FIG. 47 and/or FIG. 48A. A base station may transmit to a wireless device an RRC reconfiguration message (e.g., RRCReconfiguation-VXXX-IEs) comprising a candidate PCell/SCell configuration (e.g., candidates-L1L2-Config IE). The candidate PCell/SCell configuration may comprise a list of candidate target PCells (and/or associated SCells) (e.g., candidates-L1 L2-ToAddModList). A configuration id (e.g., candidate-L1L2-Id) may be used to identify a candidate target PCell (and/or associated SCells) of the list of candidate target PCell. Configuration parameters of a candidate target PCell (e.g., each candidate target PCell) may be implemented based on example embodiments of FIG. 49B, FIG. 49C and/or FIG. 49D.

FIG. 49B shows an example of the configuration parameters of a candidate target PCell. The configuration parameters of the candidate target PCell may be comprised in a RRC reconfiguration (RRCReconfiguration) message received by a source base station from a target base station via X2/Xn interface. The RRC reconfiguration message of the candidate target PCell may be implemented such as described with respect to FIG. 39 and/or FIG. 40. The RRC reconfiguration message of the candidate target PCell may comprise at least one of: a configuration id identifying the candidate target PCell (Candidates-L1L2-Id), a radio bearer configuration, a measurement configuration, and/or a configuration of a cell group comprising the candidate target PCell and one or more SCells.

FIG. 49C shows an example of the configuration parameters of a candidate target PCell. The configuration parameters of the candidate target PCell may be comprised in a cell group configuration (CellGroupConfig) message. The cell group configuration message of the candidate target PCell may comprise at least one of: a configuration id identifying the candidate target PCell (Candidates-L1L2-Id), one or more RLC bearer configurations, MAC cell group configuration, physical cell group configuration, SpCell configuration for the candidate target PCell, and/or SCell parameters of the one or more SCells.

FIG. 49D shows an example of the configuration parameters of a candidate target PCell. The configuration parameters of the candidate target PCell may be comprised in a special cell configuration (SpCellConfig) message. The special cell configuration message of the candidate target PCell may comprise at least one of: a configuration id identifying the candidate target PCell (Candidates-L1L2-Id), configuration parameters of the candidate target PCell, an identity of the wireless device used in the candidate target PCell, a timer for switching the PCell to the candidate target PCell and/or a RACH resource configuration for the switching the PCell to the candidate target PCell.

The base station may determine contents of configuration parameters of a candidate target cell, for example, by implementing examples of FIG. 49B, FIG. 49C and/or FIG. 49D. The base station may use the example of FIG. 49B for fully configuring the candidate target PCell, for example, if the candidate target PCell is in a different CU from the source PCell. The base station may use the example of FIG. 49C for partially configuring the candidate target PCell, for example, if the candidate target PCell is in a same CU but in a different DU from the source PCell. The base station may use example embodiment of FIG. 49D for minimally configuring the candidate target PCell, for example, if the candidate target PCell is in a same CU and in the same DU with the source PCell.

Figure 50:
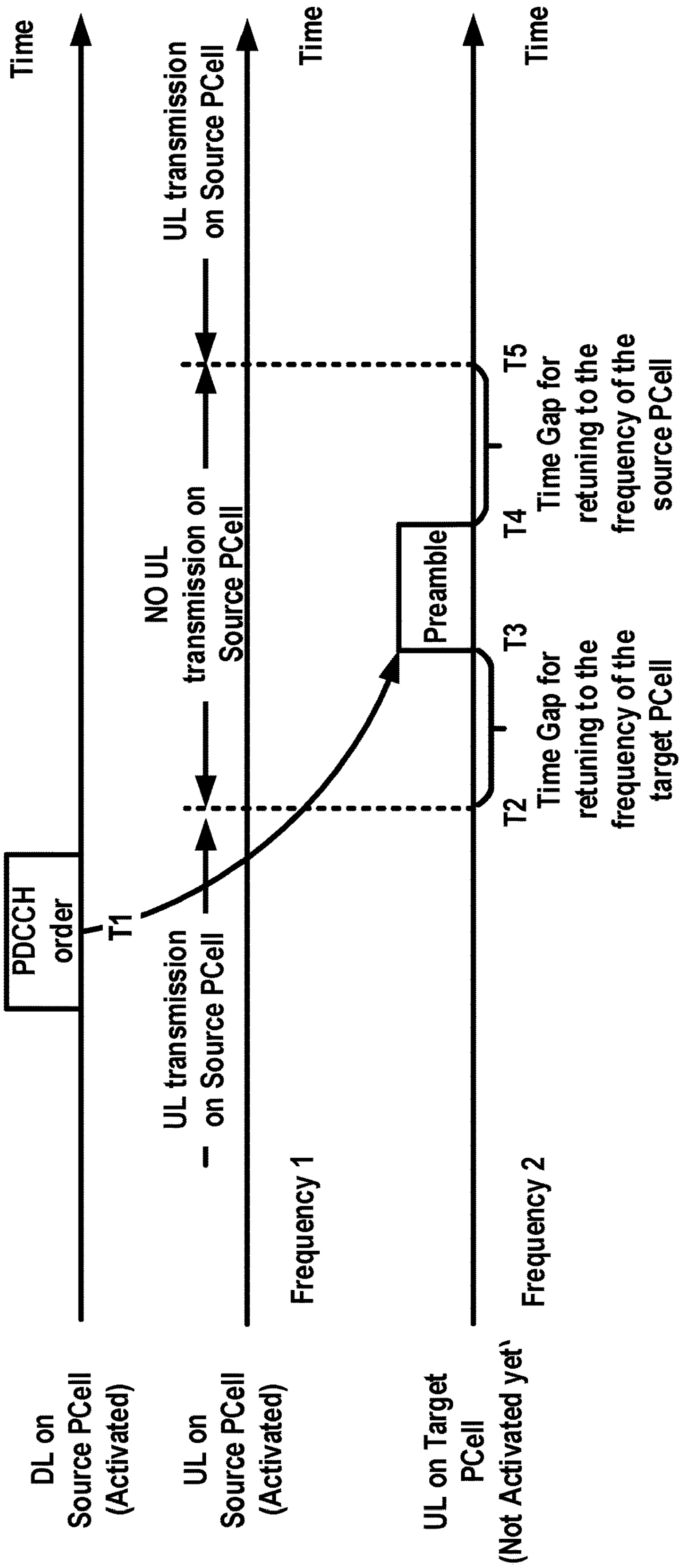
FIG. 50 shows an example timeline of early time alignment acquisition for fast cell switching.

FIG. 50 shows an example of a timeline of early time alignment acquisition for fast cell switching. FIG. 50 shows an example of uplink transmission via a non-serving cell for the ETA procedure based on FIG. 48A. The wireless device may receive a PDCCH order at T1 via an active downlink BWP of a source PCell, for example, such as described with respect to FIG. 48A. The PDCCH order in FIG. 50 corresponds to the first command received at T2 in FIG. 48A. The wireless device may start to retune the RF chain from a frequency center (at frequency 1) of an uplink BWP of the source PCell to a frequency center (at frequency 2) of an uplink BWP of the target PCell. The time gap for the retuning the RF chain may be determined based on the wireless device's RF capability. The time gap may comprise a time duration used for preparing the uplink BWP of the target PCell. The time duration may be greater than 0 and/or smaller than an active BWP switching delay in legacy system. The time gap may be a time duration between T2 and T3 in FIG. 50. T2 may be a number of symbols (which could be zero) after the end symbol of the reception of PDCCH order at T1, for example, based on the wireless device's PDCCH processing (or PUSCH preparation) capability. The wireless device may transmit the preamble/SRS from T3 to F4, the time duration between T3 and T4 depending on a sequence length of the preamble/SRS, for example, based on (e.g., after) the wireless device completes the RF retuning. The wireless device may retune the RF chain from a frequency center (at frequency 2) of an uplink BWP of the target PCell to a frequency center (at frequency 1) of an active uplink BWP of the source PCell, for example, based on (e.g., after) completing the preamble/SRS transmission. The time gap for the retuning may be a time duration between T4 and T5 determined based on the UE's RF capability. The time gap for the retuning may depend on whether the source PCell and the target PCell for an intra-frequency HO/cell switching, or for an inter-frequency HO/cell switching. The time gap for intra-frequency HO/cell switching may be smaller than for the inter-frequency HO/cell switching.

The wireless device may transmit uplink signals (PUSCH/PUCCH/SRS) via the active uplink BWP of the source PCell before T2. The wireless device may stop uplink transmission via the active uplink BWP of the source PCell in a time duration between T2 and T5, for example, if the wireless device is in uplink transmission via the target PCell. The wireless device may resume uplink transmission via an active uplink BWP of the source PCell, for example, based on (e.g., .after) completing the retuning at T5).

The PDCCH order may comprise a length indication indicating a time duration between T2 and T5. The time duration between T2 and T5 may be indicated in configuration parameters of the source PCell and/or the target PCell. The time duration between T2 and T5 may be determined by the wireless device, for example, based on the wireless device's radio capability.

The wireless device and the target PCell may align with the timing for the preamble/SRS transmission via an uplink BWP of the target PCell upon receiving the PDCCH order indicating the ETA procedure. The wireless device and the source PCell may align with the timing of the interruption for the preamble/SRS transmission to the target base station. Improvements described herein may comprise advantages such as reducing latency for PCell switching and/or reducing interruption time for uplink transmission to the source base station.

A wireless device may be equipped with two transmission chains (RF and/or base band) on two different frequency bands. The wireless device may support uplink transmission switching between two transmission chains, which is referred to as UL Tx switching in this specification. The wireless device may use one of the Tx to perform the ETA procedure.

Figure 51:
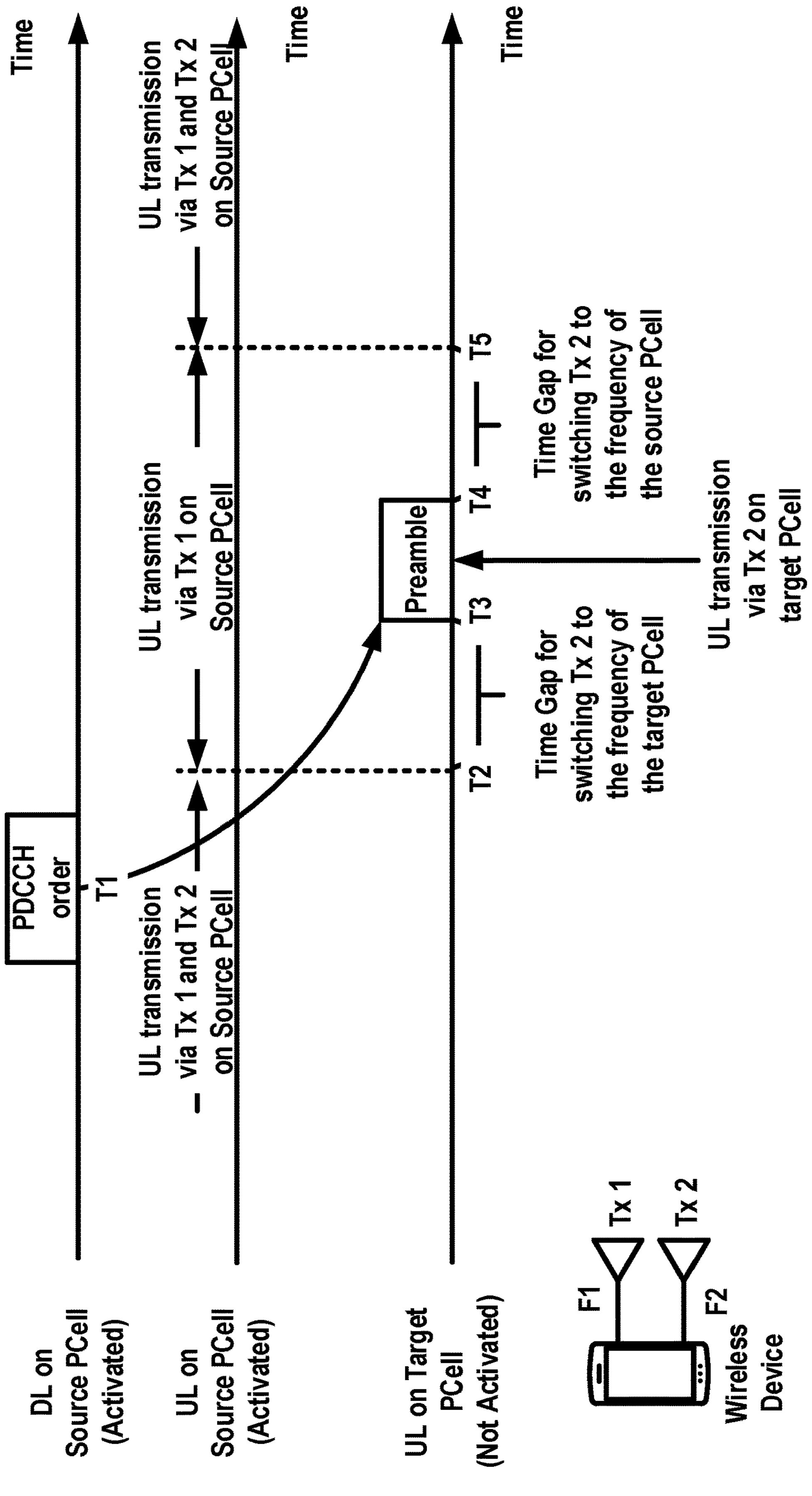
FIG. 51 shows an example timeline of early time alignment acquisition for fast cell switching.

FIG. 51 shows an example embodiment of a timeline of early time alignment acquisition for fast cell switching. FIG. 51 shows an example of uplink transmission with UL Tx switching via a non-serving cell for the ETA procedure based on FIG. 48A and/or FIG. 50. The wireless device may receive a PDCCH order at T1 via an active downlink BWP of a source PCell, for example, based on example embodiments described above with respect to FIG. 48A. The PDCCH order in FIG. 50 corresponds to the first command received at T2 in FIG. 48A.

The wireless device may be equipped with two Tx chains, one deployed in a first frequency band, another deployed in a second frequency band. The wireless device may use the two Tx chains for the source PCell transmission (as shown in FIG. 51) or use one of the two Tx chains for transmission via the source PCell and use the other one for transmission via a SCell (not shown in FIG. 51).

The wireless device may determine to switch the second Tx (Tx 2) to perform the preamble/SRS transmission via the target PCell, for example, based on receiving the PDCCH order at T1. The wireless device may keep using the first Tx (Tx 1) for uplink transmission via an active uplink BWP of the source PCell. Tx 2 may be used for uplink transmission via an active BWP of a SCell, or via the active BWP of the source PCell, for example, before receiving the PDCCH order.

The wireless device may determine the transmission timing, for the preamble/SRS via an uplink BWP of the target PCell, for example, based on at least one of: a first time gap depending on PUSCH processing capability (comprising PDCCH order processing), a second time gap depending on a BWP preparing (similar but smaller than a BWP switching delay) on the target PCell, and/or a third time gap depending on UL Tx switching capability.

The time gap between T2 and T3 may be used for switching Tx 2 to the frequency of the uplink BWP of the target PCell. The time gap between T1 and T2 may comprise a first time gap for PUSCH processing and/or a second time gap for the BWP preparing on the target PCell.

The wireless device may transmit the preamble/SRS from T3 to F4, the time duration between T3 and T4 depending on a sequence length of the preamble/SRS. The wireless device may switch Tx 2 back to the active uplink BWP of the source PCell or the active uplink BWP of a SCell, for example, based on (e.g., after) completing the preamble/SRS transmission. The time gap for the switching may be a time duration between T4 and T5 determined based on the wireless device's RF capability.

The wireless device may transmit uplink signals (PUSCH/PUCCH/SRS) via Tx 1 and Tx 2 and/or via the active uplink BWP of the source PCell before T2. The wireless device may stop uplink transmission via Tx 2 and via the active uplink BWP of the source PCell and/or continue uplink transmission via Tx 1 and/or via the active BWP of the source PCell in a time duration between T2 and T5, for example, if the wireless device is in uplink transmission via Tx 2 and via the target PCell. The wireless device may resume uplink transmission via Tx 1 and Tx 2 and via an active uplink BWP of the source PCell, for example, based on (e.g., after) completing the switching at.

The PDCCH order may comprise a length indication indicating a time duration between T2 and T5. The time duration between T2 and T5 may be indicated in configuration parameters of the source PCell and/or the target PCell. The time duration between T2 and T5 may be determined by the wireless device based on the wireless device's radio capability.

The wireless device and the target PCell may align with the timing for the preamble/SRS transmission via an uplink BWP of the target PCell upon receiving the PDCCH order indicating the ETA procedure. The wireless device and the source PCell may align with the timing of the interruption for the preamble/SRS transmission to the target base station. Improvements described herein may comprise advantages such as reducing latency for PCell switching and/or reducing interruption time for uplink transmission to the source base station.

Figure 52A:
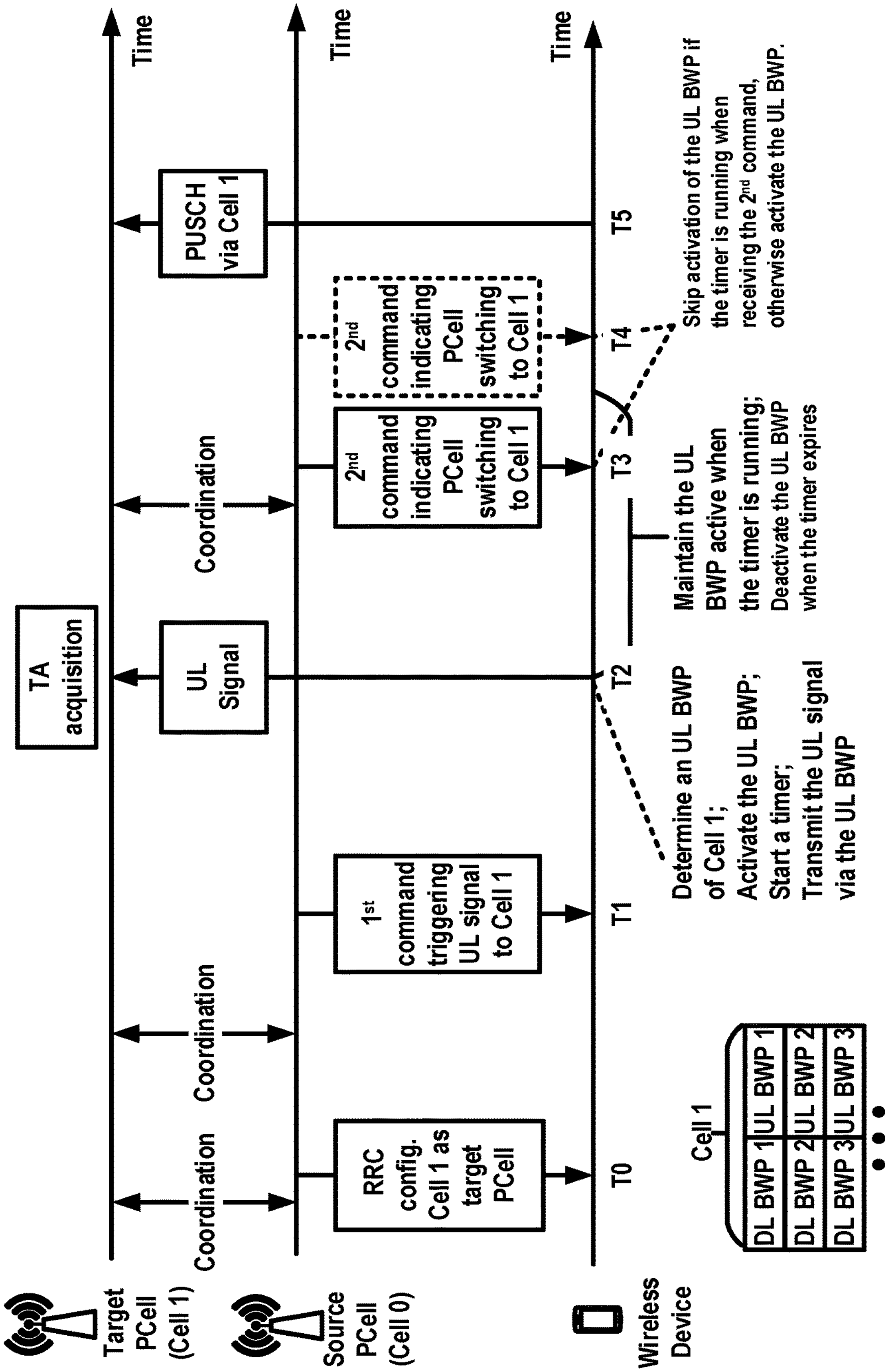
FIG. 52A shows an example of early time alignment acquisition for fast cell switching.

FIG. 52 shows an example embodiment of early time alignment acquisition for fast cell switching. FIG. 52 shows an example embodiment of ETA-based handover based on example of FIG. 48A. A wireless device may receive (e.g., at TO), and/or a base station/gNB (e.g., via a source PCell, Cell 0 in FIG. 52) may transmit, one or more RRC messages comprising configuration parameters of Cell 1 as a candidate target PCell for HO based on an L1 or L2 cell switch command. The one or more RRC messages may be implemented such as described with respect to FIG. 48A.

The configuration parameters of Cell 1 may indicate a plurality of DL BWPs and a plurality of UL BWPs configured for Cell 1. The plurality of DL BWPs may comprise DL BWP 1, DL BWP 2, etc. The plurality of UL BWPs may comprise UL BWP 1, UL BWP 2, etc. A BWP may be implemented such as described with respect to FIG. 9, FIG. 22 and/or FIG. 28.

There may be no active DL BWP and no active UL BWP in Cell 1, for example, if Cell 1 is configured as a non-serving cell, until performing HO to Cell 1. The wireless device may communicate with the base station via Cell 0 and/or one or more SCells, for example, based on receiving the one or more RRC messages (e.g., at TO). Communicating with the base station may comprise receiving MIBs/SIBs/CSI-RSs/PDCCH/PDSCH and/or transmitting RACH/PUSCH/PUCCH/SRS.

The wireless device, according to the received RRC messages comprising parameters of Cell 0 and/or Cell 1 (or a plurality of candidate target PCells), may perform Layer 1 or Layer 2 measurement report (CSI/beam) for the plurality of candidate target PCells and/or Cell 0. The layer 1 or layer 2 measurement report may comprise layer 1 RSRP, layer 1 RSRQ, PMI, RI, layer 1 SINR, CQI, etc.

The wireless device may determine that Cell 1 has better channel quality than Cell 0. The wireless device may transmit (not shown in FIG. 52) the layer 1 or layer 2 measurement report (L1 CSI report for Cell 1) indicating that Cell 1 has better channel quality than Cell 0, for example, based on such as described with respect to FIG. 48A. The source base station and/or the target base station may determine/coordinate whether Cell 1 is used as the target PCell for future cell switching, for example, based on receiving the layer 1 or layer 2 measurement report.

The source base station may transmit, for example, at T1, from Cell 0 (or an activated SCell of the wireless device) a first command (1st command) triggering an uplink transmission to (or via) Cell 1, for example, if determining Cell 1 is used as the target PCell for HO. The uplink transmission may be a transmission of a RACH preamble or other uplink signals like SRS such as described with respect to FIG. 48A.

The first command may comprise at least one of: a SSB index indicating a SSB of a plurality of SSBs of Cell 1, a RA preamble index, a PRACH mask index, a cell indication indicating Cell 1, an UL/SUL indicator, etc. The wireless device may determine on which UL BWP of Cell 1 the wireless device transmits the uplink signal (preamble or SRS, etc.), for example, based on (e.g., in response to) receiving the first command via Cell 0 (or an active DL BWP of Cell 0) at T1.

The wireless device may determine the uplink BWP, for the preamble/SRS transmission, as a BWP configured with firstActiveUplinkBWP-id (or initialUplinkBWP) of Cell 1, based on, (e.g., in response to) receiving the PDCCH order via Cell 0. Using the BWP configured with firstActiveUplinkBWP-id (or initialUplinkBWP) of Cell 1 for the preamble/SRS transmission may allow the target base station to correctly estimate the TA for the wireless device to use for uplink transmission via (the same uplink BWP of) Cell 1 in future, for example, if the wireless device receives a second command indicating PCell switching to Cell 1 (e.g., at T3 or T4 as shown in FIG. 52).

The wireless device may determine the uplink BWP, for the preamble transmission, as a BWP, of Cell 1, indicated by a BWP indicator of the PDCCH order, based on, (e.g., in response to) receiving the PDCCH order via Cell 0. The BWP indicator of the PDCCH order may indicate the BWP of a plurality of BWPs of Cell 1. The PDCCH order may further comprise a cell indication indicating Cell 1 from a plurality of candidate target PCells. Example embodiments may allow the base station to dynamically indicate an uplink BWP of Cell 1 for the preamble transmission for early time alignment acquisition.

The wireless device may determine a frequency reference point for the preamble/SRS transmission via Cell 1. The frequency reference point may be a starting PRB of the uplink BWP indicated by firstActiveUplinkBWP-id (or initialUplinkBWP) of Cell 1. The frequency reference point may be indicated as a separate parameter, for the preamble/SRS transmission for the ETA acquisition for Cell 1, different from firstActiveUplinkBWP-id (or initialUplinkBWP) of Cell 1.

The wireless device may activate the determined uplink BWP (indicated by firstActiveUplinkBWP-id (or initialUplinkBWP) or indicated by the PDCCH order) of Cell 1 upon receiving the PDCCH order (first command) at T1. The wireless device may maintain the uplink BWP in the activated state during a time period when the wireless device transmits the preamble/SRS via the uplink BWP.

The time period may be determined based on the wireless device's capability for retuning the RF chain to the frequency of the uplink BWP and transmitting the preamble and retuning the RF chain back to the frequency of the source PCell. The time period may be implemented such as described with respect to FIG. 50 and/or FIG. 51. During the timer period, the wireless device may stop uplink transmission via Cell 0 (and/or one or more active SCells).

The wireless device may start a timer (e.g., a preamble transmission timer, or an early BWP activation timer, etc.), for example, based on receiving the PDCCH order (first command) at T1. The timer may be a new timer configured for the preamble/SRS transmission on the determined uplink BWP of Cell 1 before the wireless device receives the cell switch command at T3 or T4 in FIG. 52. The timer may be different from (or shorter than) a BWP inactivity timer (bwp-InactivityTimer) configured on Cell 1. The wireless device may maintain the uplink BWP active when the timer is running. The wireless device may not transmit uplink signals (PUCCH/PUSCH) except the preamble/SRS on the uplink BWP of Cell 1, for example, if the timer is running. The timer may be configured long enough to allow the wireless device to retune the RF chain to the frequency of the uplink BWP of Cell 1 and transmit the preamble/SRS via the uplink BWP of Cell 1.

During a time period when the timer is running, the wireless device may stop uplink transmission via Cell 0 (and/or one or more active SCells). The wireless device may transmit, at T2 in FIG. 52, the preamble/SRS via the activated uplink BWP of Cell 1, for example, if the timer is running. The wireless device may start the timer upon transmitting the preamble/SRS at T2, instead of upon receiving the first command at T1.

The wireless device may receive, via the first cell, a second command indicating PCell switching from Cell 0 to Cell 1. The second command may comprise a TAC for Cell 1, for example, such as described with respect to FIG. 48A. The wireless device may receive the second command at a first time (e.g., at T3), for example, if the timer is running, or may receive the second command at a second time (e.g., at T4), for example, if the timer expires.

The wireless device may switch the PCell to Cell 1 comprising transmitting uplink signals (at T5 in FIG. 52) based on the TAC and via the uplink BWP, for example, based on the uplink BWP being in the activated state in response to the timer being running, for example, based on (e.g., in response to) receiving the second command at T3, for example, before the timer expires or if the timer is running. The wireless device may stop the timer, for example, based on transmitting the uplink signals via the uplink BWP. The wireless device may start the BWP inactivity timer, for example, based on transmitting the uplink signals via the uplink BWP. The wireless device may deactivate the uplink BWP of Cell 1, for example, based on the timer expiring. The wireless device, for example, by deactivating the uplink BWP of Cell 1 based on the expiry of the timer, may not switch the active uplink BWP to an initial/default BWP of Cell 1 and may determine none of the uplink BWPs of Cell 1 is active. In at least some wireless technologies, there is no BWP inactivity timer (where the BWP inactivity timer is used to control an active/deactivated state of a downlink BWP) associated with an uplink BWP and the active uplink BWP is kept in active state until deactivated by the base station. Improvements described herein may comprise advantages such as reducing power consumption of the wireless device for managing an uplink BWP of a target PCell (which may be a non-serving cell) when the timer expires.

The wireless device may switch the PCell to the second cell comprising activating the uplink BWP and transmitting uplink signals (e.g., at T5) based on the TAC and via the uplink BWP, for example, based on (e.g., in response to) receiving the second command at T4, for example, after the timer expires. The wireless device may activate the uplink BWP, for example, based on the uplink BWP being deactivated based on (e.g., in response to) the expiry of the timer.

By implementing example of FIG. 52, the wireless device may temporarily activate an uplink BWP (e.g., indicated by firstActiveUplinkBWP-id) of the target PCell for a preamble transmission via the target PCell upon receiving the PDCCH order via a source PCell. The wireless device may maintain the uplink BWP active for a time period (e.g., if a timer configured for the preamble transmission is running). The wireless device may deactivate (e.g., automatically) the uplink BWP of the target PCell, for example, based on (e.g., after) the time period. The wireless device may skip activating the uplink BWP and may transmit PUSCH/PUCCH on the uplink BWP of the target PCell, for example, if the wireless device receives a L1 or L2 cell switch command during the time period (or when the timer is running). The wireless device may activate the uplink BWP and then transmit PUSCH/PUCCH on the uplink BWP of the target PCell, for example, if the wireless device receives a L1 or L2 cell switch command after the time period (or when the timer expires).

The activation of a BWP of the second cell (a target PCell), for example, before receiving a L1 or L2 cell switch command indicating a PCell switching to the target PCell, may be referred to as an early (downlink/uplink) BWP activation. The early activation of the BWP of the second cell may be based on (e.g., in response to) receiving a PDCCH order triggering a preamble/SRS transmission via the second cell. The PDCCH order may not comprise a BWP ID. The PDCCH order may be received, for example, before receiving the L1 or L2 cell switch command. Early BWP activation, (combined with the ETA procedure described in FIG. 47) may reduce HO/cell switching latency, since the wireless device may not need to perform BWP activation based on receiving the L1 or 2 cell switch command. Early BWP activation may increase power consumption of the wireless device since the wireless device may maintain (or may not switch off) the RF chain for the uplink BWP as long as the uplink BWP is active on the target PCell.

A wireless device may receive from a base station RRC message(s) comprising configuration parameters of a first cell and a second cell, wherein the second cell comprises uplink BWPs. The wireless device may receive, via the first cell as a PCell, a PDCCH order indicating a transmission of a preamble to (or via) the second cell. The wireless device may transmit the preamble via an uplink BWP of the uplink BWPs of the second cell, wherein the uplink BWP is deactivated. The wireless device may receive, via the first cell, a control element indicating: switching the PCell from the first cell to the second cell, and/or a TAC for the second cell. The wireless device may switch the PCell to the second cell, wherein the switching comprises activating the uplink BWP and transmitting uplink signals based on the TAC and via the uplink BWP.

Figure 52B:
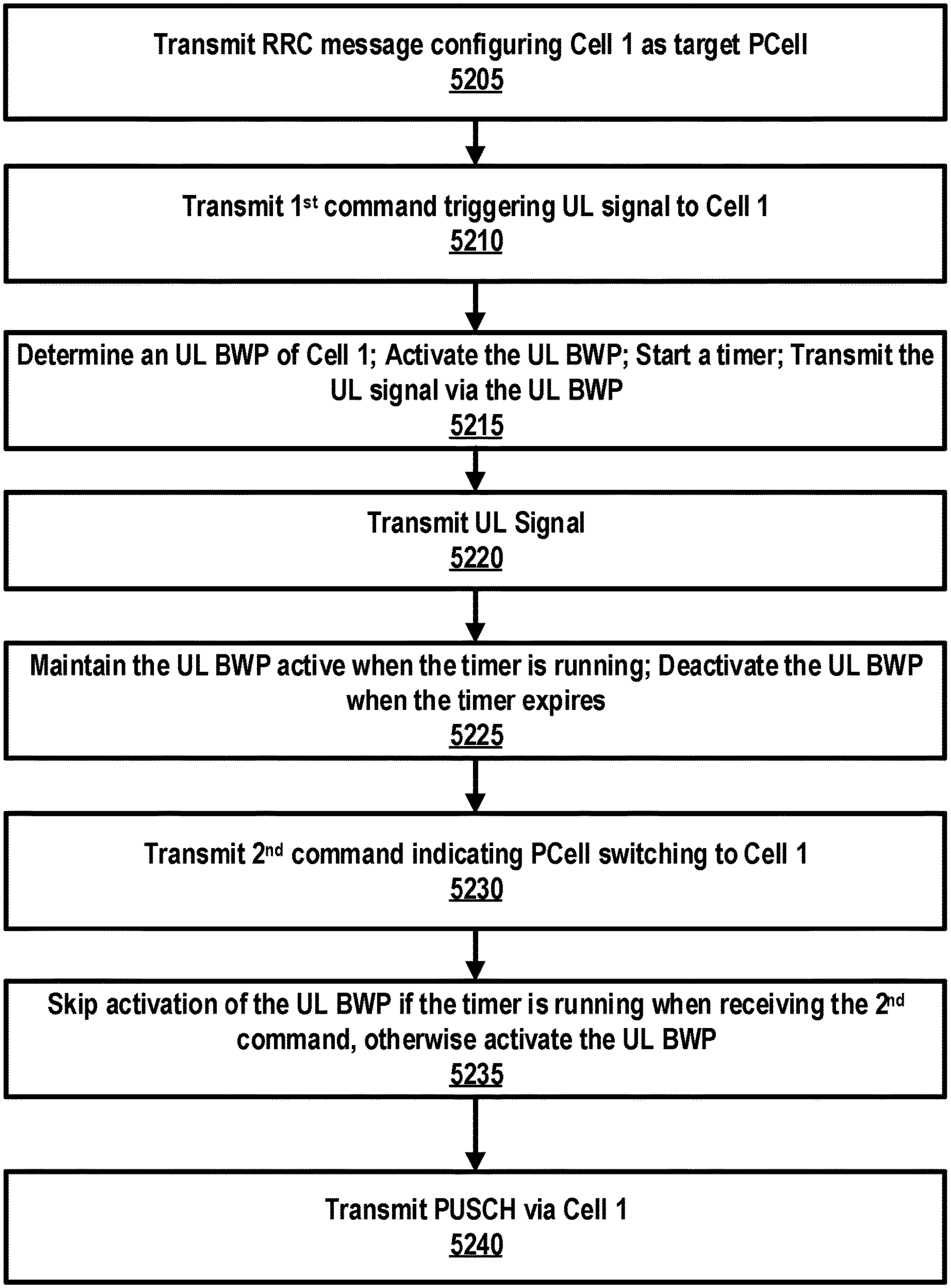
FIG. 52B shows an example method of early time alignment acquisition for fast cell switching.

FIG. 52B shows an example method of early time alignment acquisition for fast cell switching. At 5205, an RRC message configuring Cell 1 as a target PCell may be transmitted. For example, a source PCell (Cell 0) may transmit the RRC message to a wireless device. At 5210, a first command triggering an uplink signal to Cell 1 may be transmitted. For example, the source PCell may transmit the first command to the wireless device. At 5215, an uplink BWP of Cell 1 may be determined, the uplink BWP may be activated, a timer may be started, and the uplink signal may be transmitted via the uplink BWP, for example, at T2. At 5220, the uplink signal may be transmitted. For example, the wireless device may transmit the uplink signal to the target PCell (Cell 1). Time alignment acquisition may occur. At 5225, the uplink BWP may be maintained active, for example, if the timer is running, and the uplink BWP may be deactivated, for example, if the timer expires. For example, the features of 5225 may occur between T2 and T3. At 5230, a second command may be transmitted indicating PCell switching to Cell 1. For example, the source PCell (Cell 0) may transmit the second command to the wireless device. At 5235, activation of the uplink may be skipped, for example, if the timer is running during receiving the second command. Otherwise, at 5235, the uplink BWP may be activated. For example, the features of 5235 may occur at T3 and T4. At 5240, PUSCH transmissions may be transmitted via Cell 1. For example, the wireless device may transmit the PUSCH transmissions to the target PCell (Cell 1).

A wireless device may perform a method comprising multiple operations. A wireless device may receive one or more radio resource control (RRC) messages comprising configuration parameters of a candidate cell for a layer 1 or layer 2 triggered mobility (LTM) procedure, wherein the configuration parameters may indicate a frequency resource associated with an early uplink synchronization procedure of the candidate cell. The wireless device may receive a physical downlink control channel (PDCCH) order indicating a transmission of a preamble via the candidate cell for the early uplink synchronization procedure. The wireless device may transmit, via the frequency resource of the candidate cell, the preamble. The wireless device may receive a medium access control (MAC) control element (CE) indicating switching from the source cell to the candidate cell for the LTM procedure. The configuration parameters may indicate an initial uplink bandwidth part of the candidate cell. The wireless device may activate, based on switching from the source cell to the candidate cell as the PCell, the initial uplink BWP of the candidate cell. The wireless device may transmit at least one signal via the activated initial uplink BWP of the PCell. The MAC CE may further indicate a time alignment command (TAC) for the candidate cell. The transmitting the at least one signal may be based on the TAC. The configuration parameters of the candidate cell may comprise a frequency resource indication for the deactivated initial uplink BWP, wherein the frequency resource indication may indicate a starting physical resource block (PRB) and a quantity of PRBs for the deactivated initial uplink BWP. The transmitting the preamble may comprise transmitting the preamble in a frequency resource that is based on a frequency start point indication indicating a frequency offset of a physical random access channel (PRACH) transmission for the preamble and the starting PRB of the deactivated initial uplink BWP. The PDCCH order may comprise a cell indication indicating the candidate cell. The PDCCH order may comprise a synchronization signal block (SSB) index indicating a SSB of a plurality of SSBs of the candidate cell. The source cell and the candidate cell may be in different time alignment groups (TAGs). Receiving the MAC CE indicating the switching from the source cell to the candidate cell as the PCell may be based on a time alignment timer (TAT) of the candidate cell not running. The initial uplink BWP deactivated during the transmission of the preamble may be maintained. An active uplink BWP, of the source cell, may be maintained in the active state during the transmission of the preamble to the second cell. The plurality of SSBs may be received via a downlink BWP of a plurality of downlink BWPs of the candidate cell, wherein the downlink BWP is deactivated based on at least one of the candidate cell not being a serving cell or the candidate cell being a deactivated secondary cell. The wireless device may transmit the preamble at a second time occurring a quantity of slots after the last slot of the reception of the PDCCH order, wherein the quantity is determined based on a physical uplink shared channel (PUSCH) preparation time according to a wireless device processing capability, an uplink BWP switching delay, and an uplink transmission switching delay. The uplink BWP switching delay may be zero. The uplink transmission switching delay may be determined based on a wireless device uplink transmission switching capability. A TAT of the source cell may be running. The TAT of the source cell may be stopped based on switching the PCell from the source cell to the candidate cell. The TAT of the candidate cell may be started based on switching from the source cell to the candidate cell as the PCell. Uplink transmission via the source cell may be stopped for a time gap during which the wireless device is transmitting the preamble. The time gap may comprise at least one of a first duration used for preparing the transmission of the preamble, a second duration used for the preamble transmission, or a third duration used for switching to the frequency of the active uplink BWP of the first cell. Uplink signals may be transmitted via an active uplink BWP of the source cell before receiving the PDCCH order. Uplink transmissions of the uplink signals may be resumed via the active uplink BWP of the source cell after the time gap. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. A wireless device may receive, via a first cell as a primary cell (PCell), a physical downlink control channel (PDCCH) order indicating a transmission of a preamble to a second cell for a layer 1 or layer 2 triggered mobility (LTM) procedure. The wireless device may transmit, based on the PDCCH order and before an initial uplink bandwidth part (BWP) of a plurality of BWPs of the second cell is activated, the preamble via the initial uplink BWP of the second cell. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. A wireless device may receive configuration parameters of a plurality of cells comprising a first cell and a second cell, wherein the second cell comprises a plurality of uplink bandwidth parts (BWPs) comprising an initial uplink BWP. The wireless device may receive a physical downlink control channel (PDCCH) order indicating a transmission of a preamble via the second cell. The wireless device may transmit the preamble via the initial uplink BWP of the uplink BWPs, wherein the initial uplink BWP is deactivated. The wireless device may receive, via the first cell, a control element indicating switching the PCell from the first cell to the second cell and a time alignment command (TAC) for the second cell. The wireless device may switch the PCell to the second cell, wherein the switching comprises activating the initial uplink BWP and transmitting, based on the TAC, at least one signal via the initial uplink BWP. The configuration parameters of the candidate cell may comprise a frequency resource indication for the deactivated initial uplink BWP, wherein the frequency resource indication indicates a starting physical resource block (PRB) and a quantity of PRBs for the deactivated initial uplink BWP. The wireless device may transmit the preamble in a frequency resource determined based on a frequency start point indication indicating a frequency offset of a physical random access channel (PRACH) transmission occasion for the preamble and the starting PRB of the deactivated initial uplink BWP. The PDCCH order may comprise a synchronization signal block (SSB) index indicating a SSB of a plurality of SSBs of the candidate cell. The source cell and the candidate cell may be in different time alignment groups (TAGs). A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. A wireless device may receive radio resource control (RRC) messages comprising configuration parameters of a candidate cell for a layer 1 or layer 2 triggered mobility (LTM) procedure, wherein the candidate cell comprises a plurality of uplink bandwidth parts (BWPs). The wireless device may receive a physical downlink control channel (PDCCH) order indicating a transmission of a preamble to the candidate cell. The wireless device may transmit the preamble via an initial uplink BWP of the plurality of uplink BWPs of the candidate cell. The wireless device may receive a medium access control (MAC) control element (CE) indicating switching from the source cell to the candidate cell as a primary cell (PCell) for the LTM procedure. The wireless device may activate the initial uplink BWP of the candidate cell based on switching from the source cell to the candidate cell as the PCell. The wireless device may transmit at least one signal via the activated initial uplink BWP of the PCell. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may receive a physical downlink control channel (PDCCH) order indicating a transmission of a preamble via a candidate cell for a layer 1 or layer 2 triggered mobility (LTM) procedure. The wireless device may transmit, based on the PDCCH order, the preamble via a deactivated initial uplink bandwidth part (BWP) of a plurality of uplink BWPs of the candidate cell. The wireless device may receive a medium access control (MAC) control element (CE) indicating switching from a source cell to the candidate cell as a primary cell (PCell) for the LTM procedure. The wireless device may activate, based on switching from the source cell to the candidate cell as the PCell, the initial uplink BWP of the candidate cell. The wireless device may transmit at least one signal via the activated initial uplink BWP. The MAC CE may indicate a time alignment command (TAC) for the candidate cell. Transmitting the at least one signal may be based on the TAC. The wireless device may transmit the preamble in a frequency resource determined based on a frequency start point indication indicating a frequency offset of a physical random access channel (PRACH) transmission occasion for the preamble and the starting PRB of the deactivated initial uplink BWP. The PDCCH order may comprise a synchronization signal block (SSB) index indicating a SSB of a plurality of SSBs of the candidate cell. The source cell and the candidate cell may be in different time alignment groups (TAGs). A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. A wireless device may receive, via a source cell, radio resource control (RRC) messages comprising configuration parameters of a candidate cell for a layer 1/2 triggered mobility (LTM) procedure, wherein the candidate cell comprises uplink bandwidth parts (BWPs). The wireless device may receive a physical downlink control channel (PDCCH) order indicating a transmission of a preamble to the candidate cell. The wireless device may transmit, via an initial uplink BWP of the uplink BWPs of the candidate cell, the preamble, wherein the initial uplink BWP is deactivated. The wireless device may receive a medium access control control element (MAC CE) indicating switching from the source cell to the candidate cell as a primary cell (PCell) for the LTM procedure. The wireless device may activate the initial uplink BWP of the candidate cell after switching from the source cell to the candidate cell as the PCell. The wireless device may transit uplink signals via the activated initial uplink BWP of the PCell. The configuration parameters of the candidate cell may comprise frequency resource indication for the initial uplink BWP, wherein the frequency resource indication indicates a starting physical resource block (PRB) and a number of PRBs for the initial uplink BWP. The wireless device may transmit the preamble in a frequency resource determined based on a frequency start point indication indicating a frequency offset of a PRACH transmission occasion for the preamble and the starting PRB of the initial uplink BWP. The initial uplink BWP deactivated during the transmission of the preamble may be maintained. An active uplink BWP, of the source cell, may be maintained in the active state during the transmission of the preamble to the second cell. The PDCCH order may comprise a cell indication indicating the candidate cell. The PDCCH order may comprise a synchronization signal block (SSB) index indicating a SSB of a plurality of SSBs of the candidate cell. The plurality of SSBs may be received via a downlink BWP of a plurality of downlink BWPs of the candidate cell, wherein the downlink BWP is deactivated based on at least one of the candidate cell not being a serving cell and the candidate cell being a deactivated secondary cell. The wireless device may transmit the preamble at a second tie occurring a number (e.g., quantity) of slots (or symbols) after the last symbol of the reception of the PDCCH order, wherein the number is determined based on a physical uplink shared channel (PUSCH) preparation time according to a UE (e.g., wireless device) processing capability, an uplink BWP switching delay, and an uplink transmission switching delay. The uplink BWP switching delay may be zero. The uplink transmission switching delay may be determined based on a UE uplink transmission switching capability. The source cell and the candidate cell may be in different time alignment groups (TAGs). A time alignment timer (TAT) of the source cell may be running. The TAT of the source cell may be stopped in response to switching the PCell from the source cell to the candidate cell. A TAT of the candidate cell may not be running before receiving the MAC CE indicating the switching from the source cell to the candidate cell as the PCell. The TAT of the candidate cell may be started in response to (e.g., based on) switching from the source cell to the candidate cell as the PCell. Uplink transmission via the source cell may be stopped during a time gap when the wireless device is transmitting the preamble. The time gap may comprise at least one of a first duration used for preparing the transmission of the preamble, a second duration used for the preamble transmission, and a third duration used for switching to the frequency of the active uplink BWP of the first cell. Uplink signals may be transmitted via an active uplink BWP of the source cell before receiving the PDCCH order. Uplink transmissions of the uplink signals may be resumed via the active uplink BWP of the source cell after the time gap. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. A wireless device may receive, via the first cell as a primary cell (PCell), a physical downlink control channel (PDCCH) order indicating transmission of a preamble to the second cell for a layer 1/2 triggered mobility (LTM) procedure. The wireless device may transmit, in response to the PDCCH order and before an initial uplink bandwidth part (BWP) of uplink BWPs of the second cell is activated, the preamble via the initial uplink BWP of the second cell. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. A wireless device may receive configuration parameters of a first cell and a second cell, wherein the second cell comprises uplink bandwidth parts (BWPs) comprising an initial uplink BWP. The wireless device may receive, via the first cell as a primary cell (PCell), a physical downlink control channel (PDCCH) order indicating a transmission of a preamble to a second cell comprising uplink bandwidth parts (BWPs). The wireless device may transmit the preamble via the initial uplink BWP of the uplink BWPs, wherein the initial uplink BWP is deactivated. The wireless device may receive, via the first cell, a control element indicating switching the PCell from the first cell to the second cell and a time alignment command (TAC) for the second cell. The wireless device may switch the PCell to the second cell comprising activating the uplink BWP and transmitting uplink signals to the second cell via the uplink BWP and based on the TAC. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. A wireless device may receive, via a source cell, radio resource control (RRC) messages comprising configuration parameters of a candidate cell for a layer 1/2 triggered mobility (LTM) procedure, wherein the candidate cell comprises uplink bandwidth parts (BWPs). The wireless device may receive a physical downlink control channel (PDCCH) order indicating a transmission of a preamble to the candidate cell. The wireless device may transmit the preamble via an initial uplink BWP of the uplink BWPs of the candidate cell. The wireless device may receive a medium access control control element (MAC CE) indicating switching from the source cell to the candidate cell as a primary cell (PCell) for the LTM procedure. The wireless device may activate the initial uplink BWP of the candidate cell after switching from the source cell to the candidate cell as the PCell. The wireless device may transmit uplink signals via the activated initial uplink BWP of the PCell. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. A wireless device may receive, via a source cell, a physical downlink control channel (PDCCH) order indicating a transmission of a preamble to a candidate cell for a layer 1/2 triggered mobility (LTM) procedure. The wireless device may transmit, in response to (e.g., based on) the PDCCH order, the preamble via an initial uplink bandwidth part (BWP) of uplink BWPs of the candidate cell. The wireless device may receive a medium access control control element (MAC CE) indicating switching from the source cell to the candidate cell as a primary cell (PCell) for the LTM procedure. The wireless device may activate the initial uplink BWP of the candidate cell after switching from the source cell to the candidate cell as the PCell. The wireless device may transmit uplink signals via the activated initial uplink BWP. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. An uplink BWP may be the same as a first uplink BWP of the uplink BWPs of a second cell, wherein a first uplink BWP is configured to be activated upon performing RRC configuration or reconfiguration. The configuration parameters of the second cell may comprise a BWP identifier identifying the first uplink BWP. The uplink BWP may be the same as a second uplink BWP of the uplink BWPs of the second cell, wherein the second uplink BWP is configured to be activated upon receiving the control element indicating the PCell switching to the second cell. The second uplink BWP may be the same as a first uplink BWP configured to be activated upon performing RRC configuration or reconfiguration. The second uplink BWP may be different from a first uplink BWP configured to be activated upon performing RRC configuration or reconfiguration. The configuration parameters of the second cell may comprise a BWP identifier identifying the second uplink BWP. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The uplink BWP may be configured as a third uplink BWP of the uplink BWP of the second cell, and dedicated for the preamble transmission for the second cell before receiving the control element indicating the PCell switching. The uplink BWP may be different from at least one of: a first uplink BWP configured to be activated upon performing RRC configuration or reconfiguration and/or a second uplink BWP configured to be activated upon receiving the control element indicating switching the PCell to the second cell. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The configuration parameters of the second cell may comprise frequency resource indication for the uplink BWP, wherein the frequency resource indication may indicate a starting PRB and a number of PRBs for the uplink BWP. The wireless device may transmit the preamble in a frequency resource determined based on: a frequency start point indication indicating a frequency offset of a PRACH transmission occasion for the preamble and the starting PRB of the uplink BWP. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The wireless device may maintain the uplink BWP deactivated during the transmission of the preamble. The wireless device may maintain an active uplink BWP, of the first cell, in the active state during the transmission of the preamble to the second cell. The uplink BWP may be indicated in the PDCCH order. The PDCCH order may comprise a cell indication indicating the second cell. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The PDCCH order may comprise an SSB index indicating a SSB of a plurality of SSBs of the second cell. The configuration parameters of the second cell comprise configuration parameters of the plurality of SSBs of the second cell, an SSB (e.g., each SSB) of the plurality of SSBs being associated with a respective preamble of a plurality of preambles. Each preamble is identified by a preamble index. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The plurality of SSBs may be received via a downlink BWP of a plurality of downlink BWPs of the second cell, wherein the downlink BWP is deactivated based on at least one of: the second cell not being a serving cell and/or the second cell being a deactivated secondary cell. The downlink BWP may be the same as a first downlink BWP of the plurality of downlink BWPs of the second cell, wherein the first downlink BWP is configured to be activated upon performing RRC configuration or reconfiguration. The configuration parameters of the second cell may comprise a BWP identifier identifying the first downlink BWP. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The downlink BWP may be the same as a second downlink BWP of the plurality of downlink BWPs of the second cell, wherein the second downlink BWP is configured to be activated upon receiving the control element indicating the PCell switching. The configuration parameters of the second cell may comprise a BWP identifier identifying the second downlink BWP. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The wireless device may transmit the preamble at a second time occurring a number of slots (or symbols), for example, based on (e.g., after) the last symbol of the reception of the DCI, wherein the number is determined based on: a physical uplink shared channel (PUSCH) preparation time according to a wireless device processing capability, an uplink BWP switching delay and an uplink transmission switching delay. The uplink BWP switching delay may be zero. The wireless device may determine the uplink BWP switching delay is zero based on the uplink BWP being deactivated. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The uplink transmission switching delay may be determined based on a wireless device uplink transmission switching capability. The wireless device may determine the uplink transmission switching delay based on the first cell and the second cell belonging to two different time alignment groups (TAGs). The uplink transmission switching delay may be different from an uplink transmission switching delay applied for switching between two cells belonging to a same TAG. The first cell and the second cell may be in different TAGs. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. A TAT of the first cell may be running before receiving the control element. The wireless device may stop the TAT of the first cell in response to switching the PCell from the first cell to the second cell. A TAT of the second cell may not be running before receiving the control element indicating the PCell switching. The wireless device may start the TAT of the second cell in response to switching the PCell from the first cell to the second cell. The wireless device may stop uplink transmission(s) via the first cell during a time gap when the wireless device is transmitting the preamble. The uplink transmission(s) may comprise at least one of: PRACH/SRS/PUSCH/PUCCH. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The time gap may comprise at least one of: a first duration used for preparing the transmission of the preamble, a second duration used for the preamble transmission, and/or a third duration used for switching to the frequency of the active uplink BWP of the first cell. The wireless device may transmit uplink signals via an active uplink BWP of the first cell before receiving the PDCCH order. The wireless device may resume uplink transmissions of the uplink signals via the active uplink BWP of the first cell after the time gap. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The wireless device may monitor a PDCCH with a RA-RATI for receiving a RAR based on (e.g., as a response to) the preamble. The RAR may comprise the TAC for the second cell. The wireless device may determine a value of the RA-RNTI based on at least one of: a first OFDM symbol of the PRACH occasion of the second cell, a first slot of the PRACH occasion of the second cell, an index of the PRACH occasion in the frequency domain of the second cell, and/or an uplink carrier indication of the second cell. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The wireless device may monitor the PDCCH via at least one of: an active downlink BWP of the first cell on which the wireless device receives the PDCCH order and/or a first downlink BWP of the second cell on which the wireless device receives SSB(s). A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The wireless device may skip monitoring (or may not monitor) a PDCCH (on the first cell) with a RA-RNTI for receiving a RAR as a response to the preamble. The control element may comprise the TAC based on (e.g., in response to) skipping the monitoring the PDCCH with the RA-RNTI for receiving the RAR. The wireless device, during skipping monitoring the PDCCH with the RA-RNTI for receiving the RAR, may monitor other PDCCHs with a second RNTI, different from the RA-RNTI, for receiving a second DCI indicating at least one of: a downlink scheduling on the first cell and/or an uplink scheduling on the first cell. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The first cell may be a serving cell before switching the PCell to the second cell. The second cell may be a non-serving cell before switching the PCell to the second cell. According to an example embodiment, the second cell may be a deactivated secondary cell (SCell) before switching the PCell to the second cell. The first cell may be (or may be transitioned as) a non-serving cell, for example, based on (e.g., after) switching the PCell to the second cell. The wireless device may maintain (or store without releasing) configuration parameters of the first cell, for example, based on (e.g., after) switching the PCell from the first cell to the second cell. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The second cell may be (or may be transitioned as) a serving cell, for example, based on (e.g., after) switching the PCell to the second cell. The first cell may be (or may be transitioned as) a deactivated SCell, for example, based on (e.g., after) switching the PCell to the second cell. The wireless device may receive, via an active downlink BWP of the first cell, a DCI indicating the PDCCH order. The wireless device may determine the DCI indicating the PDCCH order based on at least one of: the DCI being scrambled by a C-RNTI identifying the wireless device, and/or a frequency domain resource assignment (FDRA) bit field of the DCI being set to all ones. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The DCI may comprise an indication indicating whether an UL carrier or a SUL carrier of the second cell may be used for the preamble transmission. The uplink signals may comprise at least one of: PUSCH/PUCCH/SRS. The transmitting the uplink signals based on the TAC may comprise advancing or delaying uplink transmission timing of the scheduled uplink signals by an amount indicated by the TAC. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. A wireless device may receive from a base station via a first cell as a PCell, a PDCCH order indicating a transmission of a preamble to a second cell comprising uplink BWPs. The wireless device may transmit the preamble via an uplink BWP of the uplink BWPs, wherein the uplink BWP is deactivated. The wireless device may receive, via the first cell, a control element indicating switching the PCell from the first cell to the second cell and a TAC for the second cell. The wireless device may switch the PCell to the second cell wherein the switching comprises activating the uplink BWP and transmitting uplink signals to the second cell via the uplink BWP and based on the TAC. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. A wireless device may receive from a base station via a first cell as a PCell, a PDCCH order indicating a transmission of a preamble to a second cell comprising uplink BWPs. The wireless device may determine an uplink BWP from the uplink BWPs of the second cell for the transmission of the preamble. The wireless device may transmit the preamble via the uplink BWP of the uplink BWPs, wherein the uplink BWP is deactivated. The wireless device may receive, after transmitting the preamble and via the first cell, a control element indicating switching the PCell from the first cell to the second cell. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. A wireless device may receive from a base station via a first cell as a PCell, a first command indicating a transmission of an uplink signal to a second cell comprising uplink BWPs. The wireless device may determine an uplink BWP from the uplink BWPs of the second cell for the transmission of the uplink signal. The wireless device may transmit the uplink signal via the uplink BWP of the uplink BWPs, wherein the uplink BWP is deactivated. The wireless device may receive, for example, based on (e.g., after) transmitting the uplink signal and via the first cell, a second command indicating switching the PCell from the first cell to the second cell. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The uplink signal may comprise at least one of: a preamble and/or an SRS. The first command may comprise a DCI indicating a transmission, to the second cell, of a preamble for a RA procedure initiated by a PDCCH order. The first command may comprise a MAC CE indicating a transmission, to the second cell, of a preamble for a RA procedure. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The first command may comprise an RRC message indicating a transmission, to the second cell, of a preamble for a RA procedure. The uplink BWP may be the same as a first uplink BWP of the uplink BWPs of the second cell, wherein the first uplink BWP is configured to be activated upon performing RRC configuration or reconfiguration. The uplink BWP may be the same as a first uplink BWP of the uplink BWPs of the second cell, wherein the first uplink BWP is configured to be activated upon switching the PCell from the first cell to the second based on receiving the second command. The configuration parameters of the second cell may comprise a BWP identifier identifying the first uplink BWP. According to an example embodiment, the second command may comprise a DCI, a MAC CE and/or a RRC message. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. A wireless device may receive from a base station RRC message(s) comprising configuration parameters of a first cell and a second cell, wherein the second cell comprises uplink BWPs. The wireless device may receive, via the first cell as a PCell, a PDCCH order indicating a transmission of a preamble to (or via) the second cell. The wireless device may activate a first uplink BWP of the uplink BWPs of the second cell, for example, based on (e.g., in response to) receiving the PDCCH order. The wireless device may transmit the preamble via the first uplink BWP based on activating the first uplink BWP. The wireless device may start a first timer associated with the transmitting the preamble based on (e.g., in response to) transmitting the preamble (or in response to activating the first uplink BWP). The first timer may be configured in the configuration parameters of the second cell. The first timer may be different from a BWP inactivity timer (e.g., bwp-InactivityTimer) of the second cell. The wireless device may maintain the first uplink BWP in activated state, for example, if the first timer is running. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The wireless device may receive, via the first cell, a control element indicating: switching the PCell from the first cell to the second cell, and/or a TAC for the second cell, for example, if the first timer is running. The wireless device may switch the PCell to the second cell, wherein the switching comprises transmitting uplink signals based on the TAC and via the first uplink BWP based on the first uplink BWP being in the activated state based on (e.g., in response to) the first timer being running. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

A wireless device may perform a method comprising multiple operations. The wireless device may deactivate the first uplink BWP of the second cell, for example, if the first timer expires. The wireless device may receive, for example, based on (e.g., after) the first timer expiring and via the first cell, a control element indicating: switching the PCell from the first cell to the second cell, and/or a TAC for the second cell. The wireless device may switch the PCell to the second cell, wherein the switching comprises activating the first uplink BWP and transmitting uplink signals based on the TAC and via the first uplink BWP based on the first uplink BWP being deactivated in response to the expiry of the first timer. A computing device may comprise one or more processors and memory storing instructions that, when executed by the one or more processors, may cause the computing device to perform any one or more of the operations described herein. A system may comprise a wireless device configured to perform any one or more of the operations described herein, and the wireless device may be configured to receive at least one message from a base station. A computer-readable medium may store instructions that, when executed, cause performance of any one or more of the operations described herein.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, 6G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, 6G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, 6G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

receiving, by a wireless device, one or more radio resource control (RRC) messages comprising configuration parameters of a candidate cell for a layer 1 or layer 2 triggered mobility (LTM) procedure, wherein the configuration parameters indicate a frequency resource associated with an early uplink synchronization procedure of the candidate cell;

receiving a physical downlink control channel (PDCCH) order indicating a transmission of a preamble via the candidate cell for the early uplink synchronization procedure;

transmitting, via the frequency resource of the candidate cell, the preamble; and receiving a medium access control (MAC) control element (CE) indicating switching from a source cell to the candidate cell for the LTM procedure.

2. The method of claim 1, wherein the configuration parameters indicate an initial uplink bandwidth part (BWP) of the candidate cell.

3. The method of claim 2, further comprising:

activating, based on switching from the source cell to the candidate cell as a primary cell (PCell), the initial uplink BWP of the candidate cell; and transmitting at least one signal via the activated initial uplink BWP of the PCell.

4. The method of claim 1, wherein the MAC CE further indicates a time alignment command (TAC) for the candidate cell, and wherein the transmitting the preamble is based on the TAC.

5. The method of claim 1, wherein the configuration parameters of the candidate cell comprise a frequency resource indication for an initial uplink BWP, wherein the frequency resource indication indicates a starting physical resource block (PRB) and a quantity of PRBs for the initial uplink BWP.

6. The method of claim 5, wherein the transmitting the preamble comprises transmitting the preamble in a frequency resource that is based on:

a frequency start point indication indicating a frequency offset of a physical random access channel (PRACH) transmission occasion for the preamble; and the starting PRB of the initial uplink BWP.

7. The method of claim 1, wherein the PDCCH order comprises a cell indication indicating the candidate cell.

8. The method of claim 1, wherein the PDCCH order comprises a synchronization signal block (SSB) index indicating a SSB of a plurality of SSBs of the candidate cell.

9. The method of claim 1, wherein the source cell and the candidate cell are in different time alignment groups (TAGs).

10. The method of claim 1, wherein receiving the MAC CE indicating the switching from the source cell to the candidate cell as a primary cell (PCell) is based on a time alignment timer (TAT) of the candidate cell not running.

11. A method comprising:

receiving, by a wireless device, configuration parameters of a plurality of cells comprising a first cell and a second cell, wherein the second cell comprises a plurality of uplink bandwidth parts (BWPs) comprising an initial uplink BWP for an early uplink synchronization procedure;

receiving a physical downlink control channel (PDCCH) order indicating a transmission of a preamble via the second cell;

transmitting the preamble via the initial uplink BWP of the plurality of uplink BWPs, wherein the initial uplink BWP is deactivated;

receiving, via the first cell, a control element indicating:

switching a primary cell (PCell) from the first cell to the second cell; and a time alignment command (TAC) for the second cell; and switching the PCell to the second cell, wherein the switching comprises:

activating the initial uplink BWP; and transmitting, based on the TAC, at least one signal via the initial uplink BWP.

12. The method of claim 11, wherein configuration parameters of the second cell comprise a frequency resource indication for the initial uplink BWP, wherein the frequency resource indication indicates a starting physical resource block (PRB) and a quantity of PRBs for the initial uplink BWP.

13. The method of claim 12, wherein the wireless device transmits the preamble in a frequency resource determined based on:

a frequency start point indication indicating a frequency offset of a physical random access channel (PRACH) transmission occasion for the preamble; and the starting PRB of the initial uplink BWP.

14. The method of claim 11, wherein the PDCCH order comprises a synchronization signal block (SSB) index indicating a SSB of a plurality of SSBs of the second cell.

15. The method of claim 11, wherein the first cell and the second cell are in different time alignment groups (TAGs).

16. A method comprising:

receiving, by a wireless device, a physical downlink control channel (PDCCH) order indicating a transmission of a preamble via a candidate cell for a layer 1 or layer 2 triggered mobility (LTM) procedure;

transmitting, based on the PDCCH order, the preamble via an initial uplink bandwidth part (BWP) of a plurality of uplink BWPs of the candidate cell, wherein the initial uplink BWP is configured for an early uplink synchronization procedure and is in a deactivated state during the transmitting of the preamble;

receiving a medium access control (MAC) control element (CE) indicating switching from a source cell to the candidate cell as a primary cell (PCell) for the LTM procedure;

activating, based on switching from the source cell to the candidate cell as the PCell, the initial uplink BWP of the candidate cell; and transmitting at least one signal via the activated initial uplink BWP.

17. The method of claim 16, wherein the MAC CE further indicates a time alignment command (TAC) for the candidate cell, and wherein the transmitting the at least one signal is based on the TAC.

18. The method of claim 16, wherein the wireless device transmits the preamble in a frequency resource determined based on:

a frequency start point indication indicating a frequency offset of a physical random access channel (PRACH) transmission occasion for the preamble; and a starting physical resource block (PRB) of the initial uplink BWP.

19. The method of claim 16, wherein the PDCCH order comprises a synchronization signal block (SSB) index indicating a SSB of a plurality of SSBs of the candidate cell.

20. The method of claim 16, wherein the source cell and the candidate cell are in different time alignment groups (TAGs).

* * * * *